United States Patent
Tonkovich et al.

(10) Patent No.: US 7,442,360 B2
(45) Date of Patent: Oct. 28, 2008

(54) HYDROGEN PEROXIDE PRODUCTION IN MICROCHANNEL REACTORS

(75) Inventors: Anna Lee Y. Tonkovich, Marysville, OH (US); Bin Yang, Columbus, OH (US); William Allen Rogers, Jr., Marysville, OH (US); Paul William Neagle, Westerville, OH (US); Sean P. Fitzgerald, Columbus, OH (US); Kai Tod Paul Jarosch, Bexley, OH (US); Dongming Qiu, Dublin, OH (US); David J. Hesse, Columbus, OH (US); Michael Lamont, Hilliard, OH (US)

(73) Assignee: Velocys, Inc., Plain City, OH (US)

( * ) Notice: Subject to any disclaimer, the term of this patent is extended or adjusted under 35 U.S.C. 154(b) by 391 days.

(21) Appl. No.: 11/116,148

(22) Filed: Apr. 27, 2005

(65) Prior Publication Data

US 2005/0265915 A1    Dec. 1, 2005

Related U.S. Application Data

(60) Provisional application No. 60/565,629, filed on Apr. 27, 2004.

(51) Int. Cl.
*C01B 15/029* (2006.01)
*C01B 15/023* (2006.01)
*C01B 15/022* (2006.01)

(52) U.S. Cl. ............... 423/584; 96/4; 423/588; 423/591; 423/659

(58) Field of Classification Search ............... 423/584, 423/588, 589, 590, 591
See application file for complete search history.

(56) References Cited

U.S. PATENT DOCUMENTS 6,117,409 A    9/2000  Bertsch-Frank et al.

(Continued)

FOREIGN PATENT DOCUMENTS

DE    198 16 296 A1    10/1999

(Continued)

OTHER PUBLICATIONS

Janicke, et al., The Controlled Oxidation of Hydrogen from an Explosive Mixture of Gases Using a Microstructured Reactor/Heat Exchanger and Pt/A1203 Catalyst, Journal of Catalysis, Apr. 25, 2000, pp. 282-293, vol. 191, No. 2, Academic Press, Duluth, MN, USA.

(Continued)

*Primary Examiner*—Wayne A. Langel
(74) *Attorney, Agent, or Firm*—Taft Stettinius & Hollister LLP

(57) ABSTRACT

The present invention includes methods and apparatuses that utilize microchannel technology and, more specifically in exemplary form, producing hydrogen peroxide using microchannel technology. An exemplary process for producing hydrogen peroxide comprises flowing feed streams into intimate fluid communication with one another within a process microchannel to form a reactant mixture stream comprising a hydrogen source and an oxygen source such as, without limitation, hydrogen gas and oxygen gas. Thereafter, a catalyst is contacted by the reactant mixture and is operative to convert a majority of the reactant mixture to hydrogen peroxide that is withdrawn via an egressing product stream. During the hydrogen peroxide chemical reaction, exothermic energy is generated. This exothermic energy is absorbed by the fluid within the microchannel as well as the microchannel itself. In a preferred embodiment, a heat exchange fluid is in thermal communication with the microchannel housing the exothermic reaction and is operative to absorb a portion of this exothermic energy and transfer such energy from the microchannel.

50 Claims, 84 Drawing Sheets

U.S. PATENT DOCUMENTS 7,234,514 B2 6/2007 Vogel
2005/0163701 A1* 7/2005 Tonkovich et al. .......... 423/584

FOREIGN PATENT DOCUMENTS

| WO | WO 01/12312 A | 2/2001 |
|---|---|---|
| WO | WO 02/18042 A1 | 3/2002 |
| WO | WO 03/048034 A1 | 6/2003 |
| WO | WO 2004/091771 A1 | 10/2004 |
| WO | WO 2004/103549 A | 12/2004 |
| WO | PCT/US2004/041621 | 4/2005 |
| WO | WO 2005/044442 A | 5/2005 |
| WO | WO 2005/075349 A | 8/2005 |
| WO | PCT/US2005/014492 | 6/2006 |

OTHER PUBLICATIONS

Vandenbussche, Kurt M., Direct Synthesis of Hydrogen Peroxide: Fundamentals and Conceptual Designs, GFF 05 Symposium/College Station, TX, Mar. 1, 2005, pp. 1-54, UOP LLC, Des Plaines, IL., U.S.A.

Kumar, et al., Direct Synthesis of Hydrogen Peroxide, Paper 546e/ AIChE Annual Meeting 2004/Austin, TX, Nov. 7-12, 2004, pp. 1-32, UOP LLC, Des Plaines, IL., U.S.A.

* cited by examiner

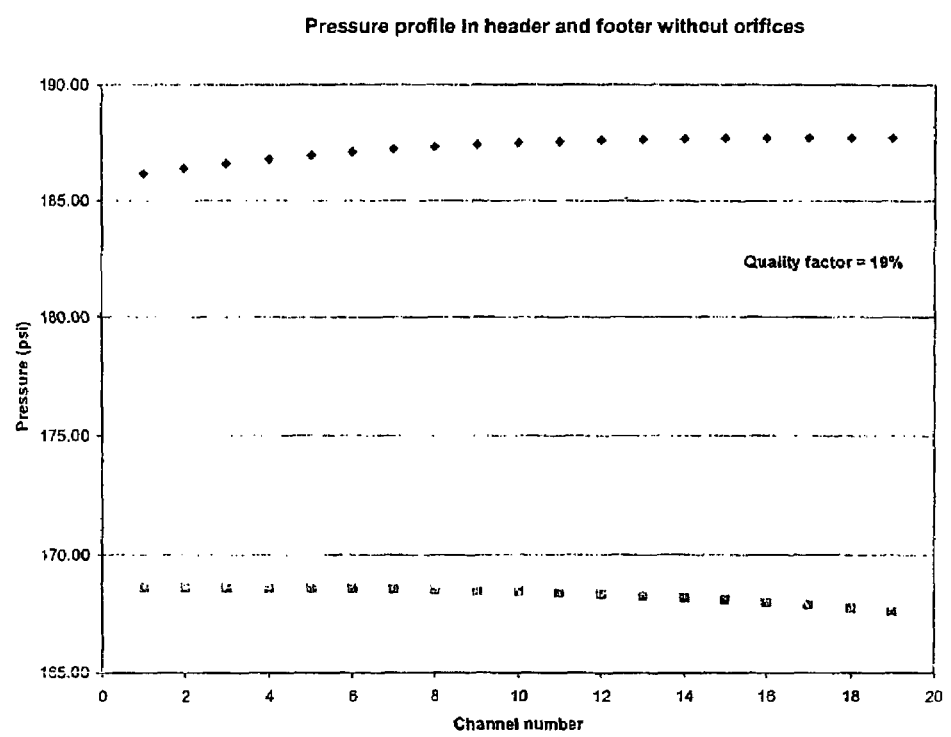
Fig. 2A|

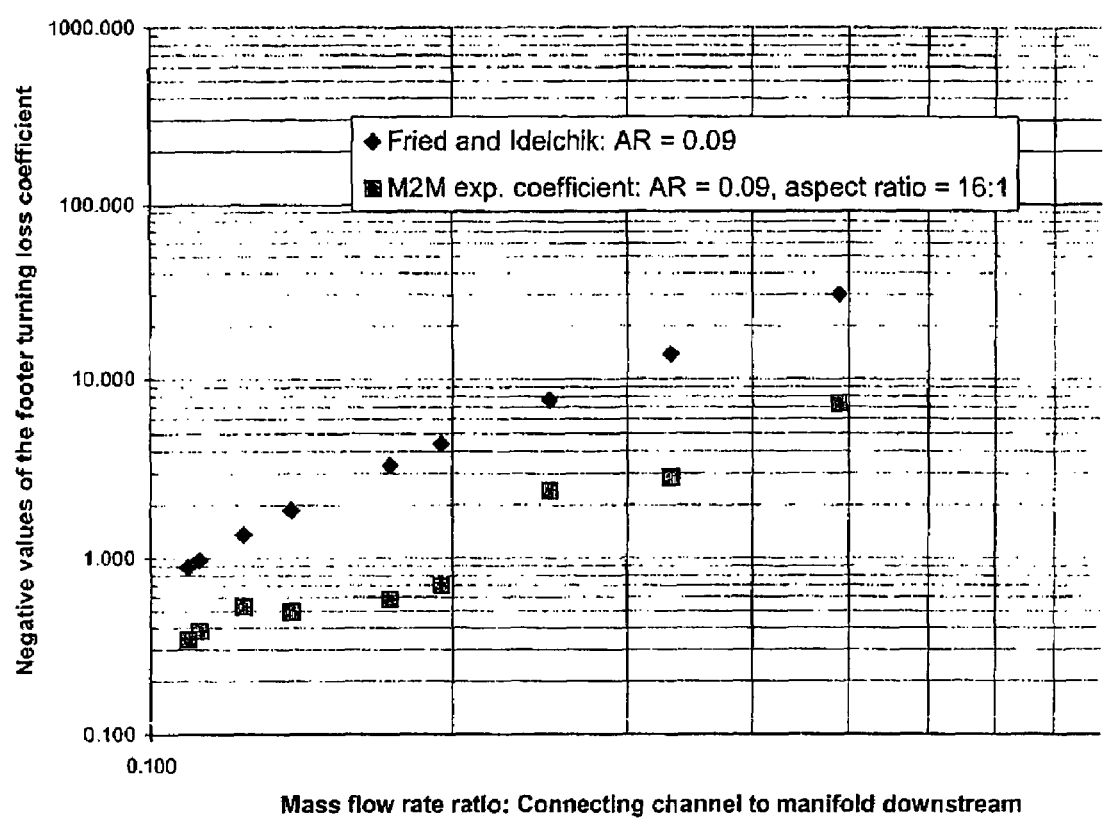
Fig. 2D1

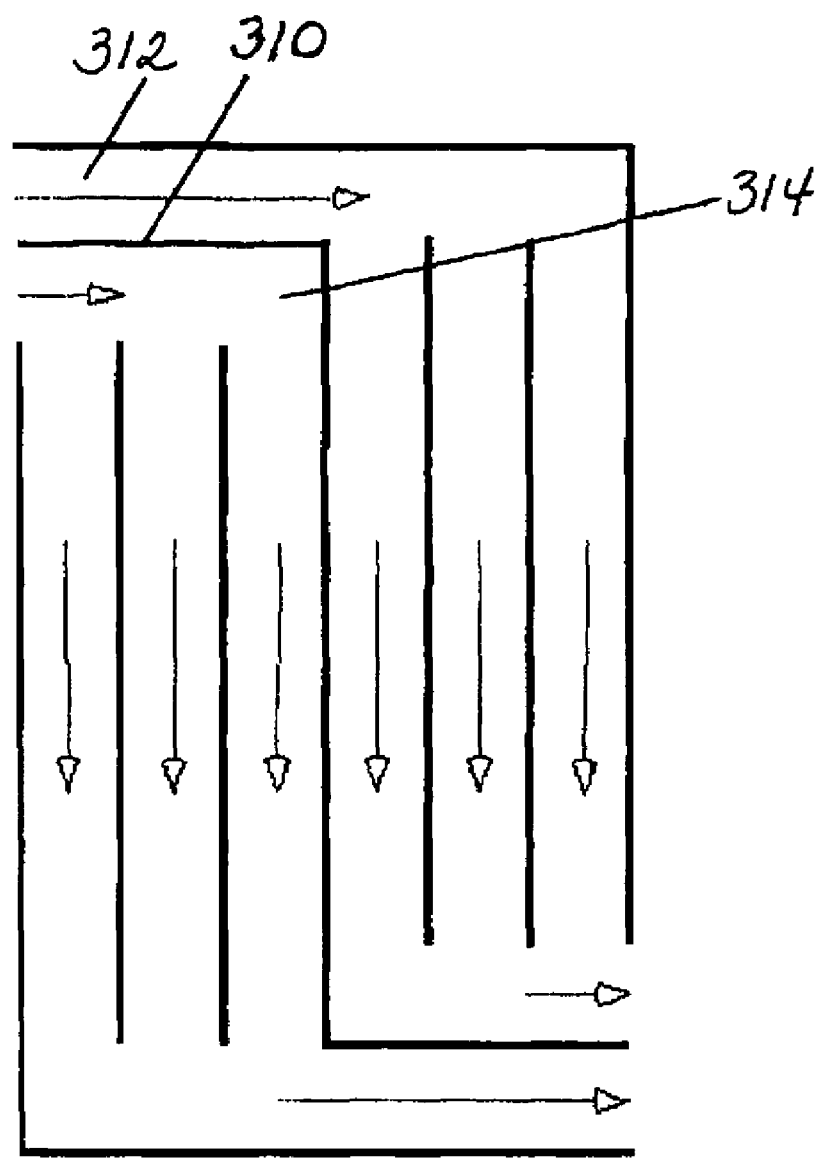
Fig. 3A1

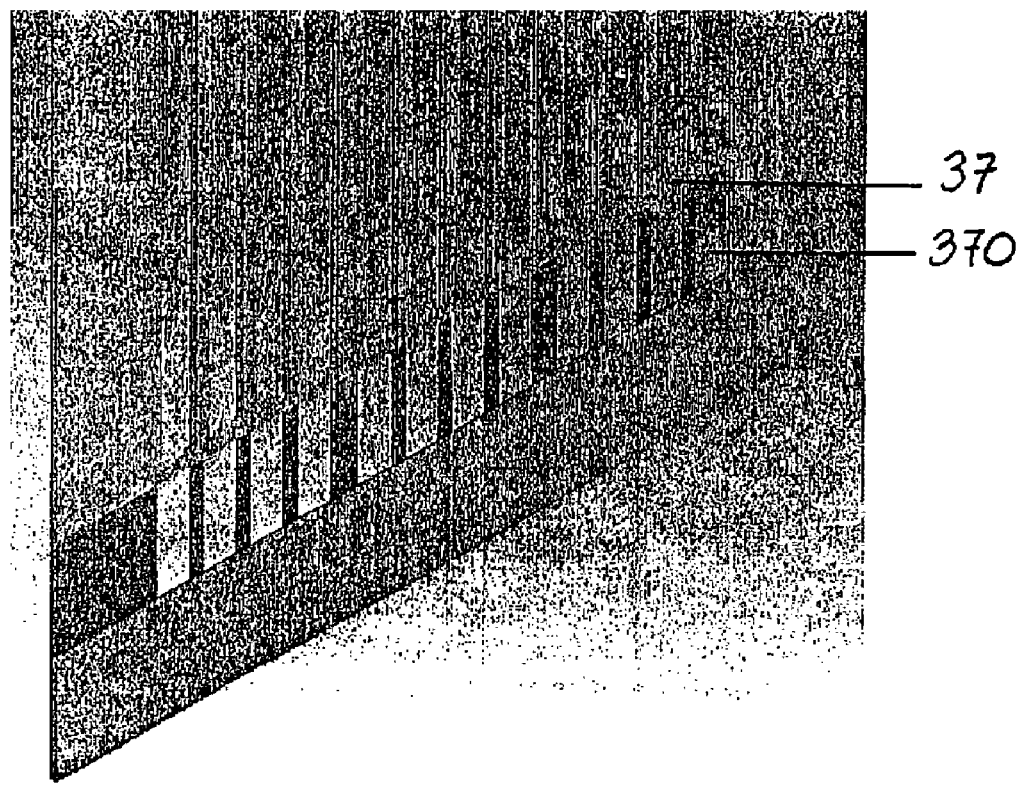
Fig. 3C1

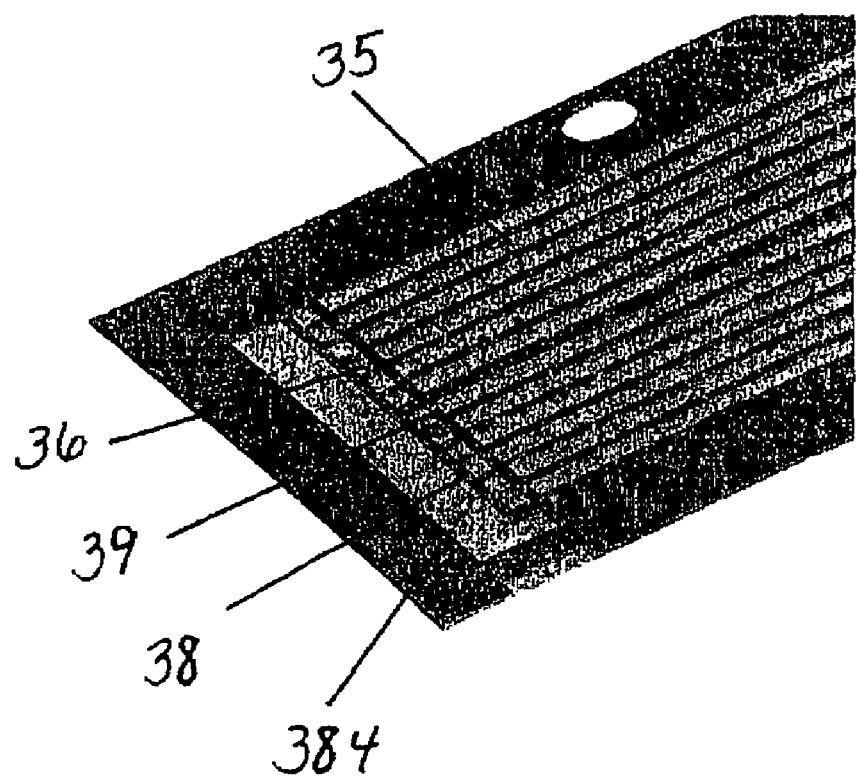
Fig. 3D1

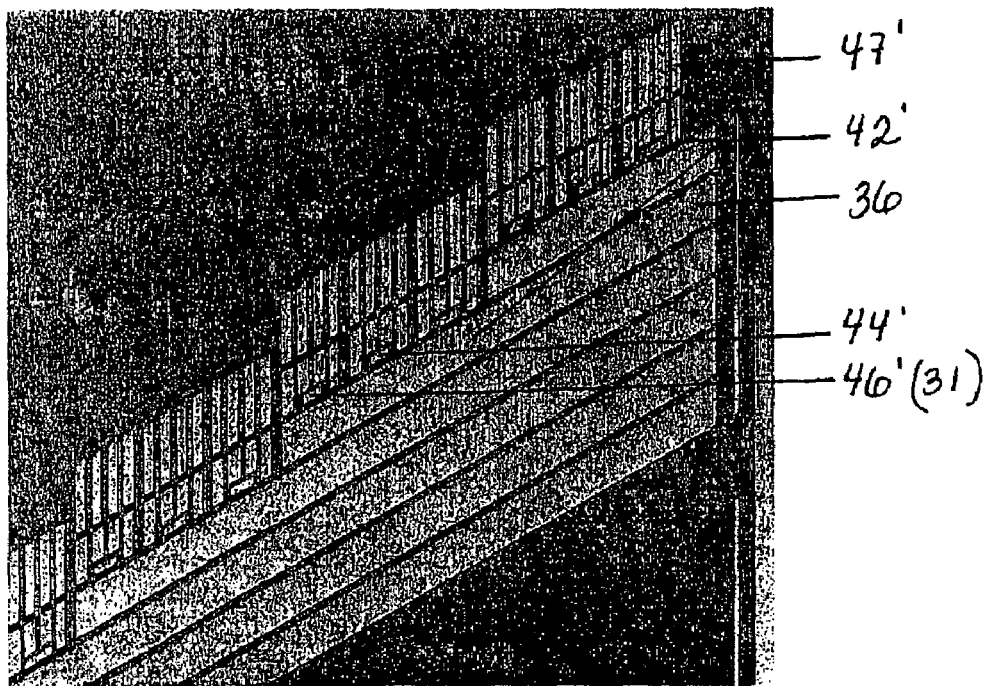
Fig. 3E /

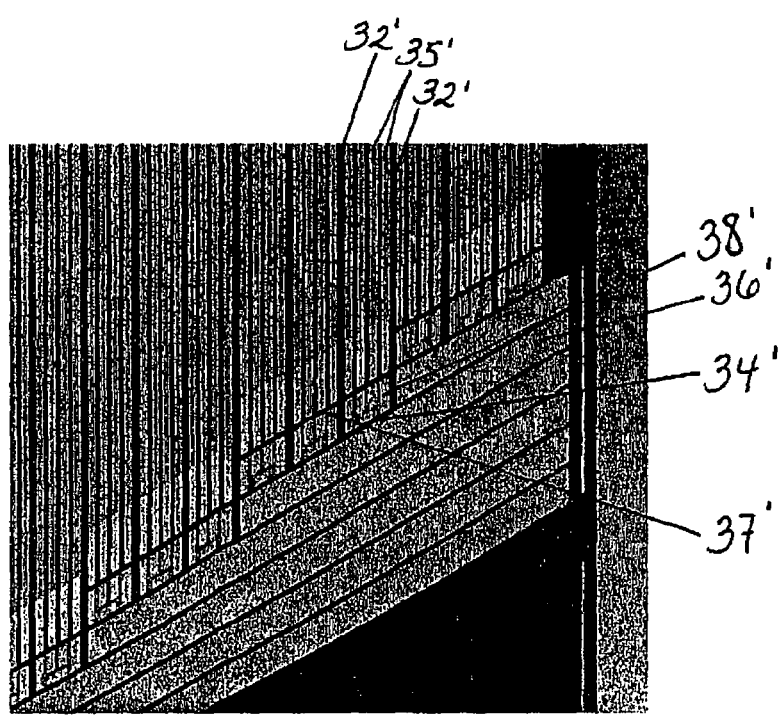
Fig. 3F1
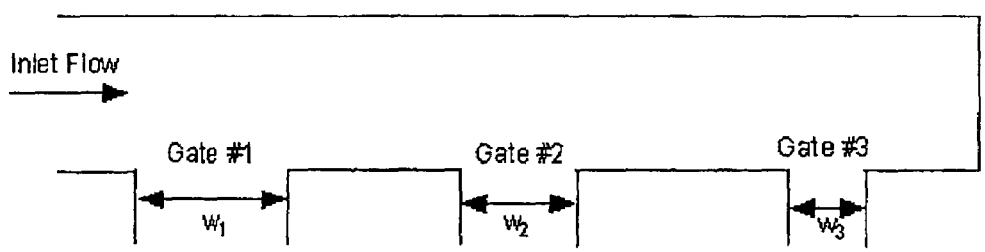
Fig. 3G1

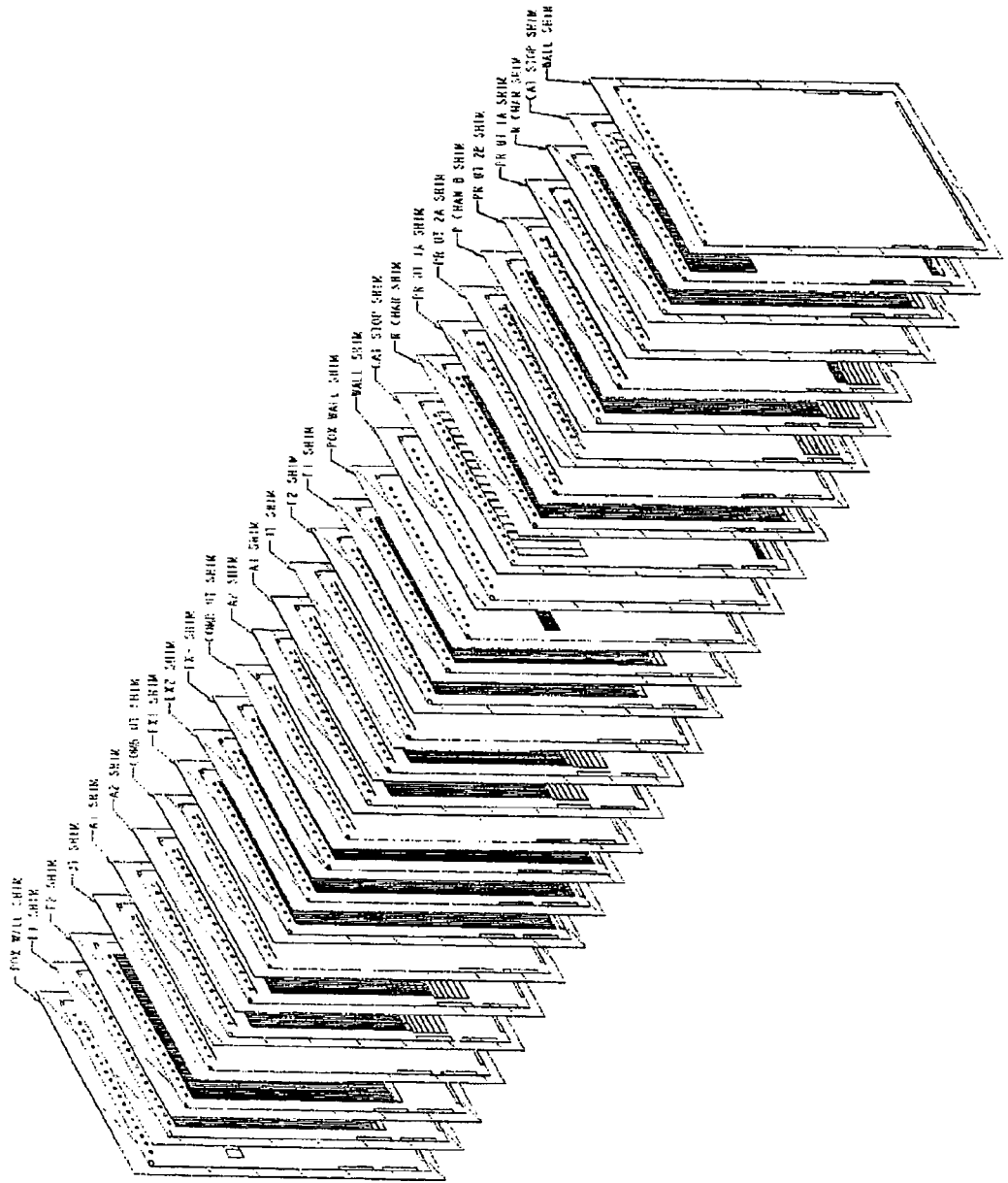
Fig. 4A1

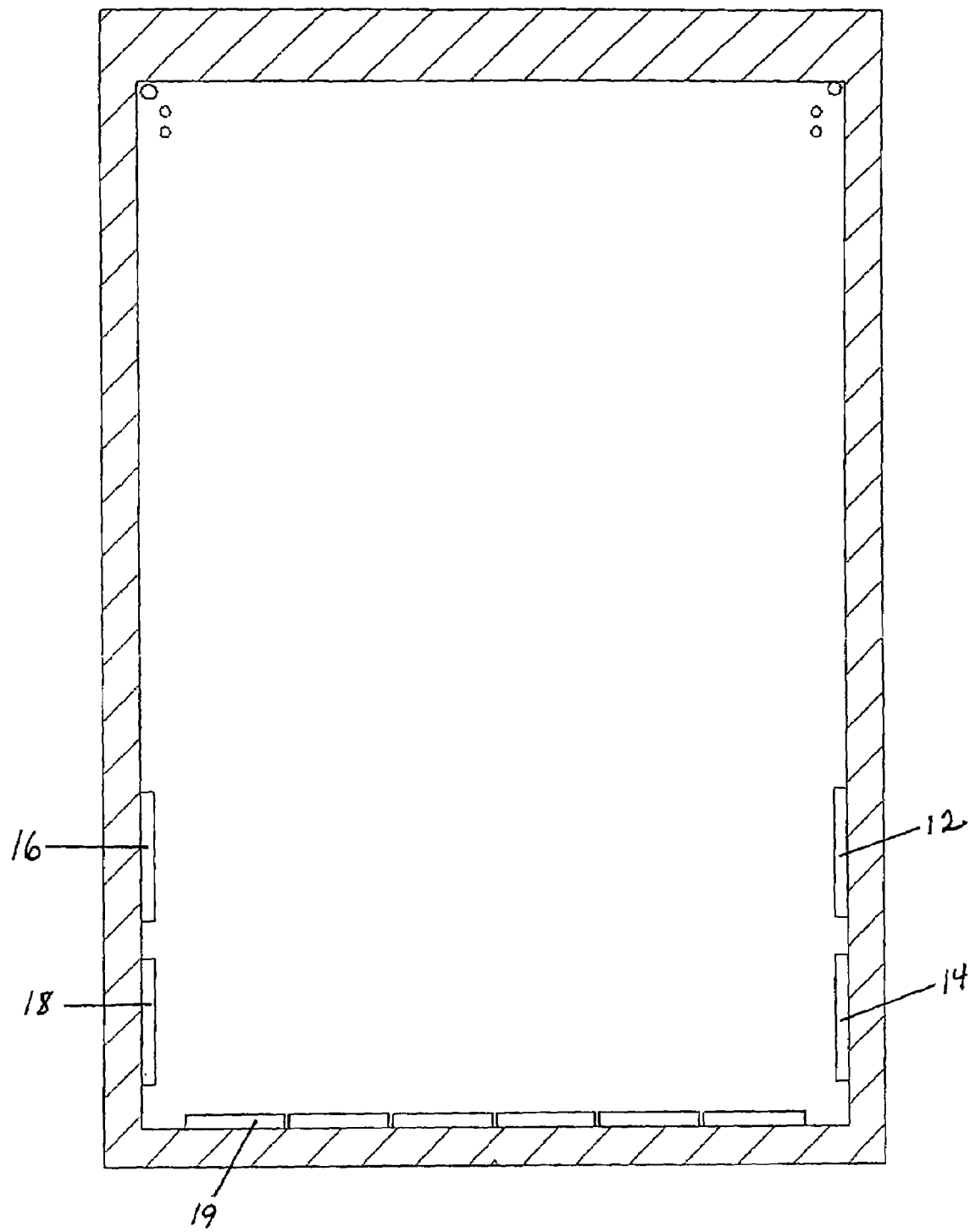
Fig. 4B1

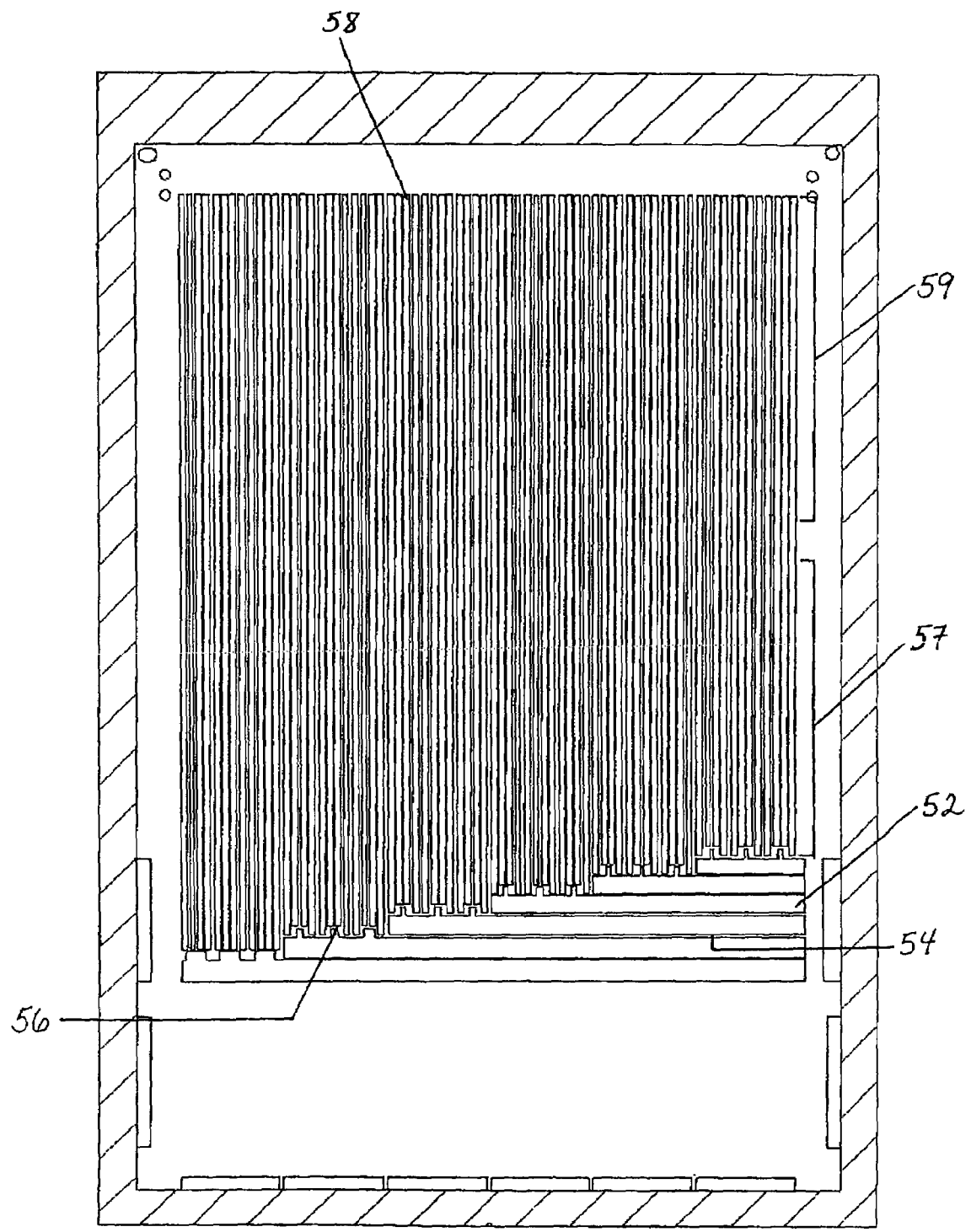
Fig. 7|

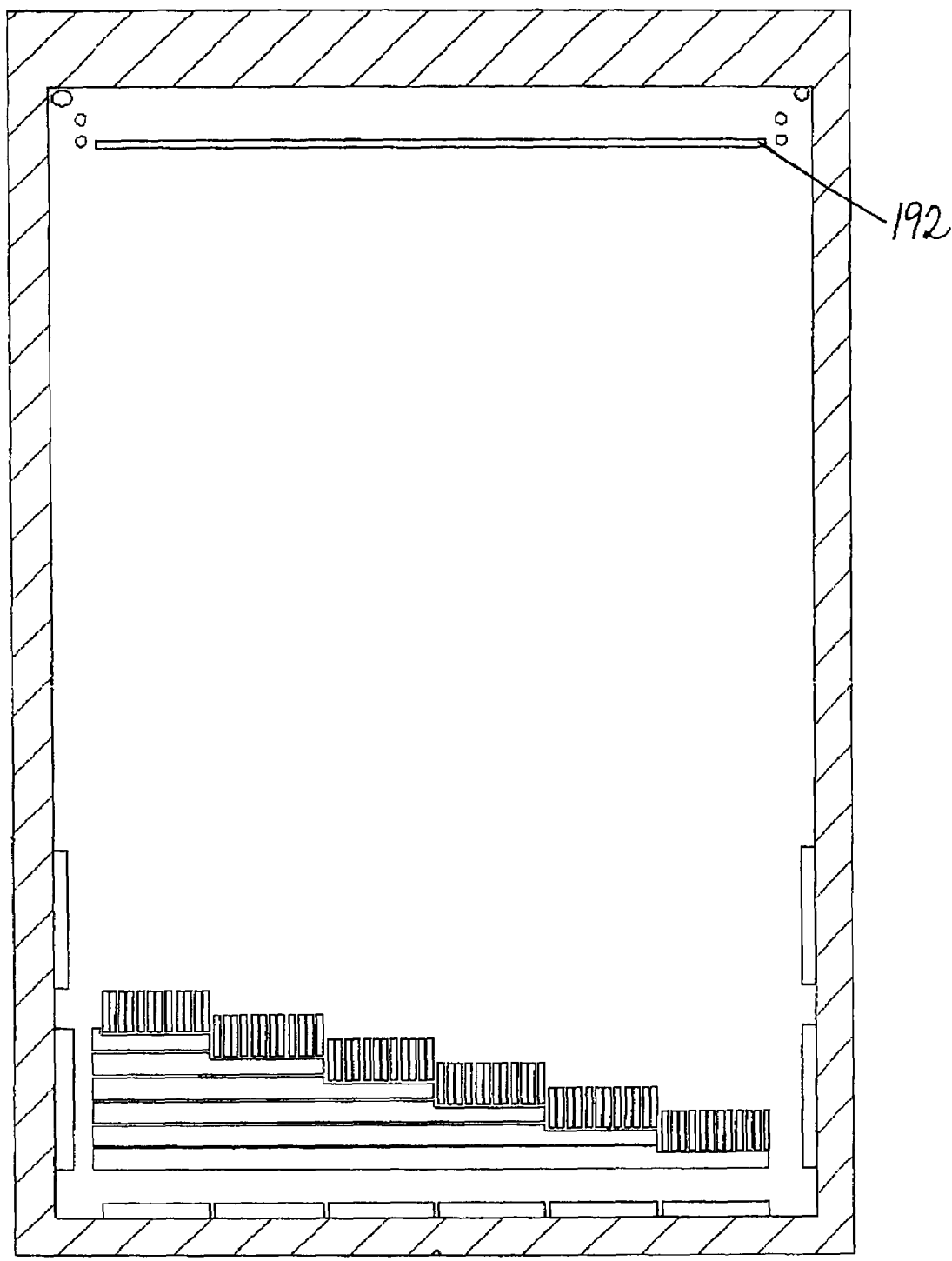
Fig. 19|

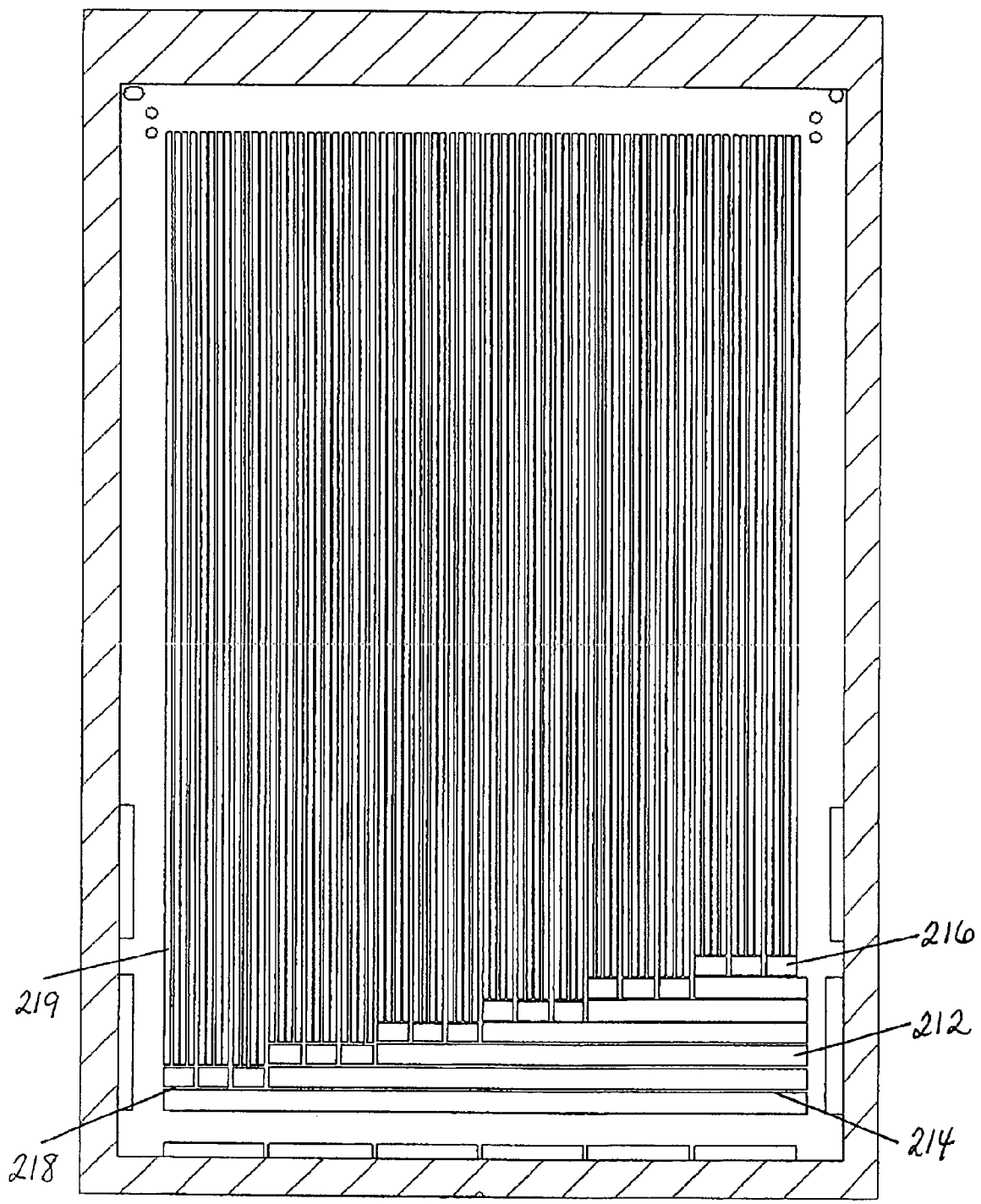
Fig. 21|

| Channel | Length (mm) |
|---|---|
| 1 | 0.711 |
| 2 | 2.108 |
| 3 | 3.734 |
| 4 | 5.309 |
| 5 | 6.706 |
| 6 | 7.899 |
| 7 | 8.052 |
| 8 | 8.331 |
| 9 | 8.585 |
| 10 | 8.738 |

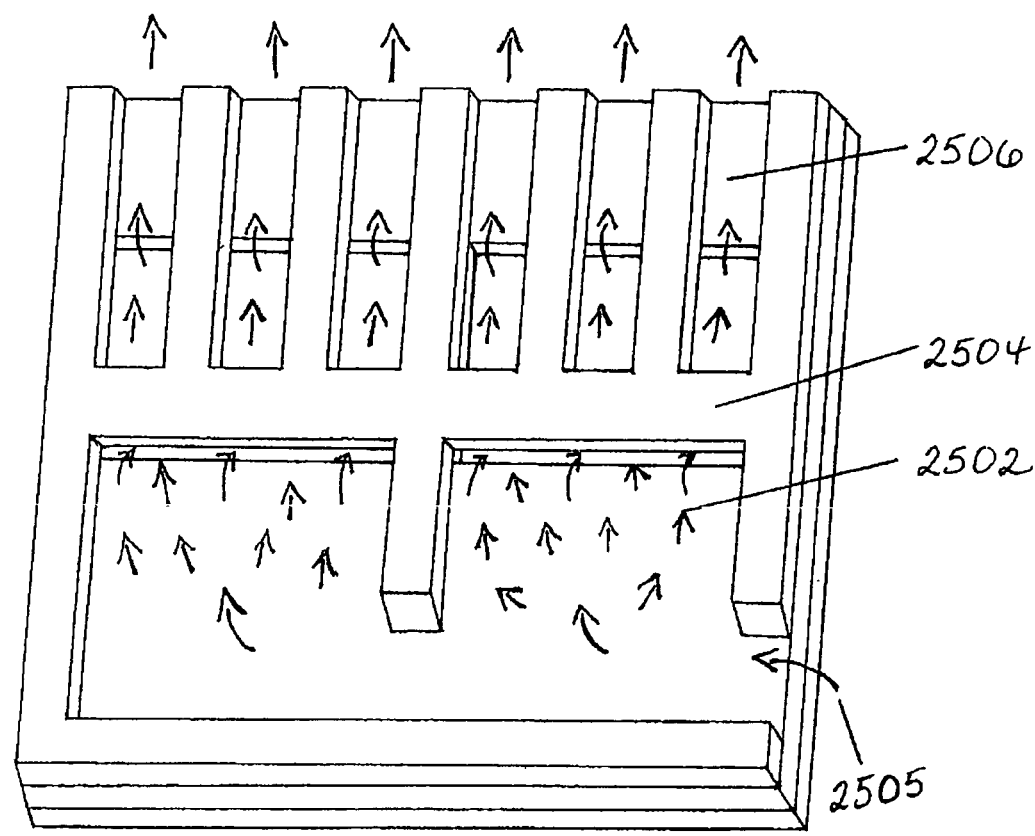
Fig. 25b|

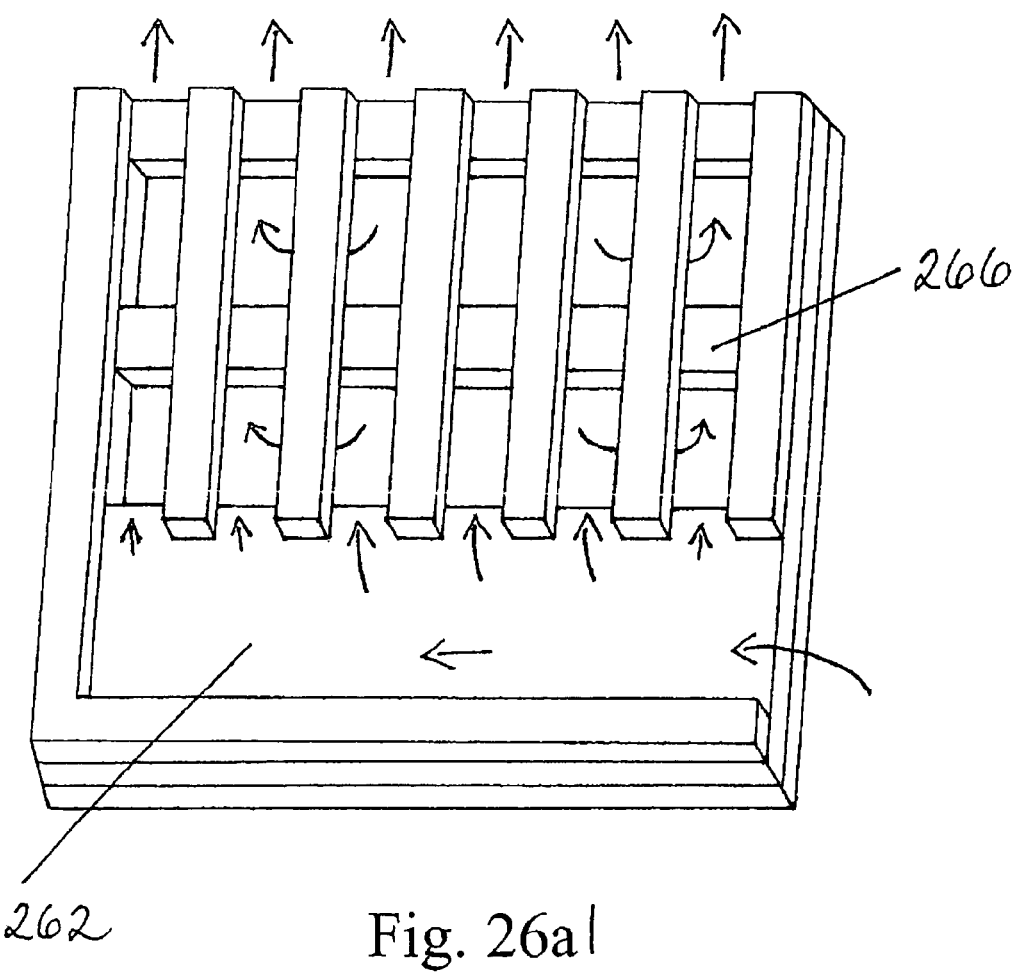
Fig. 26a1

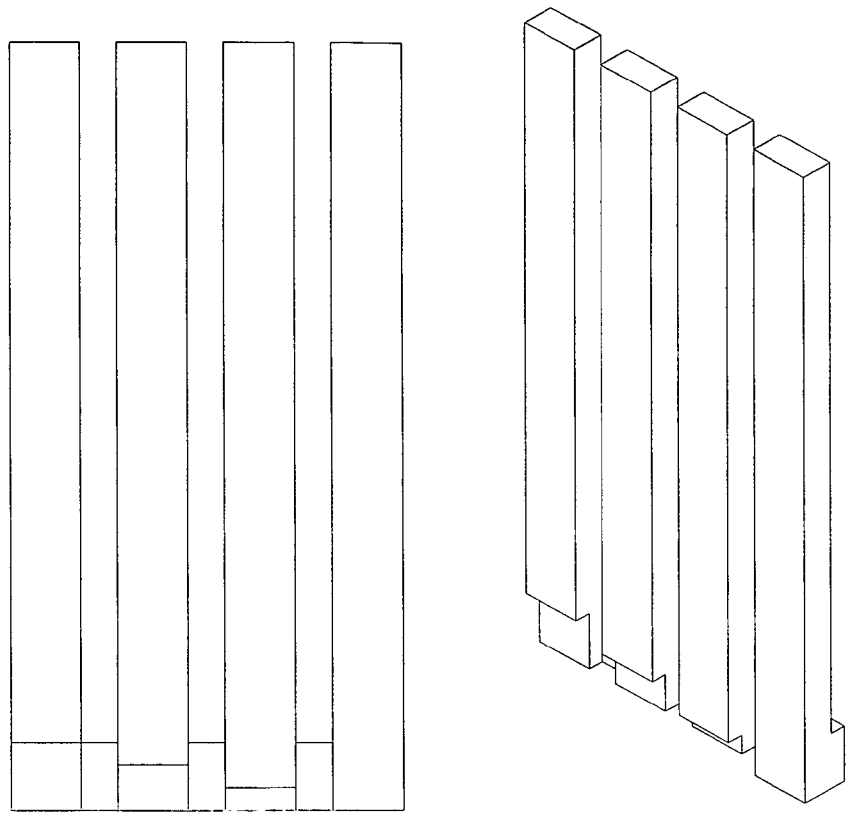

FIG. 27

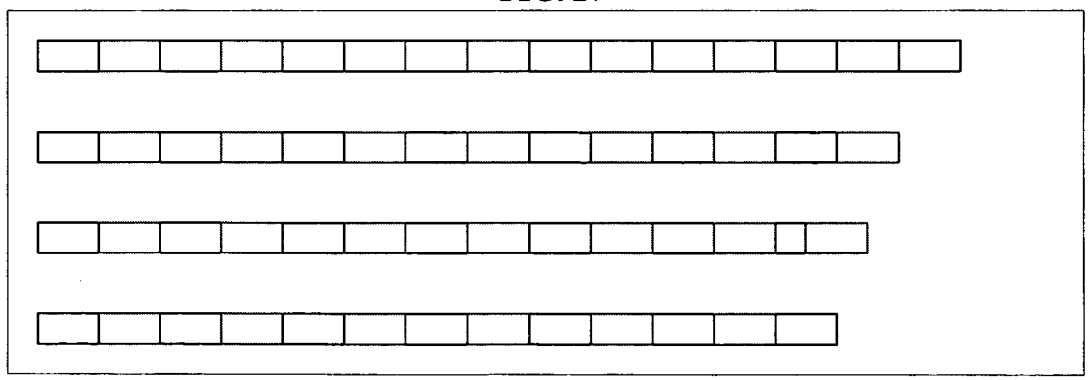

Nibbling approach to varying lengths of slots:
- The black two inch sections would be programmed into the x-y feed as the first stage for making the slots in a lamina (shim)
- The red connecting sections would be programmed into the x-y feed as the second stage for making the slots in the lamina, which could be programmed to overlap to shorten the length of the channel as shown in the third section from the top.

FIG. 28

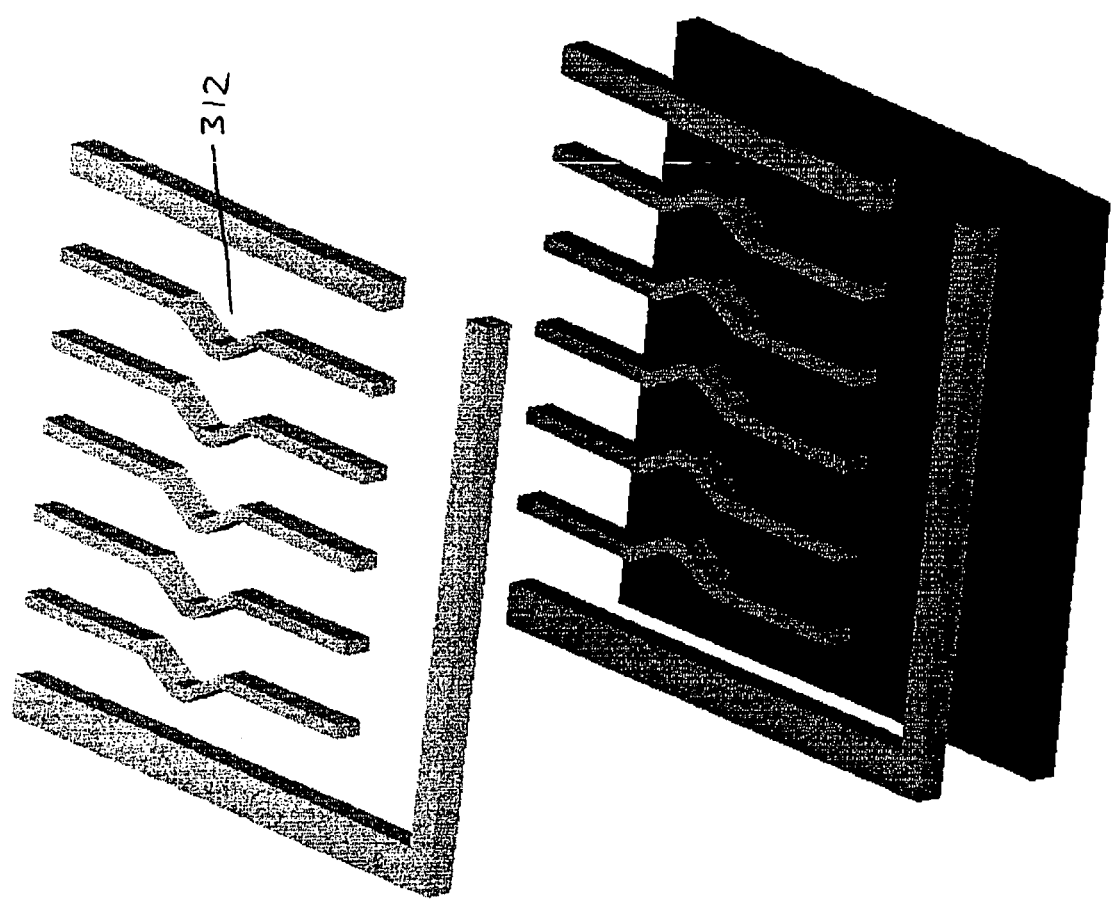
Fig. 31(

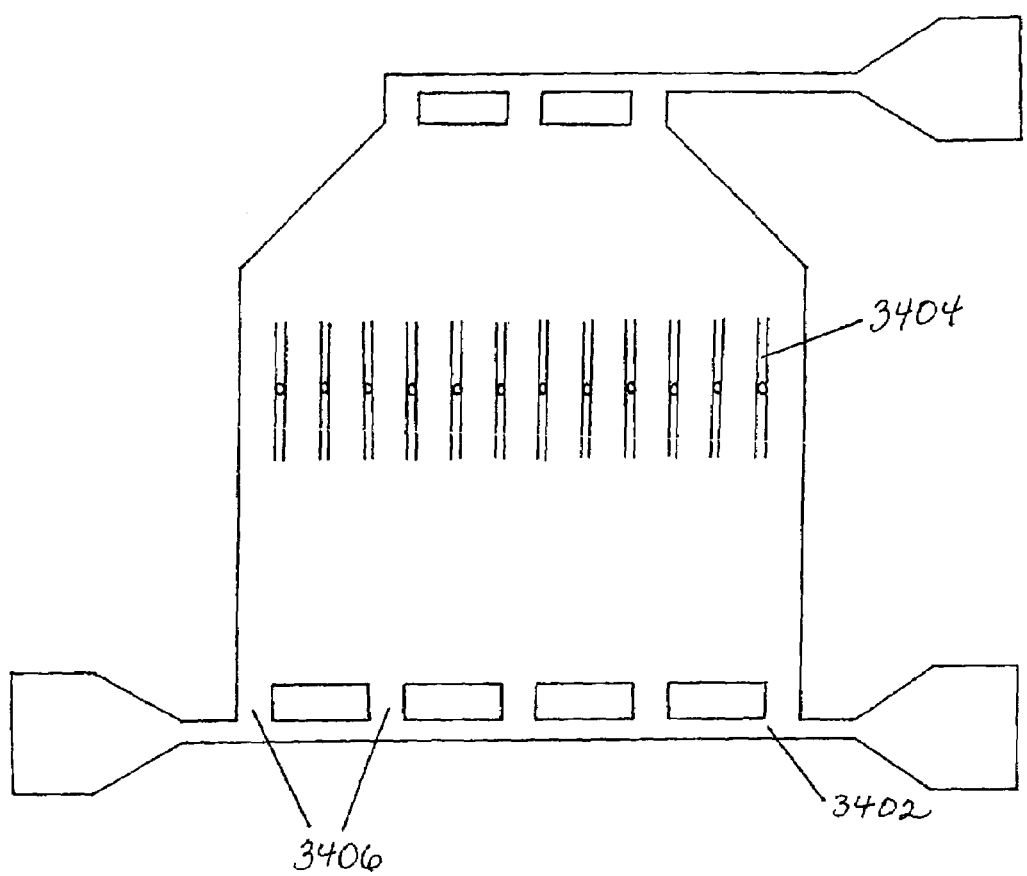
Fig. 34 B1

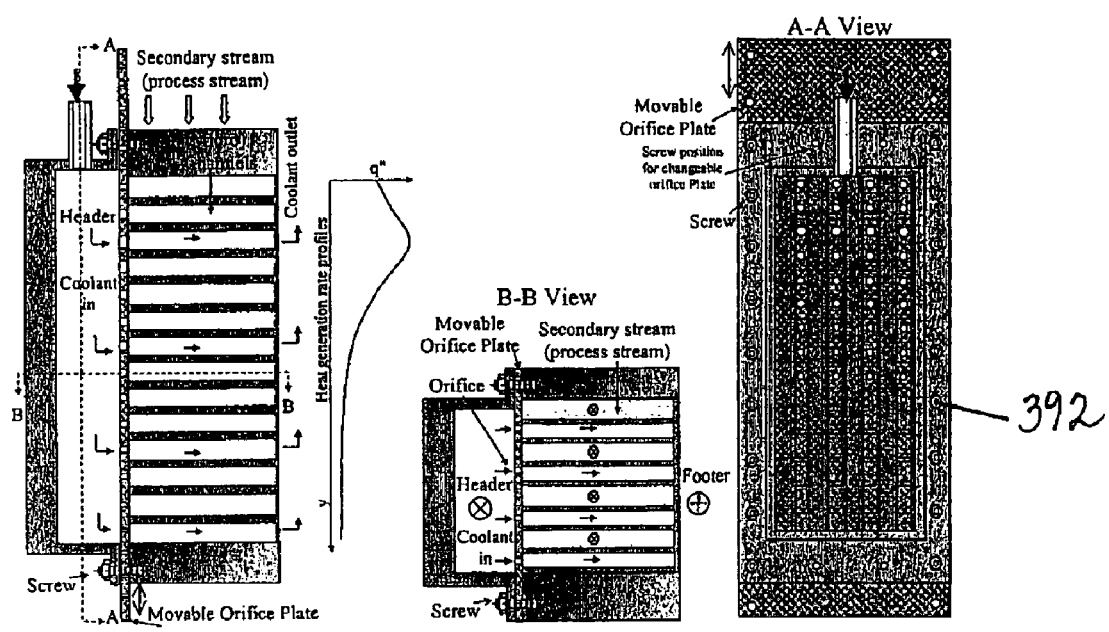
Fig. 39B1

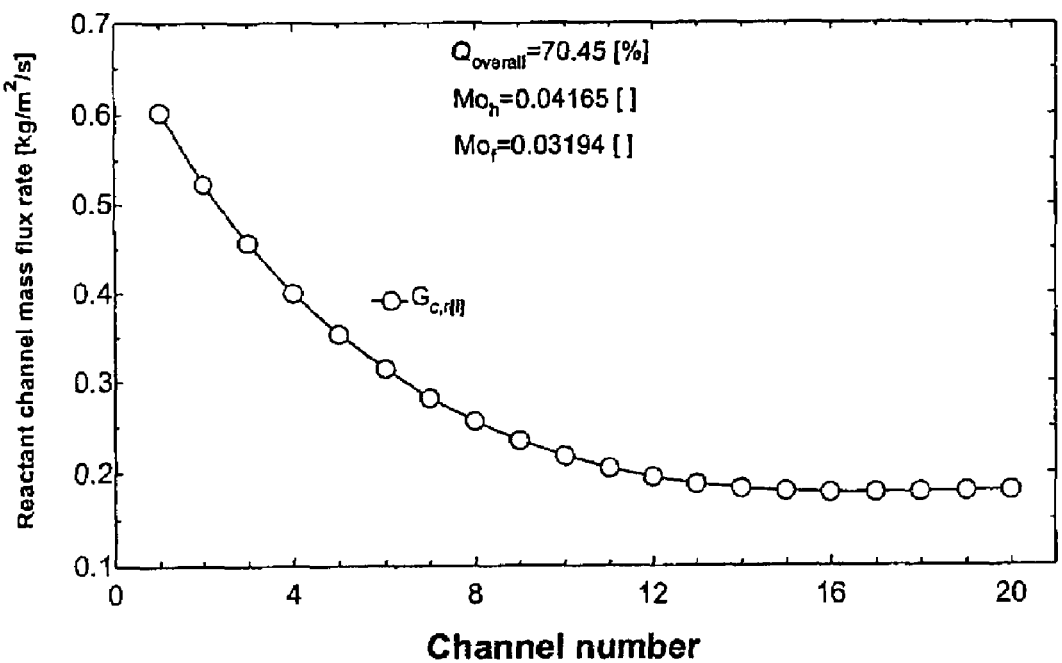
Fig. 40|
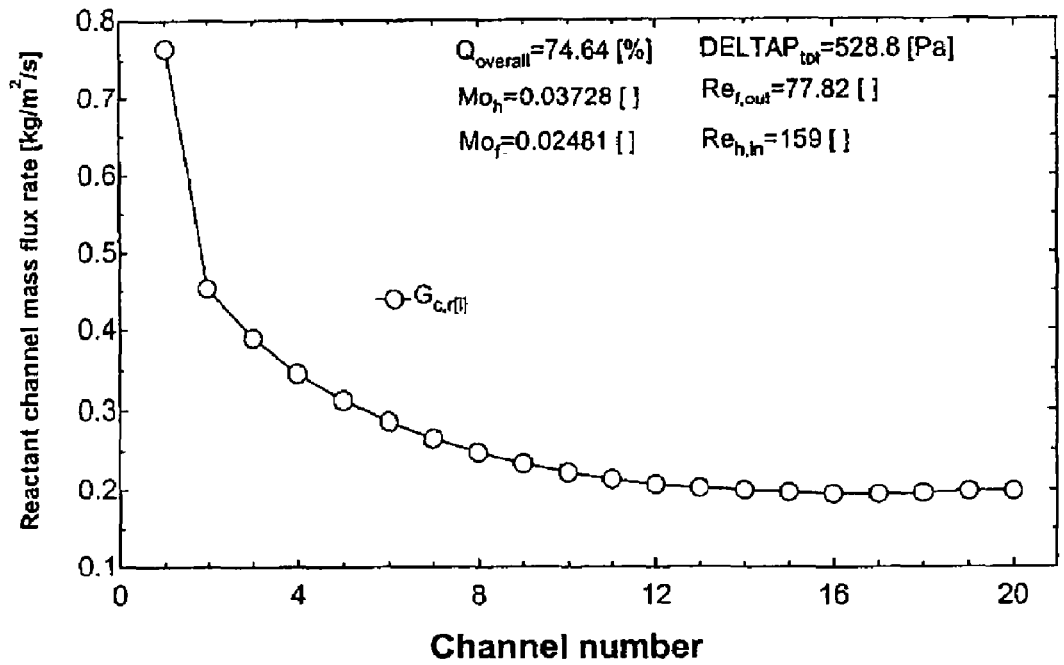
Fig. 41|

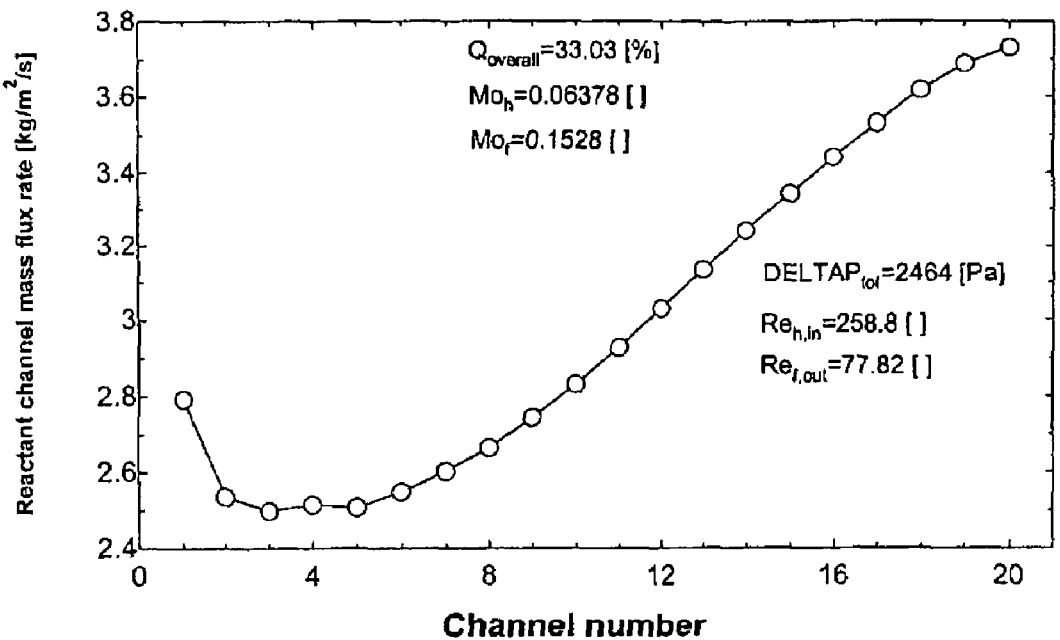
Fig. 44|
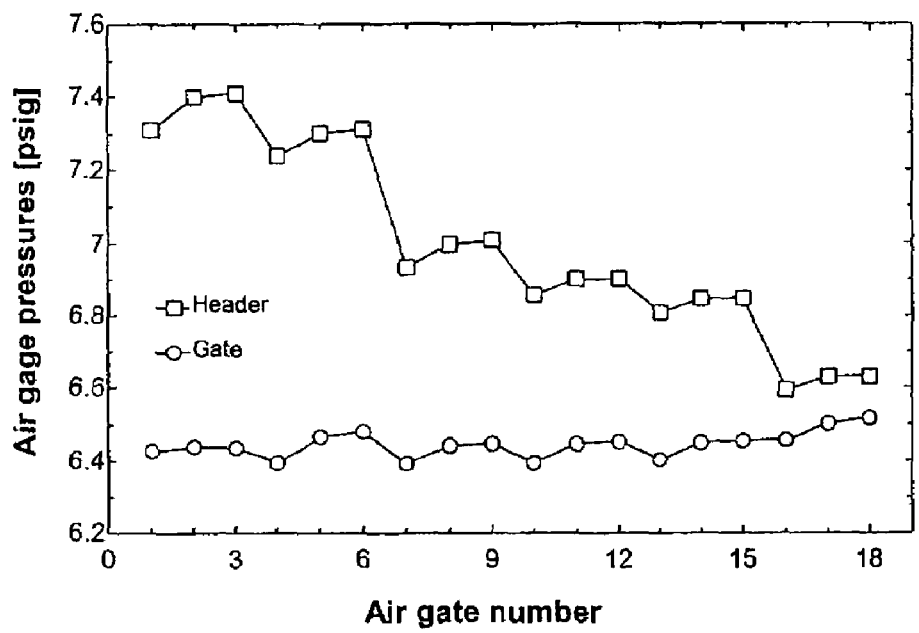
Fig. 45|

HYDROGEN PEROXIDE PRODUCTION IN MICROCHANNEL REACTORS

CROSS REFERENCE TO RELATED APPLICATIONS

This application claims the benefit of U.S. Provisional Patent Application Ser. No. 60/565,629, filed Apr. 27, 2004, and entitled "HYDROGEN PEROXIDE PRODUCTION IN MICROCHANNEL REACTORS," the disclosure of which is incorporated herein by reference.

RELATED ART

1. Field of the Invention

The present invention is directed to methods and apparatuses that utilize microchannel technology and, more specifically in exemplary form, producing hydrogen peroxide using microchannel technology.

2. Introduction of the Invention

Hydrogen peroxide is a fast growing, high volume industrial chemical with an expected growth rate of 6% to 10% annually. It is one of the most common bleaching agents, used mainly in the textile, pulp and paper industries. The decomposition products of hydrogen peroxide are water and oxygen, thereby minimizing the environmental impact of effluents.

Hydrogen peroxide is typically manufactured by a process known as autooxidation (AO), which is organic solvent based. Hydrogen peroxide can be produced up to 70% by weight concentration through an energy intensive distillation stage. FIG. 1 illustrates an exemplary AO process for the formation of hydrogen peroxide. Below is a brief description of the major component stages of an AO process.

Hydrogenation—The working solution is composed of anthraquinones in certain organic solvent(s). The working solution enters the hydrogenator where anthraquinones react with hydrogen in the presence of a catalyst to form the corresponding hydroquinones.

Oxidation—The hydroquinones are oxidized to quinones with oxygen (usually air) resulting in simultaneous formation of hydrogen peroxide. Before the hydrogenated working solution that contains hydroquinones can be fed to the oxidation step, the catalyst used in the hydrogenation step has to be filtered out. This is particularly important because the hydrogenation catalysts used in the AO process (palladium and Raney nickel) also catalyze the decomposition of hydrogen peroxide. A small amount of these catalysts in the oxidation and extraction steps may lead to considerable loss of hydrogen peroxide and serious disturbances.

Extraction and Recovery of the Working Solution—The oxidized working solution from the oxidation stage is then treated with water to extract hydrogen peroxide. The working solution leaving the extraction unit must be adjusted to a specific water content before being returned to the hydrogenation step. The working solution is purified and regenerated in regeneration units (not shown in FIG. 1).

SUMMARY OF THE INVENTION

The present invention is directed to methods and apparatuses that utilize microchannel technology and, more specifically in exemplary form, producing hydrogen peroxide using microchannel technology. An exemplary process for producing hydrogen peroxide comprises flowing feed streams into intimate fluid communication with one another within a process microchannel to form a reactant mixture stream comprising a hydrogen source and an oxygen source such as, without limitation, hydrogen gas and oxygen gas. Thereafter, a catalyst is contacted by the reactant mixture and is operative to convert a majority of the reactant mixture to hydrogen peroxide that is withdrawn via an egressing product stream. During the hydrogen peroxide chemical reaction, exothermic energy is generated. This exothermic energy is absorbed by the fluid within the microchannel as well as the microchannel itself. In a preferred embodiment, a heat exchange fluid is in thermal communication with the microchannel housing the exothermic reaction and is operative to absorb a portion of this exothermic energy and transfer such energy from the microchannel.

The invention also includes an apparatus for carrying out a hydrogen peroxide reaction within a microchannel reactor as well as methods associated therewith. Such methods include features such as, without limitation, operating parameters for start-up and shutdown of a microchannel reactor and scale-up procedures to accommodate various reactant volumetric throughputs.

The invention includes manifolds and manifold designs for distributing fluids to and from the microchannel embodiments discussed herein. The invention further includes microchannels and microchannel fabrication techniques for promoting mass transfer between catalyst and reactants. Still further, the invention includes aspects of process control for a hydrogen peroxide process carried out using microchannel technology. These and other aspects of the present invention are discussed more fully below. Therefore, for a complete summary of the present invention, reference is had to the entire disclosure.

BRIEF DESCRIPTION OF THE DRAWINGS

FIG. 27 illustrates a model of microchannel after bonding, where the microchannel to the farthest left has a higher flow resistance than the microchannel to the farthest right;

FIG. 28 illustrates a nibbling approach to varying lengths of slots;

FIG. 1A1 shows a three opening manifold with mass flux rates (G), static pressures (P) and constant connection channel widths ($W_{cc}$).

FIG. 1B1 shows dimensions for a three opening header manifold.

FIG. 2A1 illustrates the static pressure profile in an M2M based on turbulent pipe turning loss and momentum compensation coefficients for the Z-manifold. Channel #1 is the first channel seen in the header, #19 the last channel seen by the footer. The diamonds show pressure in the header and the squares show pressure drop in the footer.

FIG. 2B1 illustrates M2M header manifold momentum compensation coefficients for an connection to manifold cross-sectional area ratio of 0.09 for several M2M header manifold mass flow rate ratios (MFR), the ratio of the mass flow rates downstream to upstream of a connecting channel.

FIG. 2C1 illustrates experimentally obtained M2M header manifold turning loss coefficients versus the channel mass flow rate ratio (connecting channel to manifold upstream of connecting channel) for a connection to manifold cross-sectional area ratio of 0.09. Also plotted are the header manifold turning loss coefficients for conventional turbulent circular pipes (solid line for the same connection to manifold cross-sectional area ratio).

FIG. 2D1 illustrates negative footer turning loss coefficients for a connection to manifold cross-sectional area ratio of 0.09 in conventional pipes and an M2M manifold.

FIG. 3A1 illustrates a set of sub-manifolds for a Z-manifold system.

FIG. 3B1 illustrates a L-manifold system containing two submanifolds.

FIG. 3C1 illustrates an example of a grate for a stacked shim system with the grate extending across the M2M manifold channel's width.

FIG. 3D1 illustrates a grate design with a grate pulled into the manifold.

FIG. 3E1 illustrates a "Gate" design formed by an upper gate shim and a lower channel shim. The gray (upper) shim makes the opening with the M2M manifold and the lower "picture frame" shim makes a plane for distribution to the connecting channels, of which an example of four are shown here for each gate.

FIG. 3F1 illustrates the "Gate" design of FIG. 3E1 where the shims have been inverted across the major central plane.

FIG. 3G1 illustrates decreasing cross-sectional area of the gates in the direction of flow.

FIGS. 41-221 illustrate shim designs that were assembled to construct and integrated combustion reactor.

FIG. 231 illustrates a manifold used to separate phases.

FIG. 25a1 illustrates a design with gates and submanifold zones.

FIG. 25b1 illustrates a manifold with a straightening zone.

FIG. 25c1 is an exploded view of the laminate of FIG. 25b1.

FIGS. 26a1, 26b1 and 271 illustrate flow bumps in channels made by a shim construction.

FIG. 291 illustrates an inclined manifold.

FIG. 301 schematically illustrates angled openings between a manifold and a set of connecting channels.

FIG. 311 illustrates a channel design with offset regions for interchannel mixing.

FIG. 34A1 schematically illustrates a macromanifold connected to two microdevices.

FIG. 34B1 illustrates a non-divergent header with convergent footer and multiple inlets and outlets parallel the direction of flow. Louvers can be used to direct flow.

FIG. 351 illustrates a central flow redistributed by a flow distribution plate.

FIG. 361 illustrates an exploded view schematic of a high-pressure vaporizer showing the center-fed inlet, the first and second plates and a two-dimensional channel array in orthogonal shims. Flow is collected on the opposite side of the channel array with a centrally located outlet pipe, directly opposite the inlet pipe entrance.

FIG. 371 illustrates a manifold design with nonaligned orifice plates.

FIG. 381 is a cross-sectional, top down view of a device in which the header contains orifice plates.

FIGS. 39A1 and 39B1 illustrate a cross-flow reactor utilizing a moveable distribution plate.

FIG. 401 shows channel mass flux rates in connecting channels according to the analysis in comparative Example 1 using $10^{-06}$ kg/s of air.

FIG. 411 shows channel mass flux rates in connecting channels according to the analysis in comparative Example 1 using $10^{-06}$ kg/s of air at room temperature and pressure with developing flow and all momentum terms included.

FIG. 421 shows channel mass flux rates in connecting channels according to the analysis in comparative Example 1 using $10^{-06}$ kg/s of water at room temperature with developing flow and all the momentum terms included.

FIG. 431 shows channel mass flux rates in connecting channels according to the analysis in comparative Example 1 using $10^{-06}$ kg/s of water with wider header and footer widths with developing flow and all momentum terms included.

FIG. 441 shows channel mass flux rates in connecting channels according to the analysis in comparative Example 1 using $10^{-05}$ kg/sec (10× that of FIG. 431) with wider header and footer widths with developing flow and all momentum terms included.

FIG. 451 shows predicted static gage pressures in an air M2M manifold for the header and in the gate plotted versus fuel gate number from Example 2. Air gate number 1 corresponds to air sub-manifold 1, gate 1, while fuel gate number 18 corresponds to sub-manifold 6, gate 3.

FIG. 461 shows predicted static gage pressures in an fuel M2M manifold for the header and in the gate plotted versus fuel gate number from Example 2. Fuel gate number 1 corresponds to fuel sub-manifold 1, gate 1, while fuel gate number 18 corresponds to sub-manifold 6, gate 3.

FIG. 471 shows predicted channel mass flow rates for the air and fuel channels plotted versus fuel channel number for Example 2. Fuel channel 1 is channel 1 of sub-manifold 1 and fuel channel 72 is channel 12 of sub-manifold 6.

FIG. 481 shows mass flow rate distribution for the air manifold test piece of Example 3 plotted versus channel number. Channel 1 is closest to the manifold entrance while channel 12 is the farthest away.

FIG. 491 is a plot of static pressure as a function of distance of the channel position from the submanifold entrance.

FIG. 501 illustrates channel flow distribution from Example 4 for a 2.00" wide M2M channel with M=0.160", L=0.120" and B=0.5.

FIG. 511 illustrates minimum quality index factors plotted versus connecting channel to manifold pressure drop ratio ($PDR_2$) as explained in Example 5.

FIG. 521 illustrates minimum quality index factors plotted versus connecting channel to manifold pressure drop ratio ($PDR_1$) as explained in Example 5.

DETAILED DESCRIPTION

Figure 1:
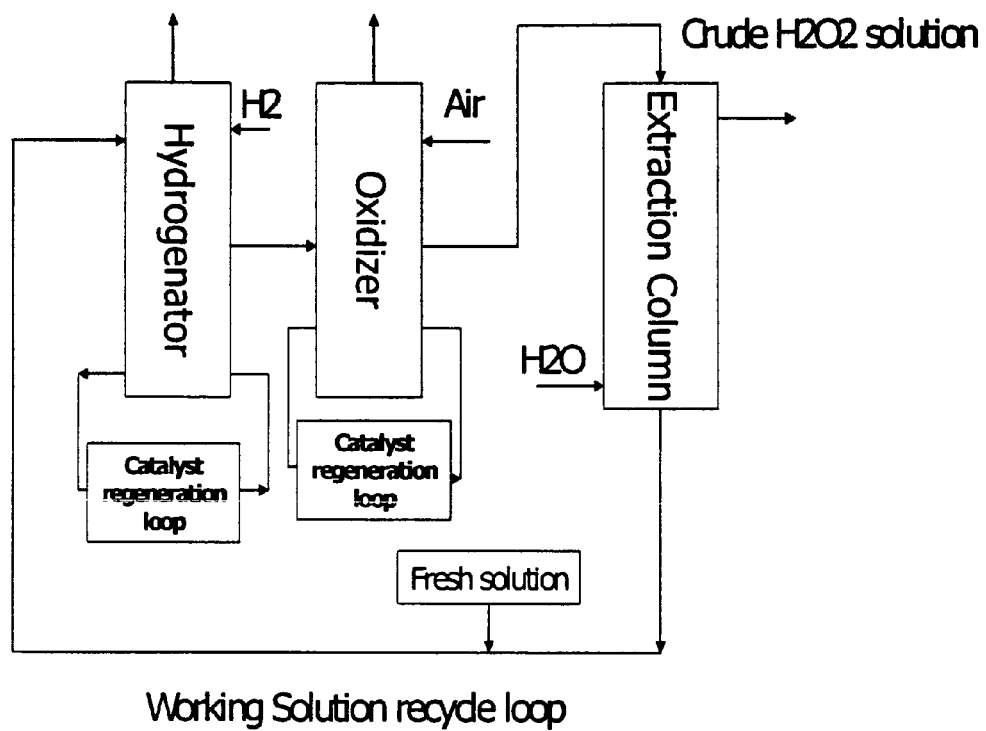
FIG. 1 is a schematic diagram of an exemplary autooxidation process for the production of hydrogen peroxide.

The exemplary embodiments of the present invention are described and illustrated below to encompass devices and methods of utilizing microchannel process technology and, in exemplary form, for producing hydrogen peroxide using a microchannel unit operation. Of course, it will be apparent to those of ordinary skill in the art that the preferred embodiments discussed below are exemplary in nature and may be reconfigured without departing from the scope and spirit of the present invention. However, for clarity and precision, the exemplary embodiments as discussed below may include optional steps, methods, and features that one of ordinary skill should recognize as not being a requisite to fall within the scope of the present invention.

An exemplary hydrogen peroxide production process involves an aqueous-based direct reaction between a source of hydrogen and an oxygen source. In exemplary form, a source of hydrogen includes any chemical compound or element capable of donating one or more hydrogen atoms or ions, whereas an oxygen source includes any chemical compound or element capable of donating one or more oxygen atoms or ions. This exemplary process generates no appreciable wastes, uses less energy per unit volume of hydrogen peroxide product produced as compared to an autooxidation (AO) process, and has lower capital and operating costs in comparison to commercial AO processes. These savings are attributable to a simplified plant design that eliminates costly solvent recovery units require to separate hydrogen peroxide from the organic working solution of an AO process. In addition, this exemplary process provides a hydrogen peroxide aqueous solution product in a market ready form, without requiring dilution.

Most hydrogen peroxide commercial applications use low concentrations of hydrogen peroxide (about 15% by weight), in direct contrast to the 70% by weight hydrogen peroxide solution produced in the AO processes. End users are interested in on-site and on-demand hydrogen peroxide generation that reduces transportation costs, storage costs, and expenses associated with diluting the hydrogen peroxide concentrate. However, combining $H_2$ and $O_2$ in conventional reactor systems is difficult at $H_2$ concentrations above about 5% by weight, as the mixture becomes flammable and even explosive. At low $H_2$ concentrations, the rate of $H_2$ diffusion in the liquid phase is extremely slow, thus making advantageous the use of very high pressures, and rendering the process energy more inefficient. The solubility of $H_2$ in the liquid phase can be improved by adding $H_2SO_4$ and halide ions, but both may pose corrosion and contamination problems.

The present invention is described below by way of several examples. The examples include discussion of gas and liquid phase systems, where one phase may be designated as the continuous phase and the other may be designated as the dispersed phase. The examples may also make use of multiple streams of liquids, gases, and/or liquid/gas mixtures.

Figure 2:
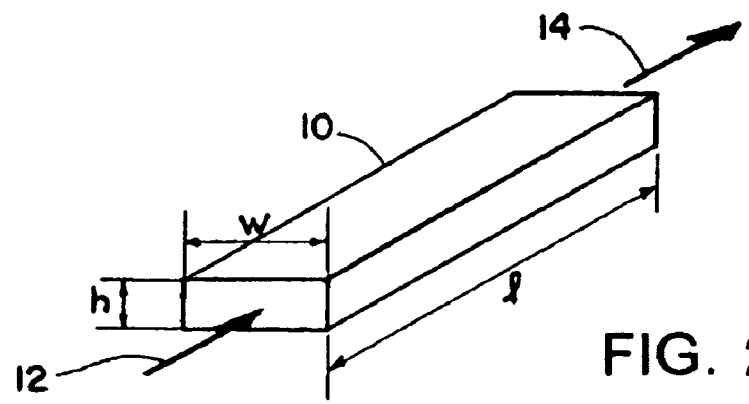
FIG. 2 is a schematic illustration of a microchannel that may be used with the inventive process.

The term "microchannel" refers to a channel having at least one internal dimension of height or width of up to about 10 millimeters (mm), and in one exemplary embodiment up to about 5 mm, and in a further exemplary embodiment up to about 2 mm, and in still a further exemplary embodiment up to about 1 mm. An example of a microchannel that may be used with the inventive process as a process microchannel and/or a heat exchange microchannel is illustrated in FIG. 2. The microchannel 10' illustrated in FIG. 2 has a height (h), width (w) and length (l). Fluid flows through the microchannel 10' in a direction that is perpendicular to both the height and width as indicated by directional arrows 12' and 14'. The height (h) or width (w) of the microchannel may be in the range of about 0.05 to about 3 m. In one embodiment the height or width may range from about 0.15 to about 3 m. The length (l) of the microchannel may be of any dimension, for example, up to about 10 meters. Although the microchannel 10' illustrated in FIG. 2 has a cross section that is rectangular, it is to be understood that the microchannel may have a cross section having any shape, for example, a square, circle, semicircle, trapezoid, etc. The shape and/or size of the cross section of the microchannel may vary over its length. For example, the height or width may taper from a relatively large dimension to a relatively small dimension, or vice versa, over the length of the microchannel.

The term "microchannel reactor" refers to a reactor wherein a chemical reaction is conducted in a microchannel.

The term "adjacent" when referring to the position of one channel relative to the position of another channel means adjacent such that a wall separates the two channels. This wall may vary in thickness.

The term "fluid" refers to a gas, a liquid, or a gas or a liquid containing dispersed solids, or a mixture thereof. The fluid may be in the form of a gas containing dispersed liquid droplets. The fluid may be in the form of a liquid containing dispersed liquid or gas droplets.

The term "contact time" refers to the volume of the reaction zone within the microchannel reactor divided by the volumetric feed flow rate of a fluid flowing through the reaction zone at a temperature of 0° C. and a pressure of one atmosphere.

The term "reaction zone" refers to a space within a microchannel wherein a catalyst is positioned.

The term "residence time" refers to the internal volume of a space (e.g., the reaction zone within a microchannel reactor) occupied by a fluid flowing through the space divided by the volumetric flowrate for the fluid flowing through the space at the temperature and pressure within the space.

The term "conversion of O2" refers to the O2 mole change between the fluid entering the process microchannels and the fluid exiting the process microchannels divided by the moles of O2 in the fluid entering the process microchannels.

The term "conversion of H2" refers to the H2 mole change between the fluid entering the process microchannels and the fluid exiting the process microchannels divided by the moles of H2 in the fluid entering the process microchannels.

The term "Acycle@" is used herein to refer to a single pass of the reactants through the process microchannel.

As is standard patent terminology, "comprising" means "including" and neither of these terms exclude the presence of additional or plural components. For example, where a device comprises a lamina, a sheet, etc., it should be understood that the inventive device may include multiple laminae, sheets, etc.

The "channel axis" is the line through the center of a channel's cross-section as it extends through the channel.

"Bonding" means attaching or adhering, and includes diffusion bonding, gluing, brazing and welding.

A "bump" is an obstruction or area of increased channel wall roughness that reduces mass flow rate through a channel under typical operating conditions.

Capacity of a manifold, Cman, is defined as the mass processed per unit volume of manifold:

$$C_{man} = \frac{m_{man}}{V_{man}} \qquad (1)$$

where
$m_{man}$[kg/sec]=Mass flow rate for a manifold
$V_{man}$[m3]=The total volume of the manifold: the manifold channels; internal distribution features, such as sub-manifolds and gates, grates and other manifold connection channels, including their containment walls; the external containment walls of the manifold, including space between manifold channels not used for other manifolds or processing channels. The total volume of the manifold does not include the channel walls in the layers directly above or below the manifold channel. The external containment wall volume in an M2M manifold includes that volume that separates the manifold from the necessary device perimeter of a microchannel device, which occurs around the entire device. It includes the wall volume separating the channels of fractal distribution manifolds that aren't used by other connecting channels.

For microchannel devices with M2M manifolds within the stacked shim architecture, the M2M manifolds add to the overall volume of the device and so it is desirable to maximize the capacity of the manifold. In preferred embodiments of the invention, an M2M distributes 1 kg/m3/s, preferably 10 kg/m3/s, and in some preferred embodiments distributes 30 to 150 kg/m3/s.

The connections between the manifold and the connecting channels (i.e., the M2M distribution structures) described herein preferably have thicknesses (i.e., heights) of 20 μm to 5 mm, more preferably 2 mm or less, and preferably have widths in the range of 100 μm to 5 cm and in some preferred embodiments have widths more than 250 micrometers and less than one millimeter. The lengths of the connecting channels have a lower limit of zero and an upper limit of 1 meter, and in some preferred embodiments a range of 2 millimeters to 10 cm.

The cross-sectional area of a channel is that cross-sectional plane normal to the channel axis. It excludes the cross-sectional area of the wall and any applied coatings (catalyst, bonding, metal protection) to the wall. A layer typically includes plural channels that are separated by channel walls. The cross-sectional area of a channel includes area taken up by catalyst, if present.

Channels are defined by channel walls that may be continuous or may contain gaps. Interconnecting pathways through a monolith foam or felt are not connecting channels (although a foam, etc. may be disposed within a channel).

"Connecting channels" are channels connected to a manifold. Typically, unit operations occur in connecting channels. Connecting channels have an entrance cross-sectional plane and an exit cross-sectional plane. Although some unit operations or portions of unit operations may occur in a manifold, in preferred embodiments, greater than 70% (in some embodiments at least 95%) of a unit operation occurs in connecting channels. A "connecting channel matrix" is a group of adjacent, substantially parallel connecting channels. In preferred embodiments, the connecting channel walls are straight.

The "connection to manifold cross-sectional area ratio" is the ratio of the cross-sectional area of open area of the manifold connection (such as a gate or grate) to the cross-sectional area (perpendicular to the central axis) of the manifold at the position immediately upstream of the connection (for a header) or immediately downstream of a connection (for a footer).

The connecting channel pressure drop (DPCCdP) is the static pressure difference between the center of the entrance cross-sectional plane and the center of the exit cross-sectional plane of the connecting channels. In some preferred embodiments, connecting channels are straight with substantially no variation in direction or width. The connecting channel pressure drop for a system of multiple connecting channels is the arithmetic mean of each individual connecting channel pressure drop. That is, the sum of the pressure drops through each channel divided by the number of channels. For the examples, pressure drops are unadjusted; however, in the claims, pressure are defined based on the channels that comprise 95% of the net flow through the connecting channels, the lowest flow channels are not counted if the flow through those channels is not needed to account for 95% of the net flow.

The FA dimensionless number is a means of distinguishing high momentum flow from creeping flow in manifolds:

$$FA = \frac{[0.058 + 0.0023(\ln Re)^2]^2 D}{L_{M2M}} < 0.01 \quad (2)$$

where Re is the manifold Reynolds number, D is the manifold hydraulic diameter and LM2M is the manifold zone length. The header manifold Reynolds number and hydraulic diameter for FA are defined at the position on the channel axis where the wall plane closest to the header entrance belonging to the connecting channel closest to the entrance in the manifold connects with the channel axis. The footer manifold Reynolds number and hydraulic diameter for FA are defined at the position where the wall plane closest to the footer exit belonging to the connecting channel closest to footer exit connects with the channel axis. FA should be below 0.01 and for some preferred embodiments less than 0.001.

A "flow resistor" is a bump, grate, or porous body. A flow resistor is not a simple straight channel, and is not a gate at the start of a channel.

A "footer" is a manifold arranged to take away fluid from connecting channels.

A "gate" comprises an interface between the manifold and two or more connecting channels. A gate has a nonzero volume. A gate controls flow into multiple connecting channels by varying the cross sectional area of the entrance to the connecting channels. A gate is distinct from a simple orifice, in that the fluid flowing through a gate has positive momentum in both the direction of the flow in the manifold and the direction of flow in the connecting channel as it passes through the gate. In contrast, greater than 75% of the positive momentum vector of flow through an orifice is in the direction of the orifice's axis. A typical ratio of the cross sectional area of flow through a gate ranges between 2-98% (and in some embodiments 5% to 52%) of the cross sectional area of the connecting channels controlled by the gate including the cross sectional area of the walls between the connecting channels controlled by the gate. The use of two or more gates allows use of the manifold interface's cross sectional area as a means of tailoring manifold turning losses, which in turn enables equal flow rates between the gates. These gate turning losses can be used to compensate for the changes in the manifold pressure profiles caused by friction pressure losses and momentum compensation, both of which have an effect upon the manifold pressure profile. The maximum variation in the cross-sectional area divided by the minimum area, given by the Ra number, is preferably less than 8, more preferably less than 6 and in even more preferred embodiments less than 4.

In a preferred shim construction (shown in FIGS. 3E and 3F), a gate comprises two or more adjoining shims that have channel walls 32' connected at their respective ends. These end wall connections 34' fix the channel walls in space so that the ends do not move during manufacturing and handling. At least one shim has end wall connections continuous across the width of the gate's two or more connecting channels and walls to form the perimeter edge of the manifold 34'. The end wall connection in this shim creates a barrier for fluid flow between the manifold 36 and the two or more connecting channels 35'. The illustrated shim also has an intermediate wall connection 37' between the connecting channels and the end wall connections. The plane extending in the stacking direction from wall 37' is the connecting channel plane exit or entrance. The intermediate wall connection acts as a barrier for flow between the gate's two or more connecting channels, leaving an open volume between connections for flow distribution in the connection 38'. At least one other shim (the "gate opening" shim) has, where it interfaces the manifold perimeter, the end wall connection 42' only partially continuous across the width of the gate's two or more connecting channels and walls. There is one continuous section 44' of the end wall channel that is offset from the manifold perimeter, extending from the manifold 36' far enough to allow a flow to travel past the barrier created by the continuous end wall connections. The walls 44' and 34' form a connection 46' between the manifold and the connecting channels. The plane extending in the stacking direction from wall 34' is the manifold interface plane. Two or more connecting channels in the "gate opening" shim provide a flow connection 46' into the connecting channels.

In some preferred embodiments, connecting channels are aligned in adjacent shims (such as in region 47' of FIG. 3E)

A "grate" is a connection between a manifold and a single channel. A grate has a nonzero connection volume. In a shim construction (shown in FIG. 3D), a grate is formed when a cross bar in a first shim is not aligned with a cross bar in an adjacent second shim such that flow passes over the cross bar in the first shim and under the cross bar in the second shim.

The "head" refers to the dynamic head of a channel flow, defined by the following equation, $$\text{head} = \frac{\rho U^2}{2} = \frac{G^2}{2\rho} \quad (3)$$

where
$\rho [kg/m3]$=density of the fluid
$G [kg/m2/s]$=mass flux rate of the fluid
$U [m/s]$=specific velocity of the fluid The head is defined at the position of interest.

A "header" is a manifold arranged to deliver fluid to connecting channels.

A "height" is a direction perpendicular to length. In a laminated device, height is the stacking direction. See also FIG. 1A.

A "hydraulic diameter" of a channel is defined as four times the cross-sectional area of the channel divided by the length of the channel's wetted perimeter.

An "L-manifold" describes a manifold design where flow direction into one manifold is normal to axes of the connecting channel, while the flow direction in the opposite manifold is parallel with the axes of the connecting channels. For example, a header L-manifold has a manifold flow normal to the axes of the connecting channels, while the footer manifold flow travels in the direction of connecting channels axes out of the device. The flow makes an "L" turn from the manifold inlet, through the connecting channels, and out of the device. When two L-manifolds are brought together to serve a connecting channel matrix, where the header has inlets on both ends of the manifold or a footer has exits from both ends of the manifold, the manifold is called a "T-manifold".

A "laminated device" is a device made from laminae that is capable of performing a unit operation on a process stream that flows through the device.

A "length" refers to the distance in the direction of a channel's (or manifold's) axis, which is in the direction of flow.

"M2M manifold" is defined as a macro-to-micro manifold, that is, a microchannel manifold that distributes flow to or from one or more connecting microchannels. The M2M manifold in turn takes flow to or from another larger cross-sectional area delivery source, also known as macro manifold. The macro manifold can be, for example, a pipe, a duct or an open reservoir.

A "macromanifold" is a pipe, tube, or duct that connects multiple microdevices to a single inlet and/or outlet. Flow in the macromanifold is in either the transition or turbulent regime. Each microdevice further comprises a manifold for distributing flow to multiple parallel microchannels (i.e., a connecting channel matrix). A "manifold" is a volume that distributes flow to two or more connecting channels or to a very large aspect ratio (aspect ratios>30:1) single connecting channel. Aspect ratio is defined as the width of the channel (the flow direction through the volume) over its height in the stacking direction. The entrance, or inlet, plane of a header manifold is defined as the plane in which marks a significant difference in header manifold geometry from the upstream channel. The header manifold includes any volume between the entrance plane and the LM2M header beginning point. The exit, or outlet, plane of the footer manifold is defined as the plane which marks a significant difference in the footer manifold channel from the downstream channel. A significant difference in manifold geometry will be accompanied by a significant difference in flow direction and/or mass flux rate. A manifold includes submanifolds if the submanifolding does not cause significant difference in flow direction and/or mass flux rate. The footer manifold includes any volume between the LM2M footer end point and the exit plane. For example, a microchannel header manifold's entrance plane is the plane where the microchannel header interfaces a larger delivery header manifold, such as a pipe or duct, attached to the microchannel device through welding a flange or other joining methods. Similarly, a header manifold starts at the plane where a tub-like, non-microchannel header connects with a microchannel header space. In most cases, a person skilled in this art will readily recognize the boundaries of a manifold that serves a group of connecting channels.

A "manifold connection" is the plane between the manifold and one or more connecting channels. The manifold connection plane can have a volume associated with it for a single connecting channel, and must have a volume if connected through a gate to two or more channels.

Figure 1A:
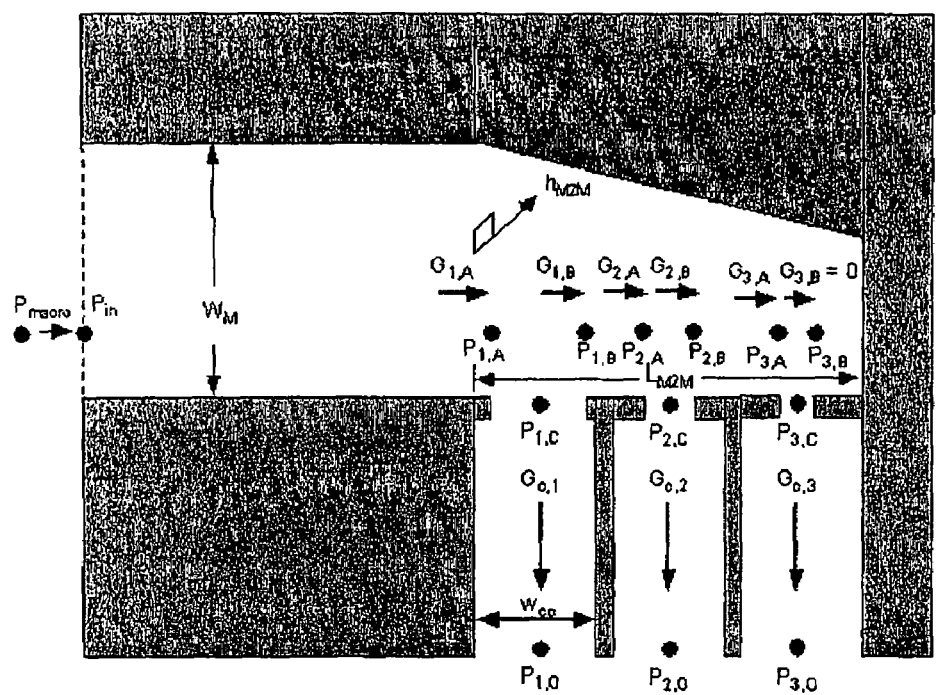

A "manifold length" (LM2M) is the length of the manifold over its connecting channels. For a header, LM2M is the distance between where the wall plane closest to the header entrance belonging to the connecting channel closest to the header entrance connects with the manifold channel axis, the "LM2M header beginning point", and the position where the wall plane farthest away from the header entrance belonging to the connecting channel farthest away from the header entrance connects with the manifold channel axis, the "LM2M header end point". For a header T-manifolds and header U-manifolds, the LM2M header end point is the midpoint on the line between the two opposite LM2M header beginning points if the channel has a constant cross-sectional area and the LM2M header end point is where the two sides's manifold channel axis lines cross, assuming symmetry between the two manifold sides. For a footer, the LM2M is the distance between the position where the wall plane farthest away from the footer exit belonging to the connecting channel farthest away from the footer exit connects with the channel axis, the "LM2M footer beginning point", and the position where the wall plane closest to the footer exit belonging to the connecting channel closest to the footer exit connects with the channel axis, the "LM2M footer end point". For a header T-manifolds and header U-manifolds, the LM2M header end point is the midpoint on the line between the two opposite LM2M header beginning points if the channel has a constant cross-sectional area and the LM2M header end point is where the two sides's manifold channel axis lines cross, assuming symmetry between the two manifold sides. An example of LM2M is seen in FIG. 1A1.

For a header the "manifold pressure drop" (DPmanifold) is the static pressure difference between the arithmetic mean of the area-averaged center pressures of the header manifold inlet planes (in the case where there is only one header inlet, there is only one inlet plane) and the arithmetic mean of each of the connecting channels' entrance plane center pressures. The header manifold pressure drop is based on the header manifold entrance planes that comprise 95% of the net flow through the connecting channels, the header manifold inlet planes having the lowest flow are not counted in the arithmetic mean if the flow through those header manifold inlet planes is not needed to account for 95% of the net flow through the connecting channels. The header (or footer) manifold pressure drop is also based only on the connecting channels' entrance (or exit) plane center pressures that comprise 95% of the net flow through the connecting channels, the connecting channels' entrance (or exit) planes having the lowest flow are not counted in the arithmetic mean if the flow through those connecting channels is not needed to account for 95% of the net flow through the connecting channels. For a footer, the manifold pressure drop is the static pressure difference between the arithmetic mean of each of the connecting channel's exit plane center pressures and the arithmetic mean of the area-averaged center pressures of the footer manifold outlet planes (in the case where there is only one header outlet, there is only one outlet plane). The footer manifold pressure drop is based on the footer manifold exit planes that comprise 95% of the net flow through the connecting channels, the footer manifold outlet planes with the lowest flow are not counted in the arithmetic mean if the flow through those exit planes is not needed to account for 95% of the net flow through the connecting channels.

For a header manifold the "manifold to interface pressure drop" (DPM2I) is the static pressure difference between the point of the "header manifold pressure at the interface", where the header manifold channel axis crosses the plane that bisects the manifold connection width through the manifold connection channel axis, where that plane goes through the bottom and top of the manifold connection channel in the stacking direction, and the center of the connecting channel inlet plane or the arithmetic mean of the connecting channel plane centers connected to the manifold connection. For a footer manifold the manifold to interface pressure (i.e., the "footer manifold pressure at the interface") is defined as the absolute value of the pressure difference between the arithmetic mean of the connecting channel's exit plane center pressures and the point where the footer manifold channel axis crosses the plane that bisects the manifold connection width through the manifold connection axis, where that plane goes through the bottom and top of the manifold connection channel in the height (stacking for laminated device) direction. Examples of the manifold connection include a grate, a gate or orifices. The manifold connection can only be the entrance or exit of a connecting channel if the manifold connection is a plane between the connection and the manifold.

The mass flux rate G is the mass flow rate per unit cross-sectional area of the channel in the direction of the channel's axis.

The ratio of the manifold's head to its friction loss, Mo, is defined by the following equation:

$$Mo = \frac{\frac{1}{2\rho}[G^2 - 0]}{\frac{4fL_{M2M}}{D}\frac{G^2}{2\rho}} = \left\{\frac{4fL_{M2M}}{D}\right\}^{-1} \tag{4}$$

where,
D[m]=manifold hydraulic diameter at the M2M reference point
f[dimensionless]=Fanning friction factor for the M2M reference point
G[kg/m2/s]=mass flux rate at the M2M reference point The reference point of header manifold Reynolds number and hydraulic diameter for Mo are defined at the position on the channel axis where the wall plane closest to the header entrance belonging to the connecting channel closest to the entrance in the manifold connects with the channel axis. The footer manifold Reynolds number and hydraulic diameter for Mo are defined at the reference point at the position where the wall plane closest to the footer exit belonging to the connecting channel closest to footer exit connects with the channel axis.

A "module" is a large capacity microchannel device, made up of multiple layers of repeating unit combinations.

An "open channel" is a gap of at least 0.05 mm that extends all the way through a microchannel such that fluids can flow through the microchannel with relatively low pressure drop.

The "pressure drop ratio #1" (PDR1) is defined as the ratio of connecting channel pressure drop over the representative head of the manifold (the LM2M header beginning point" for a header, the LM2M footer end point" for the footer):

$$DPR_1 = \frac{\Delta P_{CCdP}}{h} = \frac{\Delta P_{CCdP}}{\frac{G^2}{2\rho}} \tag{5}$$

If a manifold has more than one sub-manifold, the head is based upon the arithmetic (number average) mean of the individual sub-manifold G and r values.

The "pressure drop ratio #2" (PDR2) is defined as the ratio of connecting channel pressure drop over the manifold pressure drop:

$$DPR_2 = \frac{\Delta P_{CCdP}}{\Delta P_{manifold}} \tag{6}$$

If a manifold has more than one sub-manifold, the manifold pressure drop is based upon the number average of sub-manifold values.

The "pressure drop ratio #3" (DPR3) is defined as the ratio of manifold to interface pressure drop over the manifold pressure drop, $$DPR_3 = \frac{\Delta P_{M2I}}{\Delta P_{manifold}} \tag{7}$$

In preferred embodiments, the arithmetic mean of DPR3 for a manifold is less than 0.9, based on the manifold connections that comprise 95% of the net flow through the connecting channels, the lowest flow manifold connections are not counted if the flow through those channels is not needed to account for 95% of the net flow through the connecting channels. More preferable embodiments have DPR3 values based on the same criteria of less than 0.75, more preferably less than 0.50, more preferably still 0.25 and most preferably less than 0.10.

"Process channel volume" is the internal volume of a process (i.e., connecting) channel. This volume includes the volume of the catalyst (if present) and the open flow volume (if present). This volume does not include the channel walls. For example, a reaction chamber that is comprised of a 2 cm×2 cm×0.1 cm catalyst and a 2 cm×2 cm×0.2 cm open volume for flow immediately adjacent to the catalyst, would have a total volume of 1.2 cm3.

Quality Index factor "Q1" is a measure of how effective a manifold is in distributing flow. It is the ratio of the difference between the maximum and minimum rate of connecting channel flow divided by the maximum rate. For systems of connecting channels with constant channel dimensions it is often desired to achieve equal mass flow rate per channel. The equation for this case is shown below, and is defined as Q1.

$$Q_1 = \frac{m_{max} - m_{min}}{m_{max}} \times 100\% \qquad (8)$$

where
$m_{max}$[kg/sec]=maximum connecting channel mass flow rate
$m_{min}$[kg/sec]=minimum connecting channel mass flow rate For cases when there are varying connecting channel dimensions it is often desired that the residence time, contact time, velocity or mass flux rate have minimal variation from channel to channel such that the required duty of the unit operation is attained. For those cases we define a quality index factor Q2:

$$Q_2 = \frac{G_{max} - G_{min}}{G_{max}} \times 100\%,$$

where G is the mass flux rate. For cases when all the connecting channels have the same cross sectional area, the equation for Q2 simplifies to Q1. The quality index factor gives the range of connecting channel flow rates, with 0% being perfect distribution, 100% showing stagnation (no flow) in at least one channel, and values of over 100% indicating backflow (flow in reverse of the desired flow direction) in at least one channel. For the examples, Q1 and Q2 are unadjusted; however, in the claims, Q1 and Q2 are defined based on the channels that comprise 95% of the net flow through the connecting channels, the lowest flow channels are not counted if the flow through those channels is not needed to account for 95% of the net flow through the connecting channels.

Ra (=Amax/Amin) is the cross-sectional area ratio of the biggest to the smallest connection between a manifold and connecting channels. These areas can belong to gates or grates.

The Reynolds number, Re, is the commonly used ratio of the inertial over the viscous forces seen by flow in a channel. Its definition is the ratio of the mass flux rate (G) times the hydraulic diameter (D) divided by the dynamic viscosity (m), $$Re = \frac{GD}{\mu} = \frac{\rho UD}{\mu} \qquad (9)$$

The value of the Reynolds number describes the flow regime of the stream. While the dependence of the regime on Reynolds number is a function of channel cross-section shape and size, the following ranges are typically used for channels:
Laminar: Re<2000 to 2200
Transition: 2000-2200<Re<4000 to 5000
Turbulent: Re>4000 to 5000

"Sheets" or "shims" refer to substantially planar plates or sheets that can have any width and length and preferably have a thickness (the smallest dimension) of 5 millimeter (mm) or less, more preferably 0.080 inch (2 mm) or less, and in some preferred embodiments between 50 and 1000 µm. Width and length are mutually perpendicular and are perpendicular to thickness. In preferred embodiments, a sheet has length and width that are coextensive the length and width of the stack of laminae in which the sheet resides. Length of a sheet is in the direction of flow; however, in those cases in which the direction of flow cannot be determined, length is the longest dimension of a sheet.

A "subchannel" is a channel that is within a larger channel. Channels and subchannels are defined along their length by channel walls.

A "sub-manifold" is a manifold that operates in conjunction with at least one other submanifold to make one large manifold in a plane. Sub-manifolds are separated from each other by continuous walls.

"Thickness" is measured in the stacking direction.

In a "U-manifold," fluid in a header and footer flow in opposite directions while being at a non zero angle to the axes of the connecting channels. When two U-manifolds are brought together to serve a connecting channel matrix, with entrances on both open ends of the header manifold and exits on both open ends of the footer, the manifold is called an "I-manifold".

"Unit operation" means chemical reaction, vaporization, compression, chemical separation, distillation, condensation, mixing, heating, or cooling. A "unit operation" does not mean merely fluid transport, although transport frequently occurs along with unit operations. In some preferred embodiments, a unit operation is not merely mixing.

In a "Z-manifold," fluid in a header and footer flow in the same direction while being at a non zero angle to the axes of the connecting channels. Fluid entering the manifold system exits from the opposite side of the device from where it enters. The flow essentially makes a "Z" direction from inlet to outlet.

Figure 3:
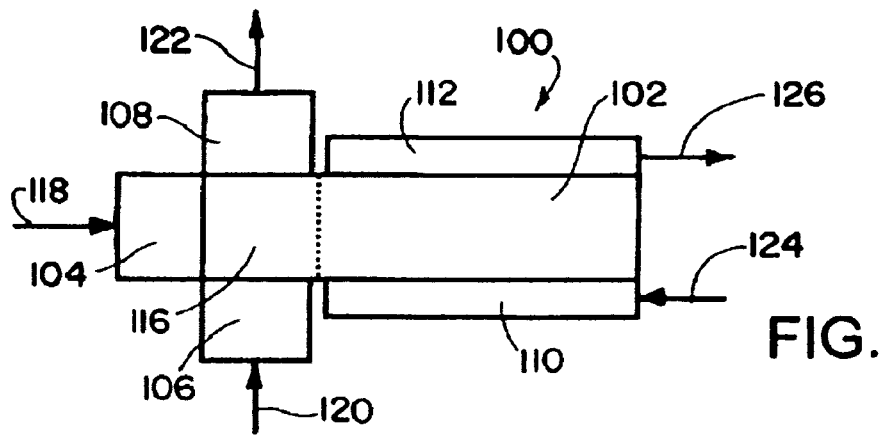
FIG. 3 is a schematic flow sheet illustrating the inventive process in a particular form wherein $H_2$ and $O_2$ flow in a microchannel reactor in contact with a catalyst and react to form hydrogen peroxide.

A first aspect of the present invention is illustrated in exemplary form in FIGS. 3-11. Referring to FIG. 3, the process is operated using microchannel reactor 100 which includes microchannel reactor core 102, process feed stream header 104, staged addition feed stream header 106, product footer 108, heat exchange header 110, heat exchange footer 112, and manifold and recuperator 116. A process feed stream comprising O2 or H2 flows into the microchannel reactor 100 through the process feed stream header 104, as indicated by directional arrow 118. A staged addition feed stream comprising O2 or H2 flows into the microchannel reactor 100 through the staged addition feed stream header 106, as indicated by directional arrow 120. It will be understood by those skilled in the art that when the process feed stream comprises O2, the staged addition feed stream will comprise H2. Alternatively, when the process feed stream comprises H2, the staged addition feed stream will comprise O2. The process feed stream and the staged addition feed stream flow into and through the manifold and recuperator 116 into the reactor core 102 wherein they are mixed with each other in one or more process microchannels to form a reactant mixture comprising O2 and H2. The reactant mixture contacts a catalyst within the one or more process microchannels and is converted to a product comprising hydrogen peroxide. The product flows from the reactor core 102 through the manifold and recuperator 116 to product footer 108, and from product footer 108 out of the reactor, as indicated by directional arrow 122. Although an advantage of the inventive process is that a high level of conversion of O2 and/or H2 may be obtained with one pass through the microchannel reactor, in one embodiment, unreacted O2 and/or H2 may be separated from the product using conventional techniques and recycled back through the microchannel reactor. The unreacted O2 and/or H2 may be recycled through the microchannel reactor any number of times, for example, one, two, three, four times, etc. A heat exchange fluid flows into heat exchange header 110, as indicated by directional arrow 124, and from heat exchange header 110 through the reactor core 102 to heat exchange footer 112, and out of heat exchange footer 112, as indicated by directional arrow 126. Heat exchange between the feed and product streams and the heat exchange fluid may be effected using convective heat transfer. In one exemplary embodiment, heat exchange may be enhanced by the heat exchange fluid undergoing a full or partial phase change in heat exchange channels in the reactor core 102. The microchannel reactor 100 is employed in conjunction with storage vessels, pumps, valves, flow control devices, and the like, which are not shown in the drawings, but would be apparent to those skilled in the art.

The process feed stream and the staged addition feed stream are mixed with each other in the one or more process microchannels in the microchannel reactor. In one embodiment, the catalyst is positioned within a reaction zone in the one or more process microchannels and the staged addition feed stream is mixed with the process feed stream in the reaction zone. In one exemplary embodiment, the one or more process microchannels contain a mixing zone and a reaction zone, the mixing zone being positioned upstream of the reaction zone, the catalyst being positioned in the reaction zone, and the staged addition feed stream is mixed with the process feed stream in the mixing zone. In a further exemplary embodiment, the one or more process microchannels contain a mixing zone and a reaction zone, and the process feed stream and the staged addition feed stream are partially mixed in the mixing zone and partially mixed in the reaction zone. In still a further exemplary embodiment, from about 1% to about 99% by volume of the staged addition feed stream is mixed with the process feed stream in the mixing zone and the remainder of the staged addition feed stream is mixed with the process feed stream in the reaction zone. The volume of the staged addition feed stream that is mixed with the process feed stream in the mixing zone may range from about 5% to about 95% by volume, and in one embodiment from about 10% to about 90% by volume, and in one embodiment from about 20% to about 80% by volume, and in one embodiment from about 30% to about 70% by volume, and in one embodiment from about 40% to about 60% by volume, with the remainder of the staged addition feed stream being mixed with the process feed stream in the reaction zone.

The mixing of the O2 and H2 in the one or more process microchannels of the microchannel reactor provides the advantage of safe handling of the reactants, as will be discussed in further detail herein.

Figure 4:
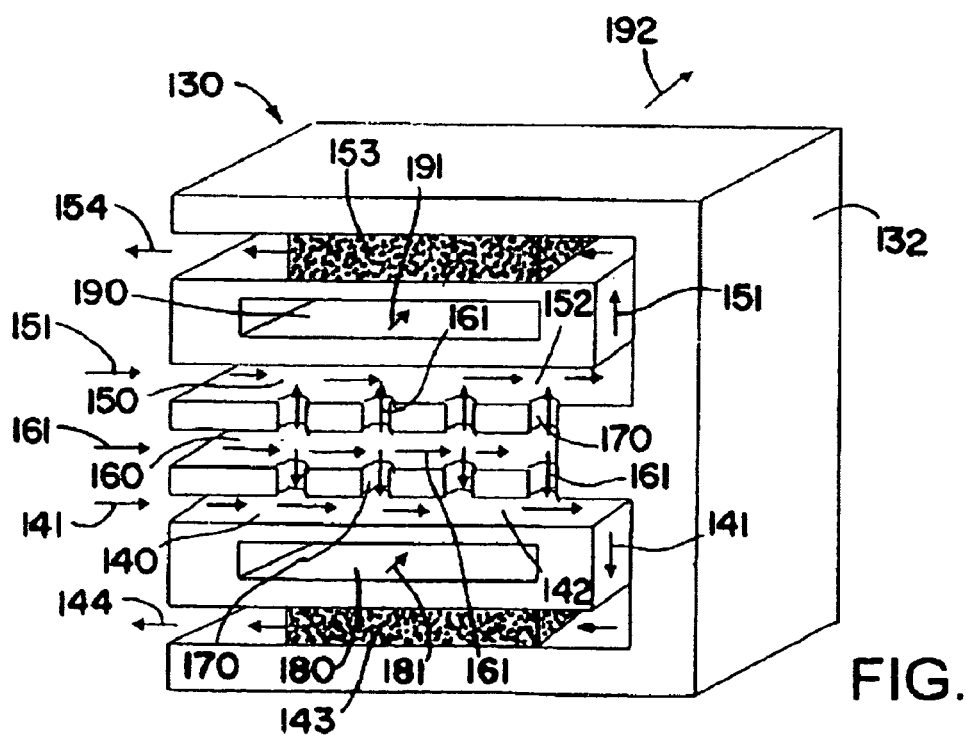
FIG. 4 is a schematic illustration of a repeating unit of process microchannels and heat exchange microchannels that may be used in the microchannel reactor core of the microchannel reactor illustrated in FIG. 3.

FIG. 4 illustrates repeating unit 130 which may be used in the reactor core 102 of the microchannel reactor 100. Repeating unit 130 is housed within housing unit 132. The inventive process is conducted using process microchannels 140 and 150, staged addition microchannel 160, orifices 170, and heat exchange channels 180 and 190. The process feed stream comprising O2 or H2 flows through process microchannels 140 and 150, as indicated by the directional arrows 141 and 151, respectively. The staged addition feed stream comprising H2 or O2 flows through the staged addition microchannel 160 into orifices 170, and from the orifices 170 into process microchannels 140 and 150, as indicated by directional arrows 161. The process microchannels 140 and 150 have mixing zones 142 and 152, respectively, wherein the process feed stream and staged addition feed stream contact each other and form a reactant mixture comprising O2 and H2. The process microchannels 140 and 150 also have reaction zones 143 and 153, respectively, wherein the catalyst is present and the reactant mixture contacts the catalyst and reacts to form a product comprising hydrogen peroxide. The mixing zones 142 and 152 are positioned upstream from the reaction zones 143 and 153, respectively. The product exits the process microchannels 140 and 150, as indicated by the directional arrows 144 and 154, respectively. The product exiting the process microchannels 140 and 150 flows to the manifold and recuperator 116, and from the manifold and recuperator 116 through the product footer 108 and out of the reactor, as indicated by arrow 122. Heat exchange fluid flows from heat exchange header 110 through heat exchange channels 180 and 190, as indicated by directional arrows 181, and 191 and 192, respectively, to heat exchange footer 112. The flow of heat exchange fluid in the direction indicated by arrows 181, 191 and 192 is cross-current to the flow of fluid flowing through process microchannels 140 and 150 as indicated by arrows 141 and 151, respectively. Alternatively, the heat exchange channels 180 and 190 could be oriented to provide for the flow of the heat exchange fluid in a direction that would be cocurrent or counter-current to the flow of fluid through the process microchannels 140 and 150. The repeating unit 130 illustrated in FIG. 4 may occur once within the microchannel reactor core 102 or it may be repeated any number of times, for example, two, three, four, five, ten, twenty, fifty, one hundred, hundreds, one thousand, thousands, ten thousand, tens of thousands, one hundred thousand, hundreds of thousands or millions of times.

Figure 5:
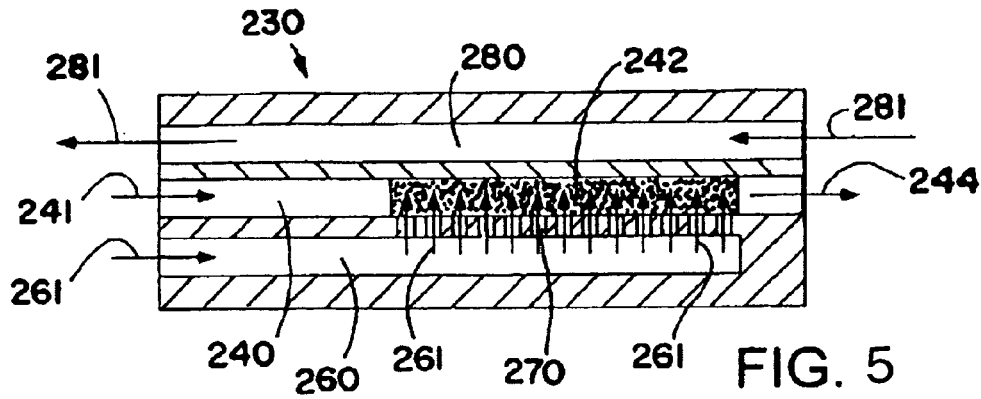
FIG. 5 is a schematic illustration of another repeating unit of a process microchannel and a heat exchange microchannel that may be used in the microchannel reactor core of the microchannel reactor illustrated in FIG. 3.

FIG. 5 illustrates another exemplary repeating unit 230 which may be used in the reactor core 102 of the microchannel reactor 100. The inventive process is conducted using process microchannel 240, staged addition microchannel 260, orifices 270, and heat exchange channel 280. Process microchannel 240 has a reaction zone 242, wherein the catalyst is present. The process feed stream comprising O2 or H2 flows through process microchannel 240, as indicated by the directional arrow 241. The staged addition feed stream comprising H2 or O2 flows through the staged addition microchannel 260 into and through the orifices 270, and from the orifices 270 into the reaction zone 242 as indicated by directional arrows 261. In the reaction zone 242 the staged addition feed stream mixes with the process feed stream to form a reactant mixture comprising O2 and H2. The reactant mixture contacts the catalyst and reacts to form a product comprising hydrogen peroxide. The product exits the process microchannel 240, as indicated by the directional arrow 244. The product exiting the process microchannel 240 flows to the manifold and recuperator 116, and from the manifold and recuperator 116 through the product footer 108 and out of the reactor, as indicated by arrow 122. Heat exchange fluid flows from heat exchange header 110 through heat exchange channel 280, as indicated by directional arrows 281, to heat exchange footer 112. The flow of heat exchange fluid in the direction indicated by arrows 281 is counter-current to the flow of fluid flowing through process microchannel 240. Alternatively, the heat exchange channel 280 could be oriented to provide for the flow of the heat exchange fluid in a direction that would be cocurrent or cross-current to the flow of fluid through the process microchannel 240. The repeating unit 230 illustrated in FIG. 5 may occur once within the microchannel reaction zone 114 or it may be repeated any number of times, for example, two, three, four, five, ten, twenty, fifty, one hundred, hundreds, one thousand, thousands, ten thousand, tens of thousands, one hundred thousand, hundreds of thousands or millions of times.

Figure 6:
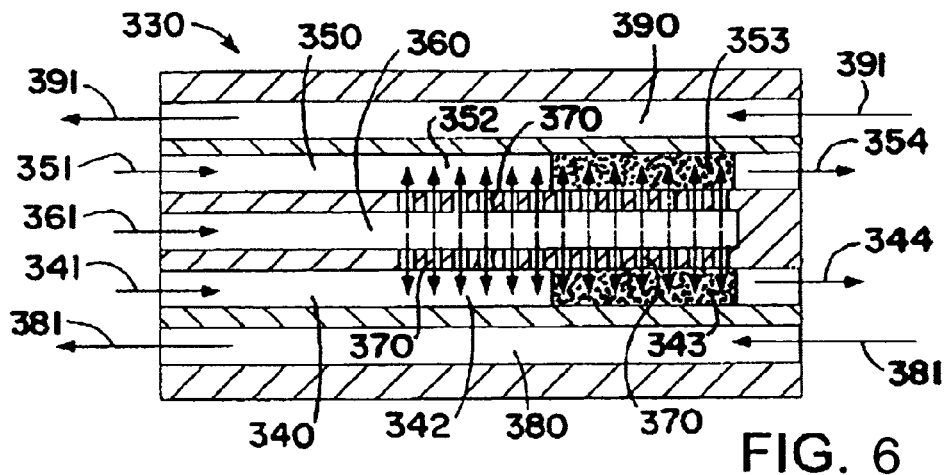
FIG. 6 is a schematic illustration of another repeating unit of process microchannels and heat exchange microchannels that may be used in the microchannel reactor core of the microchannel reactor illustrated in FIG. 3.

FIG. 6 illustrates a further exemplary repeating unit 330 which may be used in the reactor core 102 of the microchannel reactor 100. The inventive process is conducted using process microchannels 340 and 350, staged addition microchannel 360, orifices 370, and heat exchange channels 380 and 390. The process microchannels 340 and 350 have mixing zones 342 and 352, respectively, and reaction zones 343 and 353, respectively. The catalyst is present in the reaction zones 343 and 353. The mixing zones 342 and 352 are positioned upstream of the reaction zones 343 and 353. The process feed stream comprising O2 or H2 flows through process microchannels 340 and 350, as indicated by the directional arrows 341 and 351, respectively. The staged addition feed stream comprising H2 or O2 flows through the staged addition microchannel 360 into and through orifices 370, and from the orifices 370 into process microchannels 340 and 350, as indicated by directional arrows 361. In the process microchannels 340 and 350 a portion of the staged addition feed stream contacts and intermixes with the process feed stream in the mixing zones 342 and 352, respectively, with the result being the formation of a reactant mixture. This reactant mixture flows into the reaction zones 343 and 353. The remainder of the staged addition feed stream contacts and intermixes with the process feed stream in the reaction zones 343 and 353, respectively, to form an additional amount of reactant mixture. The reactant mixture comprises O2 and H2. The reactant mixture contacts the catalyst in the reaction zones 343 and 353 and reacts to form a product comprising hydrogen peroxide. The product exits the process microchannels 340 and 350, as indicated by the directional arrows 344 and 354, respectively. The product exiting the process microchannels 340 and 350 flows to the manifold and recuperator 116, and from the manifold and recuperator 116 through the product footer 108 and out of the reactor, as indicated by arrow 122. Heat exchange fluid flows from heat exchange header 110 through heat exchange channels 380 and 390, as indicated by directional arrows 381 and 391, respectively, to heat exchange footer 112. The flow of heat exchange fluid in the direction indicated by arrows 381 and 391 is counter-current to the flow of fluid flowing through process microchannels 340 and 350. Alternatively, the heat exchange channels 380 and 390 could be oriented to provide for the flow of the heat exchange fluid in a direction that would be cocurrent or cross-current to the flow of fluid through the process microchannels 340 and 350. The repeating unit 330 illustrated in FIG. 6 may occur once within the microchannel reactor core 102 or it may be repeated any number of times, for example, two, three, four, five, ten, twenty, fifty, one hundred, hundreds, one thousand, thousands, ten thousand, tens of thousands, one hundred thousand, hundreds of thousands or millions of times.

Figure 7:
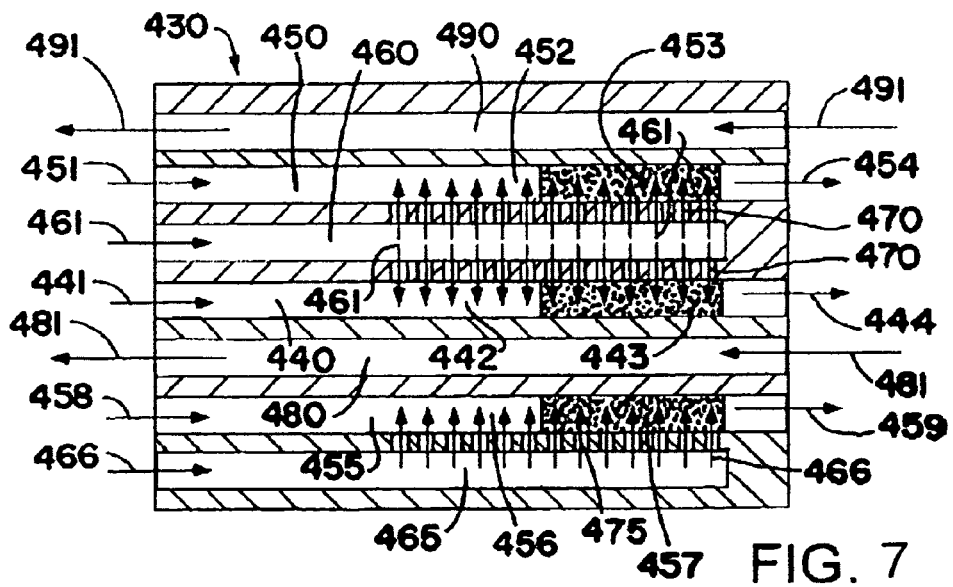
FIG. 7 is a schematic illustration of another repeating unit of process microchannels and heat exchange microchannels that may be used in the microchannel reactor core of the microchannel reactor illustrated in FIG. 3.

FIG. 7 illustrates still a further exemplary repeating unit 430 which may be used in the reactor core 102 of the microchannel reactor 100. The inventive process is conducted using process microchannels 440, 450 and 455, staged addition microchannels 460 and 465, orifices 470 and 475, and heat exchange channels 480 and 490. The process microchannels 440, 450, 455 have mixing zones 442, 452 and 456, respectively, and reaction zones 443, 453 and 457, respectively. The catalyst is positioned in the reaction zones. The mixing zones are upstream from reaction zones. The process feed stream comprising O2 or H2 flows through process microchannels 440 and 450, as indicated by the directional arrows 441 and 451, respectively. The staged addition feed stream comprising H2 or O2 flows through the staged addition microchannel 460 into and through orifices 470, and from the orifices 470 into process microchannels 440 and 450's indicated by directional arrows 461. In the process microchannels 440 and 450 a portion of the staged addition feed stream contacts and intermixes with the process feed stream in the mixing zones 442 and 452, respectively. The reactant mixture formed in the mixing zones 442 and 452 flows into the reaction zones 443 and 453, respectively. The remainder of the staged addition feed stream contacts and intermixes with the process feed stream in the reaction zones 443 and 453, respectively, to form an additional amount of reactant mixture. The reactant mixture comprises O2 and H2. In the reaction zones 443 and 453 the reactant mixture contacts the catalyst and reacts to form a product comprising hydrogen peroxide. The process feed stream also flows through process microchannel 455, as indicated by directional arrow 458. The staged addition feed stream also flows through the staged addition microchannel 465 into and through orifices 475, and from orifices 475 into process microchannel 455 as indicated by directional arrows 466. In the process microchannel 455 a portion of the staged addition feed stream contacts and intermixes with the process feed stream in the mixing zone 456 to form a reactant mixture. The reactant mixture formed in the mixing zone 456 flows into the reaction zone 457. The remainder of the staged addition feed stream flowing through the orifices 475 contacts and intermixes with the process feed stream to form a reactant mixture in the reaction zone 457. The reactant mixture comprises O2 and H2. In the reaction zone 457 the reactant mixture contacts the catalyst and reacts to form a product comprising hydrogen peroxide. The product exits the process microchannels 440, 450 and 455 as indicated by the directional arrows 444, 454 and 459, respectively. The product exiting the process microchannels 440, 450 and 455 flows to the manifold and recuperator 116, and from the manifold and recuperator 116 through the product footer 108 and out of the reactor, as indicated by arrow 122. Heat exchange fluid flows from heat exchange header 110 through heat exchange channels 480 and 490, as indicated by directional arrows 481 and 491, respectively, to heat exchange footer 112. The flow of heat exchange fluid in the direction indicated by arrows 481 and 491 is counter-current to the flow of fluid flowing through process microchannels 440, 450 and 455. Alternatively, the heat exchange channels 480 and 490 could be oriented to provide for the flow of the heat exchange fluid in a direction that would be cocurrent or cross-current to the flow of fluid through the process microchannels 440, 450 and 455. The repeating unit 430 illustrated in FIG. 7 may occur once within the microchannel reactor core 102 or it may be repeated any number of times, for example, two, three, four, five, ten, twenty, fifty, one hundred, hundreds, one thousand, thousands, ten thousand, tens of thousands, one hundred thousand, hundreds of thousands or millions of times.

Figure 8:
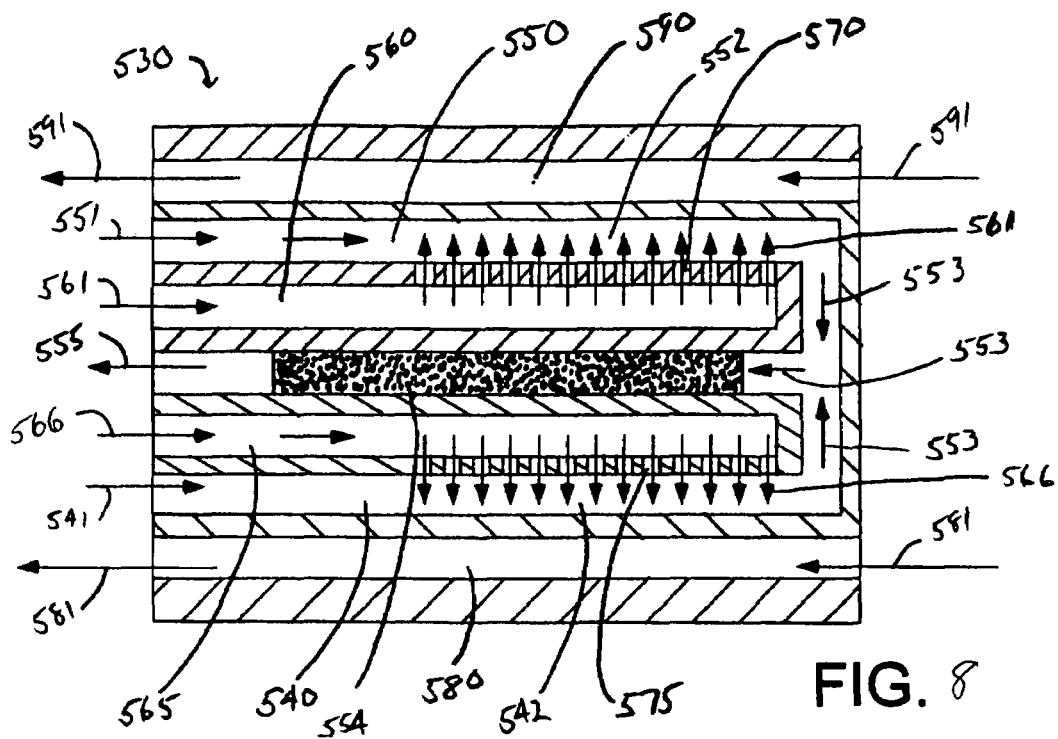
FIG. 8 is a schematic illustration of another repeating unit of process microchannels and heat exchange microchannels that may be used in the microchannel reactor core of the microchannel reactor illustrated in FIG. 3.

FIG. 8 illustrates an even further exemplary repeating unit 530 which may be used in the reactor core 102 of the microchannel reactor 100. The inventive process is conducted using process microchannels 540 and 550, staged addition microchannels 560 and 565, orifices 570 and 575, and heat exchange channels 580 and 590. The process microchannels 540 and 550 have mixing zones 542 and 552, respectively, and a common reaction zone 554. The catalyst is positioned in the reaction zone 554. The mixing zones are upstream from the reaction zone. The process feed stream comprising O2 or H2 flows through process microchannels 540 and 550, as indicated by the directional arrows 541 and 551, respectively. The staged addition feed stream comprising H2 or O2 flows through the staged addition microchannels 560 and 565 into orifices 570 and 575, respectively, and from the orifices 570 and 575 into the mixing zones 542 and 552, respectively, as indicated by directional arrows 561 and 566 where it mixes with the process feed stream to form a reactant mixture comprising H2 and O2. The reactant mixture flows into the reaction zone 554, as indicated by arrows 553, contacts the catalyst and reacts to form a product comprising hydrogen peroxide. The product exits reaction zone 554, as indicated by the directional arrow 555. The product exiting the reaction zone 554 flows to the manifold and recuperator 116, and from the manifold and recuperator 116 through the product footer 108 and out of the reactor, as indicated by arrow 122. Heat exchange fluid flows from heat exchange header 110 through heat exchange channels 580 and 590, as indicated by directional arrows 581 and 591 to heat exchange footer 112. The flow of heat exchange fluid in the direction indicated by arrows 581 and 591 is counter-current to the flow of fluid flowing through process microchannels 540 and 550. Alternatively, the heat exchange channels 180 and 190 could be oriented to provide for the flow of the heat exchange fluid in a direction that would be cocurrent or cross-current to the flow of fluid through the process microchannels 540 and 550. The repeating unit 530 illustrated in FIG. 8 may occur once within the microchannel reactor core 102 or it may be repeated any number of times, for example, two, three, four, five, ten, twenty, fifty, one hundred, hundreds, one thousand, thousands, ten thousand, tens of thousands, one hundred thousand, hundreds of thousands or millions of times.

Figure 9:
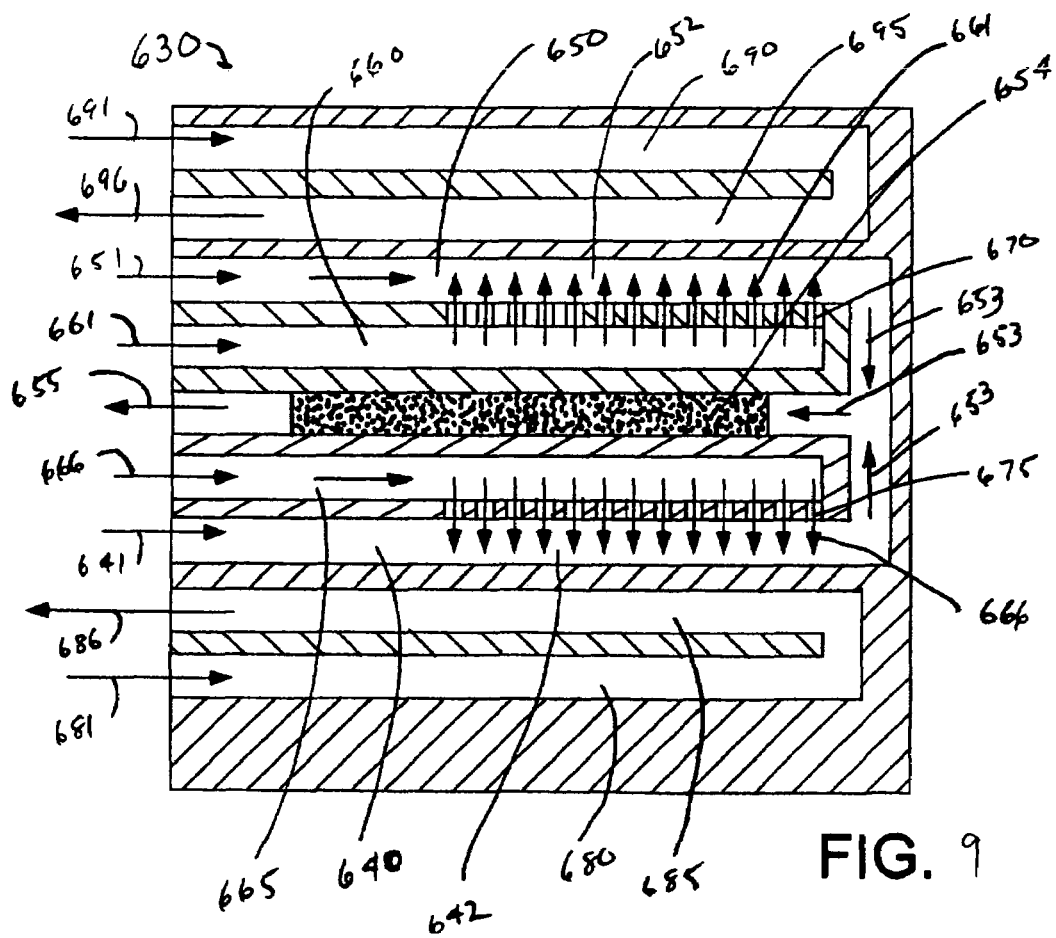
FIG. 9 is a schematic illustration of another repeating unit of process microchannels and heat exchange microchannels that may be used in the microchannel reactor core of the microchannel reactor illustrated in FIG. 3.

FIG. 9 illustrates an additional exemplary repeating unit 630 which may be used in the reaction zone 114 of the microchannel reactor 100. The inventive process is conducted using process microchannels 640 and 650, staged addition microchannels 660 and 665, orifices 670 and 675, and heat exchange channels 680, 685, 690 and 695. The process microchannels 640 and 650 have mixing zones 642 and 652, respectively, and a common reaction zone 654. The catalyst is positioned within the reaction zone 654. The mixing zones are upstream from the reaction zone. The process feed stream comprising O2 or H2 flows through process microchannels 640 and 650, as indicated by the directional arrows 641 and 651, respectively. The staged addition feed stream comprising H2 or O2 flows through the staged addition microchannels 660 and 665 into orifices 670 and 675, respectively, and from the orifices 670 and 675 into the mixing zones 642 and 652, respectively, as indicated by directional arrows 661 and 666. In the mixing zones 642 and 652 the staged addition feed stream mixes with the process feed stream to form a reactant mixture comprising H2 and O2. The reactant mixture flows into the reaction zone 654, as indicated by arrows 653, contacts the catalyst and reacts to form a product comprising hydrogen peroxide. The product exits the reaction zone 654, as indicated by directional arrow 655. The product exiting the reaction zone 654 flows to the manifold and recuperator 116, and from the manifold and recuperator 116 through the product footer 108 and out of the reactor, as indicated by arrow 122. Heat exchange fluid flows from heat exchange header 110 through heat exchange channels 680 and 685, and 690 and 695, as indicated by directional arrows 681 and 686, and 691 and 696, respectively, to heat exchange footer 112. The flow of heat exchange fluid in the direction indicated by arrows 681 and 686, and 691 and 696, is cocurrent and counter-current to the flow of fluid flowing through process microchannels 640 and 650. Alternatively, the heat exchange channels 681 and 686, and 691 and 696, could be oriented to provide for the flow of the heat exchange fluid in a direction that would be cross-current to the flow of fluid through the process microchannels 640 and 650. The repeating unit 630 illustrated in FIG. 9 may occur once within the microchannel reactor core 102 or it may be repeated any number of times, for example, two, three, four, five, ten, twenty, fifty, one hundred, hundreds, one thousand, thousands, ten thousand, tens of thousands, one hundred thousand, hundreds of thousands or millions of times.

Figure 10:
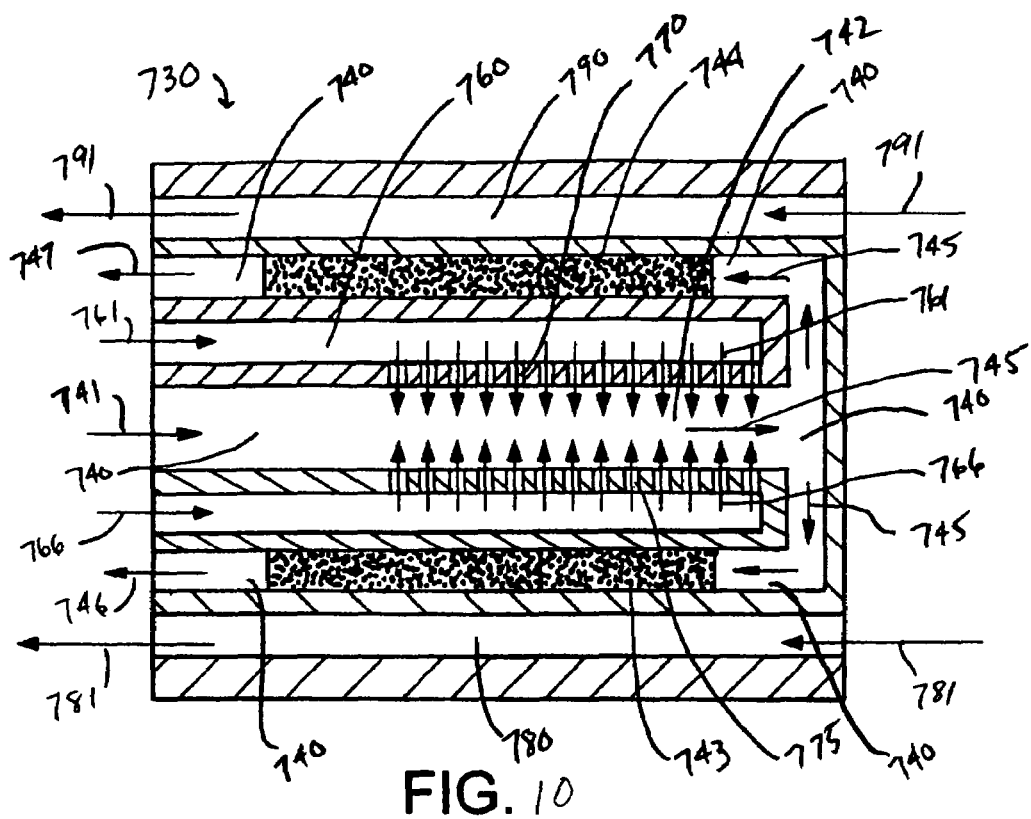
FIG. 10 is a schematic illustration of another repeating unit of process microchannels and heat exchange microchannels that may be used in the microchannel reactor core of the microchannel reactor illustrated in FIG. 3.

FIG. 10 illustrates a further exemplary repeating unit 730 which may be used in the reactor core 102 of the microchannel reactor 100. The inventive process is conducted using process microchannel 740, staged addition microchannels 760 and 765, orifices 770 and 775, and heat exchange channels 780 and 790. The process microchannel 740 has mixing zone 742 and reaction zones 743 and 744. The catalyst is positioned in the reaction zones 743 and 744. The mixing zone 742 is upstream from the reaction zones. The process feed stream comprising O2 or H2 flows through process microchannel 740, as indicated by the directional arrow 741. The staged addition feed stream comprising H2 or O2 flows through the staged addition microchannels 760 and 766 into orifices 770 and 775, respectively, and from the orifices 770 and 775 into the mixing zone 742, as indicated by directional arrows 761 and 766. In the mixing zone 742 the staged addition feed stream is mixed with the process feed stream to form a reactant mixture comprising H2 and O2. The reactant mixture flows into the reaction zones 743 and 744, as indicated by arrows 745, contacts the catalyst and reacts to form a product comprising hydrogen peroxide. The product exits reaction zones 743 and 744, as indicated by the directional arrows 746 and 747, respectively. The product exiting the reaction zone 743 and 744, flows to the manifold and recuperator 116, and from the manifold and recuperator 116 through the product footer 108 and out of the reactor, as indicated by arrow 122. Heat exchange fluid flows from heat exchange header 110 through heat exchange channels 780 and 790, as indicated by directional arrows 781 and 791, to heat exchange footer 112. The flow of heat exchange fluid in the direction indicated by arrows 781 and 791 is co-current to the flow of fluid flowing through the reaction zones 743 and 744. Alternatively, the heat exchange channels 780 and 790 could be oriented to provide for the flow of the heat exchange fluid in a direction that would be counter-current or cross-current to the flow of fluid through the reaction zones 743 and 744. The repeating unit 730 illustrated in FIG. 10 may occur once within the microchannel reactor core 102 or it may be repeated any number of times, for example, two, three, four, five, ten, twenty, fifty, one hundred, hundreds, one thousand, thousands, ten thousand, tens of thousands, one hundred thousand, hundreds of thousands or millions of times.

Figure 11:
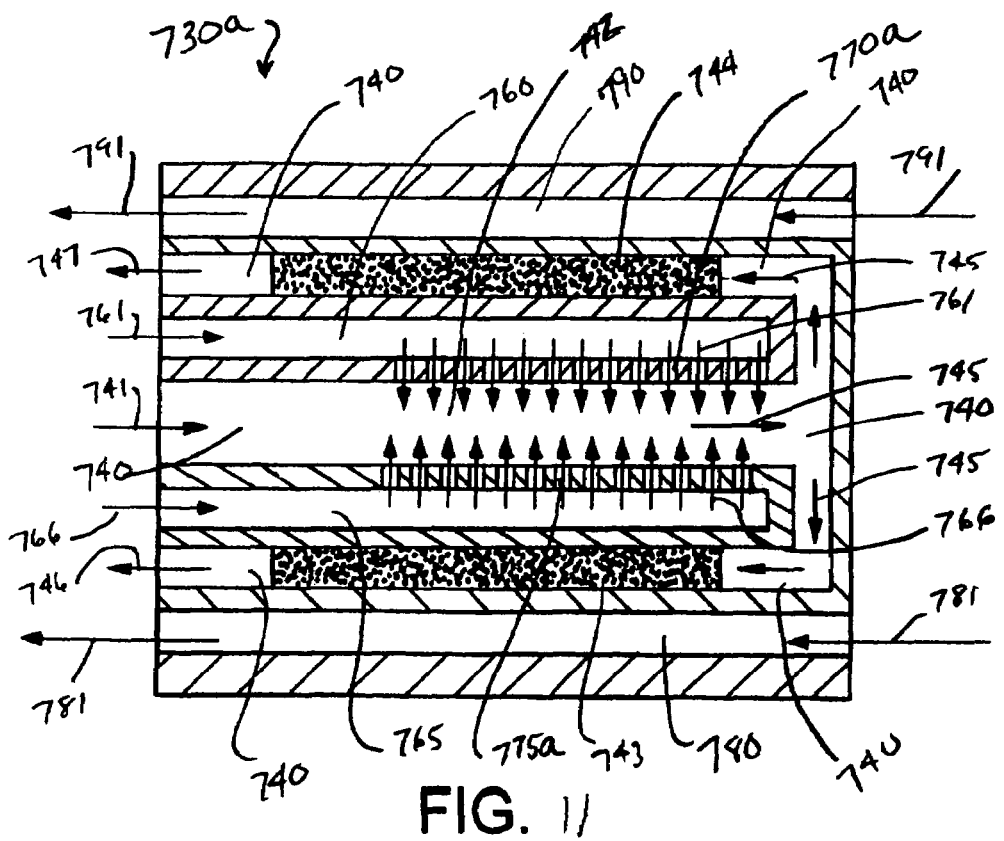
FIG. 11 is a schematic illustration of another repeating unit of process microchannels and heat exchange microchannels that may be used in the microchannel reactor core of the microchannel reactor illustrated in FIG. 3.

The repeating unit 730a illustrated in FIG. 11 is identical to the repeating unit 730 illustrated in FIG. 10 with the exception that the orifices 770 and 775 illustrated in FIG. 10 are aligned directly opposite each other, while the orifices 770a and 775a illustrated in FIG. 11 are offset from such direct alignment. In FIG. 10 the staged addition feed streams flowing through the orifices 770 and 775 impinge directly on one another thereby enhancing the diffusion of such streams in the mixing zone 742. On the other hand, in FIG. 1 the staged addition feed streams flowing through the orifices 770a and 775a alternate in sequence to reduce the diffusional distance between the centerlines of the process feed stream and the staged addition feed stream.

The contacting time for post orifice mixing may be defined, for example, with reference to FIGS. 10 or 11, using the sum of the total of the flow through the orifices 770 and 775 (or 770a and 775a) and the flow of the process feed stream in process microchannel 740, as indicated by arrow 741, at standard conditions of temperature (i.e., 20 C.) and pressure (i.e., atmospheric pressure), and the volume defined by the process microchannel 740 between the tangent of the last orifices 770 and 775 (or 770a and 775a) (downstream of the flow of the process feed stream) and the beginning of the catalysts in the reaction zones 743 and 744. This contacting time may range of about 0.25 ms to about 500 ms, and in one embodiment from about 0.25 ms to about 250 ms, and in one embodiment from about 0.25 to about 50 ms, and in one embodiment from about 0.25 to about 2.5 ms.

Figure 12:
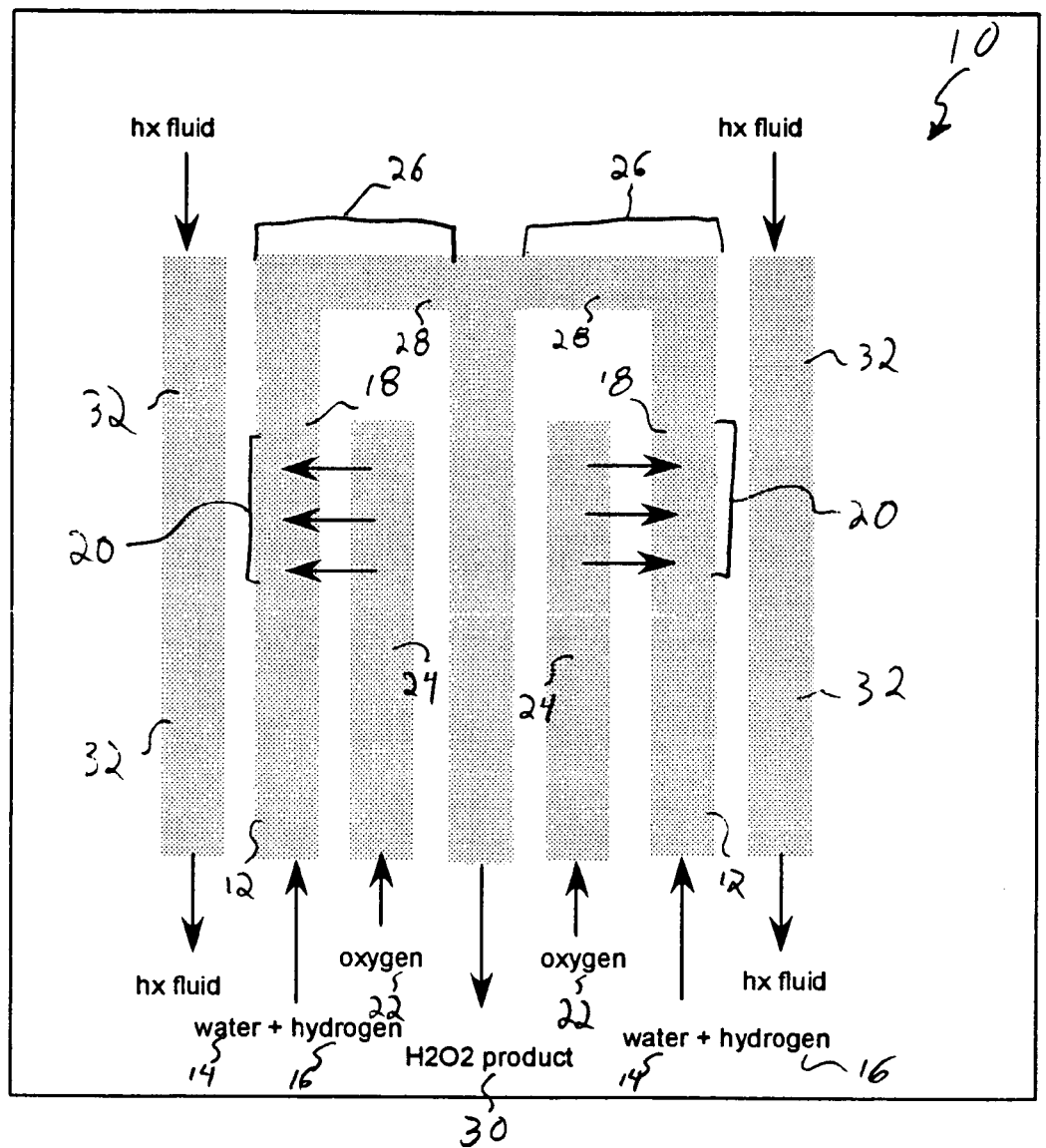
FIG. 12 is a further exemplary stream layout for hydrogen peroxide production in accordance with the present invention.
Figure 12L:
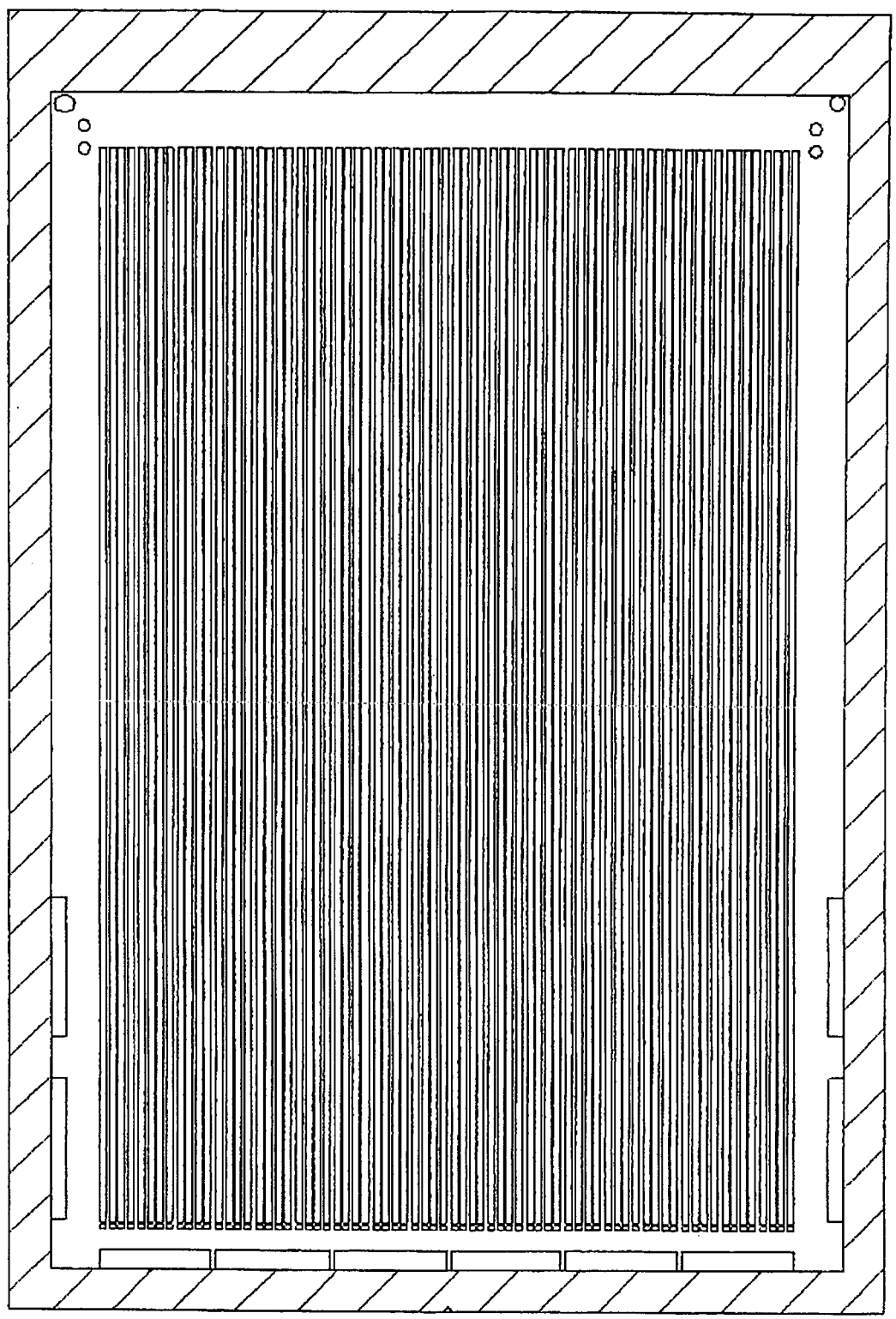

Referencing FIG. 12, an alternate exemplary embodiment of the present invention 10 includes one or more microchannels 12 carrying a mixture of water 14 and a hydrogen source 16 (such as hydrogen gas or a chemical operative to donate an atom or hydrogen ion). For purposes of explanation only, the hydrogen source 16 shall be explained with reference to hydrogen or hydrogen gas. The microchannels 12 carrying a mixture of water 14 and hydrogen 16 are in fluid communication with one or more microchannels 18 comprising the mixing zone 20. The mixing zone 20 includes those areas where oxygen or air or another oxidant 22 being fed by one or more channels 24 is mixed with the water 14 and hydrogen 16 stream. It is to be understood that further mixing of the water 14, hydrogen source 16, and oxidant 22 may take place within the reaction zone (catalyst zone) 26 of one or more channels 28 or directly upstream of the catalyst. Hydrogen peroxide 30 is produced from a number of exothermic reactions within the reaction zone 26 between the water 14, hydrogen 16, and oxidant 22. Thermal energy removal may occur primarily through convective heat transfer of a gas or liquid or through full or partial boiling of a fluid such as water or oil (represented by stream 32) that is in thermal communication with the reaction zone 26 and/or a downstream channel in fluid communication with the reaction zone 26. It is to be understood that the pressures within the microchannels may range from essentially atmospheric to in excess of 50 atm.

Figure 13A:
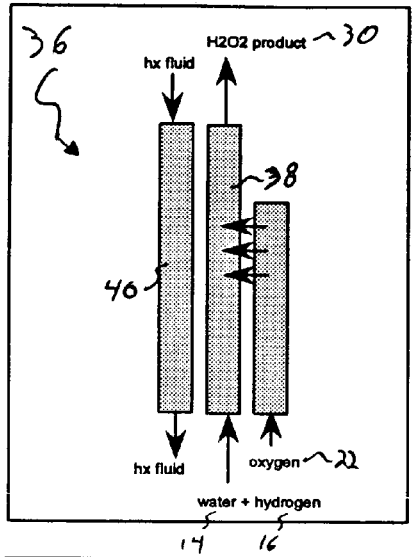
FIG. 13a is another alternate stream layout for hydrogen peroxide production in accordance with the present invention.
Figure 13B:
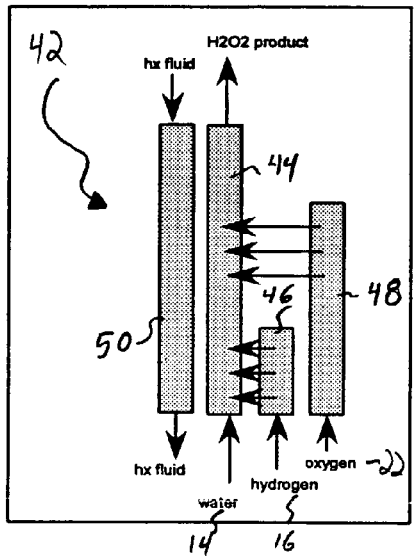
FIG. 13b is a further alternate stream layout for hydrogen peroxide production in accordance with the present invention.
Figure 13C:
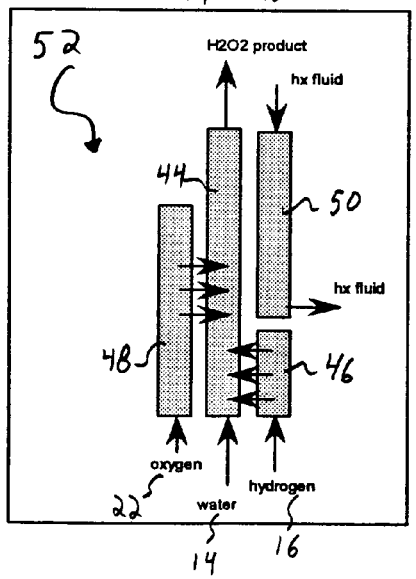
FIG. 13c is another alternate stream layout for hydrogen peroxide production in accordance with a third alternate exemplary embodiment of the present invention.
Figure 13D:
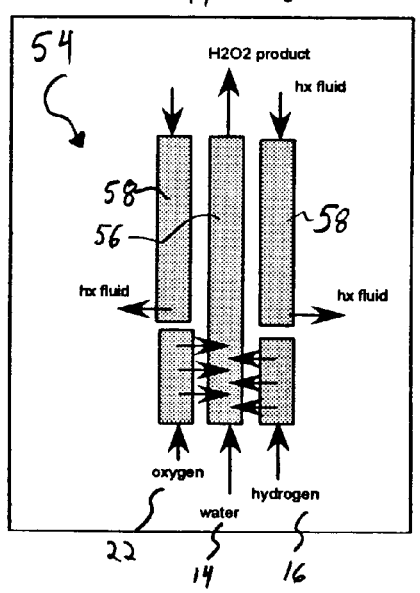
FIG. 13d is a further alternate stream layout for hydrogen peroxide production in accordance with the present invention.
Figure 13E:
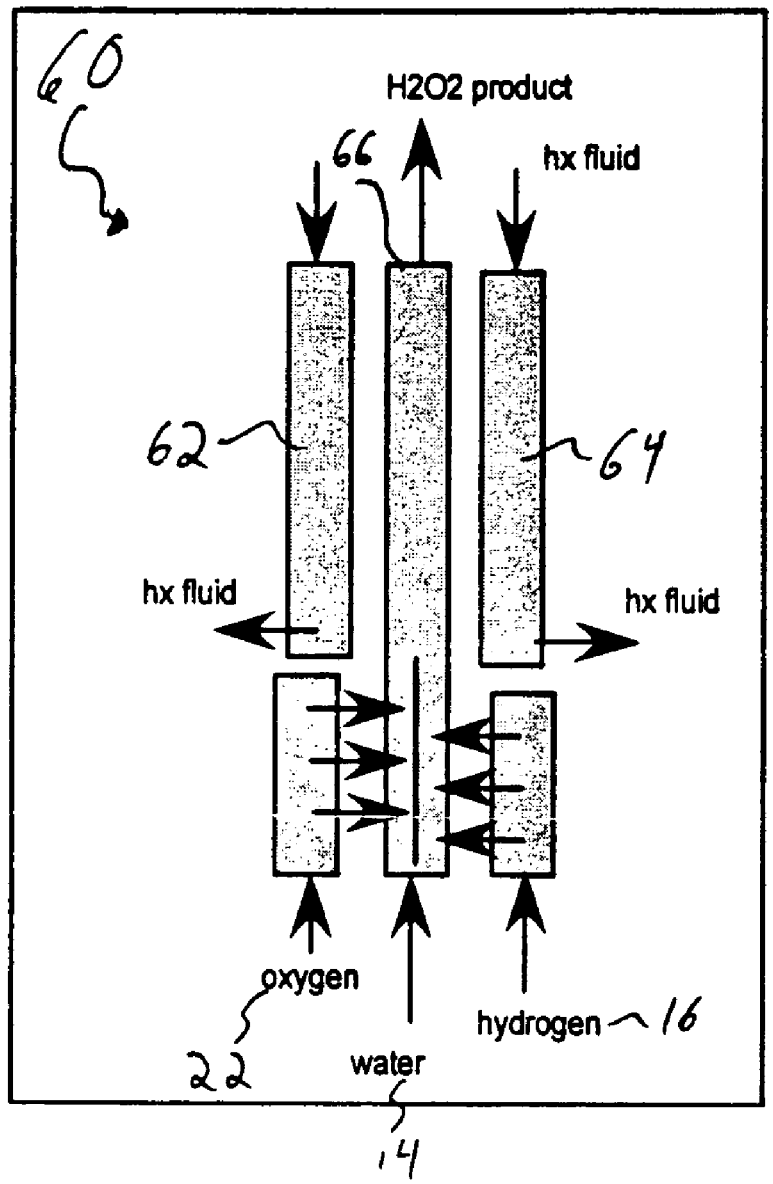
FIG. 13e is another alternate stream layout for hydrogen peroxide production in accordance with the present invention.
Figure 14:
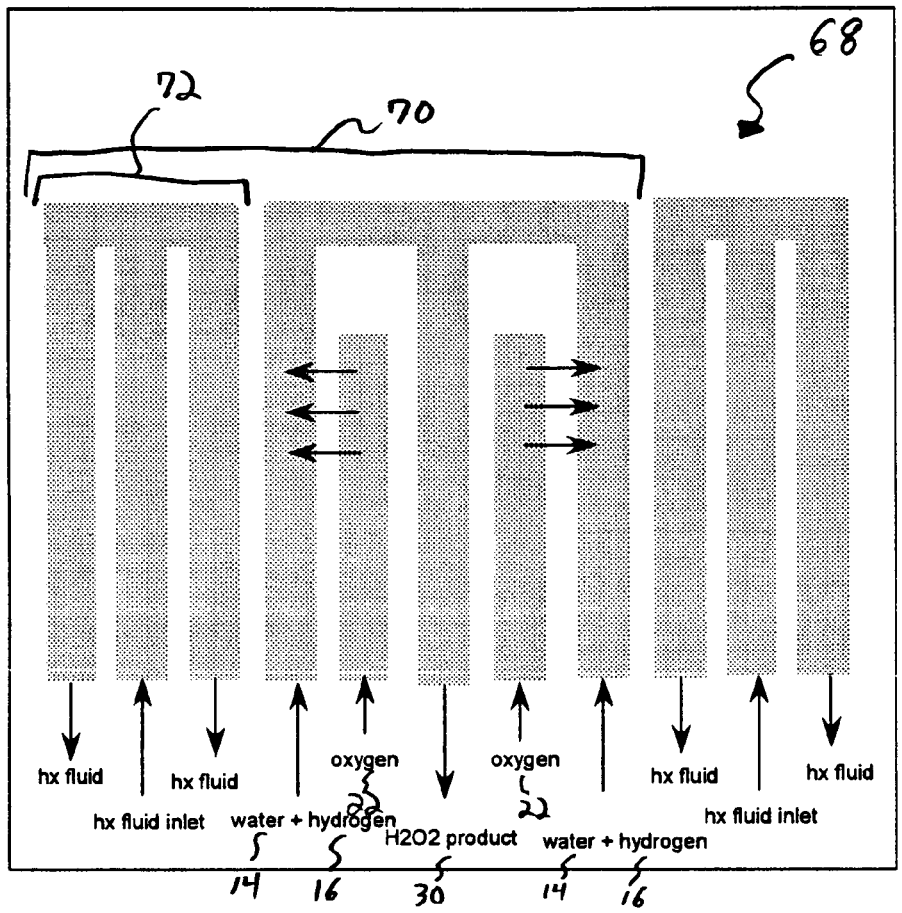
FIG. 14 is an exemplary stream layout for hydrogen peroxide production in accordance with the present invention.

Additional exemplary flow stream layouts are illustrated in FIGS. 13a-13e and FIG. 14. In a first alternate exemplary flow stream layout 36, as shown in FIG. 13a, the water 14 is premixed with hydrogen 16 before entering a microchannel 38 where the mixture of water 14 and hydrogen 16 mixes with oxygen 22 and reacts to produce hydrogen peroxide 30 and thermal energy is drawn away from the microchannel 38 using a heat transfer stream 40 in thermal communication therewith. In a second alternate exemplary flow stream layout 42, as shown in FIG. 13b, the mixing of water 14, hydrogen 16 and oxygen 22 all takes place within a microchannel 44, but includes separate feed streams 46, 48 inputting the hydrogen 16 and oxygen 22, where the hydrogen 16 and water 14 mix prior to the introduction of oxygen 22. A heat transfer stream 50 is utilized to transfer energy from the microchannel 44. A third alternate exemplary flow stream layout 52, as shown in FIG. 13c, is an alternate stream configuration to FIG. 13b. In a fourth alternate exemplary flow stream layout 54, as shown in FIG. 13d, the mixing of water 14 with hydrogen 16 and oxygen 22 takes place in generally the same physical location along the length of the microchannel 56, where a heat transfer stream 58 is in thermal communication with the microchannel 56 downstream of where the oxygen 22 and hydrogen 16 are introduced. In a fifth alternate exemplary flow stream layout 60, as shown in FIG. 13e, two heat transfer streams 62, 64 are in thermal communication with the process microchannel 66 directly downstream from the reaction zone 26. These heat transfer streams 62, 64 may be positioned on one side of the process channel 66 or on multiple sides of the process channel 66. In addition, these heat transfer streams 62, 64 may be shorter, the same length, or longer than the process channel 66. In a further exemplary flow stream layout 68, as shown in FIG. 14, a repeating unit 70 includes a heat transfer configuration 72 having an M-shaped design adapted to carry away thermal energy from two reaction zones 26.

It is to be understood that the walls of the microchannels in the exemplary embodiments discussed herein may be coated with materials to inhibit corrosion and/or material degradation. These coatings may include, without limitation, oxides such as alumina, silica, titania, chromia, zirconia, and combinations thereof, as well as metallic coatings, including aluminum, nickel, titanium, others. Still further, these coatings may also be polymeric, including Teflon, plastics, or combinations thereof. Application of these coatings may be applied prior to, during, or after fabrication and/or assembly of the microchannels.

In a further alternate exemplary embodiment (not shown) of the present invention, one or more reactant species are distributed continuously along a length of a microchannel reactor. A narrow-gap continuous phase bed is utilized to prevent bubbles (gas dispersed in liquid phase) or droplets (liquid dispersed in liquid phase) from agglomerating or coalescing and growing in size as reactant is introduced. The walls of the microchannel are perforated and may be designed to possess various openness profiles and size distributions. This configuration provides for fine, uniform dispersion of one phase into another that may be achieved at high holdup ratios, where the holdup ratio is generally defined as the ratio of the volume of fluid in the dispersed phase to the total fluid volume. High phase holdup combined with fine bubbles or droplets leads to a greater ratio of interfacial area to unit reactor volume. For chemical reactions between reactants in more than one phase, more interfacial area is generally operative for reaction enhancement. In addition, fine, uniform dispersion of one phase into another facilitates removal or distribution of reaction heat from the generation locations to prevent hot spots that may adversely effect selectivity.

Figure 15:
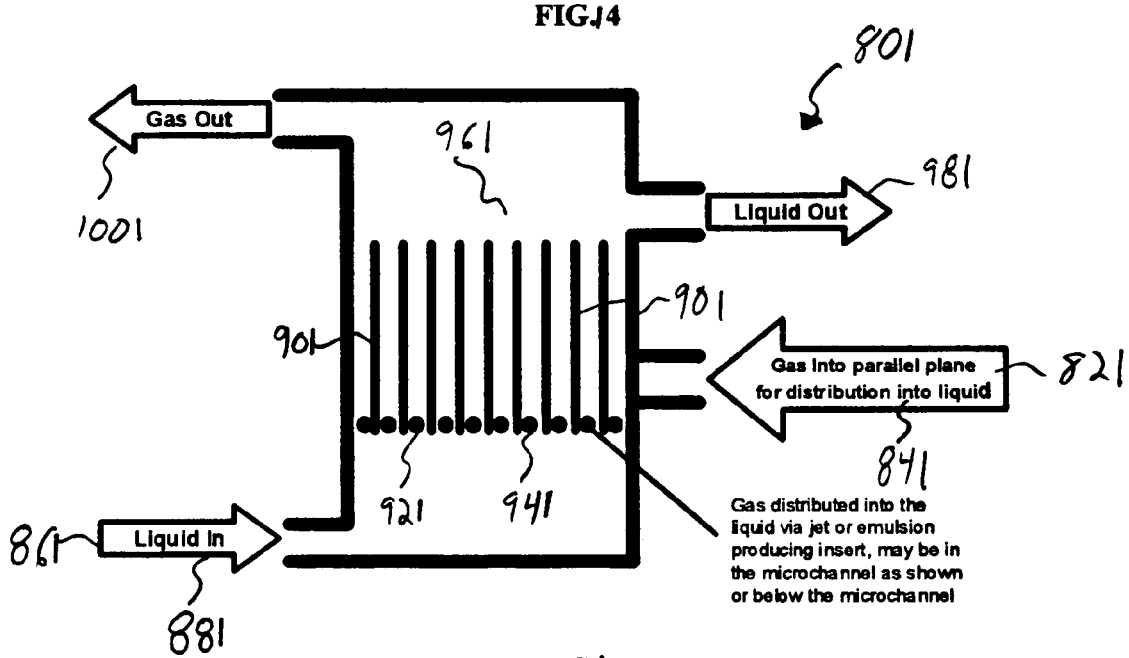
FIG. 15 is a schematic diagram of a microchannel absorber in accordance with the present invention.

Referring to FIG. 15, a further exemplary embodiment 801 of the present invention includes a microchannel device for the absorption of a chemical species 821 from a gaseous or vapor stream 841 by an absorbent 861 flowing within a liquid stream 881. The liquid absorbent 861 is distributed into a series of parallel microchannels (the process microchannels) 901. The gas or vapor stream 841 enters a set of microchannels 921 in a plane parallel to the plane in which the process microchannels 901 run and is introduced to the process microchannels 901 either by jets, orifices, or materials 941 that produce small bubbles (a la the emulsification process). These jets, orifices or bubble forming media 941 may be located at any position in the microchannels 901 or may be located just below the microchannels 901. The resultant liquid/gas mixture 961 flows up through the channels 901 and the product, in this exemplary embodiment, hydrogen peroxide exits via a product stream 981 and the gas 821 exits via a gaseous stream 1001.

Figure 16:
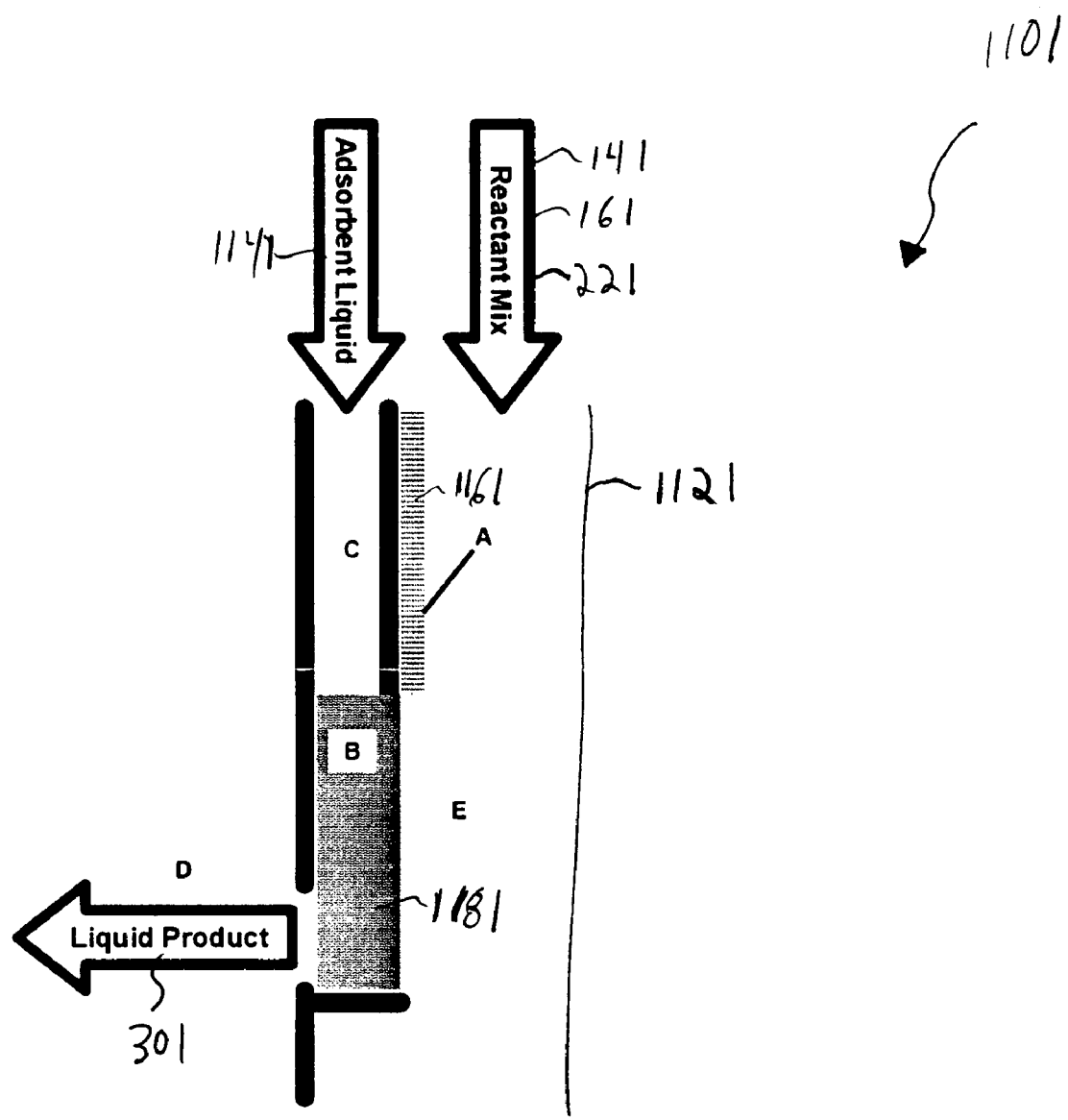
FIG. 16 is a partial schematic diagram of a microchannel absorber in accordance with the present invention.
Figure 16:
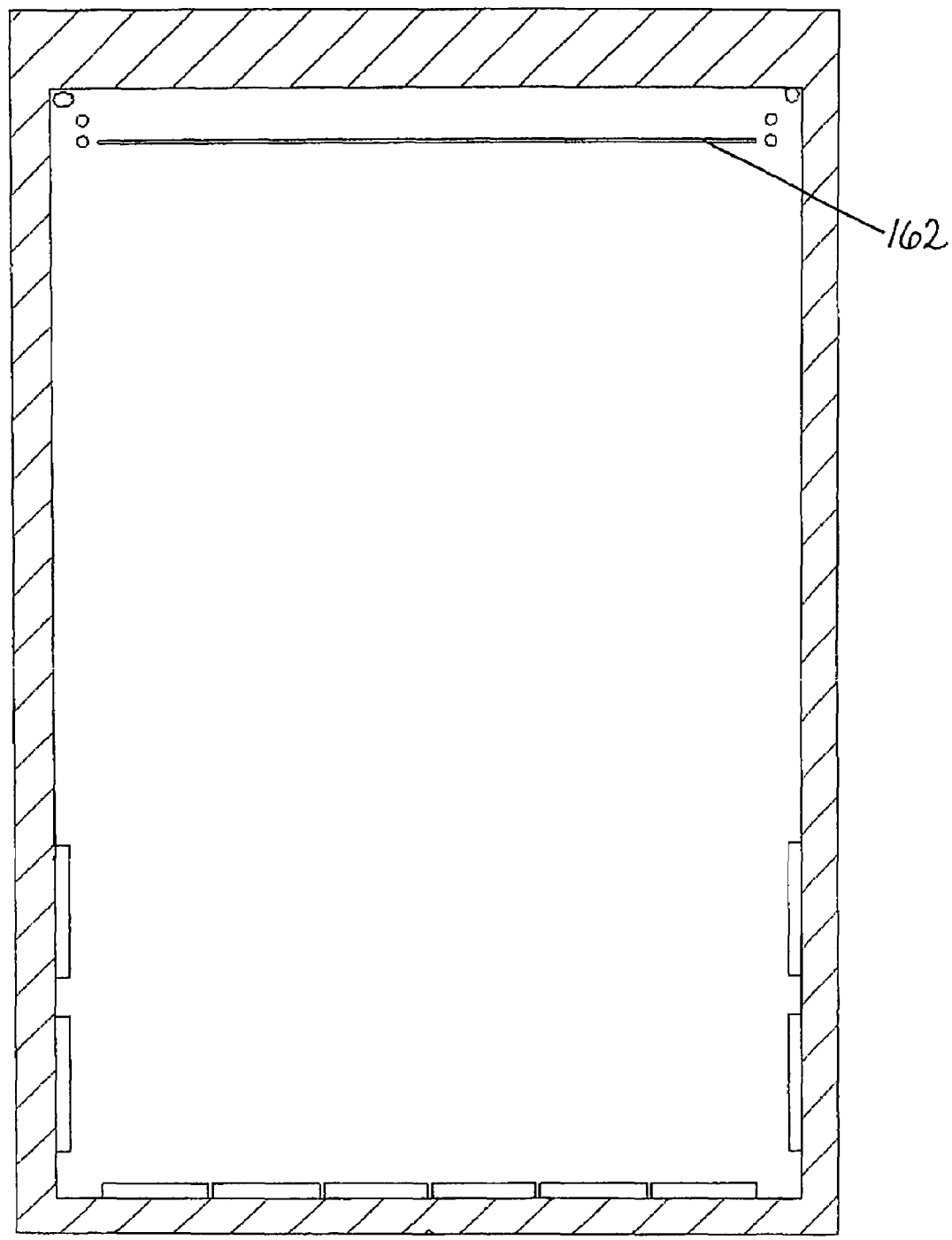

Referencing FIG. 16, an additional exemplary embodiment 1101 involves the production of hydrogen peroxide 301 in a microchannel 1121 with a subsequent removal of the product via an absorbent liquid 1141. The reactant mixture of hydrogen 161 and oxygen 221 and water 141 is distributed to one or more microchannels 1121. The reactants can be premixed or mixed in the microchannels 1121 just upstream from the catalyst 116 or over the catalyst itself. The catalyst 1161 may be disposed in the reactor by any means such as a wall coating, felt, foam, wad or bed of particles. Once the reaction has been completed the gas flows across a wetted wick 1181 and product is absorbed. This is especially true in a system like hydrogen peroxide 301 production where the product is soluble in for example water but the hydrogen and oxygen reactants are only sparingly soluble.

Referencing FIGS. 17-20, a further detailed exemplary embodiment 1201 utilizes a pressure vessel assembly 1221 to contain a reactor coolant 1241. The coolant 1241 can be selected so one or more microchannel reactors 1261 can be subjected to an external compressive pressure to help control stresses and reduce the quantity of metal used within the reactors if that is desirable. The pressure vessel 1221 can also be configured to serve as a vapor/liquid separator for the heat exchange medium 1241 in partial boiling situations. Presumably the vapor phase of the coolant 1241 would be routed back to a condenser (not shown) and the liquid phase would be recycled to a supply header via a cooler and pump (not shown). A positive seal between the coolant inlet 1281 and discharge 1301 would not be required.

Figure 17:
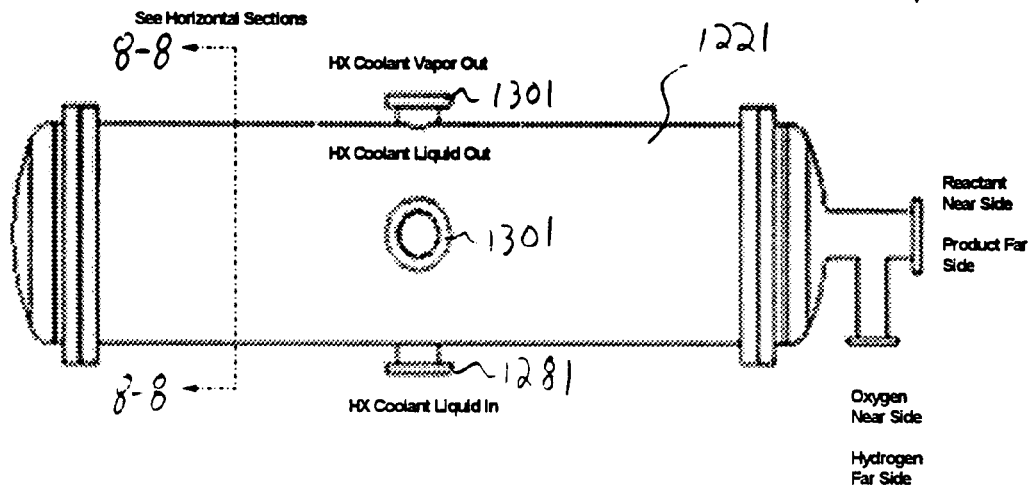
FIG. 17 is a side view of a horizontal pressure vessel housing a hydrogen peroxide microchannel reactor in accordance with the present invention.
Figure 18:
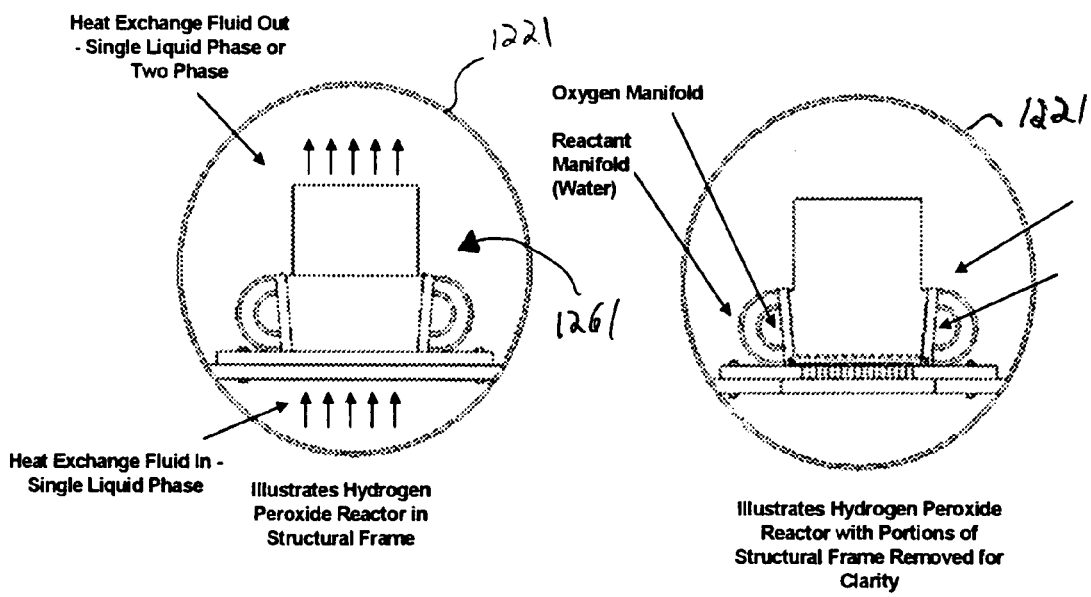
FIG. 18 includes two exemplary vertical cross-sections taken along line 8-8 of the horizontal pressure vessel of FIG. 17.

Referring specifically to FIGS. 17 and 18, a horizontal pressure vessel assembly 1221 illustrates a strategy for having removable co-flow/counter flow microchannel reactors 1261. The design utilizes the presumption that the hydrogen peroxide product stays sufficiently entrained in the bulk product stream while being routed to a vapor/liquid separator (not shown). This design allows for easy replacement of reactors 1261 if needed and easy replacement of traditional pellet or powder catalyst forms. The flexibility of being able to remove the reactors and orient them as needed may also facilitate wash coating or vacuum deposition of catalytic material or protective coatings. Common gasket materials can be utilized on the manifold sealing surfaces to prohibit undesirable stream commingling. Traditional flanged heads could be part of the reactor assembly. As depicted, the process manifolding would exit through and be coupled to one reactor head—"nozzle end". Subsequently, this reactor head will be removed when the microchannel reactors are pulled for service. The "non-nozzle end" head could provide for general access needs such as bolting the assembly down once installed or as a means of visual inspection. If this level of access is not required the "non-nozzle end" head could be a welded assembly and small hand holes provided for specific maintenance and bolt down needs.

Figure 19:
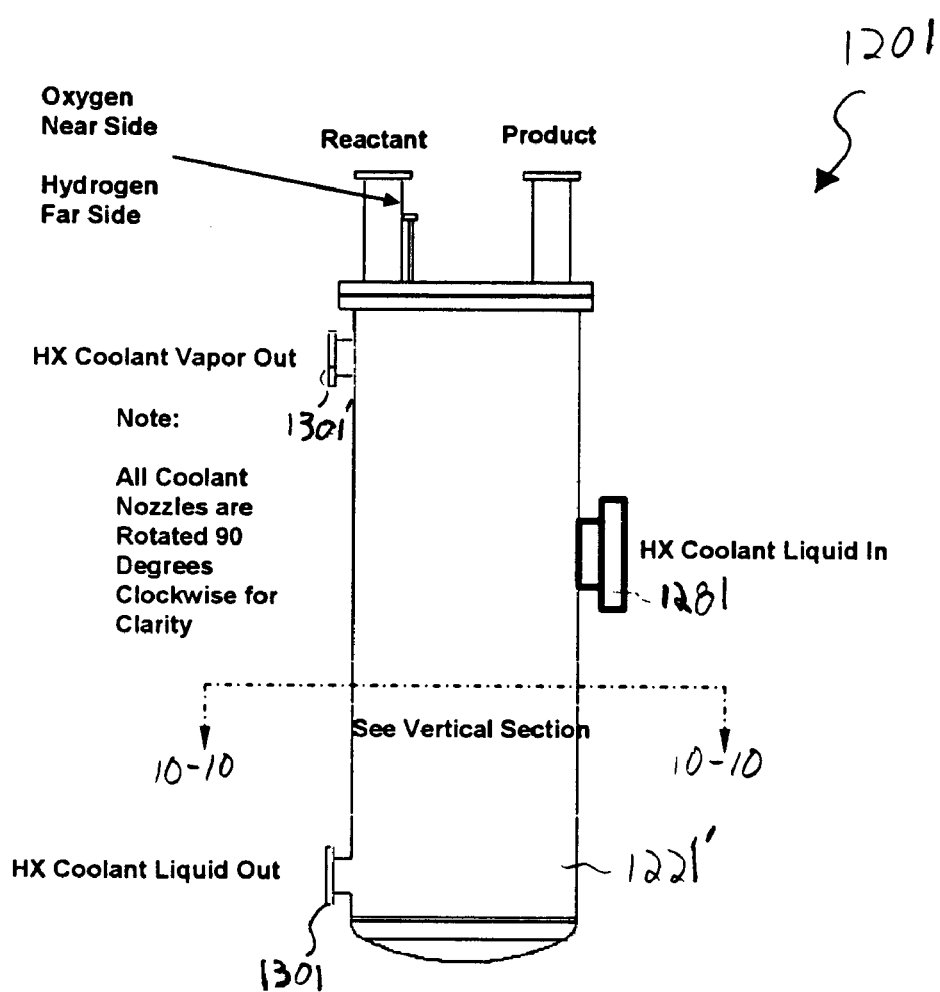
FIG. 19 is a side view of a vertical pressure vessel housing a hydrogen peroxide microchannel reactor in accordance with the present invention.
Figure 20:
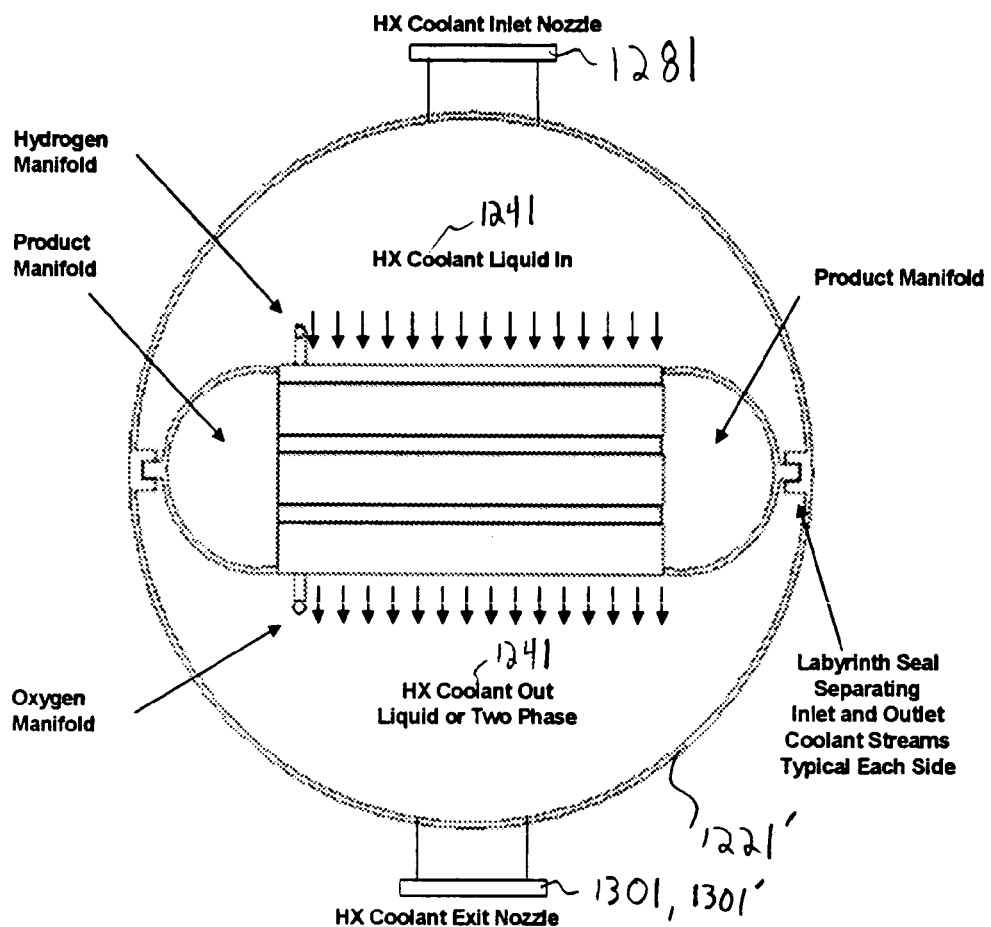
FIG. 20 is a horizontal cross-section taken along line 10-10 of the vertical pressure vessel of FIG. 19.
Figure 20L:
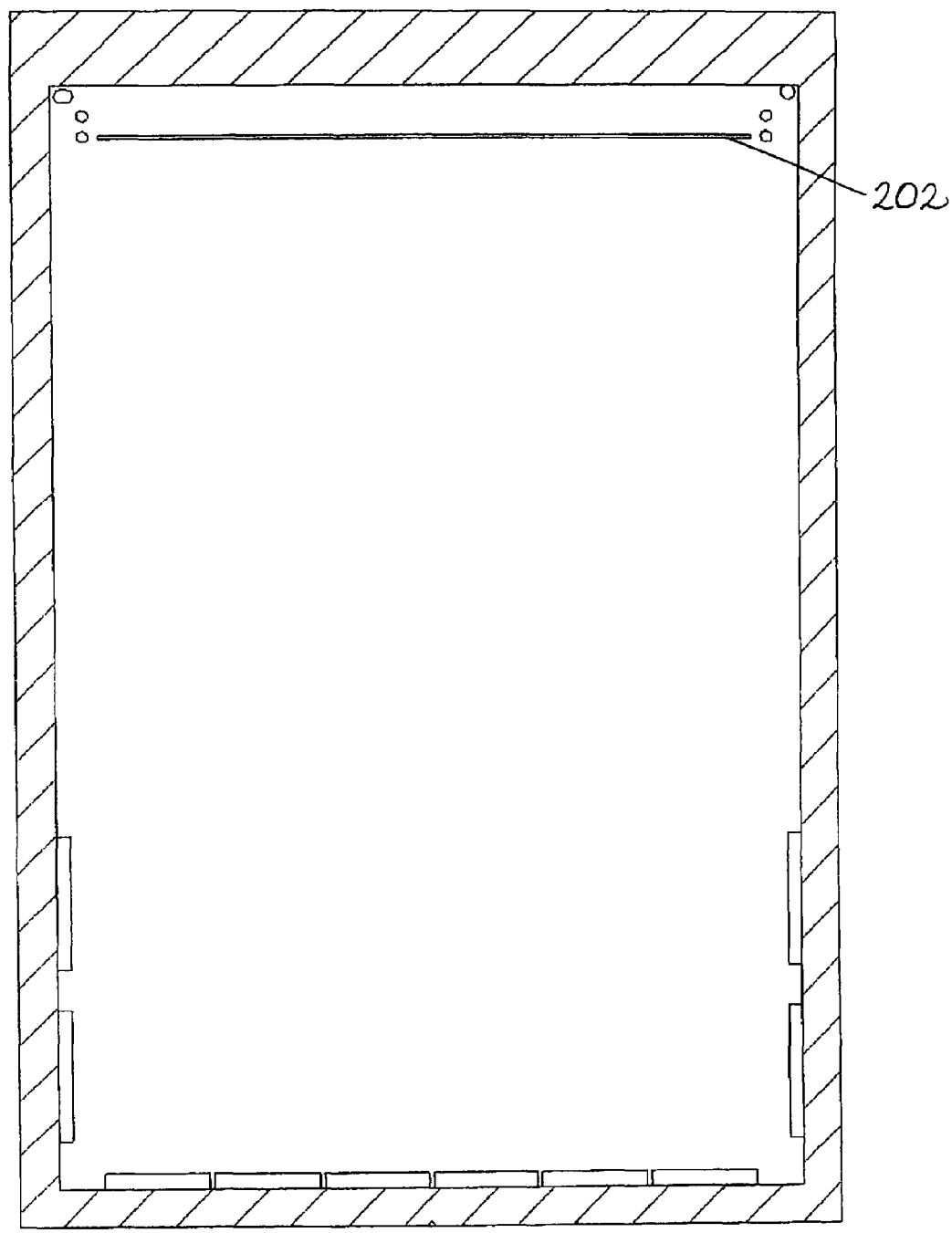

Referring specifically to FIGS. 19 and 20, a vertical pressure vessel assembly 1221' includes a top loaded fully welded microchannel reactor assembly with cross flow cooling in its coolant housing. The heat exchange medium 1241 enters via the inlet 1281 and passes into thermal communication with the microchannels of the reactor assembly. This design allows for the entrained hydrogen peroxide bubbles to migrate upward and presumably helps keep the heat exchange surfaces wetted since this arrangement inhibits local vapor/liquid separation in the product manifold. As illustrated, the process catalyst inside the welded assembly is entombed. Presumably catalyst access would be seldom needed. $H_2$ and $O_2$ manifold headers are subassemblies that are welded to the individual microchannel reactors that include internal distribution manifolding. After the heat exchange fluid has come into thermal communication with the microchannels of the reactor assembly, the resulting fluid is separated into two fluid streams exiting via a heat exchange vapor outlet 1301' and a heat exchange liquid outlet 1301.

A further detailed exemplary embodiment (not shown) includes a system that comprises a microchannel heat exchanger to preheat the reactants, a reactor, a microchannel heat exchanger to cool the products, and a chilled vapor liquid separator system incorporating the exemplary embodiments discussed above. The exemplary system is described below with appropriate controls to monitor start-up, shut-down, and steady-state operations of the exemplary embodiments.

The inlet and outlet stream temperatures of an exemplary microchannel reactor is measured using type K thermocouples placed in the connecting tubes to the reactor system approximately 1 to 2 inches from the inlet or outlet of the reactor. Pressure transducers are added to each of the inlet and outlet streams at similar locations. Thermocouples are also installed in thermocouple ports on the outer surface of the reactor system along the length of the mixer and reactor sections.

The reactant feed Brooks 5850e series mass flow controllers, NoShok pressure transducers model 1001501127 and 1003001127, Omega latching relay controllers model CNI 1653-C24, Swagelok variable pressure relief valves, thermal conductivity detector (TCD) gas chromatograph for gas analysis, etc., were calibrated and verified for proper operation. Flowrates were calibrated against a primary standard calibrator, the Dry-Cal DC-2M Primary Flow Calibrator, which was calibrated and certified by BIOS International. Pressure transducers are calibrated using a Fluke pressure calibrator model 7181006 with a Fluke 700P07 or 700P06 pressure module which were calibrated and certified by Fluke. The TCD gas chromatograph is calibrated against calibration gases blended and certified by Praxair Distribution Inc.

The exemplary reactor system was pressure tested by applying a static pressure approximately 15% higher than the anticipated operating pressure of the reactor system. If there the leak rate does not exceed 0.5 psig in 15 minutes, then the reactor system was considered ready for operation.

System startup is initiated by flowing nitrogen into the microchannel reactor at a run plan operating pressure at ~5-8 psig/min in order to heat the microchannel reactor to at 5° C./min to a predetermined operating temperature. The outlet condenser system is operated at 4° C. Hydrogen flow is initiated, and as hydrogen is increased the nitrogen flowing through the hydrogen feed line is decreased to maintain constant total flow until the nitrogen is off. Then the oxygen flow is slowly initiated, and again the nitrogen flowing through the oxygen feed line is decreased until this nitrogen flow is off. It is to be understood that the gaseous reactants, hydrogen and oxygen, are both preheated to the desired temperature and fed independently to the microchannel reactor. The microchannel reactor performance is monitored by temperature, pressure and product sampling during operation. Due to safety considerations, good temperature control is important and the distributed oxygen feed allows control of the system temperatures as oxygen or hydrogen flow can be increased or decreased to control the overall temperature and also the location of hottest single point temperature in the reactor. Additionally, an inert can be added to the hydrogen or oxygen feed for additional temperature control.

The shutdown procedure is the inverse sequence of the startup, with an inert such as nitrogen being introduced through the oxygen feed line to slowly reduce the oxygen concentration, eventually to approximately zero oxygen concentration. Thereafter, nitrogen is introduced into the hydrogen feed line and the hydrogen flow rate is decreased to reduce the nitrogen concentration, eventually to approximately zero hydrogen concentration. Once the reactor system is flushed of combustibles and oxidants, the system is cooled and depressurized.

An emergency shutdown system, if activated, would use solenoid valves to shutoff flow of all combustibles and oxidizers, and purge the system with nitrogen (or another inert) through both the hydrogen feed line and oxidizer feed line. All power would be shutoff from all heating systems. The emergency shutdown system would be activated by high pressure on either the oxidizer or hydrogen inlet lines, high temperature on the oxidizer or hydrogen inlet lines, high temperature on the reactor, or by high temperature downstream of the reactor. Two pressure relief valves on the main reactor system and a rupture disc on the main vapor-liquid separator provide additional pressure relief measures. Flame arrestors in the hydrogen and oxygen feed lines provide an extra measure of flashback protection.

Equal distribution of fluids into all of the reactor microchannels is important for efficient operation of the exemplary embodiments. In some exemplary embodiments, it may be advantageous to distribute a reactant into an adjoining channel where a reaction is taking place. In such an instance, it may be advantageous to keep the upstream reactant and the contents of the downstream reaction components separate until the point of mixing as the distribution of the fluids from macro-scale fluid channels to the microchannels is designed to achieve the desired flow distribution.

To achieve these objectives, it is possible for one reactant stream to use a large macro-scale manifold to connect the stream to its microchannels. This implies a direct path between the manifold and the connecting channels. The direction of the inlet flow in this macro-scale manifold can be aligned parallel, perpendicular or some angle in-between with regard to the direction of the connecting channels.

One of the reactant streams may use a micro-to-macro (M2M) channel for distribution within the microchannel unit. An alternate exemplary embodiment uses a M2M manifold to distribute flow into downstream channels that run parallel with the second process channels. This manifold is aligned at a nonzero angle to the downstream channels. An alternative to this approach might include using a M2M manifold that runs parallel with the second process channels and distributes flow to downstream channels that run perpendicular to the second process channels. Connection channels are made to connect the downstream channels to each second process channel. Another option is to use macro-manifolds to feed distribution channels running perpendicular to the second process channel. These channels have connection channels between the feed distribution channel for each second process channel. For purposes of the present invention, the quality index factor ($Q_1$), discussed below, for both the oxidant and hydrogen source are less than 30% for a hydrogen peroxide microchannel reactor.

Quality Index Factor "$Q_1$" is a measure of how effective a manifold is in distributing flow. It is the ratio of the difference between the maximum and minimum rate of connecting channel flow divided by the maximum rate. For systems of connecting channels with constant channel dimensions it is often desired to achieve equal mass flow rate per channel. The equation for this case is shown below, and is defined as $Q_1$.

$$Q_1 = \frac{m_{max} - m_{min}}{m_{max}} \times 100\%$$

where
$m_{max}$[kg/sec] maximum connecting channel mass flow rate
$m_{min}$[kg/sec]=minimum connecting channel mass flow rate For cases when there are varying connecting channel dimensions it is often desired that the residence time, contact time, velocity, or mass flux rate have minimal variation from channel to channel such that the required duty of the unit operation is attained. For those cases we define a quality index factor $Q_2$:

$$Q_2 = \frac{G_{max} - G_{min}}{G_{max}} \times 100\%,$$

where G is the mass flux rate. For cases when all the connecting channels have the same cross-sectional area, the equation for $Q_2$ simplifies to $Q_1$. The quality index factor gives the range of connecting channel flow rates, with 0% being perfect distribution, 100% showing stagnation (no flow) in at least one channel, and values of over 100% indicating backflow (flow in reverse of the desired flow direction) in at least one channel. In an exemplary form, $Q_1$ and $Q_2$ are unadjusted; however, $Q_1$ and $Q_2$ may be defined based on the channels that comprise 95% of the net flow through the connecting channels. It should be noted that the lowest flow channels are not counted if the flow through those channels is not needed to account for 95% of the net flow through the connecting channels.

The present invention includes a manifold and at least two connecting channels that are connected to the header manifold. In the at least two connecting channels, differing lengths of the channels have constricted cross-sectional area. As explained in greater detail below, this design tends to equalize flow through the connecting channels.

A first exemplary chemical processing device comprises: (i) a header manifold; (ii) at least two parallel connecting channels, a first connecting channel and a second connecting channel, connected to the header manifold, where in each of the at least two parallel connecting channels, 20% or more of the channel's length is characterized by a constant cross-sectional area, and 80% or less of the channel's length is characterized by a cross-sectional area reduced in size (relative to the 20% or more of the channel's length that is characterized by a constant cross-sectional area), and the first connecting channel has a longer length of constant cross-sectional area than does the second connecting channel.

The area reduced in size is significantly reduced in size so that flow is restricted; it is not simply a catalyst coating, etc. The reduced area may also contain a catalyst coating. In some exemplary embodiments, in each of the at least two parallel connecting channels, 50% (or 80%) or more of the channel's length is characterized by a constant cross-sectional area (in some embodiments up to 95% of the length has a constant cross-sectional area.

A second exemplary chemical processing device (a chemical reactor) comprises at least two parallel connecting channels, a first connecting channel and a second connecting channel, connected to the header manifold, where a portion of the first connecting channel and a portion of the second connecting channel contain catalyst, the catalyst-containing portion of the first connecting channel and the catalyst-containing portion of the second connecting channel have equal and constant cross-sectional areas, where the first connecting channel has a first length of reduced cross-sectional area and the second connecting channel has a second length of reduced cross-sectional area, and where the first length is less than the second length.

In further exemplary embodiments, the header manifold comprises an inlet and the first connecting channel has a shorter length of reduced cross-sectional area than does the second connecting channel; and the first connecting channel is closer to the inlet than the second connecting channel. Flow passing though the inlet passes into the manifold and momentum tends to force greater flow through the second connecting channel; however, the longer constricted flow path in the second channel creates greater resistance and tends to equalize flow through the connecting channels. In some preferred embodiments the manifold is an L-manifold.

The manifold can be in the plane of the connecting channels or in a layer above or below the plane of the connecting channels.

The edges between areas of a channel (preferably a microchannel) that are reduced in cross-sectional area can be sloped (such as by etching) or stepwise (such as by bonded, stamped shims). The areas of a channel that are reduced in cross-sectional area can be disposed at the beginning of channel (next to the header manifold), the end of channel, or in the middle of the channel. The areas of a channel that are reduced in cross-sectional area can be continuous or dispersed along a channel's length.

The present invention also includes exemplary methods of fabricating chemical processing devices (e.g., a chemical reactor), where the method comprises: (i) stacking plural laminae into a stack of laminae, where at least one of the plural laminae comprises at least two parallel connecting channels, a first connecting channel and a second connecting channel, where in each of the at least two parallel connecting channels, 20% or more of the channel's length is characterized by a constant cross-sectional area, and 80% or less of the channel's length is characterized by a cross-sectional area reduced in size (relative to the 20% or more of the channel's length is characterized by a constant cross-sectional area), and where the first connecting channel has a longer length of constant cross-sectional area than does the second connecting channel and the at least two parallel connecting channels are connected to a header manifold.

In further exemplary embodiments, the connecting channels are partially etched into a shim—channels of the desired structure could also be molded, formed by a deposition process, or combinations of these. Preferably, slots are formed through the entire thickness of a layer. Similarly, the invention includes methods of making laminated chemical reactors in which catalyst is deposited in the constant area portions.

The present invention also includes prebonded assemblies and laminated devices of the described structure and/or formed by the methods described herein. Laminated devices can be distinguished from nonlaminated devices by optical and electron microscopy or other known techniques. The invention also includes methods of conducting chemical processes in the devices comprising flowing a fluid through a manifold and conducting a unit operation in the connecting channels.

In further exemplary embodiment, channel heights may be altered or reduced for varying lengths to control the pressure drop and thus flow distribution to many parallel microchannels. In such an embodiment, the process flow microchannel is comprised of at least two or more shims or lamina that are stacked on top of each other. Each shim contains through slots and are stacked between two wall shims to form a hermetically sealed microchannel after bonding.

For example, when two lamina with through slots stacked to form the microchannel height, the first lamina may have a shorter slot than the at least second lamina. The resulting microchannel would have a first height for a first distance along the length of the microchannel before opening to the second height which represents the combined height of the at least two slots stacked on top of each other. It should be noted that the final channel height after diffusion bonding may be slightly smaller (e.g., up to 10% smaller) as a result of the compressive nature of the diffusion bonding process.

In some further exemplary embodiments, in a second channel, the first height (reduced cross-sectional area) as represented by the shim thickness of the first lamina would have second length that is longer than the first length in the first channel. The resulting pressure drop in the second channel would be larger than the pressure drop in the first channel. A third channel and so on could have a third length of the first height that is preferably longer than the second length.

In some additional exemplary embodiments, the lengths of reduced cross-sectional area may be utilized anywhere in the channels, or in multiple places in the channels, not just near or adjacent to the manifold. Possible locations for these flow distribution features include adjacent to the inlet manifold, adjacent to the outlet manifold, or anywhere in the channels which connect to the manifold(s) or sub-manifolds, in any sub-manifold sections, when present, or any combination of the preceding locations. This offers a distinct advantage over conventional manifold designs, in that these features can be placed in strategic locations where they can serve more than one purpose, such as adding stability by connecting long ribs between continuous channels, providing enhanced mixing, providing more uniform flow distribution over a wider range of flow rates, and providing less sensitivity to tolerance in the channel dimensions. Flow distribution features may also be included in multiple locations in each channel to better provide a more uniform pressure at points in channels where interconnectedness is present, thereby minimizing flow redistribution among channels at those points.

Another potential advantage of the present invention over conventional flow distribution techniques is more robust performance over a wider range of flow rates. For instance, in one embodiment for which the flow distribution features in each channel differ only in length (rather than cross section), the contraction and expansion losses in each channel are similar, and the resistance to flow scales more linearly with flow rate in each channel than for other types of flow distribution features which rely on different magnitudes of contraction and expansion losses (flow resistance) in each channel. In cases where the majority of flow resistance in each flow path scales more or less linearly, such flow distribution features will give a more robust flow distribution (more uniform) over a wider range of flow conditions.

In certain exemplary embodiments, there may be two, three, five, ten, or more different first lengths of the first height of parallel microchannels.

The microchannels may be made of two or three or more lamina with slots stacked on top of each other. The microchannels may have a first height, a second height, and a third height or more. There may also be a corresponding first length, second length, and third length or more. In an alternate embodiment, a first length having a first height may be adjacent to a second length having a second height. The second length can be adjacent to a third length having a third height, etc.

This method of tailoring the pressure drop in each microchannel to improve the flow distribution is especially useful for a method of manufacturing that relies on stacking stamped lamina. It is further preferable to use a nibbling approach to stamping such that minimal additional stamping dies are required to form the first and second or more lengths of microchannels that maintain the first height. The lamina is preferentially held on a table that has controls to move in both the x and y directions. The shim or lamina is moved such that the die stroke cuts the desired length of through slot in each lamina. In the nibbling process die strokes cut a fraction of the total slot length and then move to cut an adjacent slot. The adjacent slot may be connected or nearby the first slot. The die stamp that is 2 inches, as an example, can cut a full slot of 2 inches in a single stroke, or can cut a shorter slot of 1.99" or 1.9" or 1.5" or 1" or any dimension in a single stroke within the tolerance of the x-y table controls for moving the lamina. Overall the die can cut a larger slot, but the lamina must move for the die to create a larger slot. The length of the die stamp does not change, but rather the lamina moves such that the die stamps over a previously cut or stamped region while simultaneously cutting a fresh section of metal less than the full die length. By this manner, minimal additional fabrication complexity is added to form a first channel with a first height and a first length adjacent to a second channel with a first height and a preferential second length for purposes of controlling flow distribution. See FIG. 28.

In an alternate exemplary embodiment, two lamina may be stacked on top of each other to form a microchannel, where one or both lamina are partially etched to create an analogous first length and first height that is different from the second length and second height. One lamina may be partially etched, while the second or third or more lamina have through slots that are all stacked to form the microchannel.

In a further alternate embodiment, flow restrictions may be placed within the micromanifold region rather than or in addition to the microchannels. The method of stacking lamina with through slots or openings is especially helpful for this approach. A first length of the first height in the first submanifold may be longer than the second length of the first height of the second submanifold. By this manner, pressure drop in one submanifold may be made more uniform between the first and second submanifold to improve the flow distribution between the at least first and second submanifold.

This method of flow distribution within microchannels may also be preferential for cross flow microchannels that may not have a micromanifold region as required to distribute the flow laterally across the device within the device. In cross-flow devices it may be preferential to join a large open or macromanifold opening to the face of the open set of parallel microchannels. In this case, flow distribution may be enabled by creating a first length of a first height in a first microchannel that is different from a first height of a second length in the at least second microchannel. The first and second length may be made by stacking stamped lamina, or it may be made by partially removing material from a single lamina such that a continuous first microchannel has a first height for a first length and a second height for a third length along the microchannel length and a continuous second microchannel has a first height for a second length and a second height for a fourth length. In an alternate embodiment, the lamina may contain at least a first microchannel with a first height for a first length and a second height for a third length. In addition the lamina may contain at least a second microchannel with a third height for a fifth length and a fourth height for a six length. Any combination of heights and lengths of sections along a continuous microchannel may be possible.

In further exemplary embodiments, the width of each microchannel is substantially constant along its length and each channel in a set of connecting channels have substantially constant widths; "substantially constant" meaning that flow is essentially unaffected by any variations in width. For these examples the width of the microchannel is maintained as substantially constant. Where substantially constant is defined within the tolerances of the fabrication steps. It is preferred to maintain the width of the microchannel constant because this width is an important parameter in the mechanical design of a device in that the combination of microchannel width with associated support ribs on either side of the microchannel width and the thickness of the material separating adjacent lamina or microchannels that may be operating at different temperatures and pressures, and finally the selected material and corresponding material strength define the mechanical integrity or allowable temperature and operating pressure of a device. If the width were allowed to vary across a lamina, such as in the Golbig reference, then the material thickness between adjacent lamina would have to be sized based on the widest microchannel. As such, additional material would be required for this design. In addition, varying microchannel widths would require multiple tooling for stamping and increase the complexity of fabrication.

Figure 21:
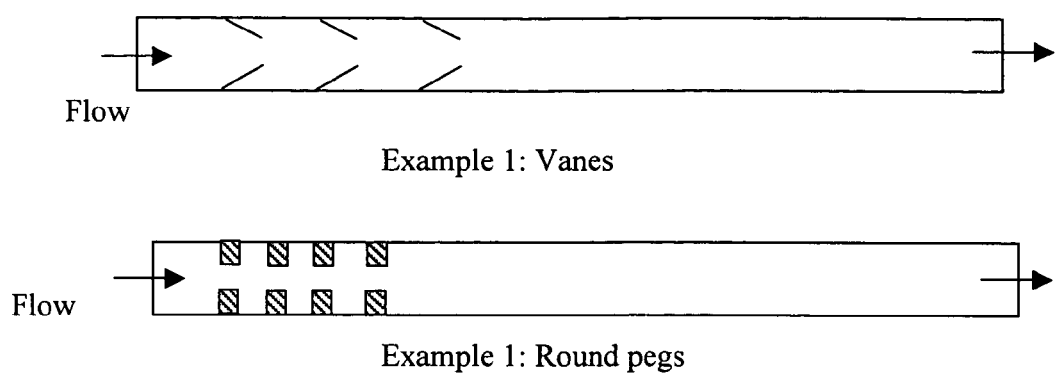
FIG. 21 illustrates exemplary features that enhance heat transfer characteristics while regulating the flow in connecting channels.

Features like protrusions can be added to the parallel connecting channels to serve a dual purpose. The size of the features can be used to regulate the channel to channel pressure drop variation which provides control on distributing flow among the connecting channels. Besides, the features provide improvement in the heat transfer characteristic of the channel. The features could be protrusions from the wall with any shape like round, square, pyramidal etc. Some of the shapes of the features are shown in FIG. 21. These features can be located only at a portion of the connecting channels.

Figure 29:
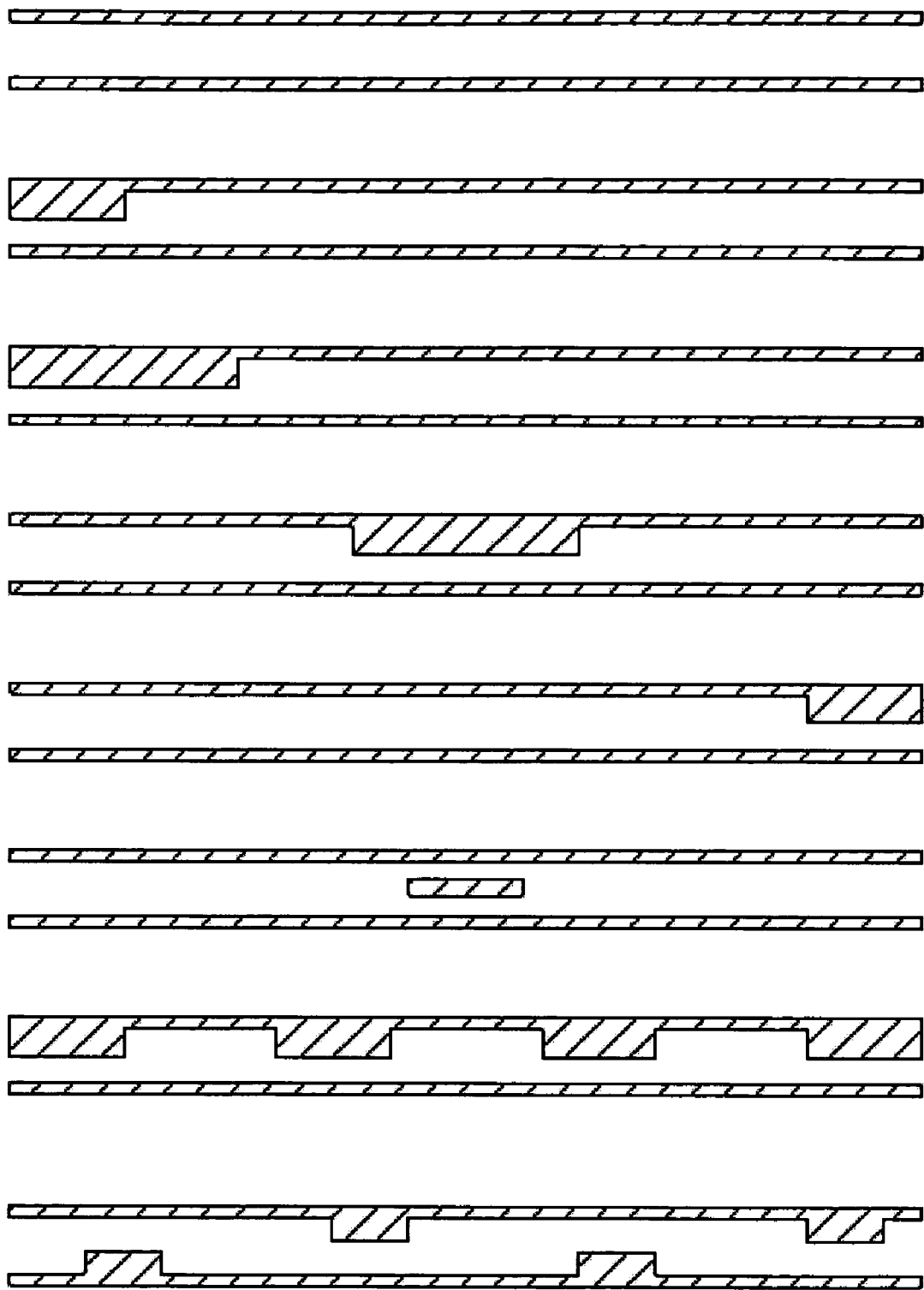
FIG. 29 illustrates an exemplary cross-section of a microchannel.
Figure 29L:
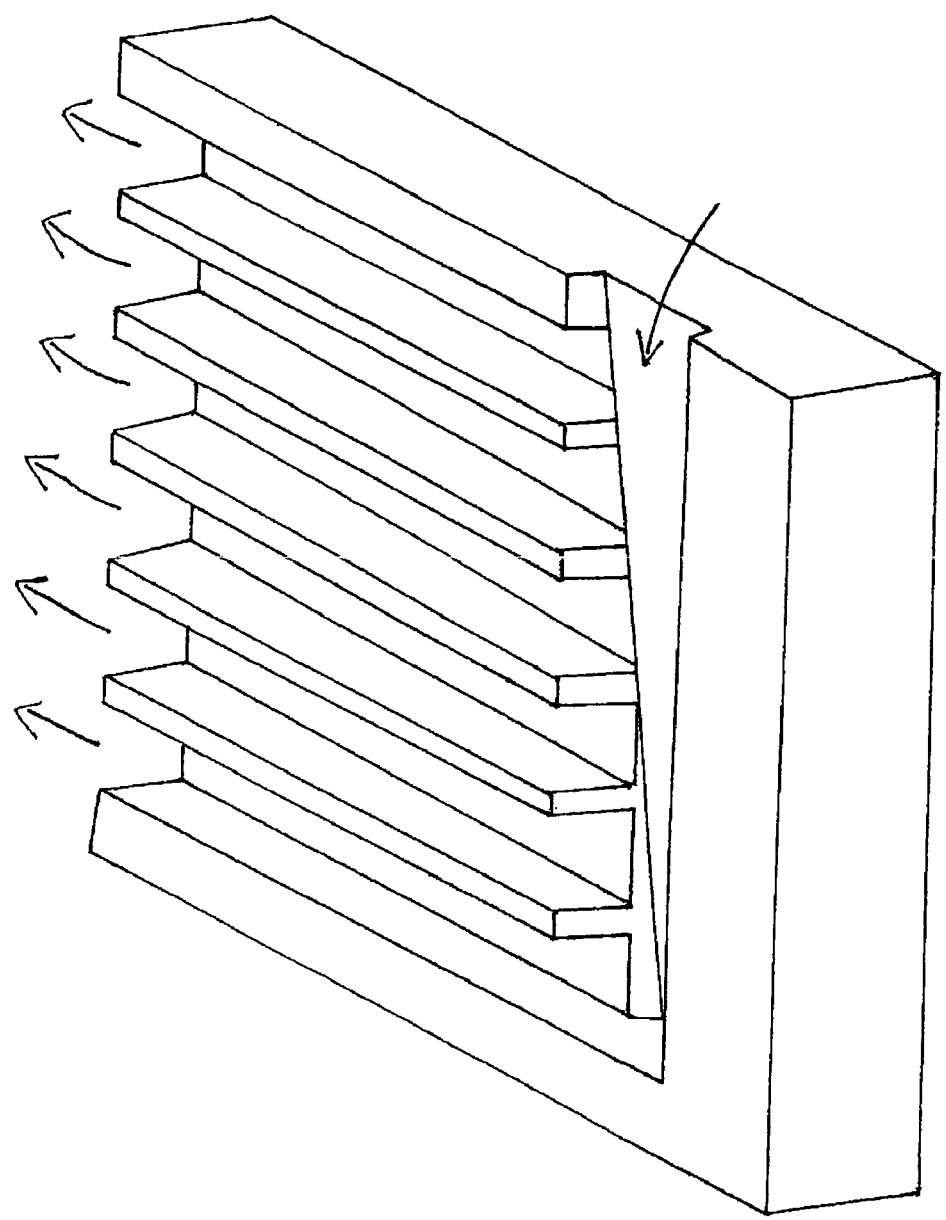

Example cross sections of microchannels with varying channel gaps and section lengths is shown in FIG. 29. The smaller microchannel gaps may be found near the front, end, middle, or anywhere within the microchannel. For the case of three or more slot lamina stacked to form a microchannel between two wall plates, the restriction may be placed in the center lamina or lamina not adjacent to the wall shim.

Figure 22:
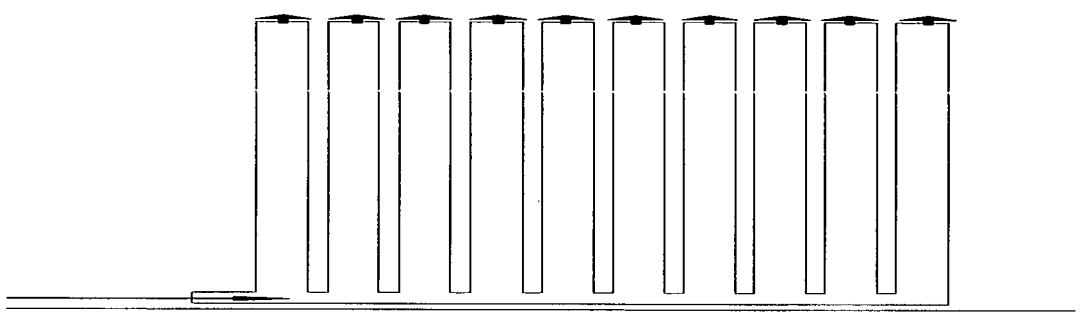
FIG. 22 illustrates the geometry assumed for flow distribution case study of Example X, with manifold and channel heights of 1.02 mm.
Figure 22I:
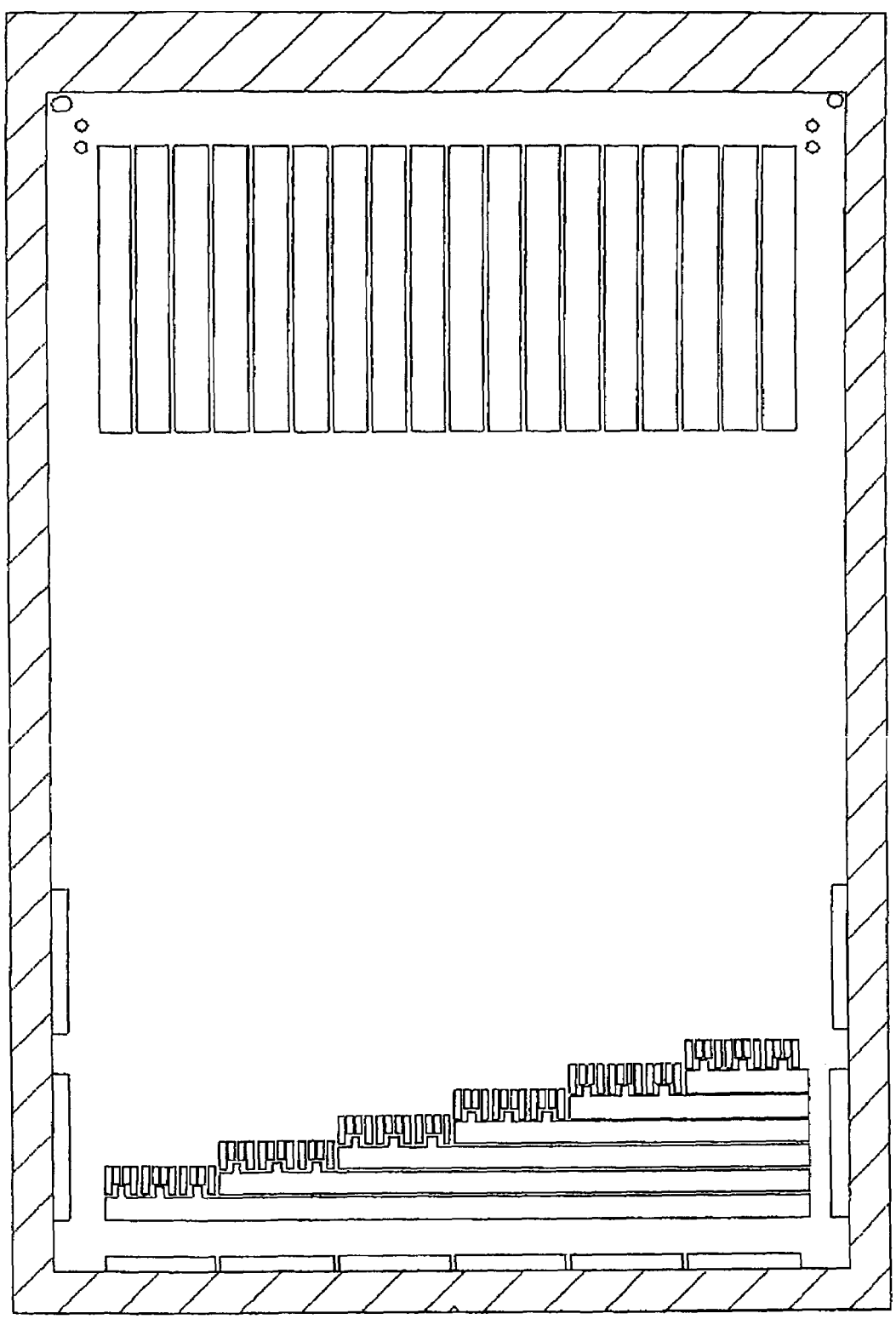
Figures 23, 24:
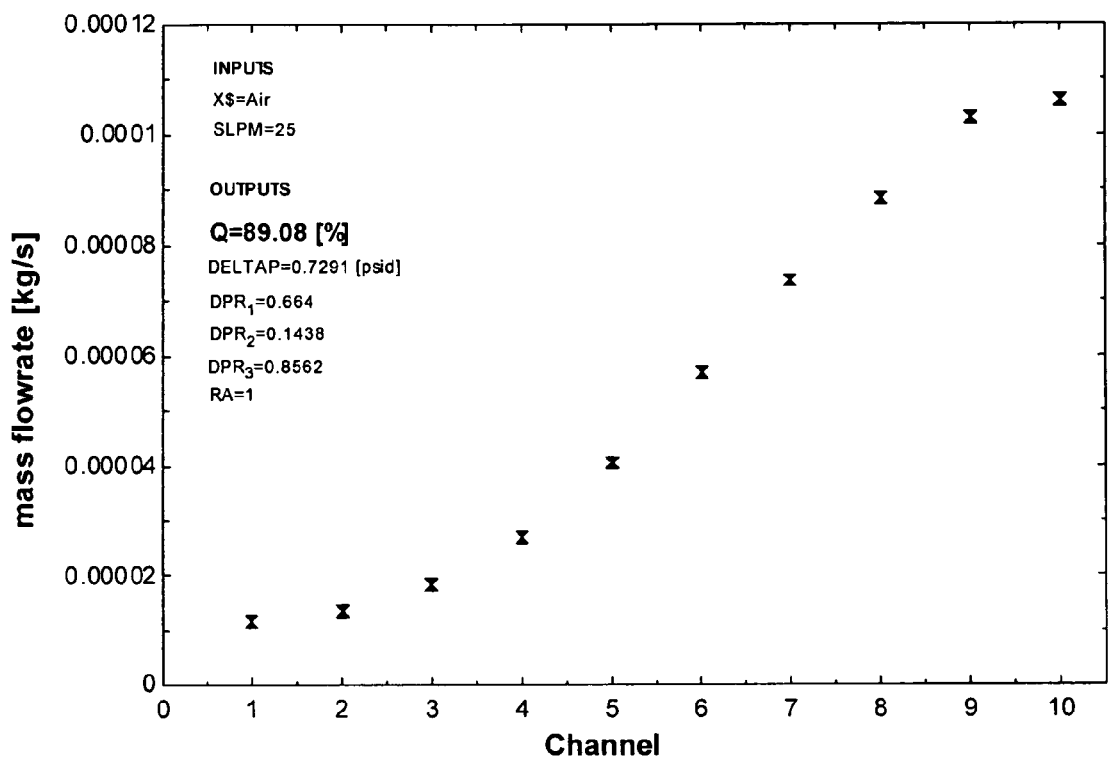
FIG. 23 illustrates mass flowrate versus channels in the case study of Example X.
FIG. 24 is a table listing lengths of flow distribution features used in the case study of Example X.
Figure 23I:
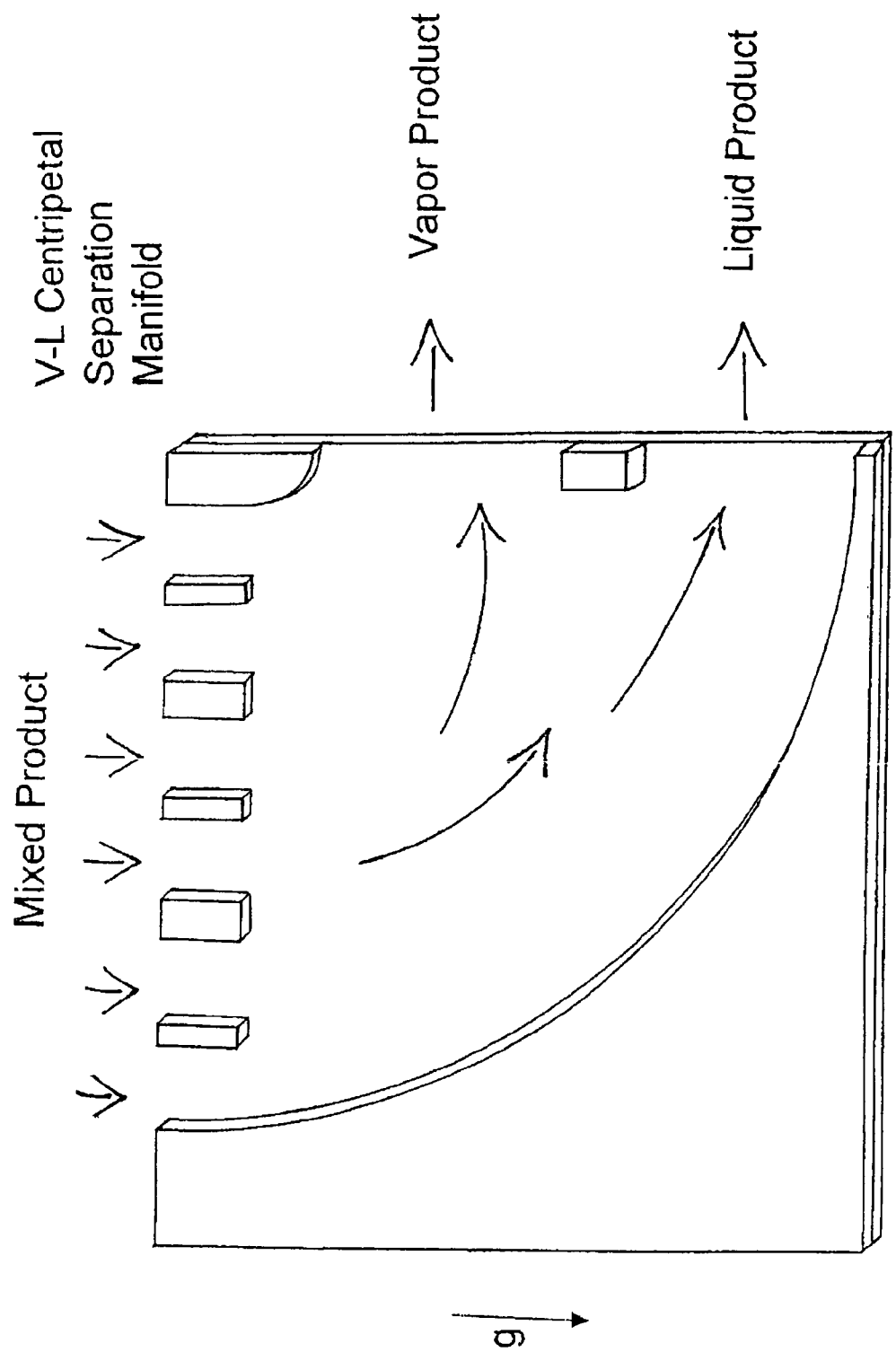
Figure 241:
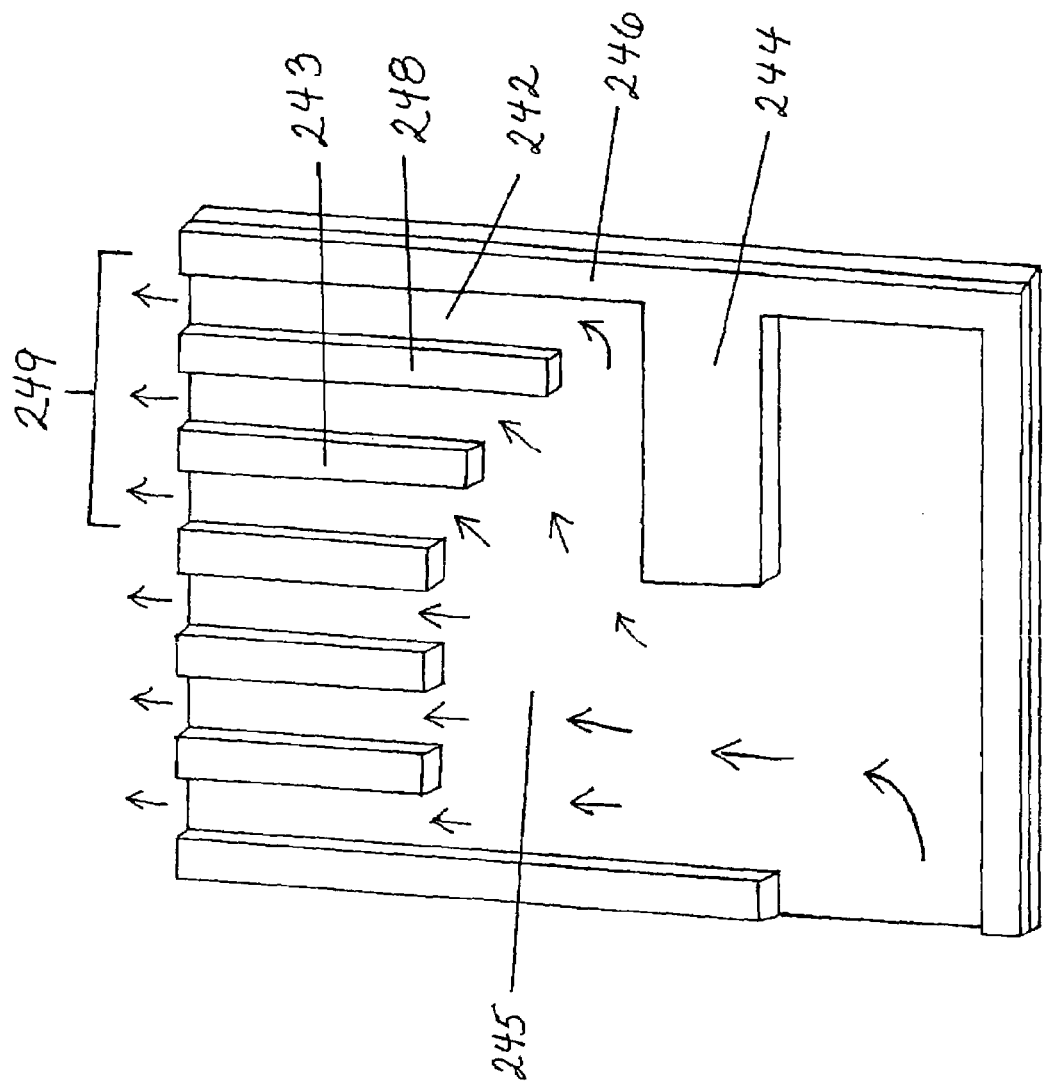
FIG. 241 illustrates a manifold with gates of decreasing channel width in the direction of manifold flow to obtain a more equal flow distribution.

The present invention was used in conduction with a flow distribution model to dramatically improve the predicted flow distribution uniformity for 25 SLPM of air at 25° C. and 1.01 bar outlet pressure among ten channels connected to a common inlet manifold. For this example the dimensions of each channel were 1.02 mm by 4.06 mm wide extending 25.4 cm long. Each channel was separated by a 1.52 mm wide wall (for a total of 5.59 mm from leading edge to leading edge of adjacent channels). The common manifold was 1.02 mm gap by 10.16 mm width and 54.4 mm in length is defined in the direction of the inlet flow stream and orthogonal to the direction of flow in the parallel microchannels, as shown in FIG. 22 as a negative model. The model gave a predicted flow distribution quality factor of >89% for the geometry described above without the use of the present invention. The model results for this baseline case are shown in FIG. 23. The predicted pressure drop for the baseline case was 5027 Pa.

Figure 25:
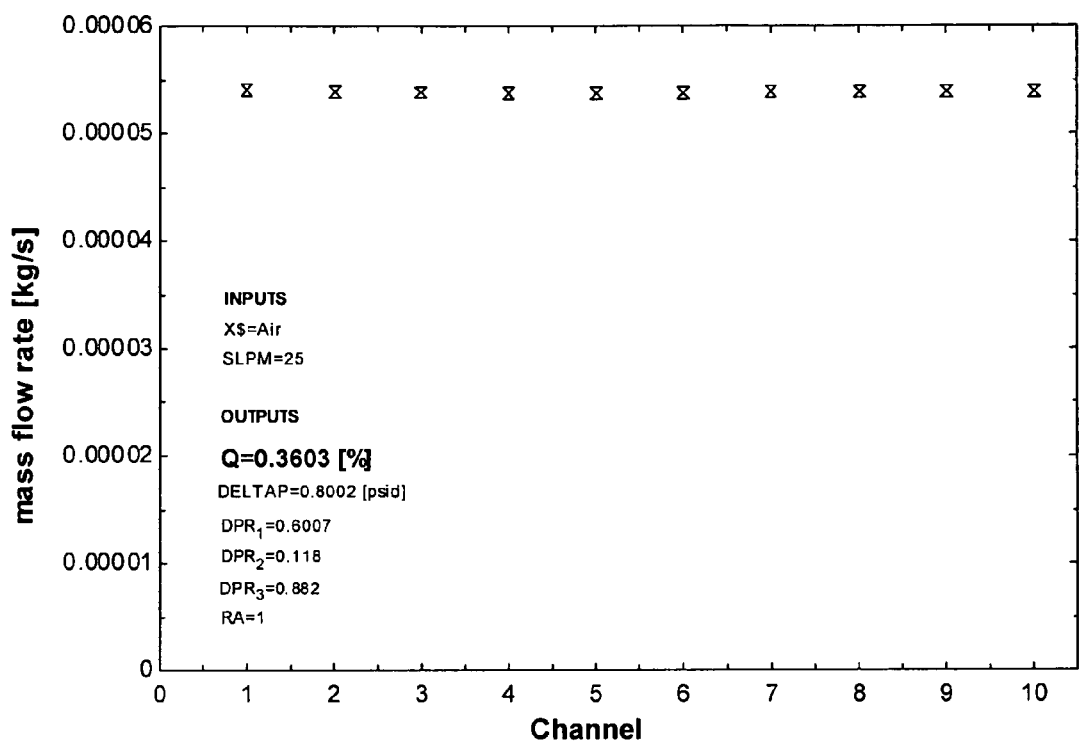
FIG. 25 illustrates a flow distribution by channel for case of Example X including flow distribution features of the present invention.

A second case was run with the same geometry except that flow distribution features which reduced the channel gap from 1.02 mm to 0.25 mm were added in the portion of each channel which is connected to the manifold. These features created channel dimensions of 0.25 mm by 4.06 mm wide, with varying lengths designed to minimize the quality factor (that is, maximize the degree of flow distribution uniformity). The total length of each channel, including the flow distribution features was maintained constant at 25.4 cm. With the flow distribution features included, a quality factor of <0.4% was predicted. The flow distribution feature lengths for each channel are shown in Table yy, and the resulting flow distribution is depicted in FIG. 25. The predicted pressure drop for the case including the inventive features was 5517 Pa (490 Pa higher than the baseline case without the features.) In FIG. 24, the channels with the longest length features have the most flow resistance in the microchannel. These values were obtained by iteratively changing the flow distribution feature length at each successive iteration by a factor proportional to the mass flow through the channel predicted for the previous iteration. These factors may be normalized such that their average value is 1. Although an infinite number of solutions may exist which provide adequate flow distribution uniformity, shorter lengths tend to minimize pressure drop, and the shortest length should not be less than is practical for manufacturing purposes.

Referencing FIG. 21, any given process will have a number of different controlled variables. For each such variable, an associated manipulated variable must be chosen and be tied to it via the appropriate feedback control hardware.

There are non-dynamic and dynamic individual components in a feedback control loop. The non-dynamic components have no time-dependent behavior, i.e. no lag in their operation. From a mathematical sense, it is algebraic in nature. In fact, it is often referred to as gain of the component. These kinds of components cannot predicatively be handled with a dynamic process, such as a hydrogen peroxide reactor, where oscillation or fluctuation of the output variables needs to be adjusted to a set point. The frequently encountered condition is that the output of the component has a lag to the input, such as in a process itself. Thus, "dynamic" control components are most often utilized in a process control loop. The specific mathematical form of these dynamic lags is a differential equation with time as the independent variable.

Generally, to control a dynamic process, using only non-dynamic (proportional) and differential components often results in an error signal in control input, causing, for example, "overshot". This problem may become severe when the deviation in the output variable is of a small amplitude but not a small frequency such as a fluctuation. Thus, reset action in the control loop may be used. The value of the manipulated variable is changed at a rate proportional to the error. The reset action is also called "integral action". The core of modern control concept is called "PID" (Proportional+Integral+Derivative) that is the most suited for a process control of fluctuation in a small amplitude and is expressed as $K(1+1/T_iP+T_dP)$.

Referencing FIG. 22, gain is a proportional factor between the error input signal and the output of a control component. The gain K is calculated as K=output/input. The gain of the controller is also referred to as the proportional sensitivity of the controller. It indicates the change in the signal to the manipulated variable per unit change in the error signal. In a very true sense, the proportional sensitivity or gain is an amplification and represents a parameter on a piece of actual hardware which must be adjusted by the operator, i.e., the gain is a knob to adjust (or a number to change in a computer).

The gain-adjusting mechanism on many industrial controllers is often expressed in terms of proportional band (PB). PB is defined as the span of values of the input that corresponds to a full change in the output:

$$PB = \frac{1}{K} \times 100$$

In an exemplary application as a control valve, PB is often inferred to through a full stroke.

Time constant of a system is a measure of output response in time or frequency domain with respect to a disturbance (including change in input) to the system in steady state. In physical terms, it represents capacitance divided by conductance. It is system-dependent and, thus, its definition depends on the characteristics of the system. For a first order system, it is defined in frequency domain as $$\frac{U_o(s)}{U_c(s)} = K\frac{1}{1+\tau s},$$

where $U_o$ is the output after the disturbance, $U_c$ is the output at its original steady state, K is gain and s is the frequency variable. In time domain (before Laplace transformation), it is written as $$\tau \frac{dU_o}{dt} + U_o = U_c.$$

After integration, the output is described as $$U_o - U_f = (U_c - U_f)(1 - e^{-t/\tau}),$$

where $U_f$ is the reference value of the output and it can be the output when the new steady state is established. At time $t=\tau$, the difference $U_o-U_f$ reaches 63.3% of the total output change $U_c-U_f$. It is recognized that the time constant for a microchannel reactor is considerably shorter than a conventional reactor as denoted by the relatively short residence times for chemical conversion. As such, the output after a disturbance ($U_o$) will reach the new output value in a time proportional to the system gain (K) multiplied by the original steady-state output ($U_c$), or a net shorter time over a system with a longer time constant. From this, the changes may be made to the process control scheme more quickly to get the process back to the desired output. The net reduction in time for off-specification performance increases the overall productivity of the microchannel reactor.

As discussed previously, the exemplary embodiments of the present invention are adapted to accommodate high production rates of the desired product, as the configurations are additive and may be multiplied to achieve greater outputs. Closely placed walls of the microchannels help maintain laminar flow that further stabilizes the dispersion. The placement and orientation of the walls also gives rise to better holdup distribution profiles across the flow channels and regulation of multi-phase flow such that the coalescence of bubbles (gas dispersion in liquid) or droplets (liquid dispersion in another liquid) occurs less frequently. The construction techniques of the microchannels may also function as a continuous heat flow network to either supply or disperse reaction heat, with continuous dispersion along the flow path automatically controlled.

In a still further exemplary embodiment, the reactive or non reactive fluid streams exchange heat with a heat exchange fluid flowing through a heat exchange channel, which in exemplary form includes a microchannel, having a rectangular cross section and being adjacent to the process microchannel or the liquid channel. During operation of the microchannel process units (exemplary embodiments), the microchannels carrying the reactants and products may be heated or cooled using heat exchange channels, which in exemplary form are microchannels. The heat exchange channels are adapted for heat exchange fluid to flow through the channels in a direction parallel to and co-current with the flows of material through the process microchannels. Alternatively, the heat exchange fluid may flow through the heat exchange channels in a direction opposite to the direction of reactants or products, and thus flow countercurrent to the flow of material through the process microchannels. Still further, the heat exchange channels may be oriented relative to the process microchannels to provide for the flow of heat exchange fluid in a direction that is cross-current relative to the flow through the process microchannels. The heat exchange channels may also have a serpentine configuration to provide a combination of cross-flow, co-current, and/or counter-current flow.

Exemplary internal dimensions for the heat exchange channels include a height or width of up to about 10 mm, and in a more detailed exemplary embodiment about 0.05 to about 10 mm. A second exemplary internal dimension encompasses various values such as, for example, from about 1 mm to about 1 m. The length of the heat exchange channels also encompass various values such as, for example, from about 1 mm to about 1 m. The separation between each process microchannel and the next adjacent heat exchange channel associated with wall thickness encompass exemplary ranges from about 0.05 mm to about 5 mm.

The heat exchange fluid may be any fluid capable of heat transfer. Such fluids include, without limitation, air, steam, liquid water, gaseous nitrogen, liquid nitrogen, other gases including inert gases, carbon monoxide, molten salt, oils such as mineral oil, and heat exchange fluids such as Dowtherm A and Therminol that are commercially available from Dow-Union Carbide. The heat exchange fluid may also comprise the first fluid and/or second fluid. This can provide process pre-heat or pre-cooling and increase overall thermal efficiency of the process.

It is also within the scope of the invention that the heat exchange channels comprise process channels where an endothermic process is conducted therein. These heat exchange process channels may include microchannels. Examples of endothermic processes that may be conducted in the heat exchange channels include steam reforming and dehydrogenation reactions. In an exemplary embodiment, the incorporation of a simultaneous endothermic reaction to provide an improved heat sink may enable a typical heat flux of roughly an order of magnitude or more above the convective cooling heat flux.

It is further within the scope of the invention that the heat exchange fluid undergoes a phase change as it flows through the heat exchange channels. This phase change provides additional heat removal from the process microchannels beyond that provided by convective cooling. For a liquid heat exchange fluid being vaporized, the additional heat being transferred from the process microchannels would result from the latent heat of vaporization. An example of such a phase change would be an oil or water that undergoes partial or complete boiling. In a more detailed exemplary embodiment, the percent boiling of the phase change fluid may be up to or over 50%.

The heat flux for convective heat exchange or convective cooling in the microchannel heat exchanger includes ranges from about 1 to about 25 watts per square centimeter of surface area of the process microchannels ($W/cm^2$) in the microchannel heat exchanger. The heat flux for phase change heat exchange includes ranges from about 1 to about 250 $W/cm^2$. The heat exchange channels, which may be adjacent to the process microchannels may provide a relatively short heat transport and diffusion distance which provides for the ability to heat and cool the reactants or products rapidly with decreased temperature gradients. As a result, products that may not necessarily be suitable for prolonged heating or would degrade under large temperature gradients may be prepared using the inventive process of the present invention.

The microchannel reactors of the present invention may be constructed of any material that provides sufficient strength, dimensional stability and heat transfer characteristics for carrying out the inventive process. Examples of suitable materials include steel (e.g., stainless steel, carbon steel, and the like), aluminum, titanium, nickel, and alloys of any of the foregoing metals, plastics (e.g., epoxy resins, UV cured resins, thermosetting resins, and the like), monel, inconel, ceramics, glass, composites, quartz, silicon, or a combination of two or more thereof. The microchannel reactor may be fabricated using known techniques including wire electrodischarge machining, conventional machining, laser cutting, photochemical machining, electrochemical machining, molding, water jet, stamping, etching (for example, chemical, photochemical or plasma etching) and combinations thereof. The microchannel reactor may be constructed by forming layers or sheets with portions removed that allow flow passage. A stack of sheets may be assembled via diffusion bonding, laser welding, diffusion brazing, and similar methods to form an integrated device. Stacks of sheets may be gasketed together to form an integral device. The microchannel reactor has appropriate manifolds, valves, conduit lines, etc. to control flow of the reactant composition and product, and flow of the heat exchange fluid. These are not shown in the drawings, but can be readily provided by those skilled in the art.

The process feed stream entering the process microchannels may comprise $O_2$, $H_2$, or a mixture thereof. The concentration of $O_2$ may range from about 1 to about 99% by volume, and in one embodiment about 20 to about 70% by volume. The concentration of $H_2$ may range from about 1 to about 99% by volume, and in one embodiment about 20 to about 70% by volume. The process feed stream may further comprise water, methane, carbon monoxide, carbon dioxide or nitrogen.

The staged addition feed stream entering the staged addition microchannels may comprise $O_2$ or $H_2$. The concentration of $O_2$ or $H_2$ may range from about 1 to about 100% by volume, and in one embodiment about 50 to about 100% by volume. The staged addition feed stream may further comprise water, methane, carbon dioxide, carbon monoxide or nitrogen.

The total molar ratio of $H_2$ to $O_2$ in the process feed stream and staged addition feed stream entering the process microchannels may range from about 0.1 to about 10, and in one embodiment about 0.5 to about 2.

The $H_2$ in the process feed stream and/or the staged addition feed stream may be derived from another process such as a steam reforming process (product stream with $H_2/CO$ mole ratio of about 3), a partial oxidation process (product stream with $H_2/CO$ mole ration of about 2), an autothermal reforming process (product stream with $H_2/CO$ mole ratio of about 2.5), a $CO_2$ reforming process (product stream with $H_2/CO$ mole ratio of about 1), a coal gasification process (product stream with $H_2/CO$ mole ratio of about 1), and combinations thereof. With each of these feed streams the $H_2$ may be separated from the remaining ingredients using conventional techniques such as membranes or adsorption.

The $O_2$ in the process feed stream and/or the staged addition feed stream may be pure oxygen or it may be derived from air or nitrous oxides. The $O_2$ may be separated using conventional techniques such as cryogenic distillation, membranes, and adsorption. The presence of contaminants such as sulfur, nitrogen, halogen, selenium, phosphorus, arsenic, and the like, in the process feed stream and/or the staged addition feed stream may be undesirable. Thus, in one embodiment of the invention, the foregoing contaminants may be removed from the process feed stream and/or the staged addition feed stream or have their concentrations reduced prior to conducting the inventive process. Techniques for removing these contaminants are well known to those of skill in the art. For example, ZnO guardbeds may be used for removing sulfur impurities. In one embodiment, the contaminant level in the process feed stream and/or the staged addition feed stream may be at a level of up to about 10% by volume, and in one embodiment up to about 5% by volume, and in one embodiment up to about 2% by volume, and in one embodiment up to about 1% by volume, and in one embodiment up to about 0.1% by volume, and in one embodiment up to about 0.01% by volume.

The heat exchange fluid may be any fluid. These include air, steam, liquid water, gaseous nitrogen, liquid nitrogen, other gases including inert gases, carbon monoxide, molten salt, oils such as mineral oil, and heat exchange fluids such as Dowtherm A and Therminol which are available from Dow-Union Carbide.

The heat exchange fluid may comprise a stream of the reactant composition. This can provide process pre-heat and increase in overall thermal efficiency of the process. In one embodiment, the heat exchange channels comprise process channels wherein an endothermic process is conducted. These heat exchange process channels may be microchannels. Examples of endothermic processes that may be conducted in the heat exchange channels include steam reforming and dehydrogenation reactions. In one embodiment, the incorporation of a simultaneous endothermic reaction to provide an improved heat sink may enable a typical heat flux of roughly an order of magnitude or more above the convective cooling heat flux. The use of simultaneous exothermic and endothermic reactions to exchange heat in a microchannel reactor is disclosed in U.S. patent application Ser. No. 10/222,196, filed Aug. 15, 2002, which is incorporated herein by reference.

The cooling of the process microchannels during the inventive process, in one embodiment, is advantageous for reducing the possibility of explosions and/or detonations due to the use of O2 and H2. As a result of this cooling, in one embodiment, the temperature of the process feed stream at the entrance to the process microchannels may be within about 200_C, and in one embodiment within about 100_C, and in one embodiment within about 50_C, and in one embodiment within about 20_C, of the temperature of the product exiting the process microchannels.

The exemplary embodiments of the present invention may utilize microchannels that may be operated in a flammable regime with channel gaps that not only exceed the quench gap, but even exceed critical detonation gap sizes, but still provide safe operation. The possibility of detonation can be eliminated by several methods, that include without limitation: (a) limit the channel gap to a critical value known as the detonation cell size, $\lambda$; (b) allow the channel gap to exceed $\lambda$ but limit the channel length to a critical value known as the detonation run-up length, $L^*$; and, (c) ensure the combustion flame speed remains in the laminar regime. Each of these methods is discussed in order below.

A microchannel process is inherently safe when the channel gap is below the safe quenching distance, which is the maximum allowable distance that ensures suppression of all flame propagation at a specific pressure and temperature condition. As the channel gap increases, flame propagation may be possible within the flammable limits. For a sufficiently large channel gap and under the necessary composition and thermodynamic conditions, a flame may become a deflagration, defined as a combustion wave propagating at subsonic velocity relative to the unburned gas immediately ahead of the flame with flame speeds in the range of 1 m/s to 1000 m/s. Empirical studies using detonation of hydrogen in air indicate the minimum gap for high aspect ratio channels to support detonation transmission is at least as large as the composition detonation cell size, $\lambda$, a quantity that is approximately an order of magnitude greater than the quenching distance. This guidance holds for channels of all aspect ratio.

When the channel gap exceeds an experimentally measured quantity called the detonation cell size, for rectangular channels or any aspect ratio, a flame propagating through a premixed fuel/oxidant stream may accelerate through a sufficiently long length of channel to transition to a detonation. A detonation is defined as a combustion wave propagating at supersonic speed relative to the unburned gas immediately ahead of the flame. Unlike a deflagration wave, which is associated with a relatively weak overpressure field of at most one atmosphere, a detonation wave can generate a much more intense blast field with overpressure in the range of 1 to 20 atmospheres.

In order for the transition from deflagration to detonation to take place, the flame propagation speed must accelerate to flame speeds of nearly 2000 m/s for most hydrocarbon/air mixtures. Detonation velocities for some typical fuel species in stoichiometric proportions with air at atmospheric pressure are at least one order of magnitude greater than typical flow velocities in micro-channel applications. Furthermore, there is a chemical induction period, which is usually related to channel length that must be available for acceleration up to the critical velocity. This transition length is typically on the order of several meters—much longer than typical microchannel applications. Finally, the feedback mechanism for a detonation generally relies on turbulent flow at the propagating flame front.

Referencing FIG. 23, flame acceleration and turbulence levels are enhanced by certain classes of obstacles to flow in the flow stream path. These classes of obstacles would include periodic or non-periodic placement of bluff restrictions to flow such as channel support ribs oriented cross-stream to the bulk flow direction.

Referencing FIG. 24, there are engineered features in microchannels that can actually serve to suppress turbulence or stretch the flame in such a manner that a detonation wave cannot be supported. Examples of these type of configurations would include fin structures oriented in the direction of flow.

In sum, if all of these conditions are not met, namely (1) channel gaps exceeding a critical size, (2) channel lengths permitting flame acceleration up to a critical detonation velocity, and (3) turbulent flame propagation, then detonation cannot take place. Therefore, microchannels may be safely applied in flammable regimes not acceptable in typical macro-scale applications.

The catalyst for use with the present invention may comprise any catalyst suitable for the direct production of hydrogen peroxide from O2 and H2. The catalyst may comprise at least one catalytically active metal or oxide thereof. The catalyst may comprise a metal from Group VIII of the Periodic Table, or an oxide thereof, or a mixture of two or more thereof. The catalyst may comprise Co, Fe, Ni, Ru, Rh, Pd, Ir, Pt, Os, or an oxide thereof, or a combination of two or more thereof. In one embodiment, the catalyst further comprises a catalyst support. The support material may comprise a ceramic, alumina, zirconia, silica, aluminum fluoride, bentonite, ceria, zinc oxide, silica-alumina, silicon carbide, a refractory oxide, molecular sieves, diatomaceous earth, or a combination of two or more thereof. Examples of catalysts that may be used include those disclosed in U.S. Pat. Nos. 3,336,112; 4,009,252; 4,389,390; 4,681,751; 4,772,458; 4,832,938; 4,889,705; 5,104,635; 5,135,731; and 6,576,214 B2; these patents being incorporated herein by reference for their disclosures of catalysts suitable for the production of hydrogen peroxide from oxygen and hydrogen, and methods for preparing such catalysts.

The catalyst used in a microchannel reactor may have any size and geometric configuration that fits within the process microchannels. The catalyst may be in the form of particulate solids (e.g., pellets, powder, fibers, and the like) having a median particle diameter of about 1 to about 1000 μm, and in one embodiment about 10 to about 500 μm, and in one embodiment about 25 to about 250 μm. In one embodiment, the catalyst is in the form of a fixed bed of particulate solids.

In an exemplary embodiment, the catalyst is in the form of a fixed bed of particulate solids, the median particle diameter of the catalyst particulate solids is relatively small, and the length of each process microchannel is relatively short. The median particle diameter may be in the range of about 1 to about 1000 μm, and in one embodiment about 1 to about 500 μm, and the length of each process microchannel may be in the range of up to about 10 meters, and in one embodiment about 1 cm to about 10 meters, and in one embodiment about 1 cm to about 5 meters, and in one embodiment about 1 cm to about 2 meters, and in one embodiment about 1 cm to about 1 meter, and in one embodiment about 1 to about 25 cm.

The catalyst may be supported on a porous support structure such as a foam, felt, wad or a combination thereof. The term "foam" is used herein to refer to a structure with continuous walls defining pores throughout the structure. The term "felt" is used herein to refer to a structure of fibers with interstitial spaces therebetween. The term "wad" is used herein to refer to a support having a structure of tangled strands, like steel wool. The catalyst may be supported on a support having a honeycomb structure or a serpentine configuration. The catalyst can be loaded on portions of the flow-by catalyst support structure. An example of this is to load the catalyst only in the section close to the interface of the support structure and the flow-by stream. Near the interface the reactant concentrations are at the higher level, the drop significantly into the depth of the support structure.

The catalyst may be supported on a flow-by support structure such as a felt with an adjacent gap, a foam with an adjacent gap, a fin structure with gaps, a washcoat on any inserted substrate, or a gauze that is parallel to the flow direction with a corresponding gap for flow. An example of a flow-by structure is illustrated in FIG. 25. In FIG. 25 the catalyst 800 is contained within process microchannel 802. An open passage way 804 permits the flow of the reactants through the process microchannel 802 in contact with the catalyst 800 as indicated by arrows 806 and 808.

Figure 26:
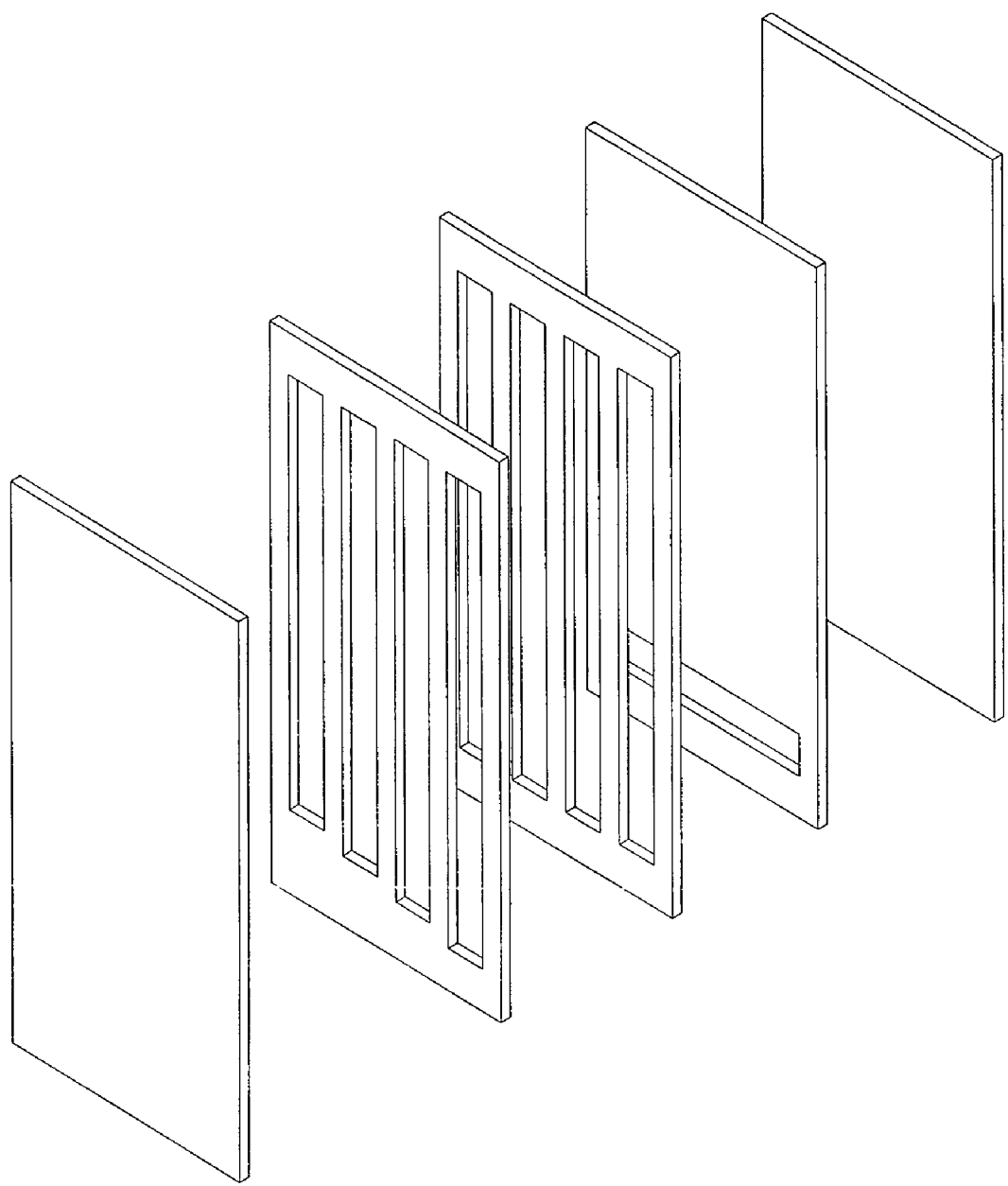
FIG. 26 illustrates a stack of lamina designed to create varying channel heights along the length of a microchannel to make the pressure drop of the flow network more uniform and thus improve flow distribution.

The catalyst may be supported on a flow-through support structure such as a foam, wad, pellet, powder, or gauze. An example of a flow-through structure is illustrated in FIG. 26. In FIG. 26, the flow-through catalyst 810 is contained within process microchannel 812 and the reactants flow through the catalyst 810 as indicated by arrows 814 and 816.

The support may be formed from a material comprising silica gel, foamed copper, sintered stainless steel fiber, steel wool, alumina, poly(methyl methacrylate), polysulfonate, poly(tetrafluoroethylene), iron, nickel sponge, nylon, polyvinylidene difluoride, polypropylene, polyethylene, polyethylene ethylketone, polyvinyl alcohol, polyvinyl acetate, polyacrylate, polymethylmethacrylate, polystyrene, polyphenylene sulfide, polysulfone, polybutylene, or a combination of two or more thereof. In one embodiment, the support structure may be made of a heat conducting material, such as a metal, to enhance the transfer of heat away from the catalyst.

The catalyst may be directly washcoated on the interior walls of the process microchannels, grown on the walls from solution, or coated in situ on a fin structure. The catalyst may be in the form of a single piece of porous contiguous material, or many pieces in physical contact. In one embodiment, the catalyst may be comprised of a contiguous material and has a contiguous porosity such that molecules can diffuse through the catalyst. In this embodiment, the fluids flow through the catalyst rather than around it. In one embodiment, the cross sectional area of the catalyst occupies about 1 to about 99%, and in one embodiment about 10 to about 95% of the cross sectional area of the process microchannels. The catalyst may have a surface area, as measured by BET, of greater than about 0.5 m2/g, and in one embodiment greater than about 2 m2/g, and in one embodiment greater than about 5 m2/g, and in one embodiment greater than about 10 m2/g, and in one embodiment greater than about 25 m2/g, and in one embodiment greater than about 50 m2/g.

In microchannel processes, washcoating sufficient catalyst onto flat process channel walls may become a challenge. The layer thickness of the coating solution left on the flat walls after a coating and draining pass is generally thin and the dried layer doesn't contain desired loading. The thin layer in microchannels is a resultant of low viscosity and low surface tension fluid needed to drain and avoid blocking the microchannel and other structures in fluid communication therewith, such as, without limitation, oxidant jet holes. For example, for an aqueous 15% Alumina SOL solution at a viscosity of 2.6 cP, density 1100 kg/m3, and surface tension 0.068 N/m, the layer directly after draining is only 25-50 μm in a vertical channel having a gap of 0.04 inches, as is shown in FIG. 27 from a computational fluid dynamics (CFD) simulation assuming a zero contact angle.

Microfin or grooves structures may increase the liquid hold-up of the wall and, in turn, the catalyst loading. The larger the structure is in size, the more liquid that can be held therein as long as the size is smaller than the capillary force acting range (determined by Laplace length). Another factor that determines the liquid hold-up is the contact angle of the liquid on the surface, as is illustrated in FIG. 28.

Obviously, a liquid with a larger contact angle is desired. However, due to fabrication limits, only one side of the channel includes a microfin in the microchannel, while the other side is a flat wall. A liquid with a large contact angle poorly wets the flat surface, as such a liquid with a small contact angle is needed at least for wetting the flat wall. In addition, the microfin may also become filled via wetting.

The washcoating process includes two exemplary formulations. One is optimized with a small contact angle for a flat surface and microfin initial wetting, while the other is optimized with a large contact angle for microfins' large liquid hold-up. The different formulations are separately filled into and drained from the microchannel so that a maximum catalyst loading of the channel can be achieved. Smaller contact angles may be achieved by adding surfactant into the coating solution or/and treating the wall surface (make it rough or reduce the surface energy in certain ways) as well as choosing certain solvents (f.i. hydrocarbon) as the solution. Larger contact angles can be achieved, for example, by choosing organic compositions of liquid and wall material and/or treating the surface (coating, polishing, etc). The polarity of the wall surface and liquid can also be tailored to match the compatibility of the liquid/wall for a large liquid hold-up.

The catalyst may comprise a porous support, an interfacial layer overlying the porous support, and a catalyst material dispersed or deposited on the interfacial layer. The interfacial layer may be solution deposited on the support or it may be deposited by chemical vapor deposition or physical vapor deposition. In one embodiment the catalyst comprises a porous support, optionally a buffer layer overlying the support, an interfacial layer overlying the support or the optional buffer layer, and a catalyst material dispersed or deposited on the interfacial layer. Any of the foregoing layers may be continuous or discontinuous as in the form of spots or dots, or in the form of a layer with gaps or holes.

The porous support may have a porosity of at least about 5% as measured by mercury porosimetry and an average pore size (sum of pore diameters divided by number of pores) of about 1 to about 1000 µm. The porous support may be made of any of the above indicated materials identified as being useful in making a support structure. The porous support may comprise a porous ceramic support or a metal foam. Other porous supports that may be used include carbides, nitrides, and composite materials. The porous support may have a porosity of about 30% to about 99%, and in one embodiment about 60% to about 98%. The porous support may be in the form of a foam, felt, wad, or a combination thereof. The open cells of the metal foam may range from about 20 pores per inch (ppi) to about 3000 ppi, and in one embodiment about 20 to about 1000 ppi, and in one embodiment about 40 to about 120 ppi. The term "ppi" refers to the largest number of pores per inch (in isotropic materials the direction of the measurement is irrelevant; however, in anisotropic materials, the measurement is done in the direction that maximizes pore number).

The buffer layer, when present, may have a different composition and/or density than both the porous support and the interfacial layers, and in one embodiment has a coefficient of thermal expansion that is intermediate the thermal expansion coefficients of the porous support and the interfacial layer. The buffer layer may be a metal oxide or metal carbide. The buffer layer may be comprised of Al2O3, TiO2, SiO2, ZrO2, or combination thereof. The Al2O3 may be αAl2O3, γAl2O3 or a combination thereof. αAl2O3 provides the advantage of excellent resistance to oxygen diffusion. The buffer layer may be formed of two or more compositionally different sublayers. For example, when the porous support is metal, for example a stainless steel foam, a buffer layer formed of two compositionally different sublayers may be used. The first sublayer (in contact with the porous support) may be TiO2. The second sublayer may be α☐Al2O3 which is placed upon the TiO2. In one embodiment, the α☐Al2O3 sublayer is a dense layer that provides protection of the underlying metal surface. A less dense, high surface area interfacial layer such as alumina may then be deposited as support for a catalytically active layer.

The porous support may have a thermal coefficient of expansion different from that of the interfacial layer. In such a case a buffer layer may be needed to transition between the two coefficients of thermal expansion. The thermal expansion coefficient of the buffer layer can be tailored by controlling its composition to obtain an expansion coefficient that is compatible with the expansion coefficients of the porous support and interfacial layers. The buffer layer should be free of openings and pin holes to provide superior protection of the underlying support. The buffer layer may be nonporous. The buffer layer may have a thickness that is less than one half of the average pore size of the porous support. The buffer layer may have a thickness of about 0.05 to about 10 µm, and in one embodiment about 0.05 to about 5 µm.

In an exemplary embodiment of the invention, adequate adhesion and chemical stability may be obtained without a buffer layer. In this embodiment the buffer layer may be omitted.

The interfacial layer may comprise nitrides, carbides, sulfides, halides, metal oxides, carbon, or a combination thereof. The interfacial layer provides high surface area and/or provides a desirable catalyst-support interaction for supported catalysts. The interfacial layer may be comprised of any material that is conventionally used as a catalyst support. The interfacial layer may be comprised of a metal oxide. Examples of metal oxides that may be used include γAl2O3, SiO2, ZrO2, TiO2, tungsten oxide, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s) and combinations thereof. The interfacial layer may serve as a catalytically active layer without any further catalytically active material deposited thereon. Usually, however, the interfacial layer is used in combination with a catalytically active layer. The interfacial layer may also be formed of two or more compositionally different sublayers. The interfacial layer may have a thickness that is less than one half of the average pore size of the porous support. The interfacial layer thickness may range from about 0.5 to about 100 µm, and in one embodiment from about 1 to about 50 µm. The interfacial layer may be either crystalline or amorphous. The interfacial layer may have a BET surface area of at least about 1 m2/g.

The catalyst may be deposited on the interfacial layer. Alternatively, the catalyst material may be simultaneously deposited with the interfacial layer. The catalyst layer may be intimately dispersed on the interfacial layer. That the catalyst layer is "dispersed on" or "deposited on" the interfacial layer includes the conventional understanding that microscopic catalyst particles are dispersed: on the support layer (i.e., interfacial layer) surface, in crevices in the support layer, and in open pores in the support layer.

Figure 30:
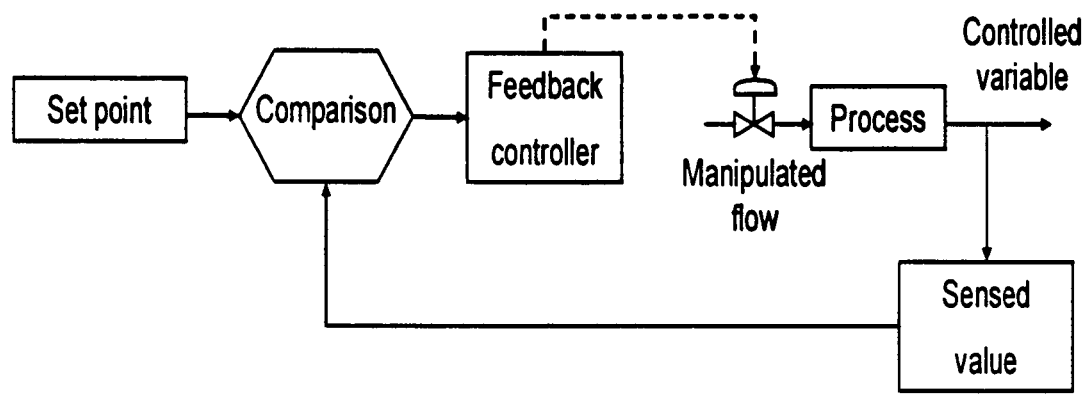
FIG. 30 is a schematic diagram of an exemplary single feedback control loop.
Figure 31:
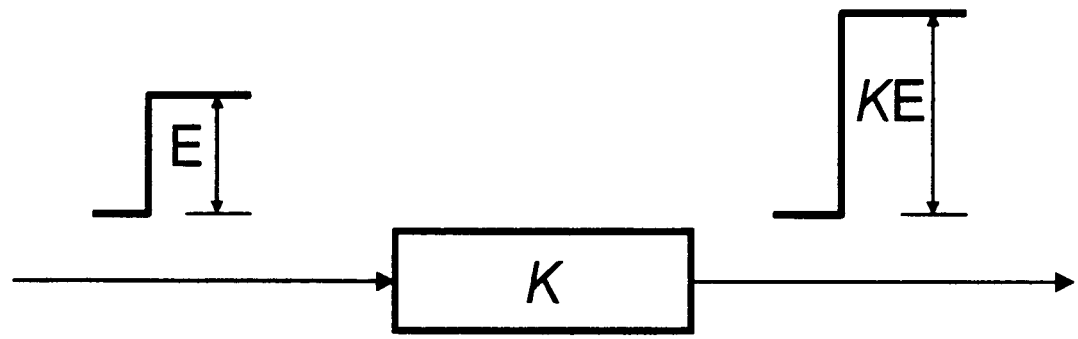
FIG. 31 is an illustration of the proportional control component in relation to gain K.
Figure 30L:
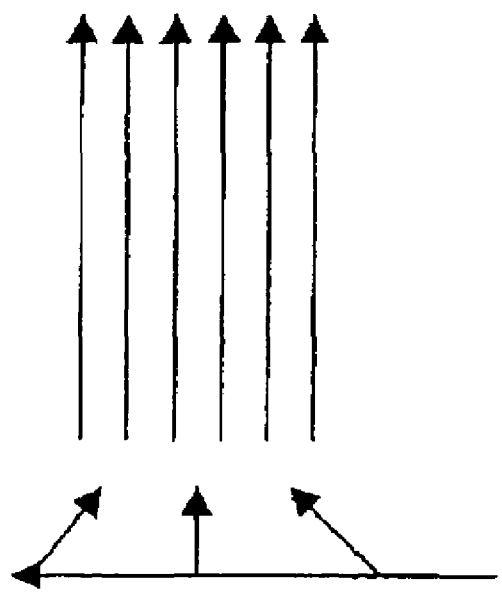

The catalyst may be supported on an assembly of one or more fins positioned within the process microchannels. Examples are illustrated in FIGS. 29-31. Referring to FIG. 29, fin assembly 820 includes fins 822 which are mounted on fin support 824 which overlies base wall 826 of process microchannel 828. The fins 822 project from the fin support 824 into the interior of the process microchannel 828. The fins 822 extend to and contact the interior surface of upper wall 830 of process microchannel 828. Fin channels 832 between the fins 822 provide passageways for fluid to flow through the process microchannel 828 parallel to its length. Each of the fins 822 has an exterior surface on each of its sides, this exterior surface provides a support base for the catalyst. With the inventive process, the reactants flow through the fin channels 832, contact the catalyst supported on the exterior surface of the fins 822, and react to form the product. The fin assembly 820*a* illustrated in FIG. 30 is similar to the fin assembly 820 illustrated in FIG. 29 except that the fins 822*a* do not extend all the way to the interior surface of the upper wall 830 of the microchannel 828. The fin assembly 820*b* illustrated in FIG. 31 is similar to the fin assembly 820 illustrated in FIG. 29 except that the fins 822*b* in the fin assembly 820*b* have cross sectional shapes in the form of trapezoids. Each of the fins may have a height ranging from about 0.02 mm up to the height of the process microchannel 828, and in one embodiment from about 0.02 to about 10 mm, and in one embodiment from about 0.02 to about 5 mm, and in one embodiment from about 0.02 to about 2 mm. The width of each fin may range from about 0.02 to about 5 mm, and in one embodiment from about 0.02 to about 2 mm and in one embodiment about 0.02 to about 1 mm. The length of each fin may be of any length up to the length of the process microchannel 828, and in one embodiment up to about 10 m, and in one embodiment about 0.5 to about 10 m, and in one embodiment about 0.5 to about 6 m, and in one embodiment about 0.5 to about 3 m. The gap between each of the fins may be of any value and may range from about 0.02 to about 5 mm, and in one embodiment from about 0.02 to about 2 mm, and in one embodiment from about 0.02 to about 1 mm. The number of fins in the process microchannel 828 may range from about 1 to about 50 fins per centimeter of width of the process microchannel 828, and in one embodiment from about 1 to about 30 fins per centimeter, and in one embodiment from about 1 to about 10 fins per centimeter, and in one embodiment from about 1 to about 5 fins per centimeter, and in one embodiment from about 1 to about 3 fins per centimeter. Each of the fins may have a cross-section in the form of a rectangle or square as illustrated in FIG. 29 or 30, or a trapezoid as illustrated in FIG. 31. When viewed along its length, each fin may be straight, tapered or have a serpentine configuration. The fin assembly may be made of any material that provides sufficient strength, dimensional stability and heat transfer characteristics to permit operation for which the process microchannel is intended. These materials include: steel (e.g., stainless steel, carbon steel, and the like); monel; inconel; aluminum; titanium; nickel; platinum; rhodium; copper; chromium; brass; alloys of any of the foregoing metals; polymers (e.g., thermoset resins); ceramics; glass; composites comprising one or more polymers (e.g., thermoset resins) and fiberglass; quartz; silicon; or a combination of two or more thereof. The fin assembly may be made of an Al2O3 forming material such as an alloy comprising Fe, Cr, Al and Y, or a Cr2O3 forming material such as an alloy of Ni, Cr and Fe.

In a further exemplary embodiment, the catalyst may be regenerated. This may be done by flowing a regenerating fluid through the process microchannels in contact with the catalyst. The regenerating fluid may comprise hydrogen or a diluted hydrogen stream. The diluent may comprise nitrogen, argon, steam, methane, carbon dioxide, or a mixture of two or more thereof. The concentration of H2 in the regenerating fluid may range up to about 100% by volume, and in one embodiment from about 1 to about 100% by volume, and in one embodiment about 1 to about 50% volume. The regenerating fluid may flow from the header 104 through the process microchannels to the footer 106, or in the opposite direction from the footer 106 through the process microchannels to the header 104. The temperature of the regenerating fluid may be from about 20 to about 600 C, and in one embodiment about 20 to about 400 C, and in one embodiment about 80 to about 200 C. The pressure within the process microchannels during this regeneration step may range from about 1 to about 100 atmospheres, and in one embodiment about 1 to about 10 atmospheres. The residence time for the regenerating fluid in the process microchannels may range from about 0.001 to about 10 seconds, and in one embodiment about 0.01 second to about 1 second. In one embodiment, the reaction zones in the process microchannels may be characterized by having a bulk flow path. The term "bulk flow path" refers to an open path (contiguous bulk flow region) within the process microchannels. A contiguous bulk flow region allows rapid fluid flow through the microchannels without large pressure drops. In one embodiment, the flow of fluid in the bulk flow region is laminar. Bulk flow regions within each process microchannel may have a cross-sectional area of about 0.05 to about 10,000 mm2, and in one embodiment about 0.05 to about 5000 mm2, and in one embodiment about 0.1 to about 2500 mm2. The bulk flow regions may comprise from about 5% to about 95%, and in one embodiment about 30% to about 80% of the cross-section of the process microchannels.

Though the exemplary embodiments have been discussed previously with respect to production of hydrogen peroxide, it is also within the scope of the present invention to produce other products, such as, without limitation, water, methane, carbon monoxide, carbon dioxide, nitrogen, or a mixture of two or more thereof. The concentration of hydrogen peroxide in the product may range up to about 100% by weight, and in one embodiment from about 1 to about 100% by weight, and in one embodiment from about 5 to about 100% by weight, and in one embodiment from about 10 to about 90% by weight, and in one embodiment from about 30 to about 90% by weight and in one embodiment about 50 to about 90% by weight. In an exemplary embodiment, the product comprises hydrogen peroxide and water, the concentration of hydrogen peroxide being from about 1% to about 70% by weight, and in one embodiment about 5 to about 50% by weight, and in one embodiment about 10 to about 30% by weight.

The contact time of the reactants with the catalyst within the process microchannels may range up to about 500 milliseconds (ms), and in one embodiment from about 1 ms to about 250 ms, and in one embodiment about 10 ms to about 100 ms.

The space velocity (or gas hourly space velocity (GHSV)) for the flow of the reactants and product through the process microchannels may be at least about 10000 hr-1 (normal liters of feed/hour/liter of volume within the process microchannels) or at least about 9260 ml feed/(g catalyst) (hr). The space velocity may range from about 10,000 to about 1,000,000 hr-1, or from about 9260 to about 926,000 ml feed/(g catalyst) (hr). In one embodiment, the space velocity may range from about 100,000 to about 1,000,000 hr-1, or about 92,600 to about 926,000 ml feed/(g catalyst) (hr).

The temperature of the reactants entering the process microchannels may range from about 20 C to about 200 C, and in one embodiment about 20 C to about 100 C, and in one embodiment about 20 C to about 50 C.

The temperature within the process microchannels may range from about 50 C to about 400 C, and in one embodiment from about 50 C to about 200 C, and in one embodiment from about 100 C to about 200 C.

The temperature of the product exiting the process microchannels may range from about 50 C to about 400 C, and in one embodiment about 50 C to about 200 C, and in one embodiment about 100 C to about 200 C.

The pressure within the process microchannels may be up to about 100 atmospheres, and in one embodiment up to about 10 atmospheres, and in one embodiment up to about 5 atmospheres. In one embodiment the pressure may range from about 1 to about 10 atmospheres, and in one embodiment from about 1 to about 5 atmospheres, and in one embodiment from about 1 to about 3 atmospheres.

The pressure drop of the reactants and/or products as they flow through the process microchannels may range up to about 100 atmospheres per meter of length of the process microchannel (atm/m), and in one embodiment up to about 10 atm/m, and in one embodiment up to about 5 atm/m.

The reactants entering the process microchannels are typically in the form of a vapor, while the product exiting the process microchannels may be in the form of a vapor, a liquid, or a mixture of vapor and liquid. The Reynolds Number for the flow of vapor through the process microchannels may be in the range of about 10 to about 4000, and in one embodiment about 100 to about 2000. The Reynolds Number for the flow of liquid through the process microchannels may be about 10 to about 4000, and in one embodiment about 100 to about 2000.

The heat exchange fluid entering the heat exchange channels may be at a temperature of about 20 C to about 200 C, and in one embodiment about 20 C to about 100 C. The heat exchange fluid exiting the heat exchange channels may be at a temperature in the range of about 50 C to about 400 C, and in one embodiment about 100 C to about 200 C. The residence time of the heat exchange fluid in the heat exchange channels may range from about 1 to about 1000 ms, and in one embodiment about 10 to about 500 ms. The pressure drop for the heat exchange fluid as it flows through the heat exchange channels may range up to about 100 atm/m, and in one embodiment up to about 10 to atm/m, and in one embodiment up to about 5 atm/m, and in one embodiment from about 1 to about 5 atm/m. The heat exchange fluid may be in the form of a vapor, a liquid, or a mixture of vapor and liquid. The Reynolds Number for the flow of vapor through the heat exchange channels may be from about 10 to about 4000, and in one embodiment about 100 to about 2000. The Reynolds Number for the flow of liquid through heat exchange channels may be from about 10 to about 4000, and in one embodiment about 100 to about 2000.

The conversion of O2 may be about 10% or higher per cycle, and in one embodiment about 30% or higher, and in one embodiment about 50% or higher per cycle. The conversion of H2 may be about 10% or higher per cycle, and in one embodiment about 30% or higher, and in one embodiment about 50% or higher per cycle.

The yield of hydrogen peroxide may be about 10% or higher per cycle, and in one embodiment about 30% or higher, and in one embodiment about 50% or higher per cycle. In one embodiment, the conversion of O2 is at least about 30%, the conversion of H2 is at least about 30%, and the yield of hydrogen peroxide is at least about 30% per cycle. Unlike conventional reaction vessels for the direct production of hydrogen peroxide from O2 and H2 which have to take into account the possibility of explosions as a result of the use of O2 and H2, the possibility of such explosions with the inventive process is of less concern. This is believed to be due to the relatively brief catalyst contact times employed in the process microchannels, the added cooling provided by the heat exchanger, and the dimensions of the microchannels which make them effective flame arresters reducing or preventing the propagation of combustion reactions and flames that would normally lead to explosions and/or detonations.

The exemplary embodiments of the present invention may utilize manifolds, as discussed briefly above, to transition to and from the microchannel. The following is a more thorough explanation of the manifolds for use with the present invention.

This section will describe manifold physics important to manifold design and begin to describe how M2M manifolds differ from larger scale manifold systems. The following section will describe experimentally obtained M2M parameters relevant to the invention. Fried and Idelchik in "Flow resistance: A design guide for engineers," Hemisphere Publishing Corporation, 1989, and Idelchik Dekker in "Fluid Dynamics of Industrial Equipment: Flow distribution Design Methods", Hemisphere Publishing Corporation, 1991 have described means of designing conventionally-sized pipe and duct manifolds with large cross-sectional area connections. These ducts are characterized by large hydraulic diameters for the manifold and the connecting channels. Because of the large hydraulic diameters even small specific velocities or mass flux rates can lead to turbulent Reynolds numbers that dominate the friction losses and the other manifold physics. In M2M manifolds, the manifold channels are built into the layers of the device, so they often have hydraulic diameters on the same order of the connecting channels, much smaller than many conventional pipe or duct based manifold systems. Due to the M2M manifold having small hydraulic diameters, fairly large specific velocities or mass flux rates can have transition and even laminar flow characteristics which can affect flow distribution in ways different from fully turbulent manifolds.

In large pipe and duct manifolds the relative cross-sectional areas of delivery manifolds compared to the connecting channels are often limited by the size of the delivery manifold. As the delivery manifold's hydraulic diameter is sized to lower the pressure drop of the system, its cross-sectional area is typically larger than the interface with the connecting channel to make fabrication of the connection (welding, joining or flanging) easier. For this reason the connection to manifold cross-sectional area ratio of the connecting channel interface to the delivery manifold is equal to or less than one for most cases. For M2M manifolds, the connection from the manifold to the connecting channels is fabricated in the same manner as the connecting channels, so the fabrication limitations of size of the connecting channel opening to delivery manifold is taken away. The in plane fabrication methods could allow one or more connecting channels with a manifold interface that has a larger area than the manifold, and its connection to manifold cross-sectional area ratio could be larger than unity.

For large pipe and duct manifolds the effect of friction losses in the length of the manifold directly adjacent to the connecting channel interface is usually negligible because the length over hydraulic diameter are on the order of unity (L/D ~1). Because of the small L/D ratio, one only accounts for momentum compensation, discussed later, in that zone. As discussed in the previous paragraph, the length of the M2M manifolds adjacent to the connecting channel interfaces can be large due to channel geometry resulting in length over diameter ratios much larger than unity, so that one can't always assume that the friction losses can be ignored.

Figure 1B:
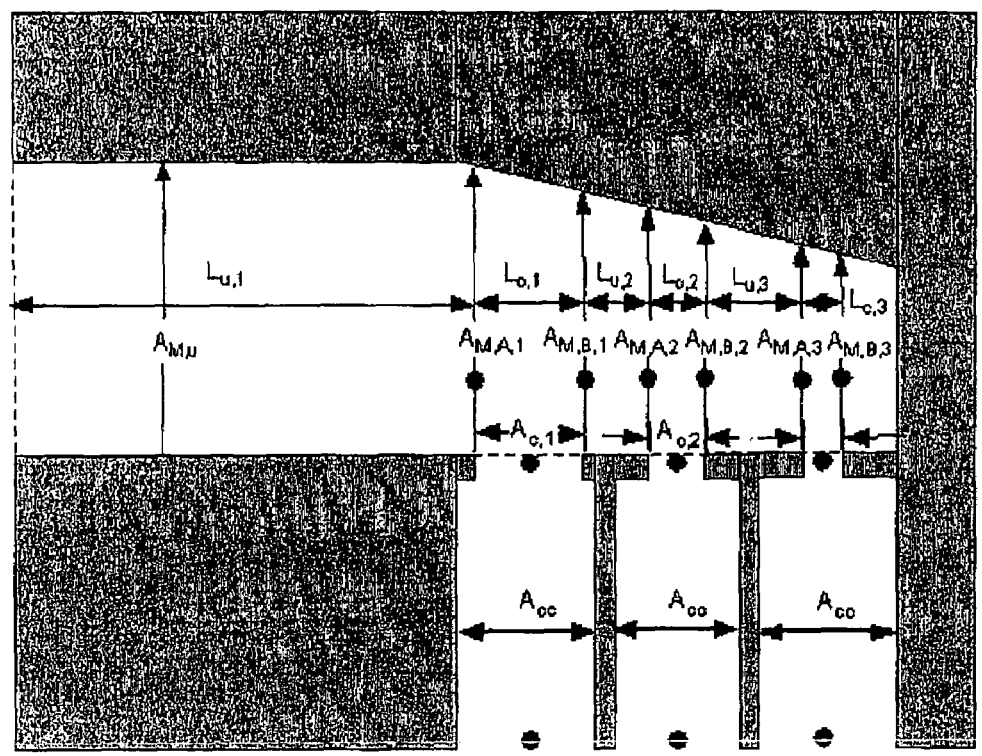

To design a manifold for a set of connecting channels, it is useful to use one-dimensional coefficients to describe complex three-dimensional flow resistances wherever possible, and this analysis will use equations similar to those used by Fried and Idelchik. Using one-dimensional coefficients allows a designer to solve for local momentum balances and mass continuity in a manner akin to electrical circuit analysis, which is very useful when evaluating design changes for flow distribution. By using one-dimensional coefficients, the source of major flow maldistributions can be identified and manifold physics compensated for in ways discussed later in the patent. To design using the circuit analysis, the representative equations that need to be solved are defined. This description will be illustrated using a case of three connecting channels, shown in FIG. 1A1. The channels have three manifold connecting areas, where the cross-sectional areas are $A_{c,i}[m^2]$. The connecting channel cross sectional areas are $A_{cc}[m^2]$. The local mass flux rates $G[kg/m^2/s]$ and the local, absolute static pressures P [Pa] are shown. $A_{c,i}$ [m²] (can be a gate, or any other orifice design), which may or may not be different than the channel area ($A_{cc}$, [m²]). The cross-sectional area in the manifold can change in the direction of flow, as shown in FIGS. 1A1 and 1B1 with changing width.

In many embodiments of the present invention, distribution is preferred to be equal, or nearly so, in all connecting channels. However, it should be noted that a small amount of flow maldistribution may be acceptable and not noticeable from the overall device performance. In some embodiments, the amount of acceptable flow maldistribution may be equivalent to a quality index factor of 5%, 10%, or up to 30%. By equal, is meant that one of the following conditions hold:

Constant mass flow rate, m [kg/s]: all connecting channels have the same cross-sectional area, $A_{cc}$ [m²], as a design basis. This leads to a $Q_1$ value of zero. This is the basis for the channels in FIGS. 1A1 and 1B1.

Constant mass flux rate, G: for cases when the connecting channels have different channel sectional areas, but the total contact time is the same. This leads to a $Q_2$ value of zero. For cases when all cross sectional areas are equal, the constant mass flux rate simplifies to constant mass flow rate case. For the design of the manifold and connecting channels, a set of equations are solved to determine mass flux rates and pressures.

The momentum balance from the inlet to the outlet of connecting channel i in FIGS. 1A1 and 1B1 is $$\Delta P_{cc,i} = P_{i,c} - P_{i,o} = r_{cc} \frac{G_{c,i}^2}{2\rho} \tag{1}$$

where $r_{cc}$ [−]=Connecting channel flow resistance $G_{c,i}$[kg/m$^2$/s]=Connecting channel i's mass flux rate, based upon $A_{cc}$.

$P_{i,c}$[Pa]=Pressure of the header manifold connection plane center $P_{i,o}$[Pa]=Pressure of the footer manifold connection plane center $\Delta P_{cc,i}$ [Pa]=Connecting channel i pressure differential $\rho$[kg/M$^3$]=Density of fluid A resistance function representing several flow resistance terms may be used instead of a series of individual momentum balances for the connecting channels, such as friction losses, cross-sectional area changes and other losses. The resistance can be a function of mass flux rate, geometry, molar composition changes, and temperature changes among others. Either resistance or a series of individual momentum balances can be used, and resistance is used here to simplify the system. A resistance function is obtained by taking the sum of the connecting channel pressure drops for a a range of flow rates and dividing each pressure drop by its representative head value ($G_{c,i}^2/2/\square$), then correlating by the head value.

To generate pressure drops in the connecting channels, the pressure drops have to be calculated from known correlations or estimated experimentally. Friction pressure losses for straight sections of connecting channels can be calculated using the Fanning friction factors. Sources of Fanning friction factors and their manner of use include Rohsenow et al ["Handbook of Heat Transfer", 3$^{rd}$ ed. McGraw Hill, 1998] for a wide range of channel geometries, and Shah and London ["Laminar Flow forced convection in ducts," Supplement 1 to Advances in Heat Transfer, Academic Press, New York, 1978] for laminar flows. Care should be placed in using appropriate Reynolds numbers, channel geometry factors (such as aspect ratios), and hydrodynamic dimensionless lengths (x$^+$=L/D/Re, where L is the section's length, D is channel's hydraulic diameter and Re is the channel's Reynolds number) for laminar flows for the Fanning friction factor. If friction factors aren't available for the connecting channels considered, experimental values can be obtained from fabricated channels fitted with pressure taps placed in well developed flow zones. If the connecting channels have pressure drops from sudden changes in cross-sections or changes in plane, Fried and Idelchik ["Flow resistance: A design guide for engineers," Hemisphere Publishing Corporation, 1989] have a number of equations and references.

To set a perfect distribution, solving for the $G_{c,i}$ then results in $$G_{c,i} = G_{c,perf} = \sqrt{2\rho \frac{\Delta P_{cc,i}}{r_{cc}}} \tag{1}$$

$G_{c,perf}$[kg/m$^2$/s]=Connecting channel perfect mass flux rate, i.e. the design point.

If the fluid is incompressible, the fluid density is an average of the connecting channel conditions. If the fluid is an ideal gas and the connecting channel pressure drop is less than 10% of the inlet pressure, the density can be approximated by the local average pressure, temperature and molecular weight of the gas as follows $$G_{c,i} = G_{c,perf} = \sqrt{\frac{P_{i,c}^2 - P_{i,o}^2}{r_{cc}} \left(\frac{Mw_e}{RT_e}\right)} \tag{2}$$

where we use an equivalent set of parameters to describe changing connecting channel conditions:

$Mw_e$ [kg/gm-mole]=Average mole fraction for the gas in the connecting channel

R [J/gm-mole/K]=Gas constant $T_e$ [K]=Average gas temperature

The following six factors characterize the system:
1. The outlet pressure profile, $P_{i,o}$ for i from 1 to N total channels
2. Either one of the following:
   a. The inlet pressure of the macro manifold, $P_{macro}$
   b. Or the inlet pressure of the M2M manifold, $P_{in}$
   c. Or the inlet manifold mass flux rate, $G_1$.
3. Connecting channel geometries (heights, widths, lengths)
4. Connecting channel conditions (temperature, mole fractions, adding/losing fluids)
5. Manifold geometries
6. Manifold conditions (temperature)

With the above information and the three-channel (N=3) system in FIG. 1A1, there are seventeen (6N−1) unknowns for a header system:

Six (2N) header pressures ($P_{1,A}$, $P_{1,B}$, $P_{2,A}$, $P_{2,B}$, $P_{3,A}$, $P_{3,B}$)

Three (N) connecting channel inlet pressures ($P_{1,c}$, $P_{1,c}$, $P_{1,c}$)

Three (N) header M2M manifold mass flux rates at the connection inlet ($G_{1,A}$, $G_{2,A}$, $G_{3,A}$)

Two (N−1) header M2M manifold mass flux rates at the connection outlet ($G_{1,B}$, $G_{2,B}$)

Three (N) connecting channel mass flux rates ($G_{c,1}$, $G_{c,2}$, $G_{c,3}$)

The exact position of the pressures A and B for the manifold are defined as follows: For the header, Position A at the manifold connection i is defined as the intersection of the manifold channel axis and the plane made by the manifold connection i's wall closest to the header manifold inlet. The header Position B at the manifold interface i is defined as the intersection of the manifold channel axis and the plane made by the manifold connection i's wall farthest from the header manifold inlet. For the footer, Position A at the manifold connection i is defined as the intersection of the manifold channel axis and the plane made by the manifold connection i's wall farthest from the footer manifold outlet. For the footer, Position B at the manifold connection i is defined as the intersection of the manifold channel axis and the plane made by the manifold connection i's wall closest to the footer manifold outlet. The plane "made" by the manifold's connection wall is a plane, perpendicular to the central axis of the manifold, that intersects an edge of the manifold connection.

The last mass flux rate in the M2M manifold header is zero, because the manifold ends.

$$G_{3,B}=0 \quad (1)$$

The 6N−1 unknowns are linked by the following 6N−1 equations:

Momentum balance for connecting channel i (N total), from equation (9)

Momentum balance between connecting channel i and the manifold (N total), also known as the "turning loss", the resistance to flow between the manifold and the manifold interface (can be a gate or a grate):

$$\left[\frac{P_{i,A} + P_{i,B}}{2}\right] - P_{i,C} = \zeta\left(\frac{G_{cc}A_{c,i}}{G_{i,A}A_{M,A,i}}, \frac{A_{c,i}}{A_{M,A,i}}\right)\frac{G_{i,A}^2}{2\rho_{Mc,i}} \quad (2)$$

where $A_{c,i}$ [m$^2$]=Cross-sectional area of the connecting channel i, at the manifold interface (not necessarily the area of the connecting channel)

$A_{M,A,i}$ [m$^2$]=Cross-sectional area of the manifold at connecting channel i $\zeta$ [dimensionless]=Turning loss function from the M2M manifold to the connecting channel $\rho_{Mc,i}$[kg/m$^3$]=Average density of the fluid between the manifold and connecting channel i The turning losses can be considered as part of a connecting channel's total pressure drop and can have a strong effect on flow distribution. The values of the turning loss are positive for the header, and can possibly be positive or negative for the footer, resulting in a pressure drop for the former and a net static pressure increase for the latter. If the manifold geometry and manifold connection geometry affect upon the turning loss is well understood, such as large pipes, you can use a correlation for the turning loss as those described in Fried and Idelchik ["Flow resistance: A design guide for engineers," Hemisphere Publishing Corporation, 1989]. If that isn't an option, another means of obtaining the turning loss coefficient ☐ for specific manifold geometry is obtaining from experiment the pressures, upstream mass flux rate, the average density and solving for ☐ using equation 14. The header manifold pressure at the interface can be used instead of the average of $P_{i,A}$ and $P_{i,B}$ in equation (14), as it represents the average pressure in the manifold across the manifold connection interface.

Mass continuity equation between connecting channel i and the manifold (N total)

$$A_{M,A,i}G_{i,A} - A_{M,B,i}G_{i,B} = A_{cc}G_{c,i} \quad (1)$$

where $A_{M,B,i}$ [m$^2$]=Cross-sectional area of the manifold at connecting channel i, downstream of the connecting channel Mass continuity in the manifold between connecting channels i and i+1 (N−1 total)

$$A_{M,A,i+1}G_{i+1,A} = A_{M,B,i}G_{i,B} \quad (2)$$

Manifold momentum balance at the connecting channel i, which includes friction losses and momentum compensation terms (N total)

$$P_{i,A} - P_{i,B} = k_M\left(\frac{A_{M,B,i}G_{i,B}}{A_{M,A,i}G_{i,A}}, \text{Re}\left(\frac{G_{i,A} + G_{i,B}}{2}\right)\right)[G_{i,B}^2 - G_{i,A}^2]\frac{1}{\rho_{M,i}} + \quad (3)$$

$$4f\left(\text{Re}\left(\frac{G_{i,A} + G_{i,B}}{2}\right)\right)\frac{L_{i,c}}{D_i}\left[\frac{G_{i,A} + G_{i,B}}{2}\right]^2 \frac{1}{2\rho_{M,i}}$$

where $D_i$ [m]=Hydraulic diameter of the manifold at connection i f [dimensionless]=Fanning friction factor for the manifold $k_M$ [dimensionless]=Momentum compensation factor $L_{i,c}$ [m]=Length of the connecting channel opening in the manifold at connection channel i $\rho_{M,i}$ [kg/m$^3$]=Average density of the fluid in the manifold at connection channel i The momentum compensation coefficient $k_M$ always has a positive value in the header, which can lead to leading to an increase in static pressure across the manifold connection if that effect is stronger than friction losses. Average mass flux rates based on the upstream and downstream values are used for this analysis. The effect of momentum compensation can vary the pressure profiles in the header and footer greatly. If the manifold geometry and manifold connection geometry affect upon the momentum compensation coefficient $k_M$ is well understood, such as large pipes, you can use correlation for the turning loss as those described in Pigford et al ("Flow distribution in piping manifolds", INDUSTRIAL & ENGINEERING CHEMISTRY RESEARCH, v.22, INDUSTRIAL & ENGINEERING CHEMISTRY RESEARCH, pp. 463-471, 1983). If that isn't an option, another means of obtaining the momentum compensation coefficient $k_M$ for specific manifold geometry is obtaining from experiment the pressures, upstream and downstream mass flux rates, the average manifold density and solving for $k_M$ using equation (17).

Manifold momentum balance upstream of connecting channel i (N total)

$$P_{i,B} - P_{i+1,A} = \frac{4f\left(\text{Re}\left(\frac{G_{i,A} + G_{i-1,B}}{2}\right)\right)L_{u,i}}{D_{u,i}} \left(\frac{G_{i,A} + G_{i-1,B}}{2}\right)^2 \frac{1}{2\rho_{u,i}} \quad (1)$$

where $D_{u,i}$ [m]=Average hydraulic diameter of the manifold's upstream section prior to connection channel i $L_{i,c}$ [m]=Length of the connecting channel opening in the manifold at connection channel i $\rho_{u,i}$ [kg/m$^3$]=Average density of the fluid in the manifold upstream connection channel i Thus, there are 6N−1 equations for 6N−1 unknowns. These nonlinear equations can be solved simultaneously using a number of solution strategies. If the manifold channel width is constant in the manifold, the equations simplify. Note that, for gases, the local average density is a function of local pressure.

A similar set of 6N−1 equations can be written for the footer manifold. The direction of manifold flow is from A to B. The footer $G_{1,A}$ value is zero, as it is there is no flow prior to the first manifold connection. The manifold connection to manifold pressure drop in equation (14) would change the sign of the equation (14)'s right hand side, along with the head term's mass flux basis to $G_{i,B}$. The value of the footer turning loss coefficient in (14) would be dependent upon $G_{i,B}$, also. The footer manifold pressure at the interface can be used instead of the average of $P_{i,A}$ and $P_{i,B}$ in the footer version of equation (14), as it represents the average pressure in the manifold across the manifold connection interface. The sign on the right hand side of equation (15)'s continuity equation would change to negative while the continuity equation in (16) would be the same. Equation (17)'s form is the same, leading to a net decrease in static pressure from A to B caused by the combined friction and momentum compensation losses. The only change to equation (17) is that the ratio $$\frac{A_{M,B,i} G_{i,B}}{A_{M,A,i} G_{i,A}}$$

is inverted so the footer manifold mass flow rate ratio is correct for the footer. Equation (18) stays as is for the footer.

For footer Z-manifolds and footer L-manifolds the number order of manifold connection i increases follows in the same direction as the header. The direction of G can be in the opposite direction of the header for U-manifolds. This means the manifold interface numbering scheme goes in the opposite direction of the header.

M2M Manifold Physics

The flow of fluid takes the path of least resistance to leave a manifold. If the connecting channels have large pressure drop at the design flow rate compared to the manifold physics described in the last section, the flow distribution in the connecting channels will be mostly equivalent and sophisticated manifold designs become less necessary. If the connecting channels pressure drop at the design flow rate is low compared to the manifold pressure drops, then depending on the manifold header and footer pressure profiles there is potential for poor flow distribution. The manifold physics versus the connecting channel pressure drop must be balanced to obtain the necessary connecting channel flow distribution for a given manifold.

For low relative flow rates, friction losses dominate the static pressure profiles in the manifolds because the small head values don't give rise to large turning losses or momentum compensation static pressure changes. Examples of such cases include lab-on-a-chip analytical devices and reactions with relatively long contact times. To distribute flow to microsecond contact time reactors and fast liquid phase reactions, a manifold can potentially see very high mass flux rates or velocities, even at low Reynolds numbers. These large head values can give rise to not only large friction losses but also substantial turning and momentum compensation static pressure changes. The latter two pressure changes can strongly affect flow distribution in manifolds.

Momentum compensation refers to the change in manifold static pressure based on flow leaving and entering a manifold from a connecting channel. Momentum compensation increases the header static pressure each time fluid leaves the header to join the connecting channel, and it is possible that the static pressure rise associated with momentum compensation can be larger than friction losses at the connection. The rise in static pressure can be thought of as the means of "pushing" the fluid into the connecting channel. Momentum compensation acts to decrease static pressure in the footer, with the loss in static pressure attributed to accelerating the connecting channel's flow in the direction of the manifold flow. The combination of momentum compensation and friction losses can greatly decrease the footer static pressure in the direction of M2M footer manifold flow.

Momentum compensation is a function of the mass flow rate ratio, the ratio of the manifold flow rates just downstream to just upstream of a distribution point, and the flow regime of the fluid in the manifold. The mass flow rate ratio ranges from zero to one, and the mass flow rate ratio is the ratio of the downstream to upstream mass flow rates for the header and the ratio of the upstream to downstream flow rates for the footer. Microchannel M2M manifolds with high enough heads can see momentum compensation static pressure increases large enough to increase the static pressure in the header despite frictional static pressure losses, resulting in an increase of the static pressure driving force for flow to the connecting channels in the direction of flow. An example of the static pressure increase is seen in FIG. 2A1, where the static pressures in a header or footer calculated for a large M2M Z-manifold system based upon turbulent pipe turning loss and momentum compensation coefficients. Channel 1 is the first connecting channel that the header manifold interacts with, while channel 19 is the last connecting channel the footer interacts with. The momentum compensation effect in the header drives the static pressure up with increasing channel number (direction of flow), despite frictional losses, while the combined frictional and momentum compensation losses in the footer drive the static pressure down with increasing channel number. The resulting pressure profile drives more flow to the higher number channels due to the larger pressure differential driving force with the same connecting channel flow resistance.

Figure 2B:
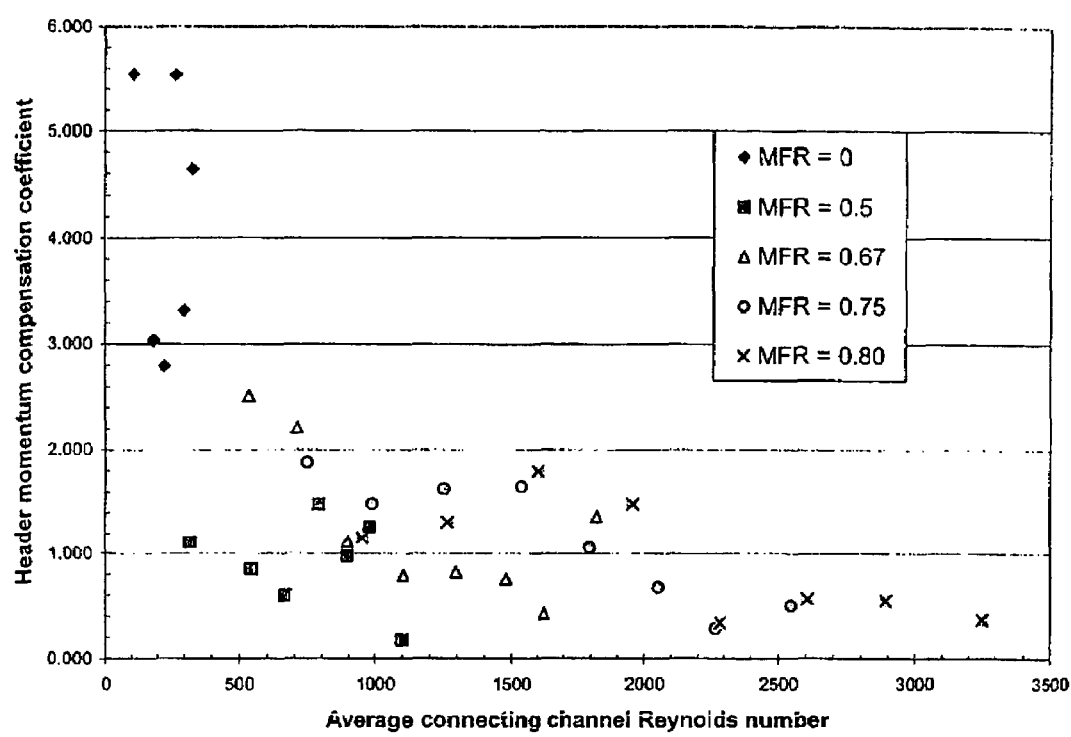

Experimental data for the microchannel header momentum compensation coefficients versus local average Reynolds numbers are plotted in FIG. 2B1. The solid shapes show different manifold mass flow rate ratios (downstream over upstream). The header manifold mass flow rate ratio of zero represents the last channel in the header, while one half represents the second to last channel, assuming equal mass flow in both connecting channels. The value of the ratio increases as the channels increase in number from the end of the header manifold, up to a value approaching unity. As can be seen, the turning losses show a dependence upon Reynolds number, as the headers see values in the laminar (Re<2200) to transition (2200<Re<4000-5000). For many curves a change in the M2M header momentum compensation coefficient can be seen at the transition from laminar to transition flow. The M2M header momentum compensation coefficient values tend to be on the same order or higher than seen in pipes from Pigford et al ("Flow distribution in piping manifolds", INDUSTRIAL & ENGINEERING CHEMISTRY RESEARCH, v.22, INDUSTRIAL & ENGINEERING CHEMISTRY RESEARCH, pp. 463-471, 1983) (values of 0.4-0.7). These M2M header momentum compensation values have experimentally lead to increases in header static pressure, even at inlet Reynolds numbers below 1000.

The average header Reynolds number is used as a basis of the M2M momentum compensation coefficient because this coefficient is obtained from the experimental change in the static pressure from the beginning of the connecting channel to the exit by subtracting the frictional pressure drop from it, which is based upon the average Reynolds numbers. As the connecting channel openings can be quite long in the direction of flow in the M2M manifold and spaced close together, the pressure can change appreciably in the manifold, as mentioned in the previous section.

The Reynolds number in the header can change appreciably in an M2M manifold due to its small hydraulic diameter and large mass flux rates needed to supply fast reactions, high effectiveness heat exchangers and other unit operations aided by microchannel architecture. Some preferred embodiments have operational contact times (contact times through the connecting channels) of fifty milliseconds and less, and some have contact times of ten milliseconds and less. The value of the Reynolds numbers in preferred embodiments can vary across the M2M manifold from turbulent flow, to transition flow to laminar flow; in other preferred embodiments it can vary from transition flow to laminar flow. In other preferred embodiments it can vary from transition flow to turbulent flow. For M2M manifolds where the flow regime changes, the friction losses and the M2M momentum compensation losses, the latter seen in FIG. 2B1, change with it. These flow regime changes affect the pressure profiles in the M2M manifold and can contribute to poor flow distribution.

The turning loss is defined as the static pressure change the connecting channel pays to divert the flow to and from the manifold to the connecting channel. The turning loss is a function of 1. The cross-sectional area ratio of the connecting channel interface over that of the manifold;
2. The local ratio of the mass flow rate of the connecting channel to that of the highest manifold mass flow rate at the connection, upstream or downstream; and
3. The shape of the manifold cross section. For rectangular cross sections, the shape is quantified with the manifold aspect ratio.

For constant values of the cross-sectional area of both the manifold and the connecting channel interface, the header turning loss tends to be higher for the connecting channels closest to the header entrance than to those farther downstream. This change in the turning loss with position in the manifold is based upon the change in the manifold head: The head value decreases in the direction of header flow, so diverting a fraction becomes less energy intensive.

Figure 2C:
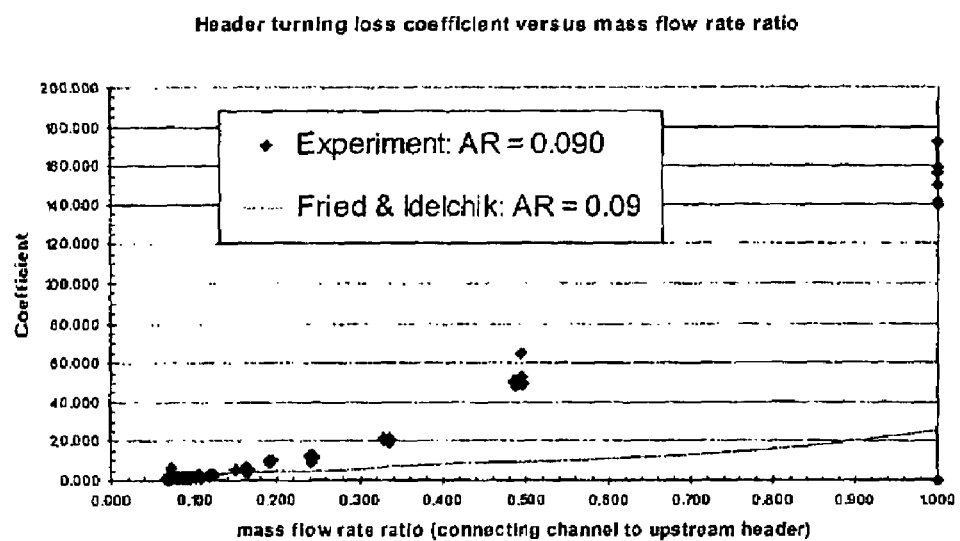

FIG. 2C 1 shows the experimental values of the M2M header manifold turning loss coefficient measured in a microchannel M2M header manifold with an grate interface to manifold area ratio of 0.09, plotted versus the connecting channel to upstream M2M header manifold mass flow rate ratio of the grate interface to the manifold just upstream of the grate interface. Also in FIG. 2C 1 are the turning loss coefficients for large dimension manifold from Fried and Idelchik ("Flow resistance: A design guide for engineers," Hemisphere Publishing Corporation, 1989) shown in solid line. In general, microchannel M2M (macro to micro) turning loss coefficients follow a similar trend to that of the Fried and Idelchik turning loss coefficients: the values increase with decreasing connection to manifold cross-sectional area ratio. This implies that a larger pressure drop is needed to turn manifold flow into a smaller connecting channel opening. The turning loss coefficient increases with increasing connecting channel to upstream M2M header manifold mass flow rate ratio (or increase with position down the manifold, 0 being for the first channel, 1 for the last channel). However, the turning losses, based upon the product of the manifold head upstream of the grate interface and the turning loss coefficient, are higher for the first channel in the header than for the last channel if the connection to manifold cross-sectional area ratios are constant. This is because the increase in the turning loss coefficient's value with connecting channel to upstream M2M header manifold mass flow rate ratio approaching one (i.e. the end of the header) isn't as large as the decrease in the manifold head ($G^2/2/\square$) as the manifold loses mass flow rate The microchannel turning losses in FIG. 2C1 are a factor of 2 to 5 higher than turbulent pipe values, making the turning losses even higher than pipes for connecting channel to upstream M2M header manifold mass flow rate ratios greater than 0.2. The manifold aspect ratio (largest side of the rectangle over the smallest) of the M2M manifold causes the high header turning losses. M2M manifold channel heights are constrained by stacking limitations, as there is often a limited amount of height available between repeating layers. Faced with the restriction of channel height, the M2M manifold can increase its width to increase the overall manifold cross-sectional area for flow. By increasing the manifold cross-sectional area for flow, one can lower both frictional losses and momentum compensation static pressure changes. By increasing the cross-sectional area, the local manifold head is also decreased. As the M2M manifold channel aspect ratio increases, the flow turning from the manifold into the connecting channel sees increasing shear stress from the channel walls above and below. These wall shear stresses increase the turning loss pressure drop with increasing M2M manifold aspect ratio, where circular pipes and nearly square cross-sectioned ducts have much less of this. For example, the M2M manifold channel aspect ratio for the M2M turning loss coefficient in FIG. 2C1 is roughly 16:1.

For the footer turning losses, there is further interesting phenomena. FIG. 2D1 shows the negative values of the experimental M2M footer turning loss coefficients for the footer manifold plotted versus the local connecting channel connecting channel to upstream M2M header manifold mass flow rate ratio of the connecting channel to that of the highest manifold flow rate at the connection, downstream of the footer connection. The M2M footer turning loss coefficients in FIG. 2D1 are for a connecting channel interface to manifold area ratio of 0.09 and an M2M manifold aspect ratio of 16:1, and the large manifold numbers from Fried and Idelchik ("Flow resistance: A design guide for engineers," Hemisphere Publishing Corporation, 1989) for the same connection to manifold cross-sectional area ratio are plotted. The negative value footer turning coefficients for the pipe manifolds (from Fried and Idelchik) show a monotonic increase in the footer turning loss coefficient with increasing connecting channel to upstream M2M header manifold mass flow rate ratio. These negative footer turning loss coefficients in FIG. 2D1 for both cases means that these coefficients have a negative value, so when the footer turning loss coefficient is multiplied by the manifold head downstream of the connecting channel there will be a net increase in the static pressure from the connecting channel outlet to the manifold. This static pressure increase compensates for the static pressure header turning loss to some degree. The footer turning loss coefficient for the 16:1 M2M manifold aspect ratio is a factor of two or three smaller than that of the Fried and Idelchik footer turning loss coefficients. The M2M manifold aspect ratio is probably a strong contributor to the difference in footer turning loss coefficient values, with wall shear stress lowering the net static pressure increase compared to the large manifold system in Fried and Idelchik.

In summary, the experimental M2M manifold momentum compensation and M2M manifold turning losses coefficients diverge strongly in value from reported values used for large pipe and duct systems, mostly due to the effect of large M2M manifold aspect ratio manifold channels. These large M2M manifold aspect ratios are needed to slow down the velocities in the M2M manifold, which in turn decrease local head values which drive the friction, turning and momentum effects. To avoid making larger M2M manifold aspect ratios than the values described above and their associated turning losses, a wide M2M channel can be split into several smaller manifolds of smaller widths that distribute flow to a fraction of the total connecting microchannels. These smaller manifolds are referred to as sub-manifolds. If the coefficients of momentum compensation and turning losses are well understood for a given M2M manifold aspect ratio in a M2M manifold, it is possible to manipulate the manifold and connecting channel cross-sectional areas to tailor the turning losses to compensate for other manifold static pressure changes from friction losses and momentum compensation static pressure changes. By tailoring the turning losses in a manner that will make the driving force for flow equal across the connecting channels despite the other changes in manifold pressure profiles, it is possible to reach an equivalent distribution of flow in each connecting channels. From this desire for controlling turning losses came the invention of variable cross-section grates and gates. Sub-manifolds, grates and gates are discussed in the next section, in addition to other novel means of controlling flow distribution in M2M manifolds.

M2M Distribution Layers

Flow into the M2M of a microdevice is usually routed through a large pipe, tube, or duct. Each large pipe or duct may further serve to connect multiple microdevices operating in parallel. Flow distribution occurs through multiple layers. One large pipe or duct meters flow to one or two or more microdevices. Once flow enters the microdevice, it may then be further segregated into submanifolds. Each submanifold serves to distribute flow to at least two or more connecting channels. Flow may then be further divided within a connecting channel into subchannels. Subchannels may be formed, for example, by the use of fins (either inserted before or after bonding) or integral (such as those formed from the laminae or shims). Flow in one microchannel may be divided into at least two subchannels and in some embodiments, 10 to 100 subchannels.

Improved Distribution in Micro-to-Macro Manifolds

As discussed in the previous section, when the cross-sectional area ratio of the connecting channel to the manifold becomes small and the M2M manifold aspect ratio is high, the effect of turning pressure losses in manifolds can be dramatic for the first channel in a header manifold or the last channel in a footer manifold. If an M2M manifold distributes flow to a large number of connecting microchannels, the manifold width could be increased to slow the mass flux rate enough to avoid large turning losses. This in turn decreases the connection to manifold cross-sectional area ratio and increases the M2M manifold aspect ratio resulting in increasing turning losses. The turning losses add to the overall connecting channel pressure drop (which includes frictional and other losses) and can lead to poor flow distribution. This is seen in microchannel process technology (MPT) devices in which large flows are distributed across long distances to individual microchannels.

Splitting a larger M2M manifold into cascaded layers of smaller parallel M2M manifolds, each of which feed two or more connecting microchannels or one large M2M manifold aspect ratio connecting microchannel can improve flow distribution. A manifold can be split into separate manifolds with walls, with each sub-manifold handling a fraction of the total flow. This change increases the connection to manifold cross-sectional area ratio and lowers the cross-section's M2M manifold aspect ratio, making turning losses lower. FIG. 3A1 shows a M2M Z-manifold split into two separate M2M sub-manifolds 312, 314. The sub-manifold includes length in addition to the distribution zone of length $L_{M2M}$. This additional length can be used to tailor the pressure drop for the sub-manifold.

Figure 3B:
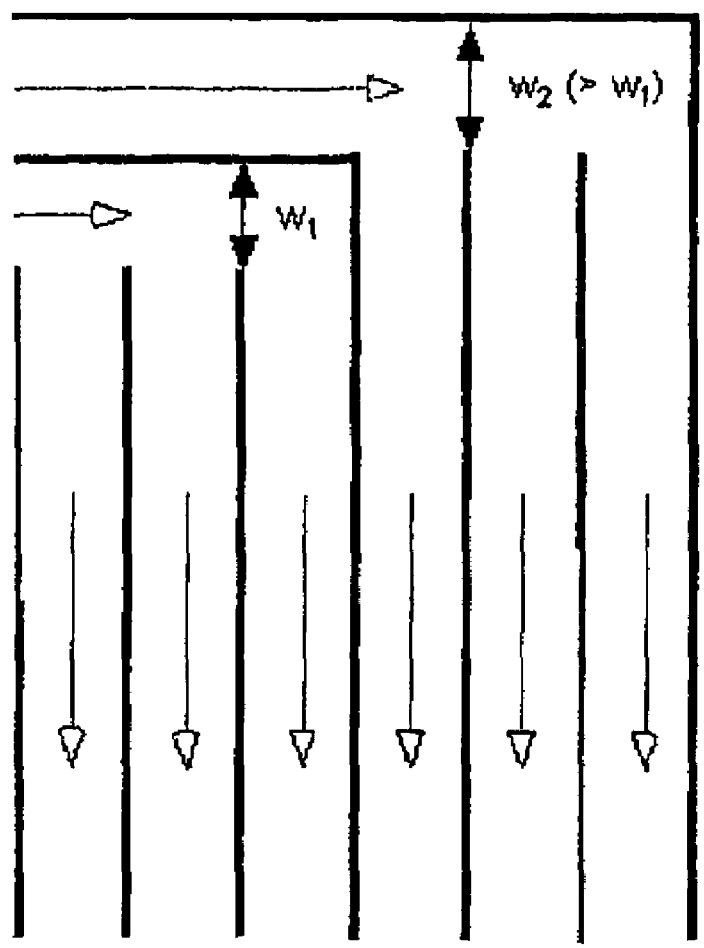

The width of the sub-manifold section between a macro manifold and a connecting channel distribution section can be changed to affect the sub-manifold's flow resistance. FIG. 3B1 shows a sub-manifold design for an L-manifold with two sub-manifolds and connecting channels of equivalent flow resistance. The width of the sub-manifold with the longer upstream flow path, $w_2$, is wider than the path for the sub-manifold with the shorter upstream flow path, $w_1$. This difference in upstream widths allows a means of decreasing the flow resistance for the longer flow path sub-manifold and increasing the flow resistance of the shorter flow path sub-manifold so that both sub-manifolds can meter the same amount of total flow. A similar method to this L-manifold's sub-manifold width design can be used for U-manifolds, which have a similar problem matching pressure drops in multiple sub-manifolds with the added burden of matching the total flow resistance between sub-manifold that include headers and footers of differing lengths. An additional benefit can be that the walls separating sub-manifolds can act as pillars of mechanical support to handle loads applied the wall shims directly above and below in the direction of stacking.

Channel walls often need some material to hold the ends together in a way that avoids creating long and dangling features that could shift position during fabrication and/or operation. FIG. 3C shows an example in which one or more shims whose microchannels end in a bar 37 perpendicular to the channels' axes, signaling the end of the microchannel. In this example, the bar 37 forms a grate that defines one side of a manifold 370. The plane created by the bar 37 and the open space in the adjacent channel is the connecting channel plane exit or entrance. This connecting channel plane design is similar to that illustrated by Golbig et al and discussed in Example 1, except the connecting channel in Golbig's stays in the plane under 37 and doesn't extend into the plane of 37.

An example is shown in FIG. 3D1. In this example, each crossbar 39 (upper shim), 38 (lower shim) forms a portion of the grate. The opening 36 created by the differences in the shim channel's ends creates an interface for fluid flow between the microchannels 35 and the M2M manifold.

In some embodiments, it is better to have more of the M2M zone available for flow to lower the M2M mass flux rates, which in turn could lower the momentum compensation static pressure changes, turning and friction losses. FIG. 3D1 shows the "grate" concept for a single sub-manifold. For the header 384, fluids flows in the M2M and turns into and over the outstretched "grate" 38, entering the interface channel 36 created by the lower shim 38 and the upper shim 39 that marks the end of the microchannel. The flow then leaves the interface and enters the microchannels 35. The flow distribution can be tailored by varying the degree the "grate" sticks out into the manifold over the length of a M2M manifold and also by varying the width of the opening 36 under the crossbar 33. The design in FIG. 3D has been tested in a flow distribution test device.

A "gate" connects an M2M manifold to two or more connecting microchannels. Gate features can help distribute flow with a lower pressure drop than a conventional orifice, which seeks to obtain flow distribution by making all the flows pay an equally large sudden expansion and contraction pressure drop. The gate uses turning losses to meter flow to a connecting channel, set of connecting channels, or submanifold, and does so by varying the gate cross-sectional area. This tailoring of the turning loss allows the gate to compensate for changes in the manifold pressure profiles so that the connecting channel pressure drops are equivalent. Gates also use friction losses, expansion and other distribution features to add back pressure. By varying gate cross-sectional area it is possible to add back pressure to or remove backpressure from a sub-manifold in a larger manifold cascade as a means of controlling overall sub-manifold flow resistance.

In L-manifolds, orifice gates 31 in the connecting channel smooth out distribution by forcing flow through a narrowed opening in the entrance of the connecting channels. FIGS. 3E1 and 3F1 show an example of a gate, with an opening in the gray shim to let in flow through the wall created by the stacking of two or more shims. This "gate" is an extension of the "grate" design in that it brings an end to the connecting microchannels in shim geometry and allows access to the microchannels from the M2M manifold.

Gates and grates use the turning losses to equalize the static pressure profiles at the connecting channel interfaces, but the manner in which they do so are different from orifices. Orifices use constant small manifold connection cross-sectional areas to impose large flow resistances for each connection, and incur large operating costs in the form of higher overall pressure drops. The inventions described in gates and grates use two or more openings of varying cross-sectional area to use the naturally occurring turning losses to overcome the manifold static pressure profiles caused by manifold physics. In Example 3, the gate openings in the direction of flow decrease in size to compensate for the larger turning losses for the first opening and the increased static pressure driving force at the last two gates caused by momentum compensation. These gate sizes help control flow without the large pressure drops associated with orifice flow resistance. For gates and grates, the preferred value of $DPR_2$ is greater than two, more preferably greater than 5, in some preferred embodiments it is greater than 10, and in some embodiments 5 to 30. The higher the ratio, the less operational costs incurred by the manifold from pressure drop it gives.

Decreasing the cross-sectional area of the gates in the direction of flow (see FIG. 3G) in a header manifold improves distribution because (1) a large gate width at the first openings compensates for the larger relative turning losses seen for the first interface in the manifold; and (2) for gates downstream of the first gate, decreasing the gate size and increasing the turning loss penalty can counteract the increase in static pressure down the length of the manifold, caused by manifold momentum compensation.

Flow Regime

The relative momentum of the manifold stream flow plays an important part in manifold physics. For M2M manifolds with large head values, momentum compensation and turning losses become more pronounced, and can have greater influence on fluid flow distribution than manifold friction losses. However, if the manifold flow does not have a large head value, the friction losses become the dominant effect and the use of manifold features that compensate for the high momentum phenomena lose their effectiveness. As mentioned previously, microchannel M2M manifolds can achieve large head values at low Reynolds numbers because their small hydraulic diameters compensate for large velocities and mass flux rates. These large head values can occur in laminar flow regimes, well below the Reynolds number values of transition and turbulent flow. With large pipe and duct manifolds systems the same head values would be in the turbulent regime due to their inherently larger hydraulic diameters.

The regime of flow entering a macromanifold is typically turbulent or transition. The flow then undergoes additional regime change in the manifold within the microdevice from turbulent, to transition, to laminar. Alternatively, the flow may only undergo one regime change, from turbulent to transition or from transition to laminar.

As a means of determining if a M2M manifold has a large head value, we can use the ratio Mo:

$$Mo = \frac{\frac{1}{2\rho}[G^2 - 0]}{\frac{4fL_{M2M}}{D}\frac{G^2}{2\rho}} = \left\{\frac{4fL_{M2M}}{D}\right\}^{-1} \quad (1)$$

where

D [m]=manifold hydraulic diameter at the M2M f [dimensionless]=Fanning friction factor for the M2M. The source of Fanning friction factors for channels is given in Rohsenow et al ["Handbook of Heat Transfer", $3^{rd}$ ed. McGraw Hill, 1998] for a wide range of channel geometries, along with references. Care should be placed in using appropriate Reynolds numbers, channel geometry factors (such as aspect ratios), and hydrodynamic dimensionless lengths ($x^+=L_{M2M}/D/Re$ for laminar flows) for the Fanning friction factor.

G [kg/m$^2$/s]=mass flux rate at the M2M

Re [dimensionless]=Reynolds number at the M2M

The ratio Mo (see equation 18) compares the largest M2M manifold head value, the driving force for turning losses and momentum compensation static pressure changes, to the friction losses the manifold would see if the largest M2M manifold head was applied over the entire manifold length $L_{M2M}$. Small values of Mo would indicate that the M2M effects would be small in comparison to the friction losses, negating some of the effectiveness of sub-manifolds and all the effectiveness of grates and gates to control flow distribution. If the Mo value was greater than some small ratio, for example, Mo>0.05, the head driven turning losses and momentum compensation terms contribute to flow distribution. For cases when Mo is greater than 0.05 sub-manifolds, grates, gates and other architecture that manipulate the turning losses and manifold static pressure profiles can improve M2M manifold flow distribution. For cases when Mo is less than 0.05, manifold friction losses dominate flow distribution.

An alternate for the Mo number is the FA number. The purpose of FA number is to avoid the laminar creeping flow distributed over short manifold lengths. The FA expression is a function of flow rate/flow regime (or Reynolds number), hydraulic diameter of manifold and Length of manifold. Below is the expression of FA number:

$$FA = \frac{[0.058 + 0.0023(\ln Re)^2]^2 D}{L_{M2M}} < 0.01$$

where hydraulic diameter D in inches, manifold length $L_{M2M}$ in inches and Reynolds number Re have the same definition as that for Mo.

In preferred embodiments, FA<0.01. For example, if the hydraulic diameter of sub-manifold is 0.080" (0.20 cm), then the table below gives the length requirement of a sub-manifold with FA<0.01.

| Reynolds number | Length of sub-manifold (in) |
| --- | --- |
| 10 | $L_{M2M} > 0.04''$ |
| 100 | $L_{M2M} > 0.09''$ |
| 1000 | $L_{M2M} > 0.23''$ |
| 10000 | $L_{M2M} > 0.51''$ |
| 100000 | $L_{M2M} > 1.05''$ |

This means for Re=10 and D=0.08"(0.20 cm), any manifold design with sub-manifold length>0.04"(0.10 cm) will have FA<0.01.

Construction of a 5 Stream, Integrated Combustor and Reformer

A microchannel-based module was designed to perform steam-reforming of methane, with heat supplied by combustion of air and fuel. The combustion and steam reforming reactions are conducted in the same device, which has three zones:

Manifold: The manifold zone distributes flow into the channels. There are five streams that need to be manifolded. These streams are—Fuel, Air, Exhaust, Reactant and Product. Fuel and air comes into the device and leaves out as exhaust. The reactant comes in, gets processed and exits as Products.

Heat exchanger: The exhaust and the products leaving the device are at high temperature. The heat exchanger recuperates the heat from exhaust and product streams to fuel, air and reactant streams. This recuperation helps in achieving the necessary temperature of streams for chemical reactions in the reactor.

Reactor: The reactor zone is actually a reactor plus a heat exchanger. Most of the chemical reactions occur in the reactor zone. The reactions occurring in the device are: combustion in the fuel channel (both catalytic and homogeneous), and catalytic steam methane reforming reaction in reactant channel. In an optional embodiment, some pre-reforming of either the fuel or process feed may occur in a catalytically coated heat exchanger section.

The fuel channel is coated with different types of catalyst which promotes combustion at low temperatures (heterogeneous combustion). The heat of combustion is transferred through the wall to the reaction channel. This heat drives the steam-reforming reaction.

A module combustion M2M manifold was designed to achieve equal flow distribution of combustion reaction streams (fuel such as natural gas, hydrogen, carbon monoxide, and the like with or without air to the fuel side, air to the air side) to the array of combustion channels so that they would mix inside the connecting microchannels within the module. The air and fuel enter from opposite sides of the module, mix within the combustion section, and the combined exhaust makes a u-turn before traveling down the return microchannel and leaves the end of the module, forming header L-manifolds for both streams.

Since each M2M manifold feeds multiple separate millisecond contact time microchannel reactors (72 in this example, but could range from several to tens of hundreds), it has to distribute large flow rates that have high dynamic pressure ($G^2/(2\rho)=\rho U^2/2$) values. The total combined M2M and channel pressure drop was important, and achieving a good distribution of air and fuel in each channel was especially important due to the need to mix near stoichiometric mixtures of fuel and oxidant (air). The means of achieving equal flow distribution for this system was complicated by a number of fabrication and macro manifold constraints. The resulting design included innovations such as: multiple (six, in the illustrated example) sub-manifolds with multiple (12) channels per sub-manifold; and multiple (3) gates per sub-manifold with multiple (4) downstream connecting channels per gate.

FIG. 4A is an exploded view of shims in the stacked device. FIGS. 4-22 are overhead views of shims that were assembled into the device. The overall size of all the shims is 31.47" (length)×22.00"(width). The shim length and width are as defined in FIG. 4B1. The thickness of the shim is defined in the direction perpendicular to length and width. Shims from 1-28 were stacked on top of each other to form a repeating unit of the device. The stack height of the repeating unit is 0.43". There are total 49 repeating units in the device. The overall height of the device is 23.1". For all the shims, a perimeter margin of 1.00" along the length and 1.50" along the width has been marked. This marked perimeter metal does not become the part of final device and was provided only to enhance metal diffusion bonding. Toward the bottom and sides of all the shims, rectangular slots are made. The purpose of these slots is to provide a location indicator for opening sub-manifolds during post-bonding fabrication operations, such as plunge electrodischarge machining. The slots on the right side are for fuel stream 12 and reactant stream 14 sub-manifolds, the slots on the left side are for air stream 16 and product stream 18 and the slots at the bottom 19 are for exhaust stream.

All the openings in the shims are through slots or holes. Passages for the flow in the device are through slots or holes. The flow between the passages is separated either by ribs (within a shim for the same stream) or wall shims (between different streams)

FIG. 4B1 shows a wall shim. The thickness of the shim is 0.020". This shim separates the reforming reaction stream from the fuel stream. The shim also transfers heat generated in combustion channels to the reaction channels for the steam reforming reaction.

Figure 51:
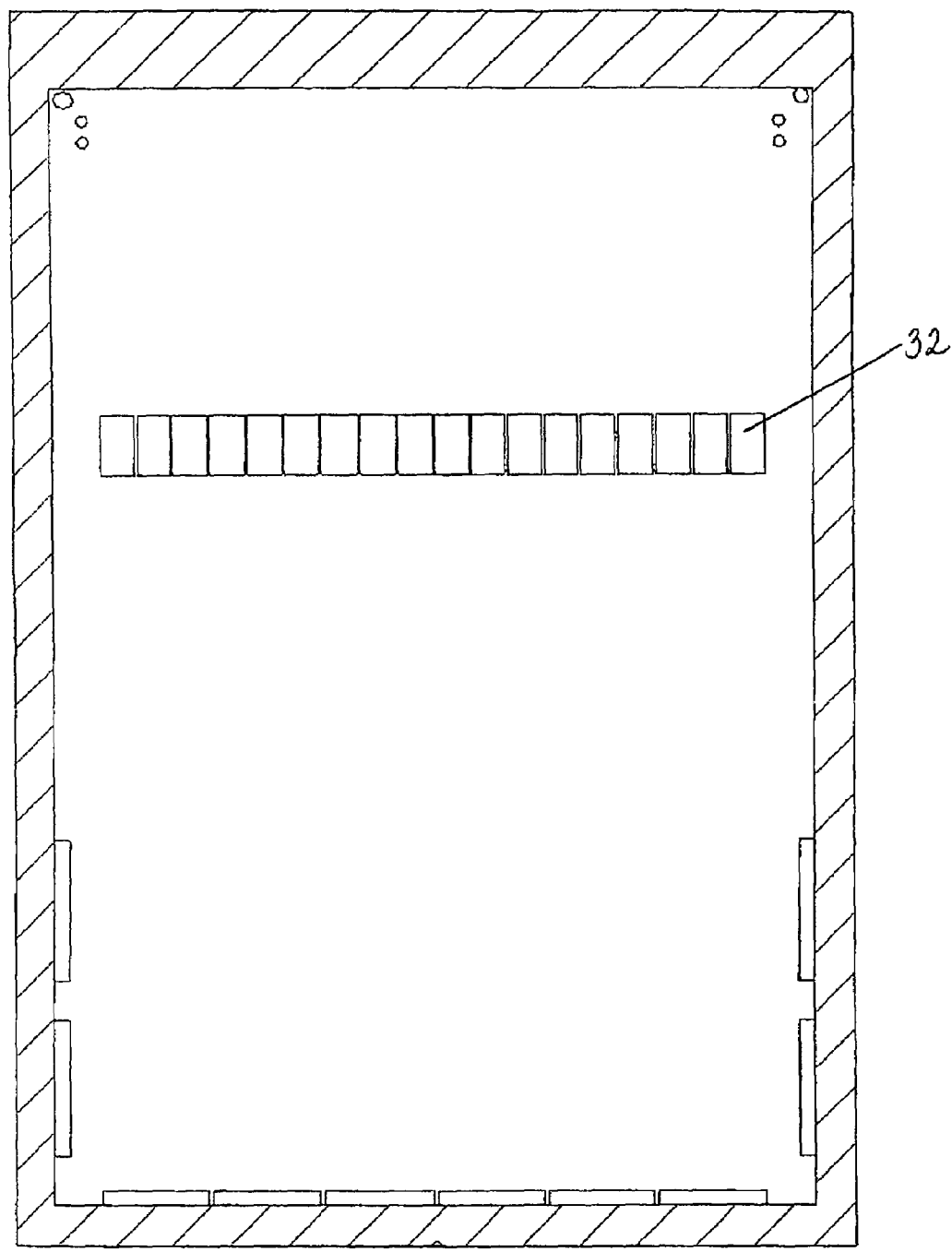

FIG. 51 shows a wall shim. The thickness of the shim is 0.020". This shim separates the reactant stream from fuel stream. The shim also transfers heat generated in combustion channels to the reactant channels for steam reforming reaction. The slots 32 in the shims are to hold catalyst support fins in the fuel channel.

Figure 61:
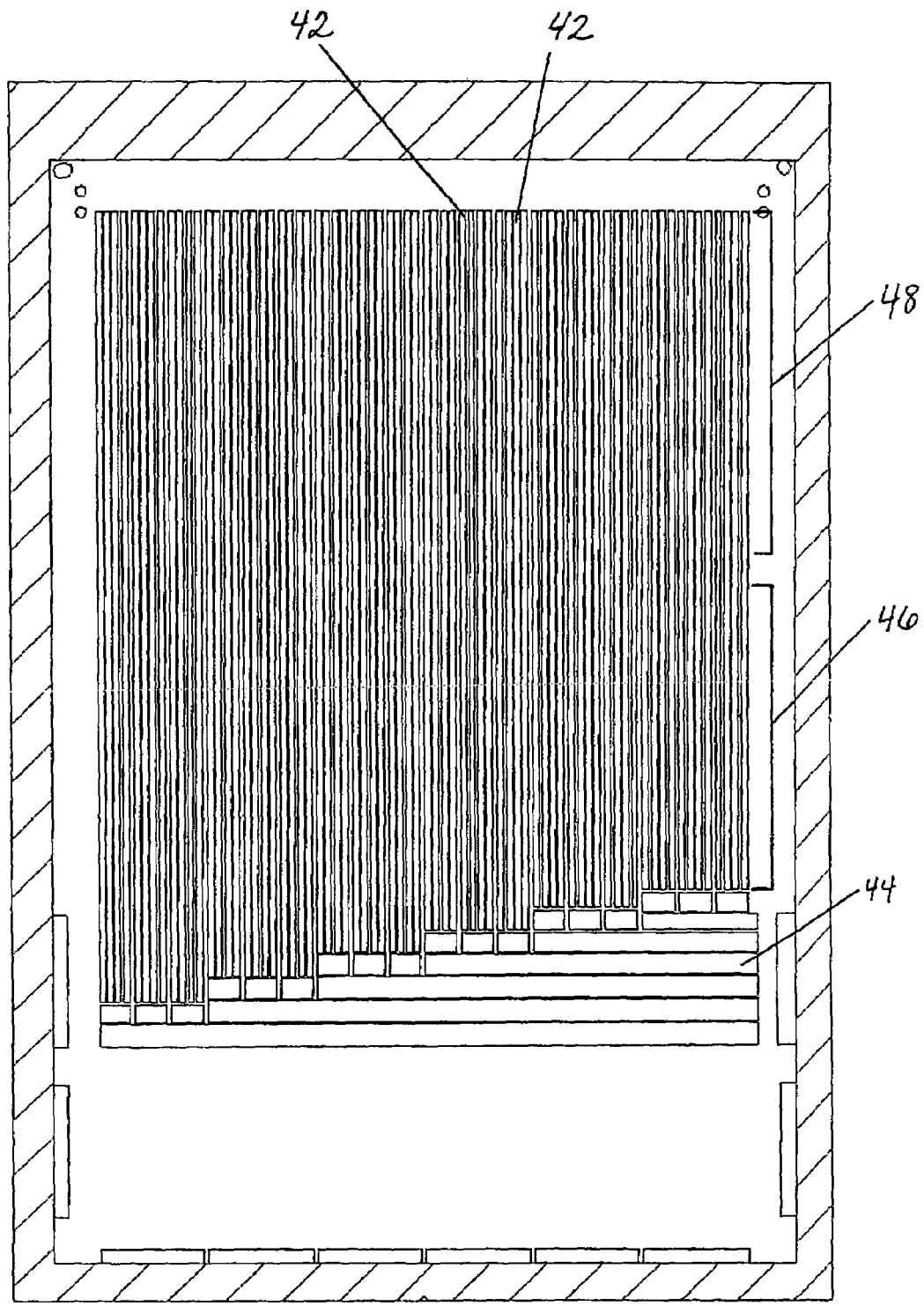

FIG. 61 shows a shim that forms the passage for fuel stream. The thickness of the shim is 0.012". The slots on the shims form features for the fuel stream. The fuel enters from the right end of the shim through 6 inlets 44 (referred as sub-manifolds). The widths of these sub-manifolds perpendicular to the direction of flow, starting from the bottom are 0.60", 0.60", 0.55", 0.50", 0.50" and 0.40". All six sub-manifolds are separated by 0.060" rib. The lengths of the sub-manifolds in the flow direction, starting from the bottom are 16.93", 14.11", 11.29", 8.47", 5.65", and 2.83". The flow from each sub-manifold distributed into three super-channels as shown in the drawing. The flow goes over a 0.060" rib to enter the super-channel from sub-manifolds. The length of super-channels in the direction of flow is 0.50". Each super-channel further divides the flow into four channels. the numerous thin channels 42 are separated by 0.060" ribs except for every 4th rib which is 0.120". All the channels 42 are 0.160" wide. The flow passes through the heat exchanger zone 46, receiving heat from exhaust and product stream and enters combustion zone 48. In the combustion zone, fuel mixes with air and combusts in the presence of combustion catalyst.

FIG. 71 shows another shim that forms the passage for fuel stream in conjunction with the shim shown in FIG. 61. The thickness of this shim is 0.025". The slots on the shims form features for fuel stream. The fuel enters from the right end of the shim through 6 inlets 52 (referred as sub-manifolds). The widths of these sub-manifolds perpendicular to the direction of flow, starting from the bottom are 0.60", 0.60", 0.55", 0.50", 0.50" and 0.40". All six sub-manifolds are separated by 0.060" ribs 54. The lengths of the sub-manifolds in the flow direction, starting from the bottom are 16.93", 14.11", 11.29", 8.47", 5.65", and 2.83". The sub-manifolds have small openings 56 (gates) to meter the flow into the channels. Each sub-manifold has 3 gates. There are a total of 18 gates to meter the flow into the channels. The length of the gates in the flow direction is 0.060". The widths of the gates starting from the right are −0.105", 0.102", 0.094", 0.122", 0.199", 0.103", 0.143", 0.142", 0.127", 0.160", 0.161", 0.145", 0.299", 0.230", 0.152", 0.560", 0.555", and 0.550". The channels 58 are separated by 0.060" ribs except for every 4th rib which is 0.120". All the channels are 0.160" wide. The flow passes through the heat exchanger zone 57, receiving heat from exhaust and product stream and enters combustion zone 59. In the combustion zone, fuel mixes with air and combusts in the presence of combustion catalyst.

Figure 81:
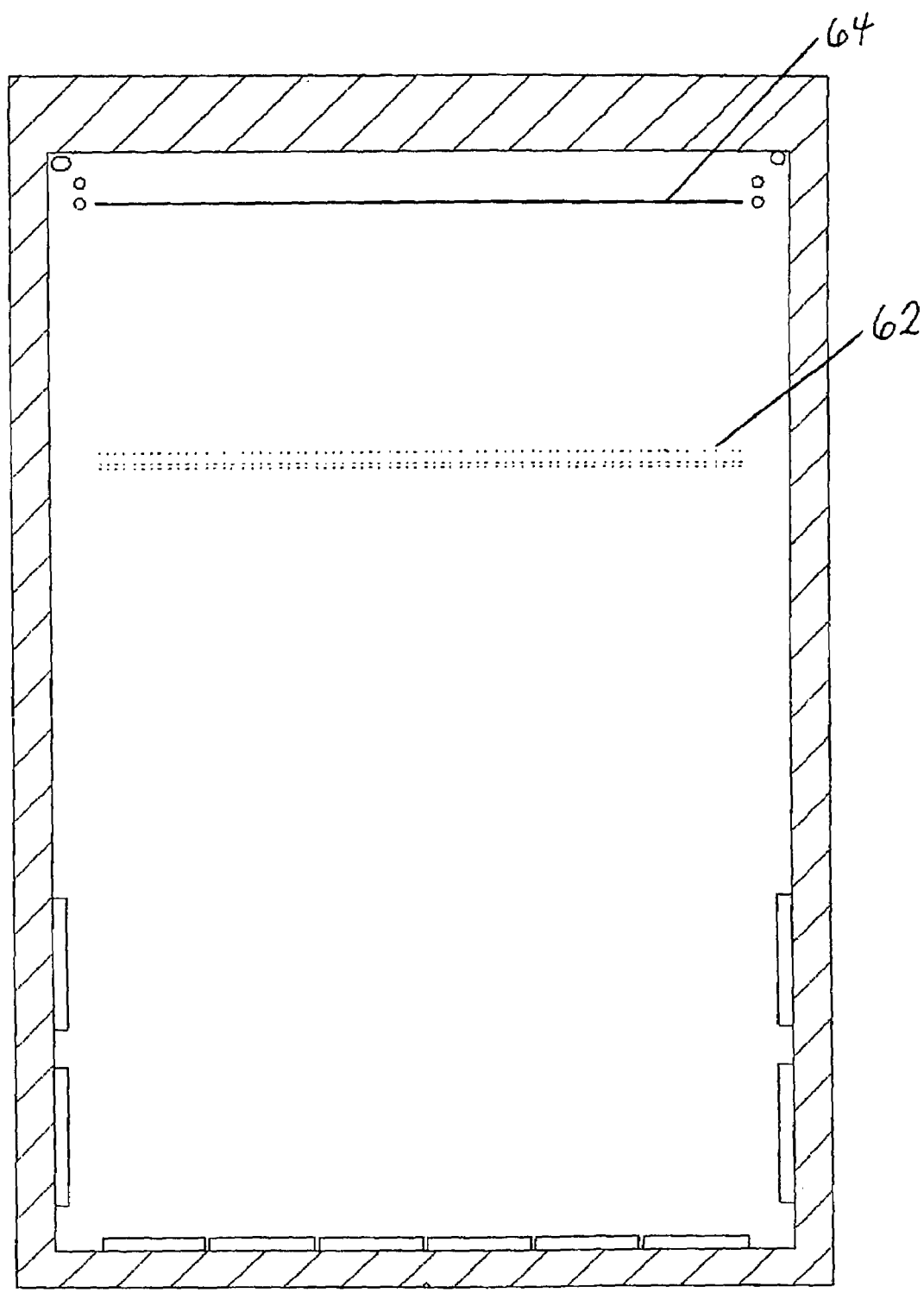

FIG. 81 illustrates a jet shim that acts as a wall shim between fuel and air stream in the manifold and heat exchanger zone. The thickness of this shim is 0.010". In the combustion zone, this shim provides passages 62 (referred as orifices) to mix air into fuel. For every channel (fuel or air), there are 18 orifices to mix air into fuel. Beginning from the bottom, the first orifice is rectangular slots with semi-circular ends of diameter 0.012". The longest length of the slot is in the direction of flow. The second orifice is equilateral triangular in shape with 0.012" side length and is placed at a distance of 0.133" from first orifice. The third & fourth orifices are of 0.012" diameter holes placed 0.267" from the first orifice. The fifth orifice is again a same triangular slot placed 0.386" from the first orifice. Orifice six to fifteen are circular holes with diameter 0.012" and are placed at 0.594", 0.769", 0.969", 1.168", 1.615", 2.112", 2.658", 3.257", 3.257", 3.857", 4.624" from the first orifice. Orifice sixteen and seventeen are 0.012" diameter holes place 5.392" from first orifice.

A continuous 0.050" slot 64 is made on the top of the shim to transport combusted fuel (exhaust) over to exhaust channel. This slot allows flow to travel between connecting channels in between the header and the footer.

Figure 91:
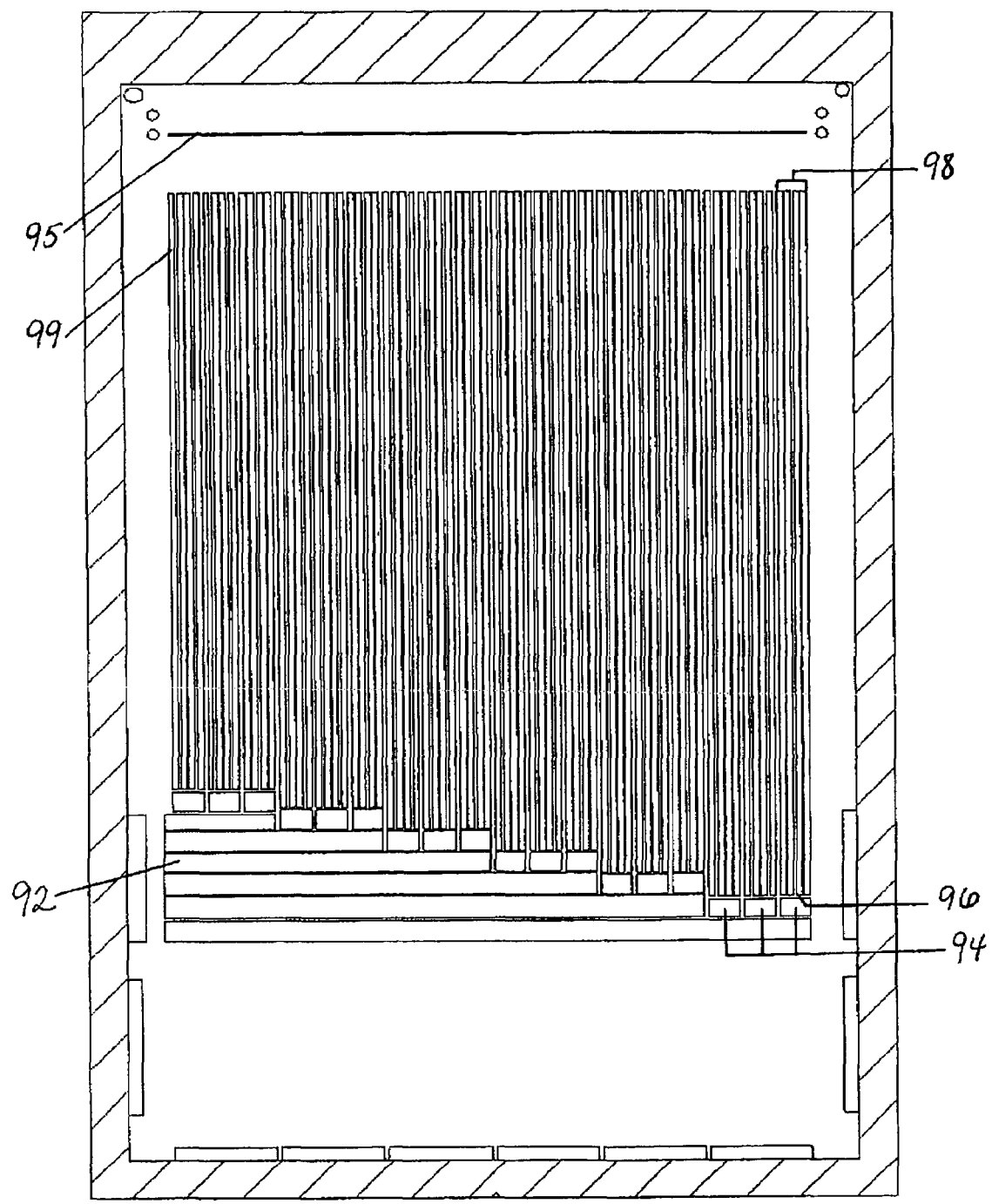

FIG. 91 shows the shim that forms the passage for the air stream. The thickness of the shim is 0.012". The slots on the shims form features for air stream. The air enters from the left end of the shim through 6 inlets 92 (referred as sub-manifolds). The widths of these sub-manifolds perpendicular to the direction of flow, starting from the bottom are 0.60", 0.60", 0.55", 0.50", 0.50" and 0.40". All six sub-manifolds are separated by a 0.060" rib. The lengths of the sub-manifolds in the flow direction, starting from the bottom are 16.93", 14.11", 11.29", 8.47", 5.65", and 2.83". The flow from each sub-manifold distributes into three super-channels 94 as shown in the drawing. The flow goes over 0.060" rib 96 to enter the super-channel from sub-manifolds. The length of super-channels in the direction of flow is 0.50". Each super-channel further divides the flow into four channels. These channels are separated by 0.060" ribs except for every 4th rib which is 0.120". All the channels 99 are 0.160" wide. The flow passes through the heat exchanger zone, receiving heat from exhaust and product stream and enters the combustion zone. In the combustion zone, air flows into the F1 (FIG. 41) and F2 shim (FIG. 51) through orifices 62 to combust the fuel. A continuous 0.050" tall slot 95 is made on the top of the shim to transport combusted fuel (exhaust) over to the exhaust channel.

Figure 101:
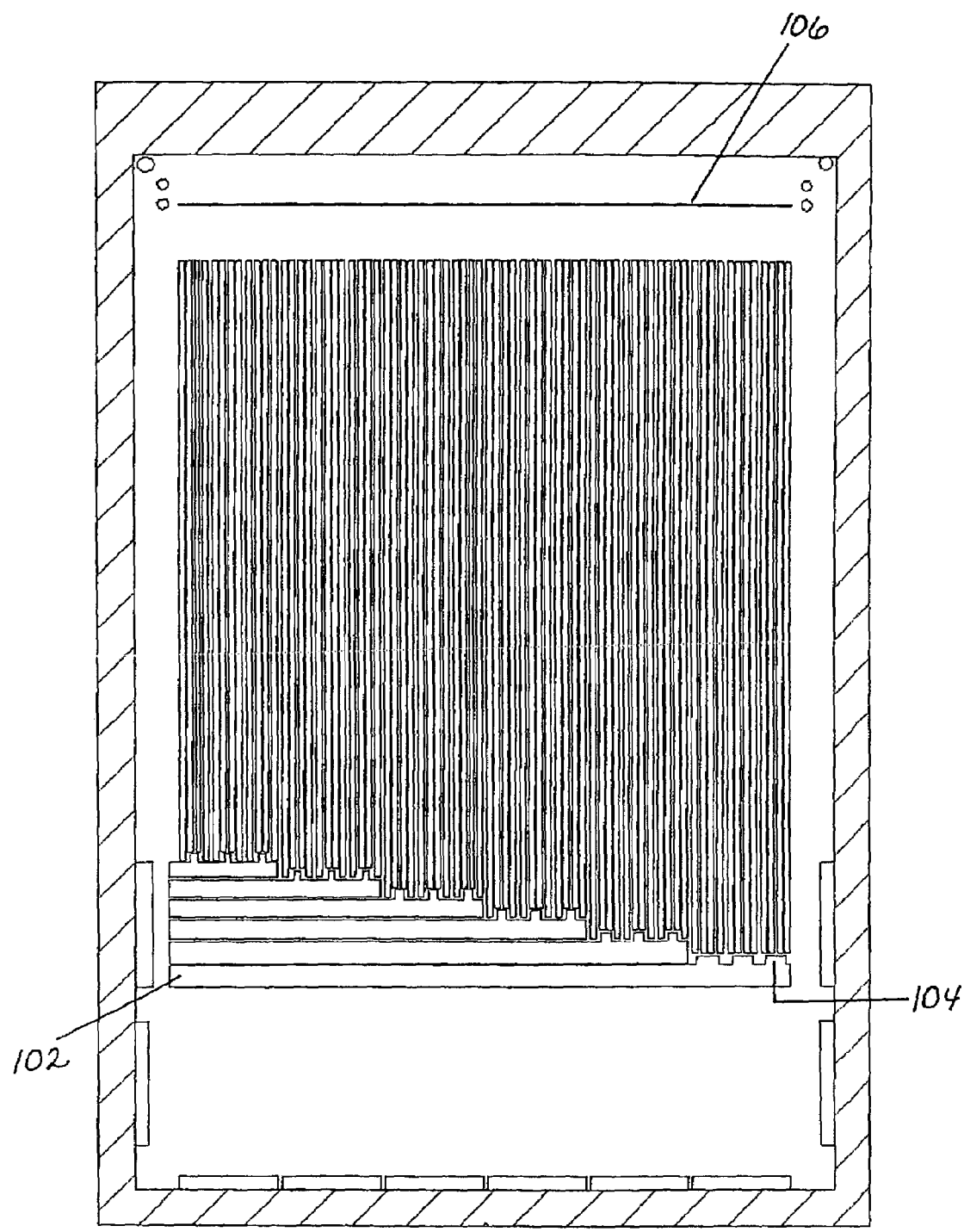
Figure 11L:
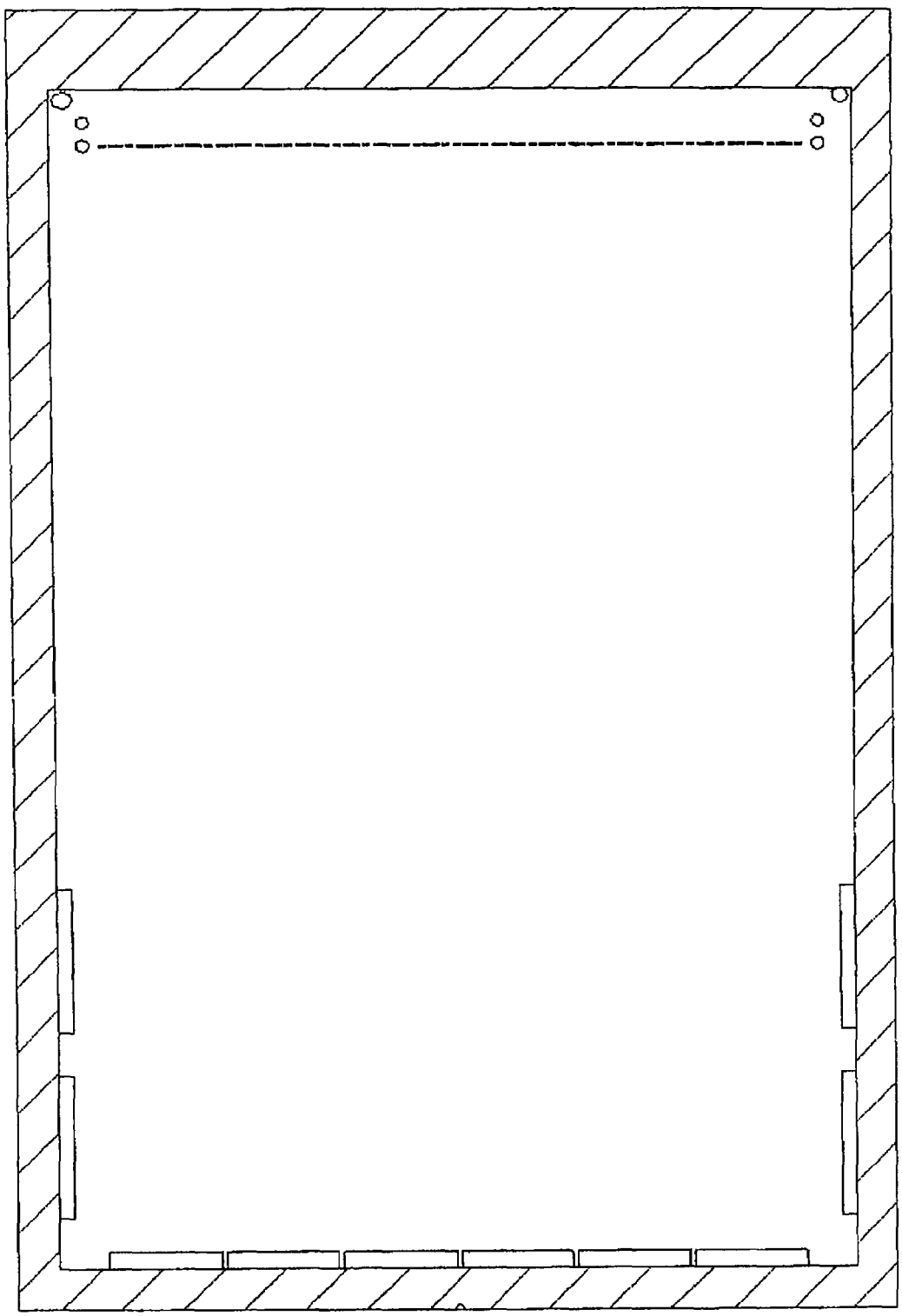

FIG. 101 shows another shim that forms the passage for the air stream in conjunction with the shim shown in FIG. 91. The thickness of the shim is 0.025". The slots on the shims form features for the air stream. The air enters from the left end of the shim through 6 inlets (referred as sub-manifolds). The widths of these sub-manifolds perpendicular to the direction of flow, starting from the bottom are 0.60", 0.60", 0.55", 0.50", 0.50" and 0.40". All six sub-manifolds are separated by a 0.060" rib. The lengths of the sub-manifolds in the flow direction, starting from the bottom are 16.93", 14.11", 11.29", 8.47", 5.65", and 2.83". The sub-manifolds have small openings (gates) to meter the flow into the channels. Each sub-manifold has 3 gates 104. There are total 18 gates to meter the flow into the channels. The length of the gates in the flow direction is 0.060". The widths of the gates starting from the right are −0.188", 0.175", 0.172", 0.165", 0.167", 0.167", 0.240", 0.235", 0.232", 0.260", 0.260", 0.260", 0.277", 0.277", 0.277", 0.590", 0.580", and 0.588". The channels are separated by 0.060" ribs except for every 4th rib which is 0.120". All the channels are 0.160" wide. The flow passes through the heat exchanger zone, receiving heat from exhaust and product stream and enters the combustion zone. In the combustion zone, air flows through the jet shim to react with the fuel in the fuel channels. A continuous 0.050" tall slot 106 on the top of the shim to transports combusted fuel (exhaust) over to exhaust channel.

FIG. 111 shows a wall shim that separates the air stream from the exhaust stream. The thickness of the shim is 0.010". On the top of the shim there are slots through which combusted fuel (exhaust) passes over to the exhaust channel.

FIG. 121 shows a shim with exhaust stream channels. The thickness of the shim is 0.020". The exhaust stream flows from top of the shim to the bottom of the shim. All the passages for the flow are 0.160" wide and are separated by 0.060" ribs except for every 4th rib which is 0.0120". The exhaust enters a passage from a U-turn at the top of the shim, passes through the heat exchanger zone exchanging heat with fuel and air and flows out at the bottom of the shim.

Figure 131:
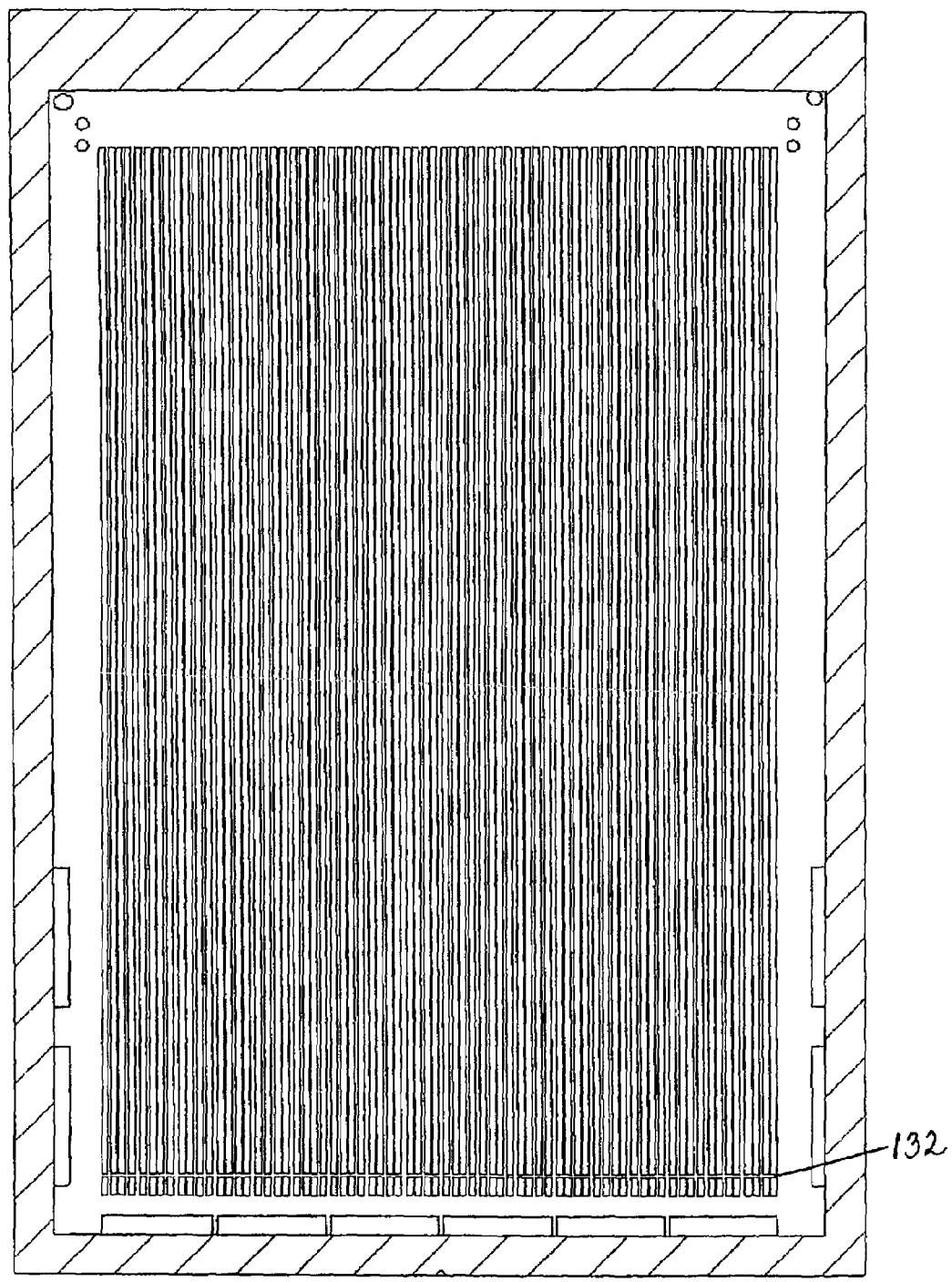

FIG. 131 shows a shim with exhaust stream channels that pair with the channels in the shim shown in FIG. 12. The thickness of the shim is 0.020". The exhaust stream flows from top of the shim to the bottom of the shim. All the passages for the flow are 0.160" wide and are separated by 0.060" ribs except for every 4th rib which is 0.0120". The exhaust enters at the top of the shim in the reactor zone, passes through the heat exchanger zone exchanging heat with fuel and air and flow out at the bottom of the shim. At the bottom, a rib 132 of 0.060" serves as support for bonding.

Another shim identical to the shim in FIG. 12 is stacked over the shim in FIG. 13.

Another shim identical to the shim in FIG. 11 is next in the shim stack. Followed by another shim identical to that shown in FIG. 10. Followed by another shim identical to that shown in FIG. 9. Followed by another shim identical to that shown in FIG. 8. Followed by another shim identical to that shown in FIG. 7. Followed by another shim identical to that shown in FIG. 6. Followed by another shim identical to that shown in FIG. 5. Followed by another shim identical to that shown in FIG. 4B.

Figure 141:
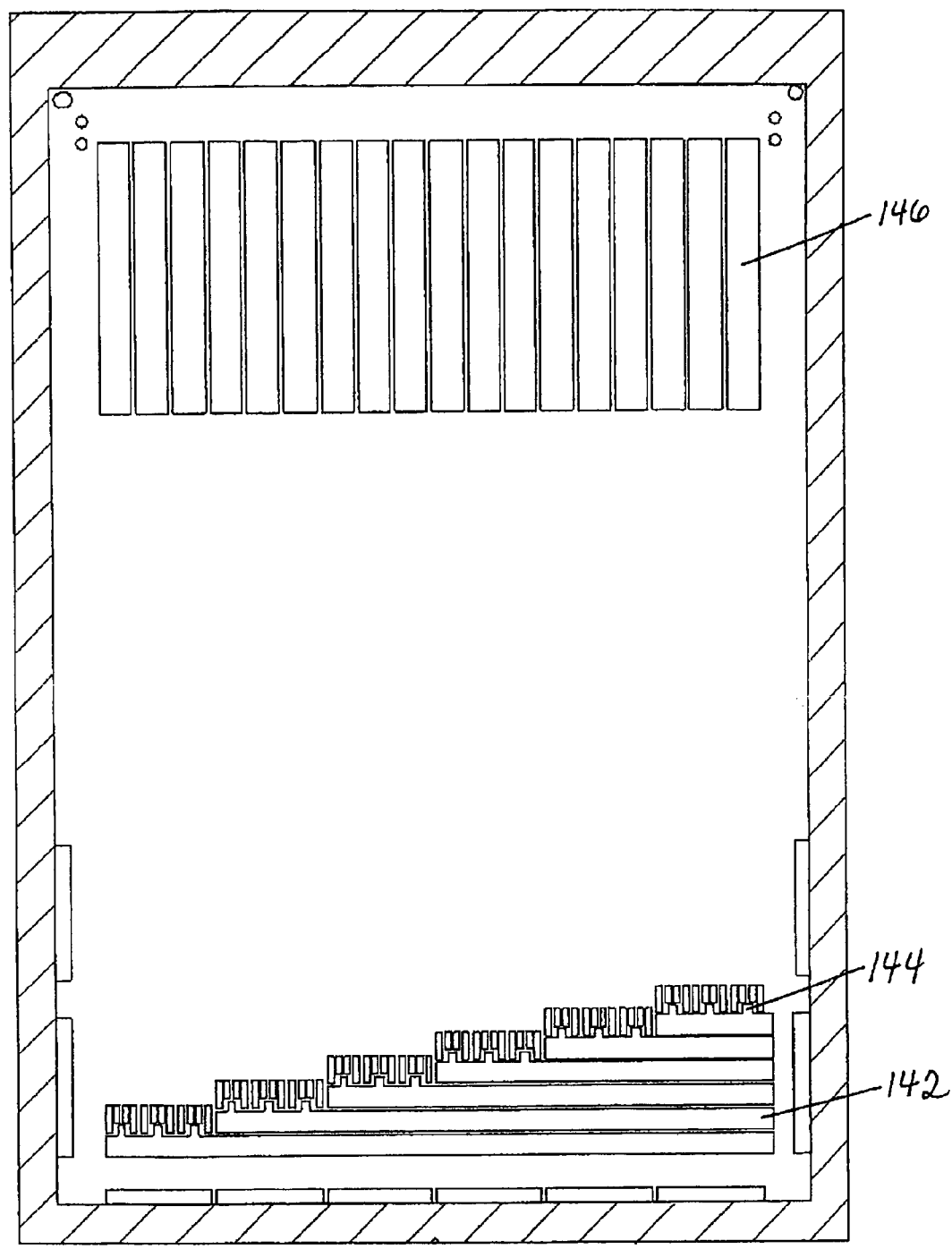

FIG. 141 shows the shim that forms the passage for reactant stream. The thickness of the shim is 0.010". The slots in the shim form passages for the flow of reactant stream. The reactant enters from the right end of the shim through 6 inlets 142 (referred as sub-manifolds). The widths of these submanifolds perpendicular to the direction of flow are 0.539". All six sub-manifolds are separated by 0.060" rib. The lengths of the sub-manifolds in the flow direction, starting from the bottom are 16.93", 14.11", 11.29", 8.47", 5.65", and 2.83". The sub-manifolds have small openings 144 (gates) to meter the flow into the channels. Each sub-manifold has 3 gates. There are a total 18 gates to meter the flow into the channels. The length of the gates in the flow direction is 0.060". The widths of the gates starting from the right are –0.229", 0.209", 0.173", 0.229", 0.209", 0.173", 0.229", 0.209", 0.173", 0.229", 0.209", 0.173", 0.229", 0.209", 0.173", 0.229", 0.209", and 0.173". The channels are separated by 0.060" ribs except for every 4th rib which is 0.120". All the channels are 0.160" wide. The length of the flow passage in the shim from the respective sub-manifold is 0.70". In the reactor zone, slots 146 (7.00" long and 0.82" wide) are made. The purpose of these slots is to hold the fins which provide surface area for steam-reforming reaction.

Figure 151:
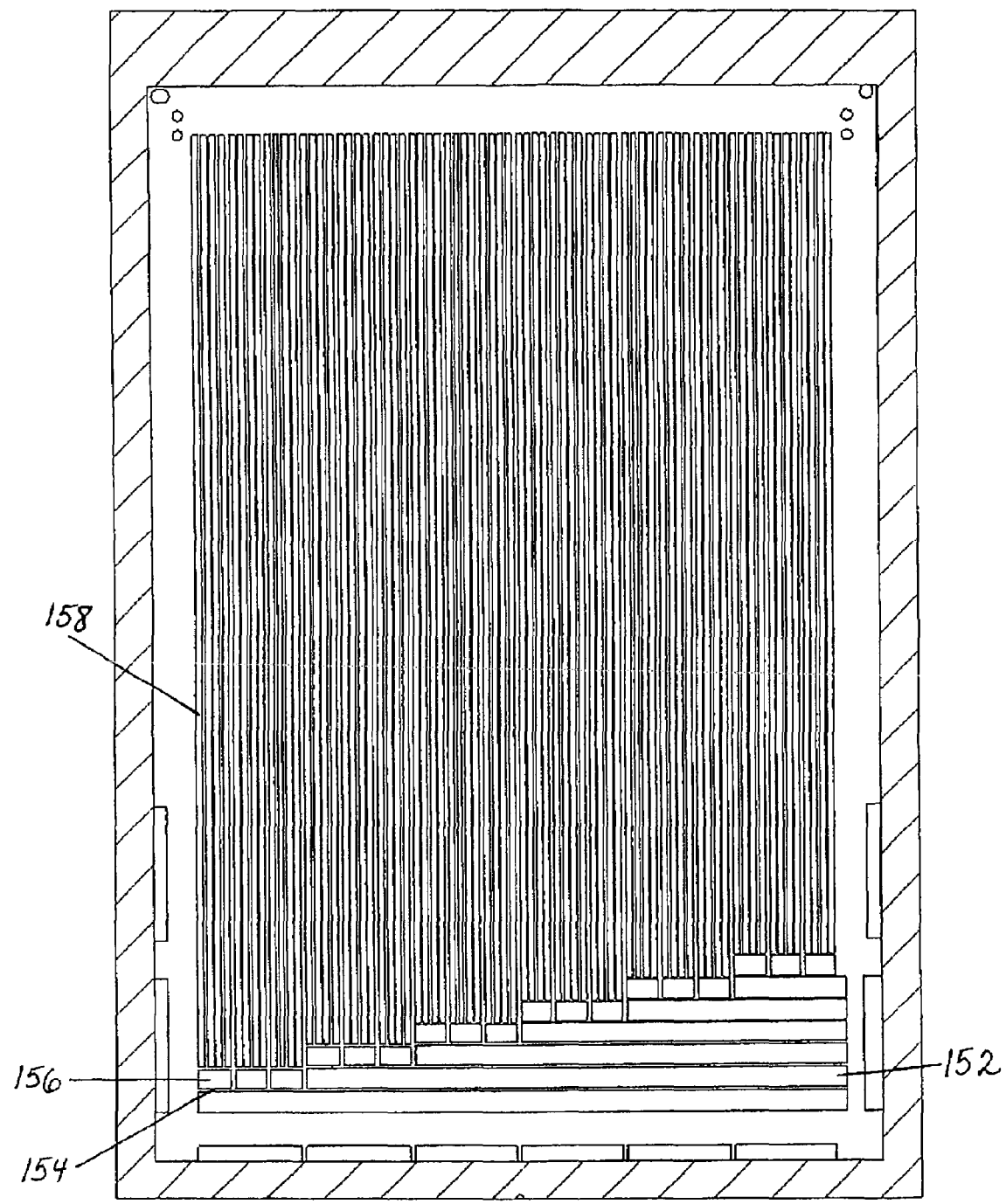

FIG. 151 shows another shim that forms the passage for reactant stream in conjunction with the shim shown in FIG. 151. The thickness of the shim is 0.012". The reactant enters from the right end of the shim through 6 inlets 152 (referred as sub-manifolds). The widths of these sub-manifolds perpendicular to the direction of flow are 0.539". All six sub-manifolds are separated by 0.060" rib. The lengths of the sub-manifolds in the flow direction, starting from the bottom are 16.93", 14.11", 11.29", 8.47", 5.65", and 2.83". The flow from each sub-manifold distributed into three super-channels as shown in the drawing. The flow goes over a 0.060" rib 154 to enter the super-channel 156 from sub-manifolds. The length of super-channels in the direction of flow is 0.539". Each super-channel further divides the flow into four channels 158. Channels are separated by 0.060" ribs except for every 4th rib which is 0.120". All the channels are 0.160" wide. The flow passes through the heat exchanger zone, receiving heat from product and exhaust stream and enters the reactor zone. In the reactor zone, the steam reforming reaction occurs in the presence of combustion heat.

FIG. 161 shows a wall shim that separates the reactant stream from the product stream. The thickness of the shim is 0.010". A continuous 0.050" slot 162 is made on the top of the shim to transport products formed in the reactant channel over to the product channel.

Figure 171:
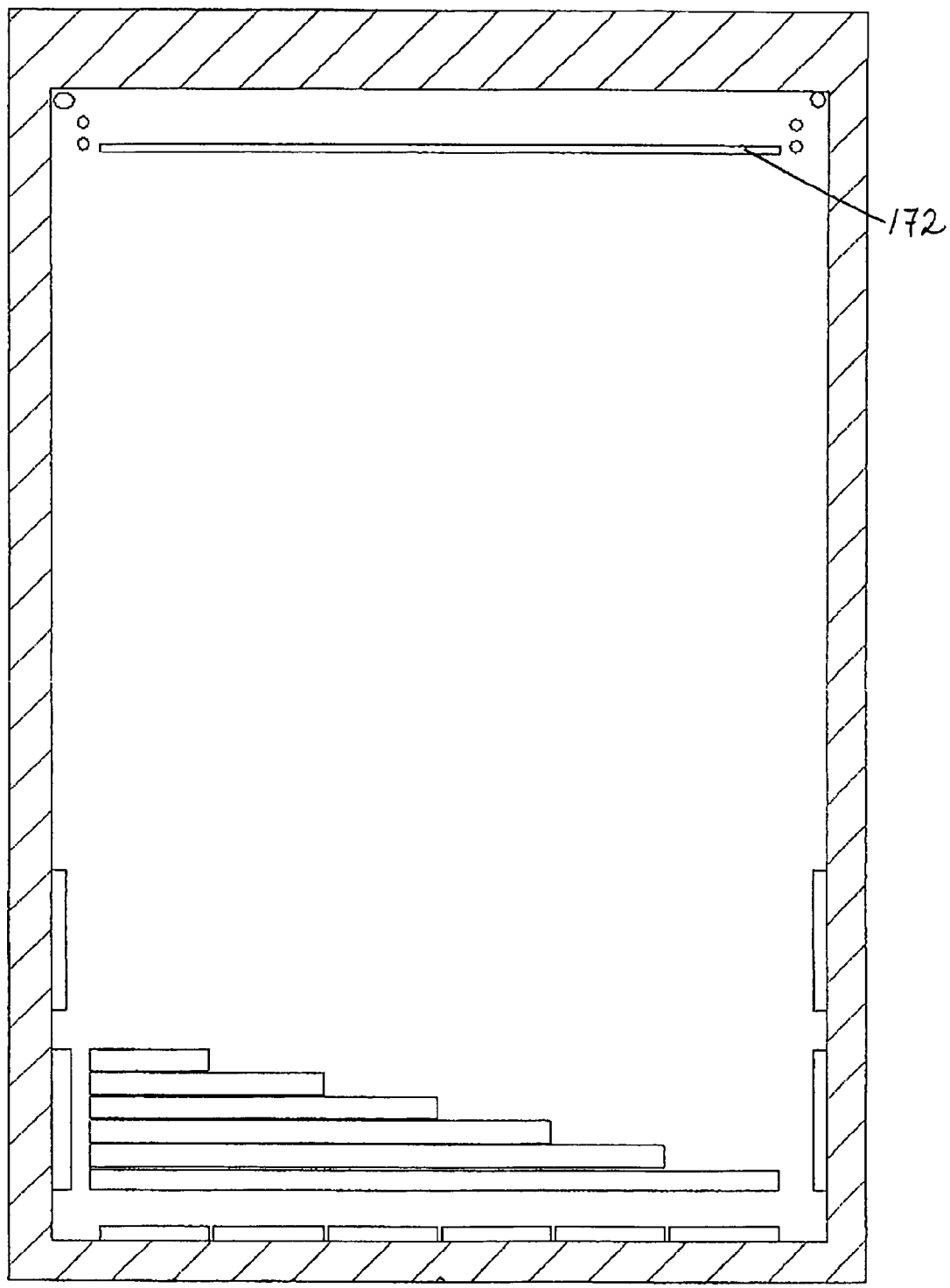

FIG. 171 shows the wall shim and separates the reactant stream from the product stream. The thickness of the shim is 0.010". A continuous 0.21" tall slot 172 is made on the top of the shim serves to transport products formed in the reactant channel over to the product channel.

Figure 181:
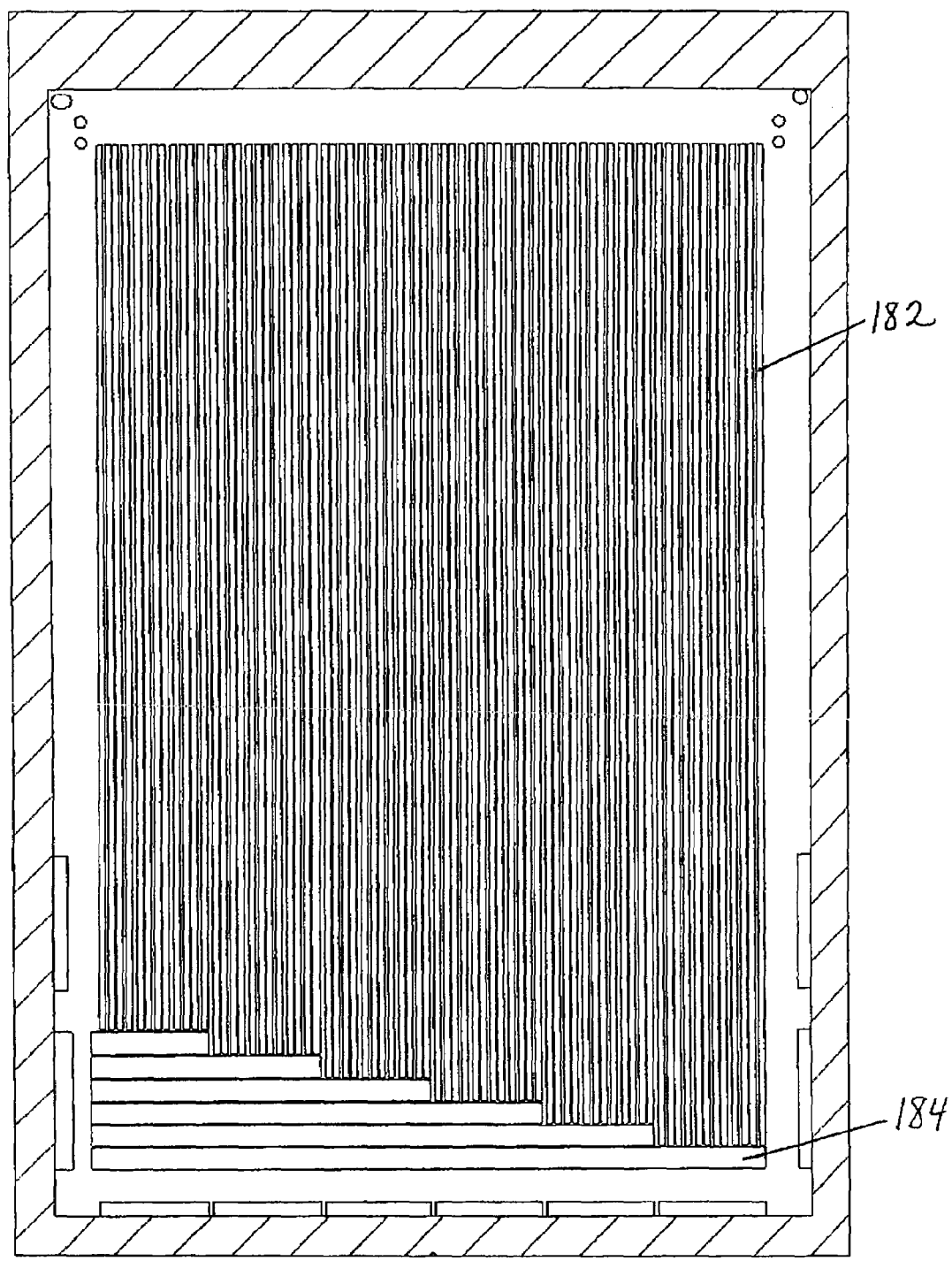

FIG. 181 shows a shim for product flow. The thickness of the shim is 0.018". The product flows in the passages from the top of the shim to the bottom of the shim. Passages are 0.160" wide and are separated by 0.060" rib except for every 4th rib which is 0.120" wide. The flow from the passages is then collected in another set of passages 184 (referred as sub-manifold) that run perpendicular to first set of passages. These passages are separated from first set of passages by 0.060" ribs that in conjunction with shims in FIG. 171 and FIG. 191 form "grates". The width of each sub-manifold in the direction perpendicular to flow direction is 0.539". The lengths of sub-manifolds in the flow direction starting from bottom sub-manifold are 16.93", 14.11", 11.29", 8.47", 5.65", and 2.83".

FIG. 191 shows a wall shim that separates reactant stream from product stream. The thickness of the shim is 0.010". A continuous 0.21" tall slot 192 is made on the top of the shim to transport products formed in the reactant channel over to the product channel.

FIG. 201 shows a wall shim and separates reactant stream from product stream. The thickness of the shim is 0.010". A continuous 0.050" tall slot 202 is made on the top of the shim to transport products formed in the reactant channel over to the product channel.

FIG. 211 shows the shim that forms the passage for reactant stream. The thickness of the shim is 0.012". The reactant enters from the right end of the shim through 6 inlets 212 (referred as sub-manifolds). The widths of these sub-manifolds perpendicular to the direction of flow are 0.539". All six sub-manifolds are separated by 0.060" ribs 214. The lengths of the sub-manifolds in the flow direction, starting from the bottom are 16.93", 14.11", 11.29", 8.47", 5.65", and 2.83". The flow from each sub-manifold distributed into three super-channels 216 as shown in the drawing. The flow goes over a 0.060" rib 218 to enter the super-channel from sub-manifolds. The length of super-channels in the direction of flow is 0.539". Each super-channel further divides the flow into four channels 219. Channels are separated by 0.060" ribs except for every 4th rib which is 0.120". All the channels are 0.160" wide. The flow passes through the heat exchanger zone, receiving heat from product and exhaust stream and enters the reactor zone. In the reactor zone, the steam reforming reaction occurs in the presence of combustion heat.

FIG. 221 shows a drawing of a shim that in conjunction with shim in FIG. 211 forms the flow channels for reactant stream. The slots in the shim form passages for the flow of reactant stream. The reactant enters from the right end of the shim through 6 inlets (referred as sub-manifolds). The widths of these sub-manifolds perpendicular to the direction of flow are 0.539". All six sub-manifolds are separated by 0.060" rib. The lengths of the sub-manifolds in the flow direction, starting from the bottom are 16.93", 14.11", 11.29", 8.47", 5.65", and 2.83". The sub-manifolds have small openings (referred as orifices) to meter the flow into the channels. Each sub-manifold has 3 orifices. There are total 18 orifices to meter the flow into the channels. The length of the flow opening in the flow direction is 0.060". The widths of the openings starting from the right are –0.229", 0.209", 0.173", 0.229", 0.209", 0.173", 0.229", 0.209", 0.173", 0.229", 0.209", 0.173", 0.229", 0.209", 0.173", 0.229", 0.209", and 0.173". The channels are separated by 0.060" ribs except for every 4th rib which is 0.120". All the channels are 0.160" wide. The length of the flow passage in the shim from the respective sub-manifold is 0.70". In the reactor zone, slots (7.00" long and 0.82" wide) are made. The purpose of these slots is to hold the fins which provide surface area for steam-reforming reaction.

Manifolding and Microchannel Features

Cross-sectional area restrictions in gates and grates, preferably at the front of connecting channels, can be formed, for example, by: holes through walls, bumps from a lower surface, wall projections, and combinations of these. Features such as rounded bumps can be formed by etching.

Manifold walls can be rounded (such as to appear like a race track). Flow into a manifold can enter from above or below; and, in many preferred embodiments, in-plane, such as from a side header attached to the side of a laminated shim stack. Manifold walls can be solid or with gaps.

In some embodiments (see FIG. 23), a manifold (in the illustrated case, a footer) can be used to separate two phases of differing density in a microchannel device by gravity and/or centrifugal forces.

Walls between connecting channels may be the same or different lengths. Gates to groups of channels can be centered or offset from the center of the gate's connecting channels. FIG. 24 illustrates a manifold structure with an offset gate and channels of differing lengths. In the illustrated manifold, flow momentum (of a stream entering from the side of the connecting channels) for a centered gate would tend to force the greatest flow through downstream channel 242 on the far right side due to the incoming stream coming from left to right; however, the gate 244 positioned in the downstream portion of the manifold (in the illustrated embodiment, the gate is attached to the downstream manifold wall 246) blocks a portion of the flow. Another feature that can be used independently of or in conjunction with offset gates are longer internal walls 248 (not 246) positioned downstream (relative to the direction of flow into the manifold) to restrict flow. Thus, flow is more equally distributed through the connecting channels. In preferred embodiments, at least one internal channel wall in the downstream section 249 of a connecting channel set is longer than a channel wall in the upstream section. More preferably, at least two (or at least 4) internal channel walls in the downstream section 249 of a connecting channel set are longer than a channel wall in the upstream section. Still more preferably, the downstream section 249 of a connecting channel set contains at least two internal channel walls 243, 248 that project progressively further into a manifold zone 245. Preferably, there are a combination of an offset and at least one internal channel wall in the downstream section 249 of a connecting channel set longer than a channel wall in the upstream section, since this combination can provide more equal flow distribution (smaller $Q_1$ or $Q_2$) for large flow rates than either feature individually. In this embodiment, "longer" means projecting the channel further into a manifold zone 245. A similar design concept can also be used for the footer. When the steams of two or more connecting channel combine at a manifold connection, the stream from the connecting channel farthest from the footer manifold's outlet will have a larger momentum vector in the manifold's flow direction than those connecting channel closer to the manifold's exit. This will lower the flow resistance for the farthest away channel for leaving the manifold connection, so to balance the flow leaving the channels we can then vary the geometry around the channel as described above for 242.

Figure 25A:
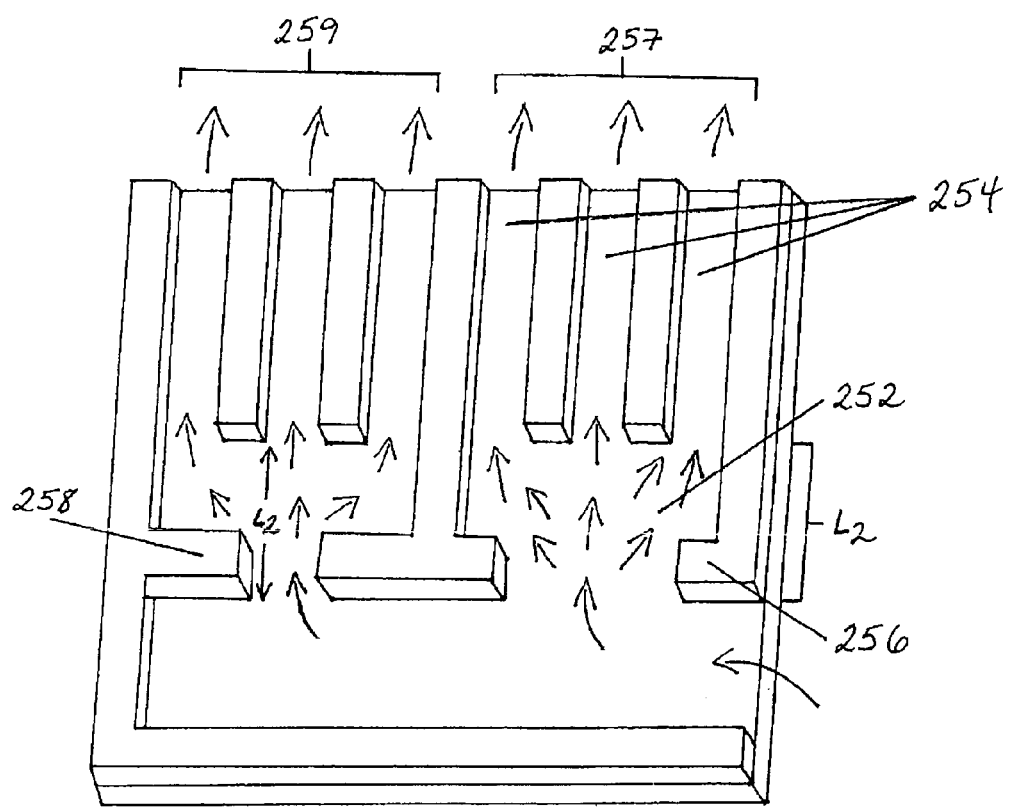

FIG. 25a illustrates flow straightening in a multiple gate configuration. Flow enters from the side and is momentum biased toward flow through the downstream portion of the connecting channels. Gates 256, 258 can be used to equalize flow between channel sets 257, 259. Flow through connecting channels 254 can be equalized by extending the length of a manifold zone a distance $L_2$ (or, in the case of FIG. 25a, a submanifold zone 252). Preferably, the zone has a length $L_2$ of at least three times longer than the manifold length $L_{M2M}$ (see FIG. 1A1) in the flow direction, in some embodiments at least 6 times longer than the manifold length $L_{M2M}$, in some embodiments, to save space $L_2$ is 20 times or less longer than the manifold length $L_{M2M}$. Unless corrected by other means, shorter zones suffer from biased flow while excessively long zones may unnecessarily add cost and reduce performance (for example, by adding frictional losses). Like all features described herein, this feature can be combined with the other designs described herein.

Figure 25C:
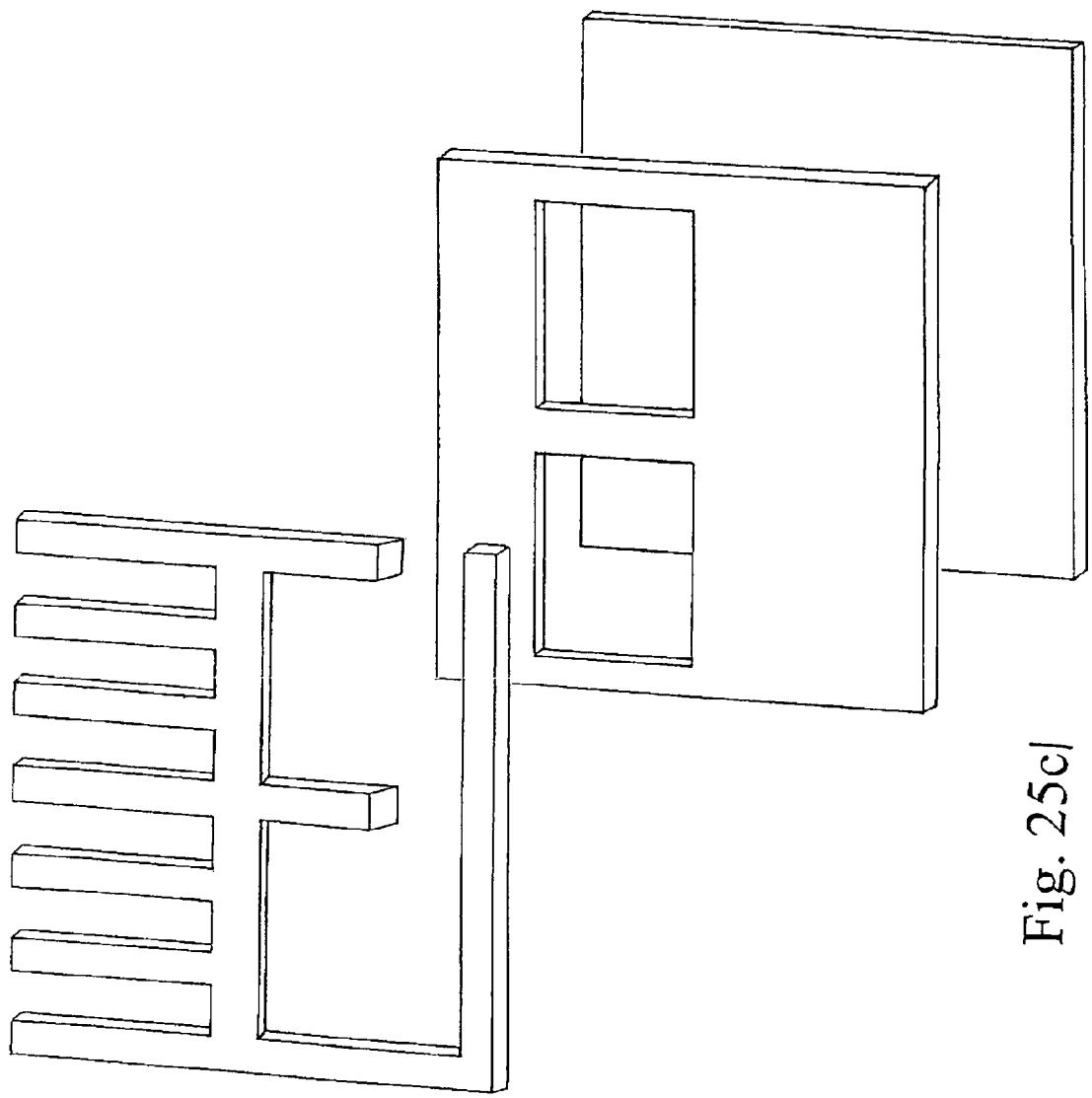

FIG. 25b1 shows a manifold with a straightening zone 2502 and a flow bump (a grate) 2504 before the entrance of the connecting channels 2506. Entering stream 2505 may come from a side manifold in which flow emanates from above, below, or in the plane. FIG. 25c is an exploded view of sheets that can be used to form the manifold/channel structure.

Figure 26B:
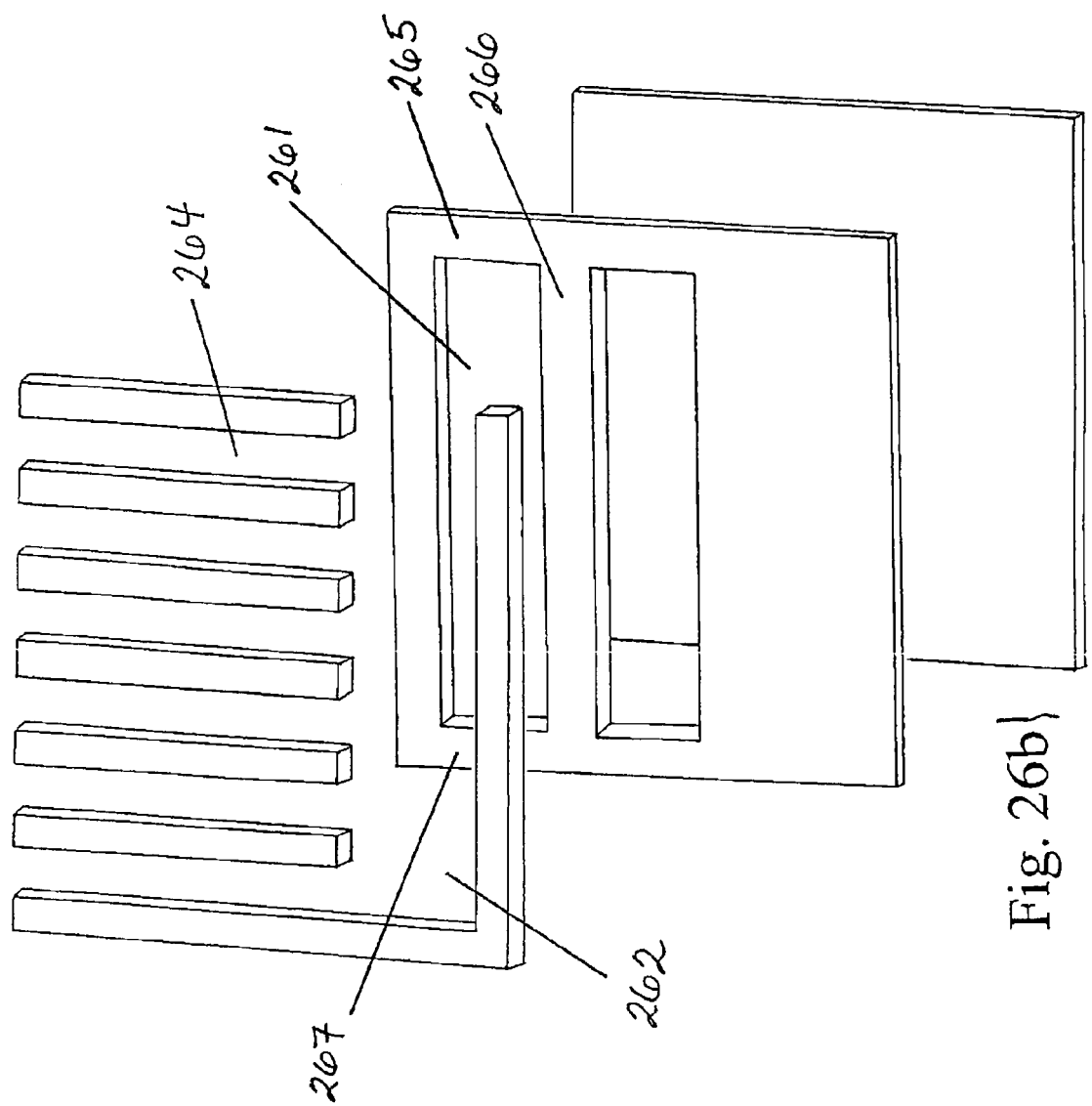
Figure 271:
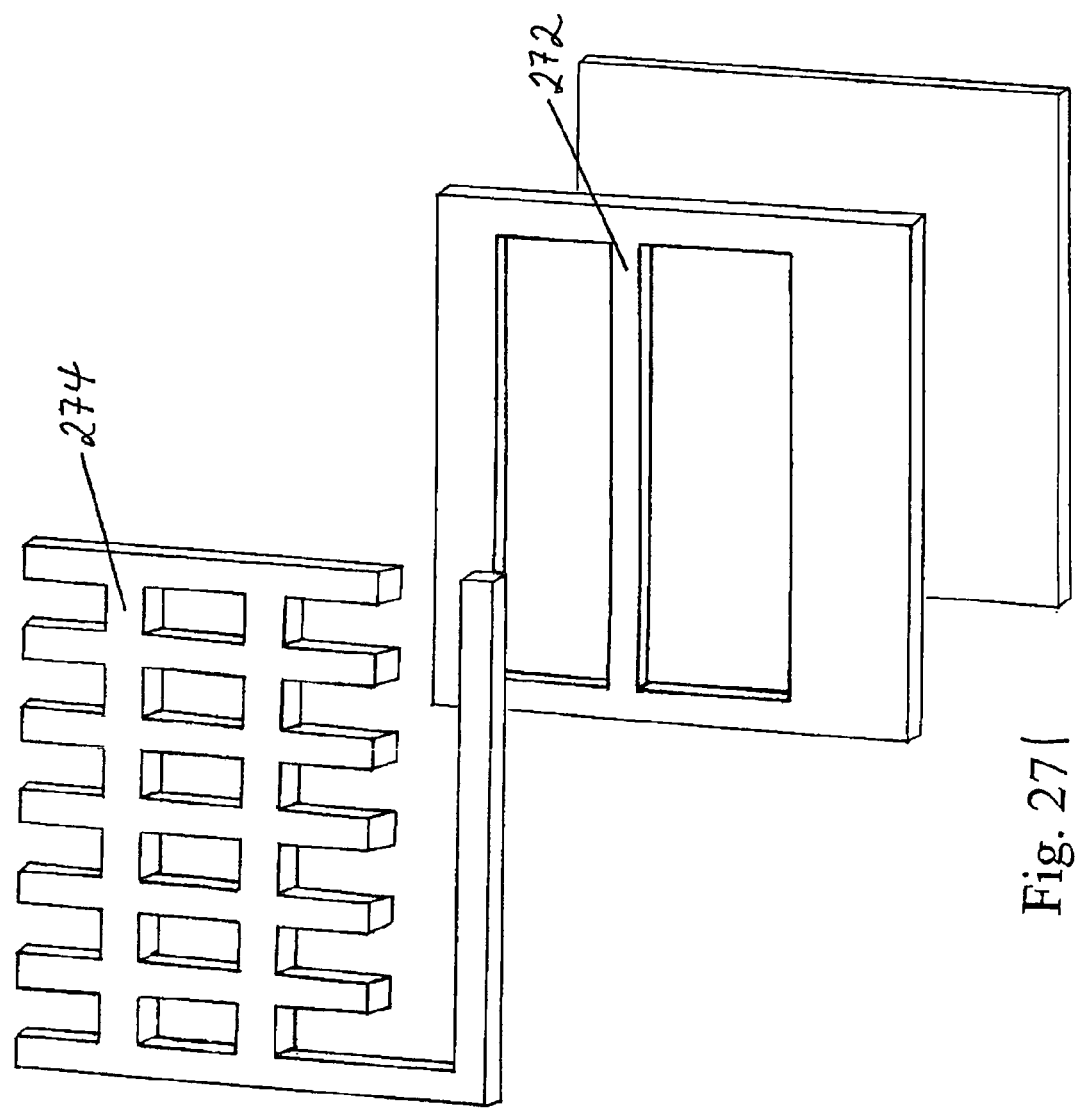
Figure 281:
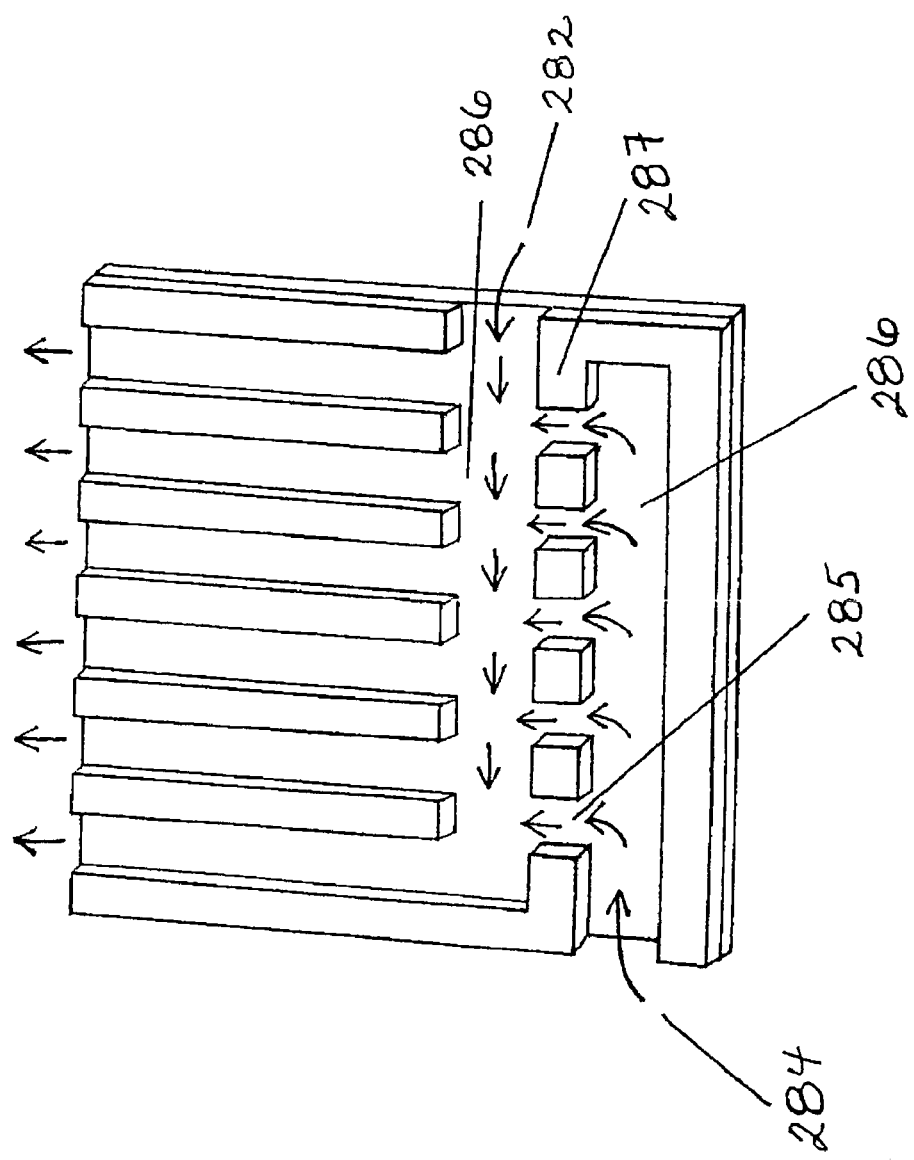
FIG. 281 illustrates a cross flow manifold with openings for mixing.

FIGS. 26a and 26b illustrate a manifold 262 with straight connecting channels 264. The connecting channels are partially blocked by flow bumps 266. The flow enters the connecting channels from the manifold, but can redistribute amongst channels through the cross-connecting channels underneath the connecting channels. Two such cross-connecting channels are shown in FIG. 25a1, made by the layer 266. The advantage for such a system is that cross-connecting channels in 266 can allow for redistribution of flow should manifold design not allow for acceptable distribution due to space constraints.

A modified version of the structure of FIG. 26 could be microchannel apparatus, comprising: an array of parallel microchannels disposed in a plane; wherein the array of parallel microchannels are connected at one end by an inlet manifold and at their opposite end by an outlet manifold; and at least one channel disposed above or below the array of parallel microchannels and disposed at an angle of at least 20 degrees (preferably substantially 90 degrees) relative to the parallel microchannels and disposed between the inlet manifold and outlet manifold and connected via openings to the parallel microchannels in the array. Such a structure could be obtained by forming connections through the walls 265, 267 of second channel 261. The connections through the walls 265, 267 would connect to an inlet and outlet respectively so that there could be cross flow through the second channel. In some embodiments (not shown) a plate can separate the first and second layers except for an aperture or apertures through the plate to provide communication between the first layer and the second channel. Such a construction could be used, for example, to mix components or as a pathway to add a coating material from one layer to the next.

FIG. 27 is an exploded view (also a preassembled view) of an alternative design having flow bumps 272, 274 in an alternating arrangement such that there is no straight flow path through the connecting channels. This structure creates extensive interchannel mixing.

In addition to flow distribution, manifolds may also perform a mixing function. FIG. 28 illustrates a manifold with cross-current flows 282, 284 that mix over the length of the manifold zone 286 via gaps 285 in dividing wall 287. This cross-flow mixing reduces momentum biased flow into the connecting channels. The mixing can be a single component, two or more reactants, or two phases. In the illustrated embodiment, the in-flows are coplanar; however, it should be appreciated that mixing could alternatively or additionally be accomplished through holes in the sheet above or below the manifold.

As illustrated in FIG. 29, a manifold can be inclined to change the cross-sectional area of the manifold in the direction of flow, which changes the local connecting channel interface to manifold area ratio and the channel M2M manifold aspect ratio. By "inclined" is meant that the height (not merely the width) of the manifold varies. Preferably, the manifold slopes upward so that the smallest volume is adjacent to the connecting channel furthest downstream (i.e., the opposite of the slope in FIG. 29). This structure can be made by etching.

In some embodiments, the gates from the manifold to the connecting channels can be angled. This is schematically illustrated in FIG. 30. An angled opening can be made by etching. The angled flows can add or subtract from turning loss resistance and can be designed to make flow more equal through the connecting channels. Here, "angled" means that the gate is sloped such that the center line through the gate forms an angle between 2 and 98 degrees or between 92 and 178 degrees, more preferably between 20 and 80 or between 100 and 170 degrees with respect to the center line through the connecting channels. Preferably, the design is as illustrated where at least one channel (or preferably more) that is in the upstream section of the manifold is angled to reduce turning loss (with flow) while at least one channel (or preferably more) that is in the downstream section of the manifold is angled to increase turning loss (against flow).

FIG. 31 illustrates an exploded (or preassembly) view of stacked connecting channels that include an offset region 312 that allows interchannel mixing. In an offset configuration, a channel wall or walls in a first layer extend to provide a fluid pathway into a second adjacent layer.

Another option to reduce the effects of flow momentum is to place baffles within the headers (not shown).

Figure 32:
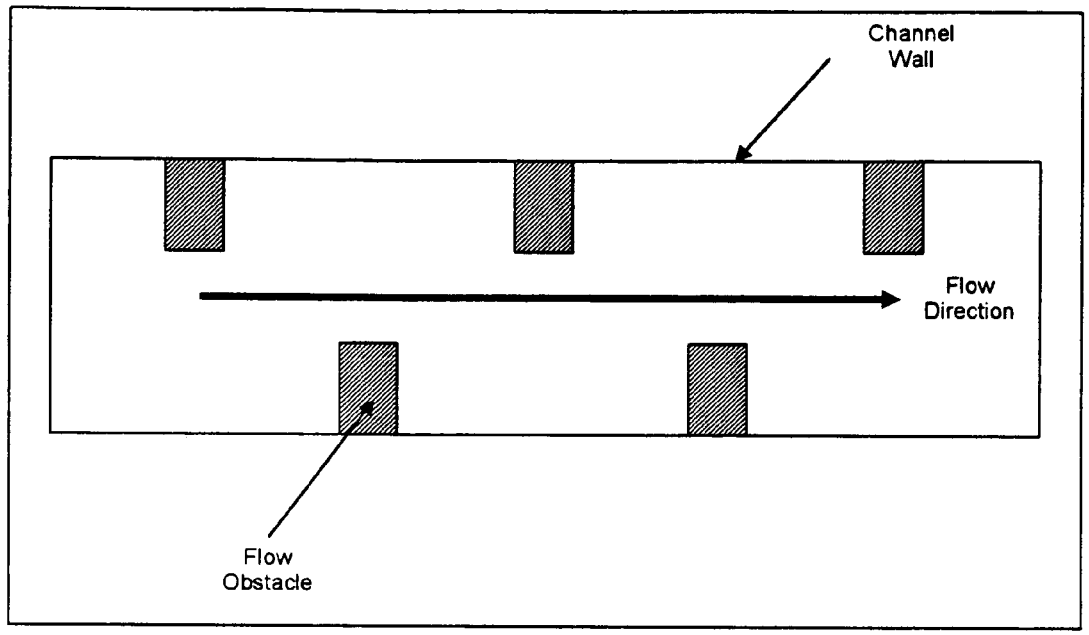
FIG. 32 is an exemplary diagram of a microchannel having components to enhance flame acceleration and turbulence therein in accordance with the present invention.

FIG. 32 illustrates an alternative form of gate in which porous bodies are placed between a manifold 322 and connecting channels. Preferably for a header manifold for a Z-manifold or L-manifold the porous bodies are arranged such that the greatest resistance to flow is present in the porous body 324 furthest downstream relative to the manifold while the relatively less resistance to flow is present in upstream porous body 326 for a header manifold with a Mo value greater than 0.05. This puts the highest flow resistance for the zone with the highest static pressure value in the manifold, a product of increasing static pressure from momentum compensation. A header for a U-manifold with a Mo value greater than 0.05 may want the order reversed from that described for the Z-manifold and L-manifold headers to compensate for momentum compensation and friction losses in the footer. More generally, it is preferred that a porous body with a relatively greater resistance to flow is located downstream in the header manifold relative to a porous body with a relatively lesser resistance to flow for a header manifold for a Z-manifold or L-manifold. The reverse is true for the U-manifold. For flow distribution through connecting channels of equal width, at least 3 porous bodies increase in flow resistance with increasing distance downstream in the manifold. The porous bodies can be catalytic (e.g. in a reactor) or noncatalytic. A foam is a preferred example of a porous body.

Figure 33:
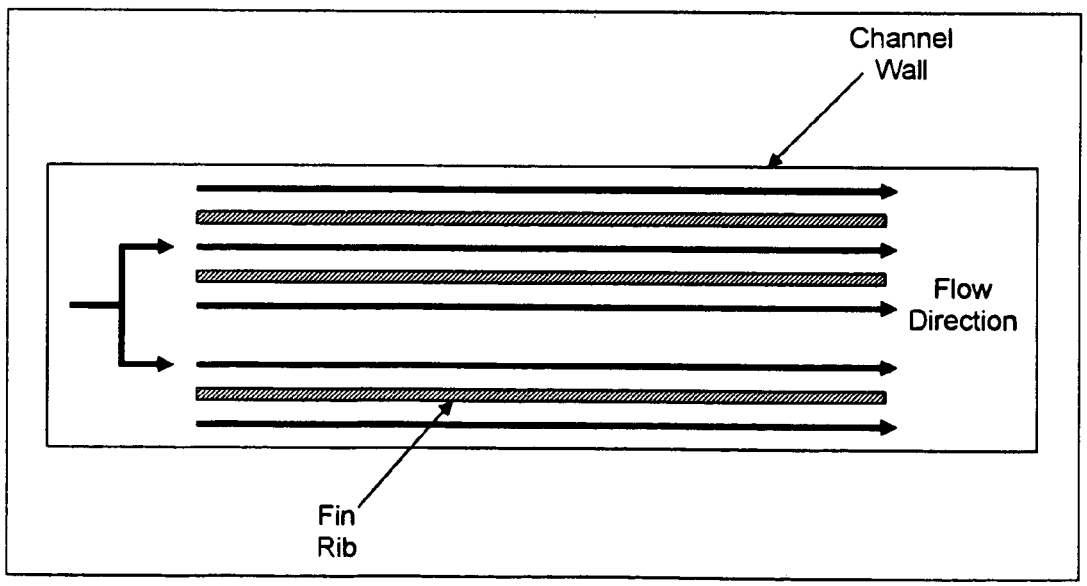
FIG. 33 is an exemplary diagram of a microchannel having components to suppress flame turbulence and induce flame stretching therein in accordance with the present invention.
Figure 321:
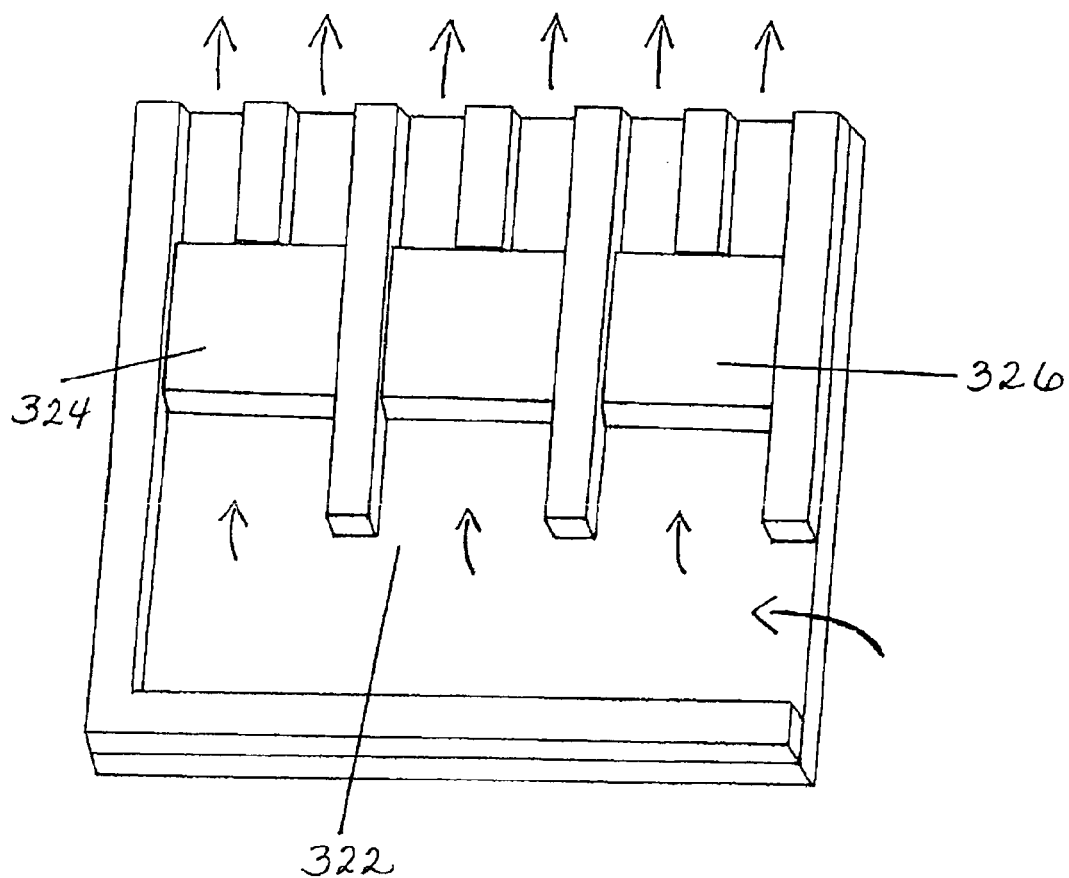
FIG. 321 illustrates a gate design in which porous bodies provide equal flow.
Figure 331:
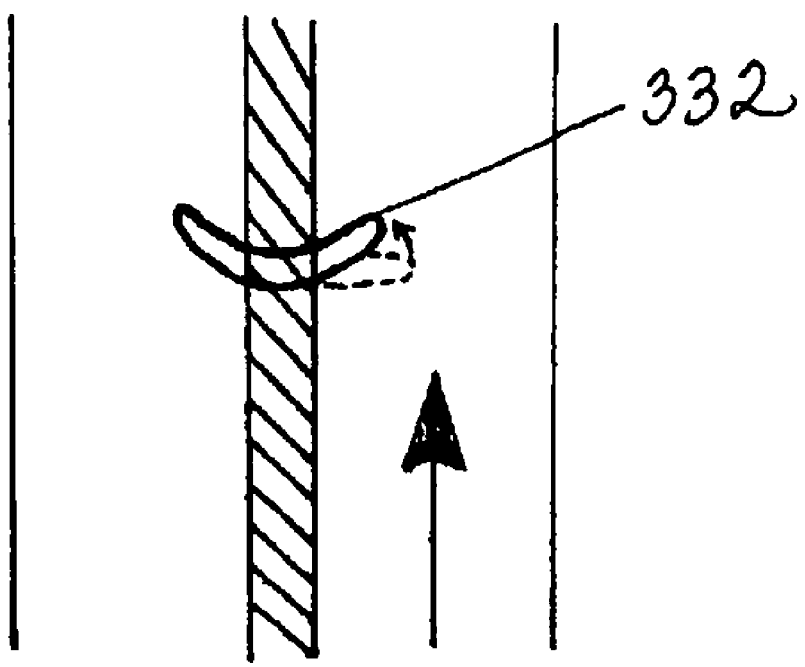
FIG. 331 illustrates a flexible wall projection that alters flow through a channel.

FIG. 33 illustrates an embodiment in which flow is affected by a flexible projection 332 through a channel wall. The flexible projection can project from one side of a wall or through a channel wall and into both adjacent channels.

Multiple microdevices 3402, 3404, each with an internal micro-to-macro manifold may be further connected together with a macromanifold 3405 (see FIG. 34A) to achieve any desired capacity or productivity. This level of manifolding may comprise pipes or ducts that connect streams between microdevices. At least one stream can be in a single pipe 3406 or duct with an inlet 3407 or outlet 3408 to each parallel microdevice. In some embodiments, all streams are connected with a unique pipe or duct. In one embodiment, one or more outlet streams 3409 vents to the atmosphere, such as the case of a combustion exhaust stream.

The pipes or ducts that connect multiple microdevices preferably maintain a hermetic seal around the respective inlet or outlet of a fluid stream for each microdevice. The hermetic seal may be achieved by welding or gasket connections. For a microdevice with multiple inlets or outlets, the connecting macromanifold pipes or ducts may be connected to each other but in a gas-tight manner to prevent cross-stream leaks or connections. As an example, an inner pipe that contains the inlet for one stream, may contain an outer pipe that is attached to the inner pipe around a portion of the circumference of the inner pipe (not shown). Multiple pipes or ducts may be connected in this manner. An advantage of this approach includes a reduced amount of metal weight for the macromanifold, control of the thermal profile along the pipes to reduce stress imposed material thickness limits, and reduced total volume required for the macromanifold system.

The macromanifold represents the first level of flow distribution. Flow enters from a single source and is distributed to two or more microdevices. After flow enters each microdevice it is further optionally segregated into multiple submanifolds. From each submanifold, flow may be further distributed to multiple connecting channels. Finally, an optional embodiment includes a further level of flow distribution to multiple subchannels within each microchannel. Each subchannel may take the form of a fin (either inserted or formed integrally to the device) or other flow distributor housed within a microchannel. There may be three, four, or more levels of flow distribution required for the operation of microdevices that produce a quality index factor of less than 30%, or any of the preferred Q values discussed herein.

Flow Distribution in Two Dimensions

Where there is a need to distribute flow to two-dimensional array of connecting channels, in the stacking direction and in the planes of channels, often there are options that allow for using a single manifold for distribution. These single manifolds can be large ducts or pipes, and they are often used for cross-flow applications. For these cases, the frictional losses play a smaller role as the length of the manifold over hydraulic diameter becomes small (L/D~1). However, the momentum driven phenomena, the momentum compensation and turning losses, become the main driving force for flow distribution and should be accounted for within the design. The manifold physics change from those of the high M2M manifold aspect ratio channel terms discussed in the one dimensional manifold section. The less significant turning losses for the high aspect ratio channel is due to the cross-sections of large ducts that have square perimeters or have pipe or half-pipe perimeters. The turning losses for these cases have less wall shear stress than seen for the high aspect ratio rectangular channels. The next two concepts describe means of improving flow distribution to two dimensional channel arrays.

One problem with flow distribution is maldistribution through a connecting channel matrix due to the momentum of incoming flow. A central feed inlet and central feed outlet can lead to channeling through the center of the matrix, as seen in cross-flow heat exchangers. See Lalot et al, Applied Thermal Engineering, v. 19, pp. 847-863, 1999; Ranganayakulu and Seetharamu, Heat and Mass Transfer, v. 36, pp. 247-256, 2000).

Also, a single inlet tangent to the direction of flow can result in a stream that distributes the bulk of the flow to the channels opposite to the inlet and could induce large recirculation zones in the header and footer, recirculation from the header to the footer and recirculation or stagnant zones in the device.

Figure 34:
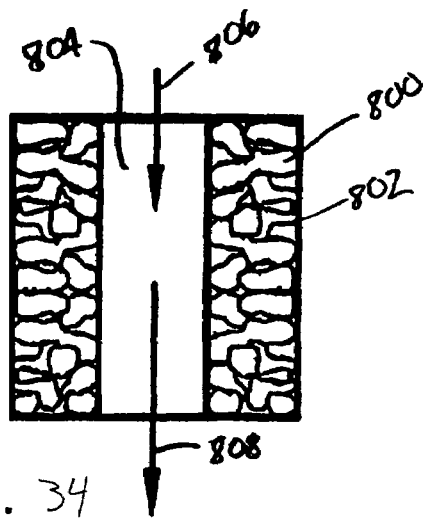
FIG. 34 is a schematic illustration of a process microchannel that may be used with the inventive process, the process microchannel containing a catalyst having a flow-by configuration.

A device that ameliorates these problems is illustrated in FIG. 34B which is a top-down view inside a channel in a device having multiple inlets 3406 parallel to the direction of flow. In the illustrated design, inlet flow is introduced from both sides of a sub-manifold 3402. If flow is introduced from only one side, the bulk of the flow would leave via the header inlet farthest from the main inlet. A simulation indicated that that this arrangement was successful in eliminating recirculation zones, recirculation from the footer to header and stagnant areas in the device. The basic distribution for this option is biased to the center but to a greatly reduced extent as compared to other options.

Also illustrated in FIG. 34B are optional flow directors 3404 that can direct flow through a chamber. These flow directors can be louvers (or paddles) that can be collectively or individually rotated to direct flow in a desired direction. A louver system was designed where all of the louvers are attached together by an adjoining rod, which will allow all of the louvers to move and rotate at the same time, same direction and to the same position. The use of louvers provides a convenient way of changing flow directions within a device. The louvers are able to shift the flow such that it can be biased to the left, middle and right. Thus, in one example, the flow directors are rotatable louvers.

In some preferred embodiments, a heat exchange fluid is passed through the chamber with the heat exchange fluid biased. Stacked adjacent to the illustrated heat exchange chamber, either above and/or below, is a reaction chamber (not shown) in which reactants pass in a cross-flow relationship relative to the heat exchange fluid. This orientation is advantageous if the reaction rate is greatest at the front or back of the reaction chamber and this high-reacting-rate portion is matched to the biased flow through the heat exchanger such that the highest flow of heat exchange fluid is directly adjacent to the highest reaction rate in the adjacent reaction chamber.

Flow Distribution Plates

Figure 35:
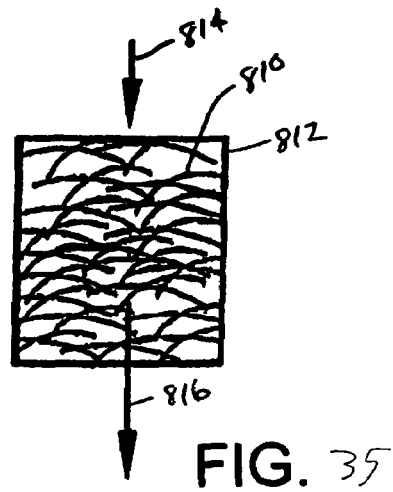
FIG. 35 is a schematic illustration of a process microchannel that may be used with the inventive process, the process microchannel containing a catalyst having a flow-through configuration.
Figure 36:
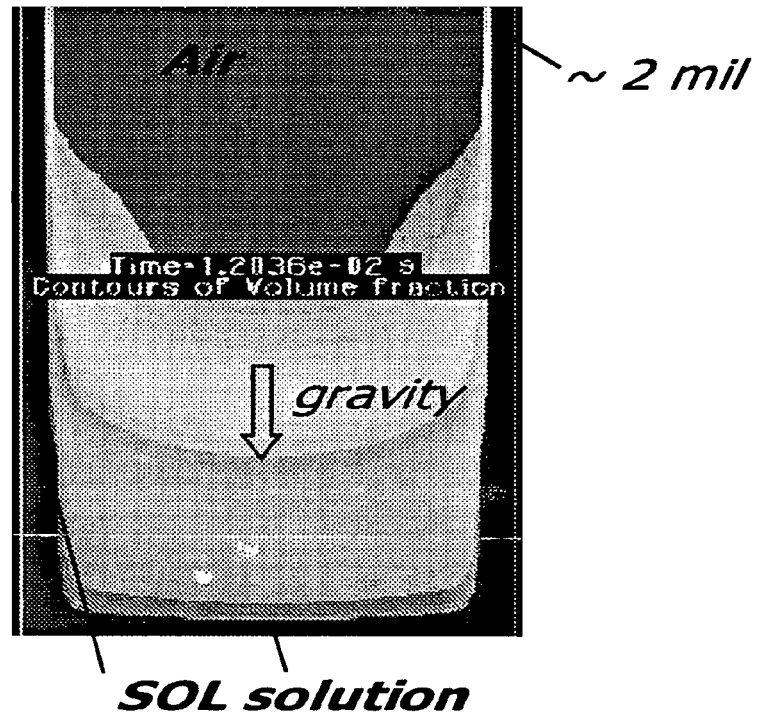
FIG. 36 is a computational fluid dynamics (CFD) simulation indicative of a thickness of liquid layer directly after draining in a vertical channel having a gap of 0.04 inches.

In some multichannel design embodiments, at low flow rates, friction losses may dominate causing flow to primarily pass through the center of a multichannel array. One solution to this problem is to place a flow distribution plate prior to a multichannel array. This concept is illustrated in FIG. 35 which shows flow being forced to the periphery of a distribution plate 3502. Generally, this can be accomplished by a plate with orifices preferentially distributed nearer the periphery of the plate than to the center. Preferably, a second orifice plate 3504 with a two-dimensional array of equally distributed holes follows the first plate. The combination of the first and second plates, preferably in further combination with an open redistribution zone (not shown) following the first plate, equalizes pressure over the front surface of an array and reduces flow maldistribution through a multichannel array. A partially exploded view of a multichannel device using the combination of first and second flow redistribution plates 3602, 3604 is shown in FIG. 36.

Figure 37:
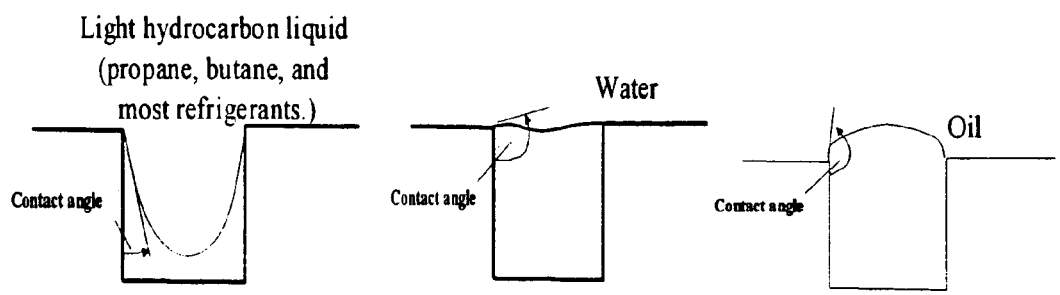
FIG. 37 is a representation of the effect of contact angle on liquid hold-up associated with a microfin/groove.
Figure 36I:
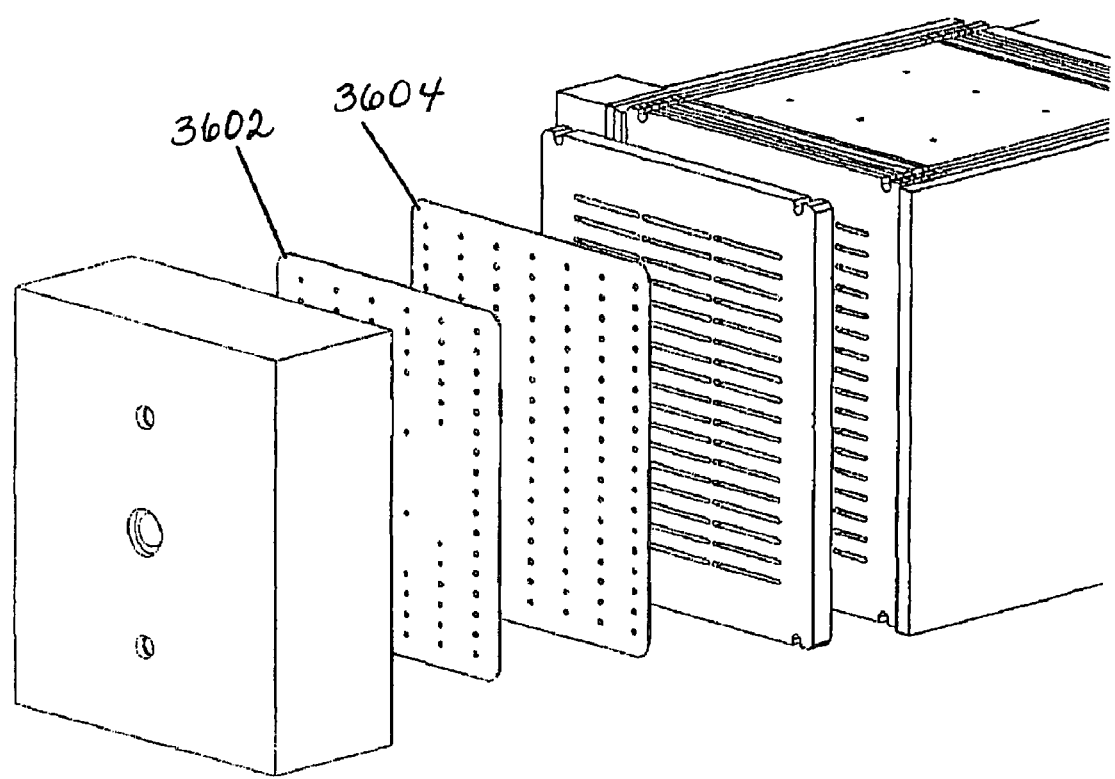
Figure 37I:
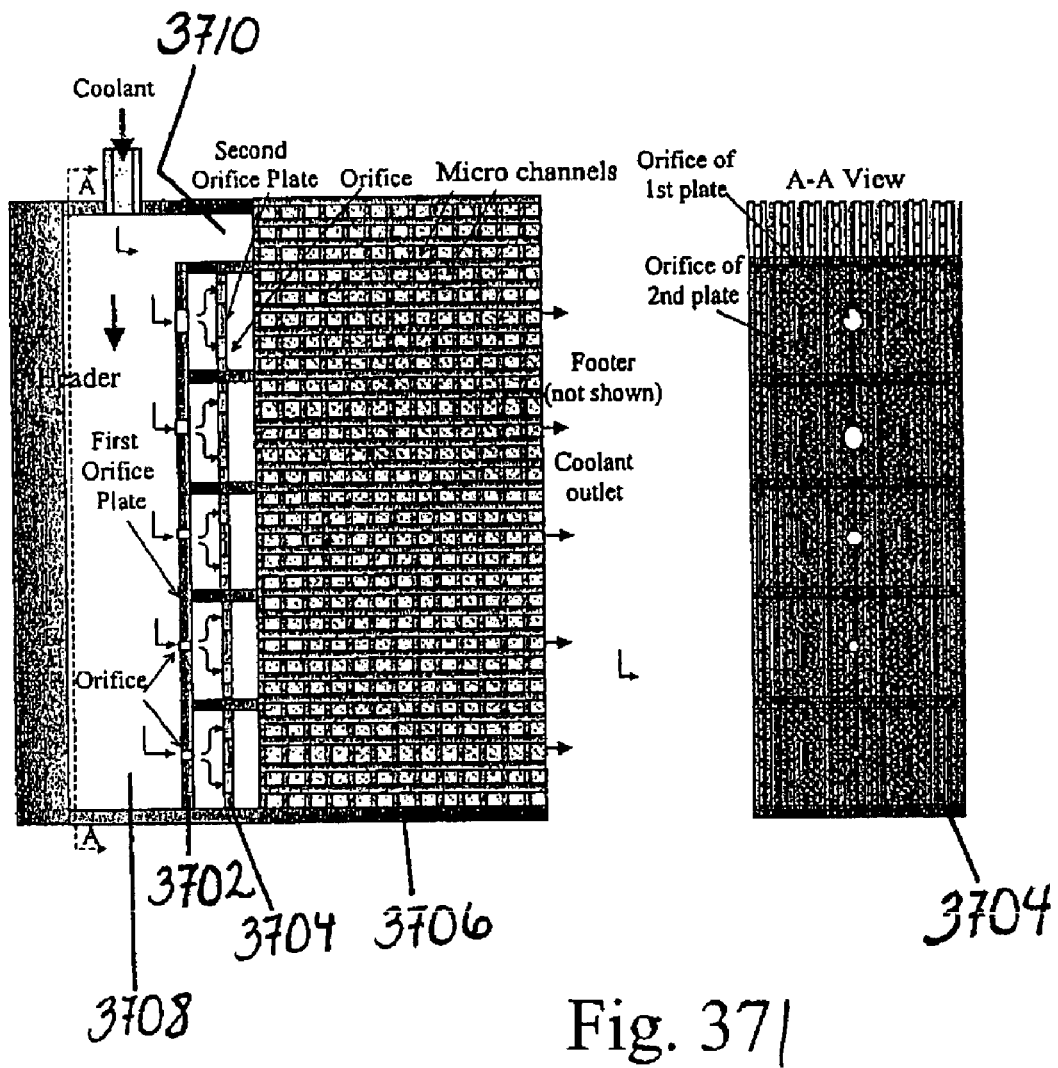
Figure 38L:
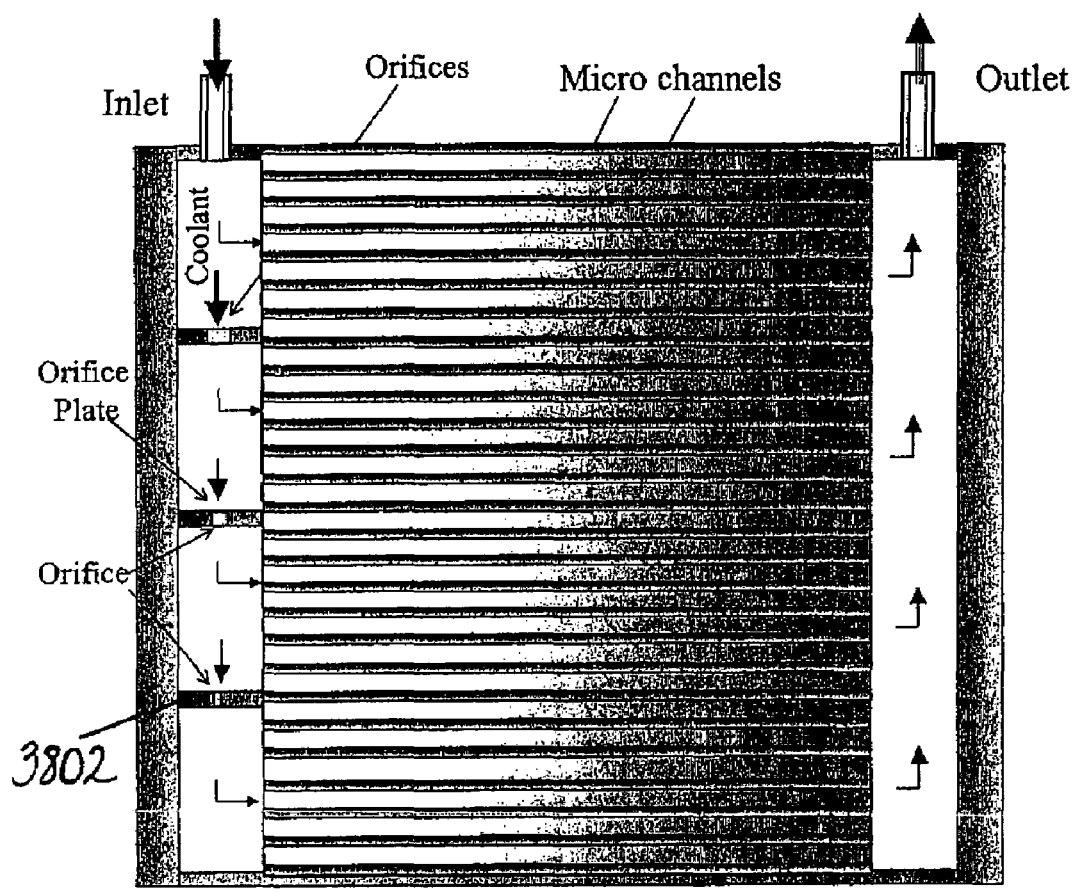

Cross sectional and side views of another design with first and second flow distribution plates is illustrated in FIG. 37. In this design, the first orifice plate 3702 has differing gate sizes to control flow. The varying gate sizes can either be used to equalize flow, or to provide a nonuniform flow for instances in which nonuniform flow is desired. In the cases when local flow maldistribution (within the segment) would occur using one orifice plate, for example, if the frictional loss is too small in the microchannels (too short of a channel) or velocity in the orifice is very high, a second orifice plate 3704 with a number of large orifices offset from the orifice position of the first plate (i.e., nonaligned) is needed to divert the flow stream from the single orifice and ensure a uniform distribution within the segment of microchannels (i.e., connecting channel matrix 3706). In some embodiments, because of the difference in turning losses, equal flow can be obtained with a portion 2710 of the connecting channel matrix in direct contact with the manifold 3708 without intervening orifice plates.

Figure 38:
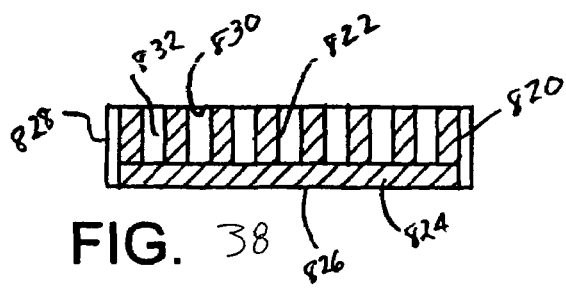
FIG. 38 is a schematic illustration of a process microchannel that may be used in the inventive process, the process microchannel containing a fin assembly comprising a plurality of fins, a catalyst being supported by the fins.

In some embodiments, plates containing one or more orifice are disposed within the header. See FIG. 38. In the illustrated device, plates 3802 with one or more orifices are of a shape that fits in the header cross section and can be mounted (sealed or welded) inside the header so as to separate the header of a microchannel device into several segments. The orifice sizes are designed according to the desired flow rate and pressure drop for the corresponding group (arrays) of the microchannels to realize a designed stepwise profile of flow rate and pressure drop over the whole device. As the pressure varies from segment to segment, the segment-averaged flow rate in the microchannels can be different from segment to segment or can also be the same for a uniform flow distribution. The illustrated design contains 6 microchannels within each segment; however, it should be realized that any number of channels may be present in a segment, for example, in some preferred embodiments, 2 to 100 channels, and in some embodiments 10 to 50 channels. The illustrated design has orifice plates with decreasing orifice sizes in the direction of flow to compensate for momentum and provide more equal flow through the connecting channels. The illustrated plates are parallel to the connecting channels. By selecting the number of orifice plates, the orifice size or number, the flow rate difference between the microchannels of a single segment can also be designed and limited within an allowable range. As such, a stepwise flow distribution can be achieved. As one example, if the illustrated layer were a coolant layer in an integrated reactor containing an adjacent reactor layer (not shown) in cross-flow relationship, coolant flow is concentrated in the area immediately adjacent to the front (hottest part) of the reactor layer.

Figure 39:
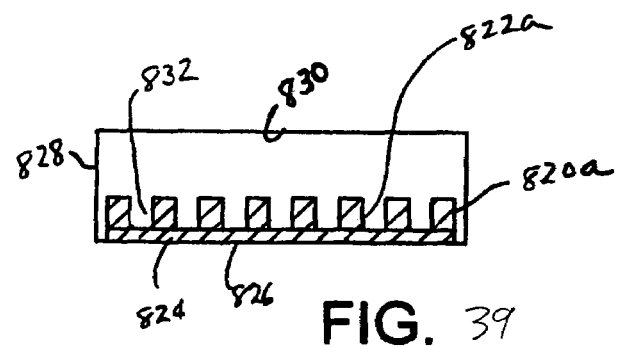
FIG. 39 illustrates an alternate embodiment of the process microchannel and fin assembly illustrated in FIG. 38.
Figure 40:
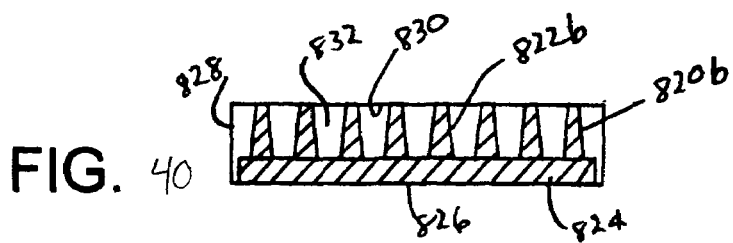
FIG. 40 illustrates another alternate embodiment of the process microchannel and fin assembly illustrated in FIG. 38.
Figure 34:
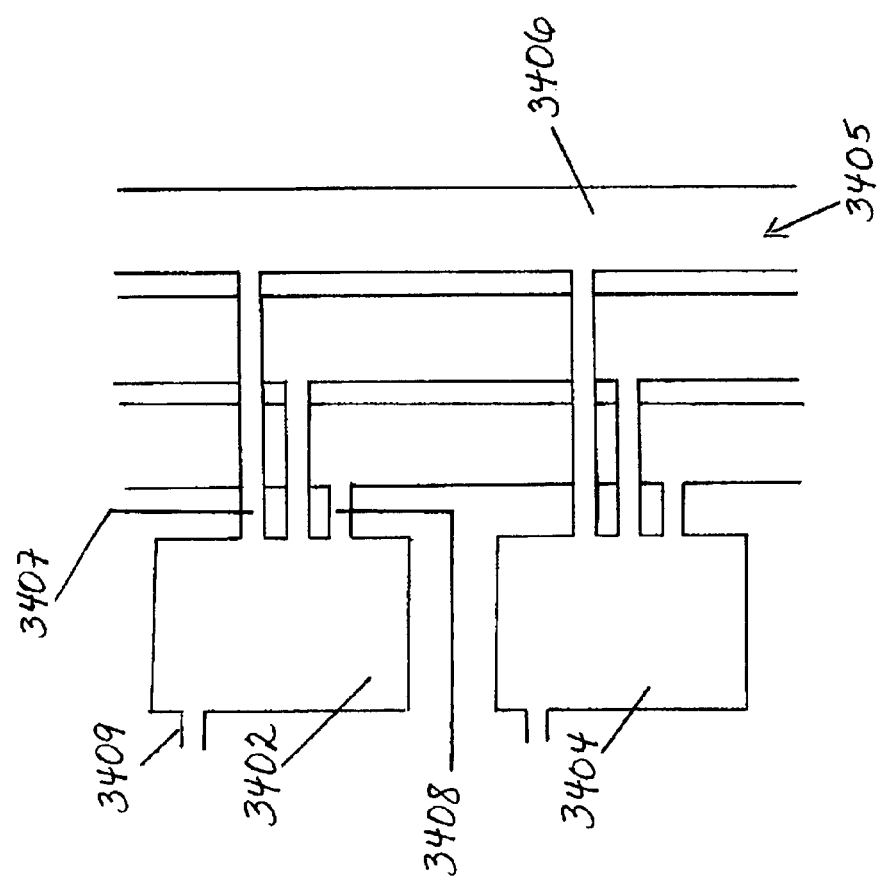
Figure 35:
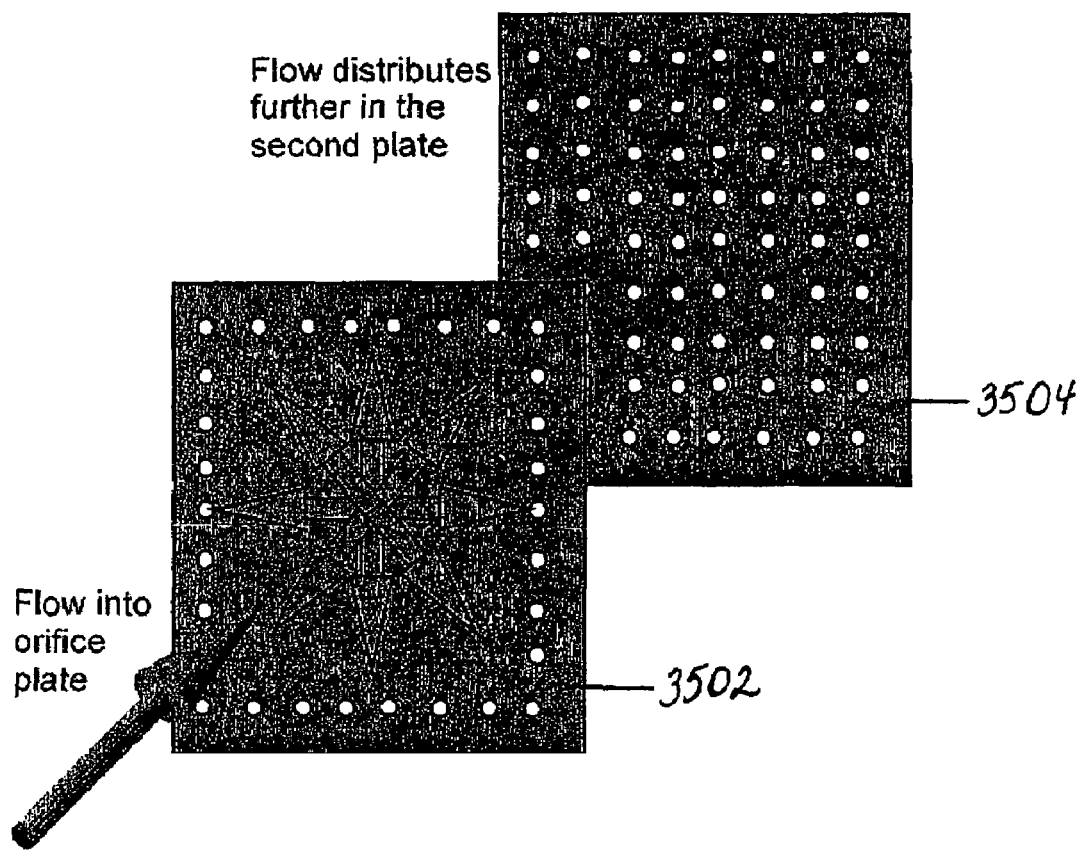
Figure 39A:
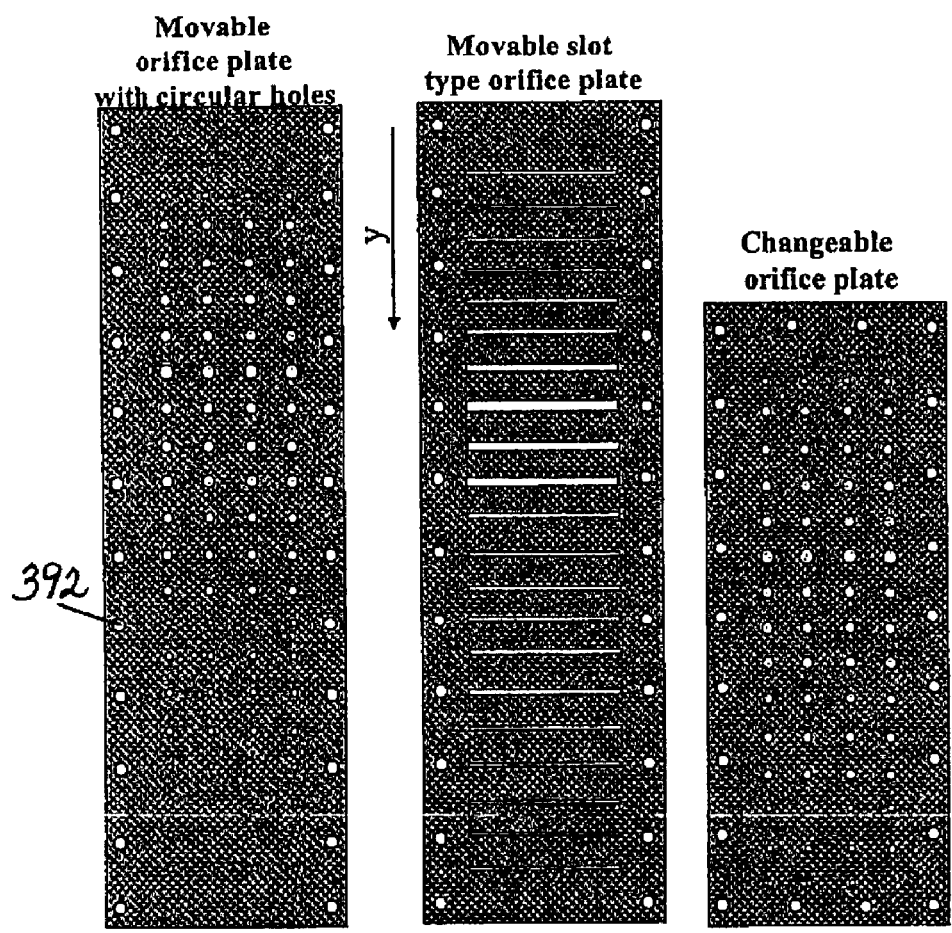
Figure 42:
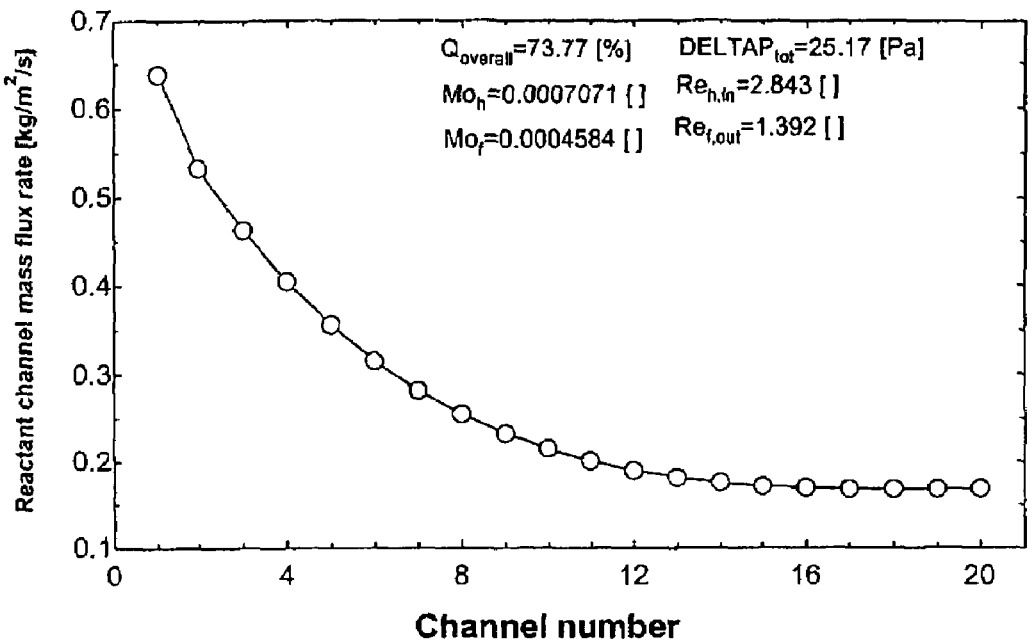
Figure 43:
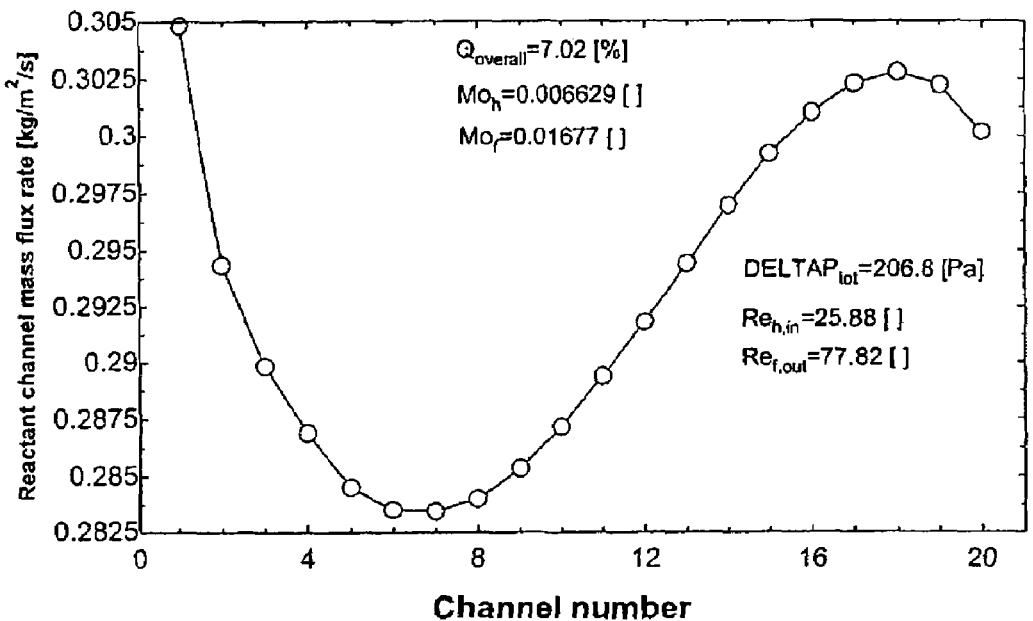
Figure 46I:
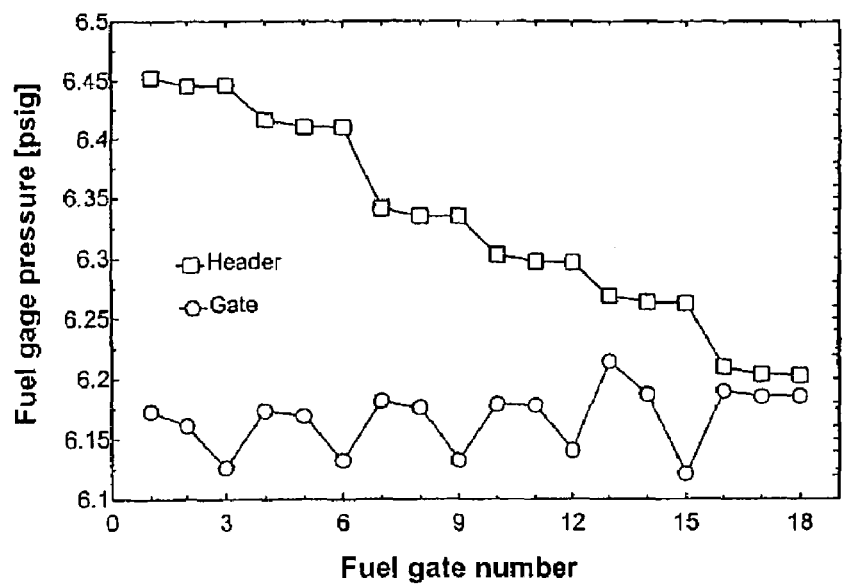
Figure 47I:
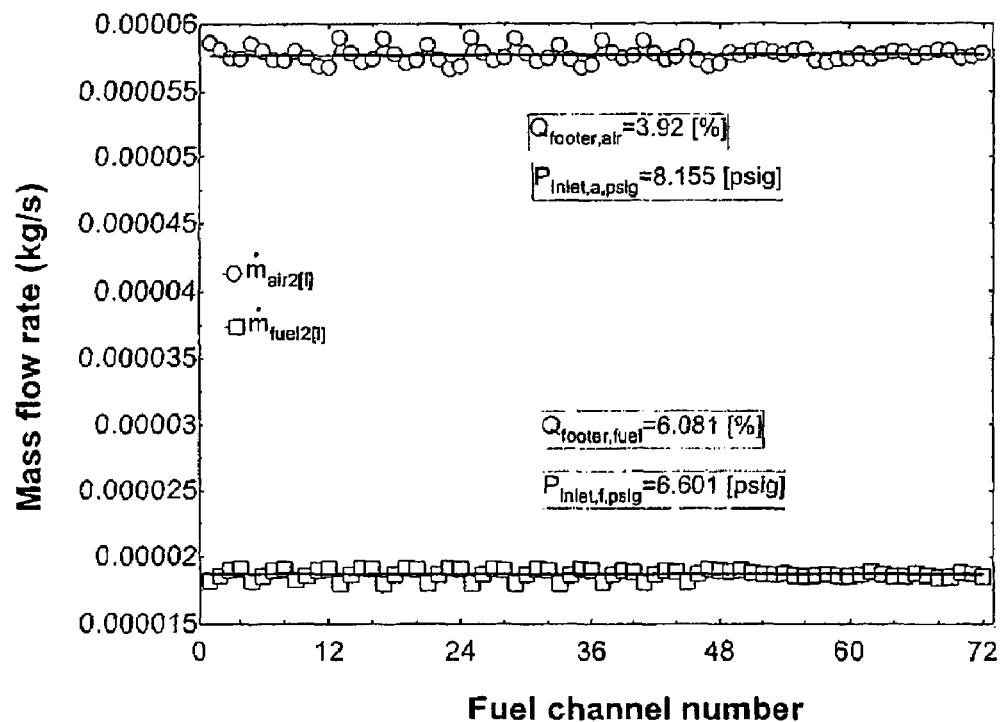
Figure 48J:
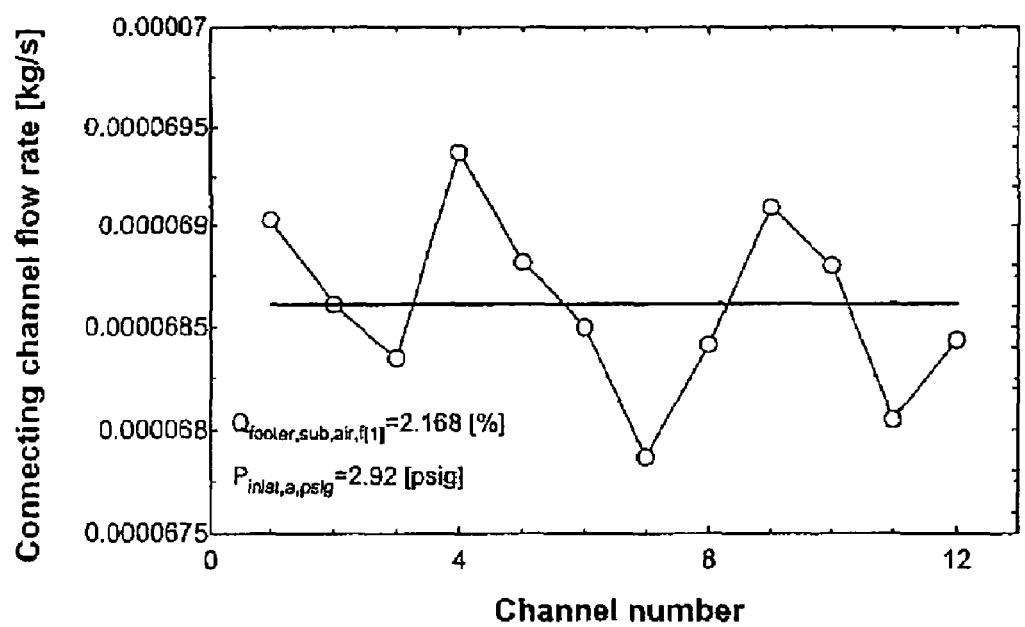
Figure 49L:
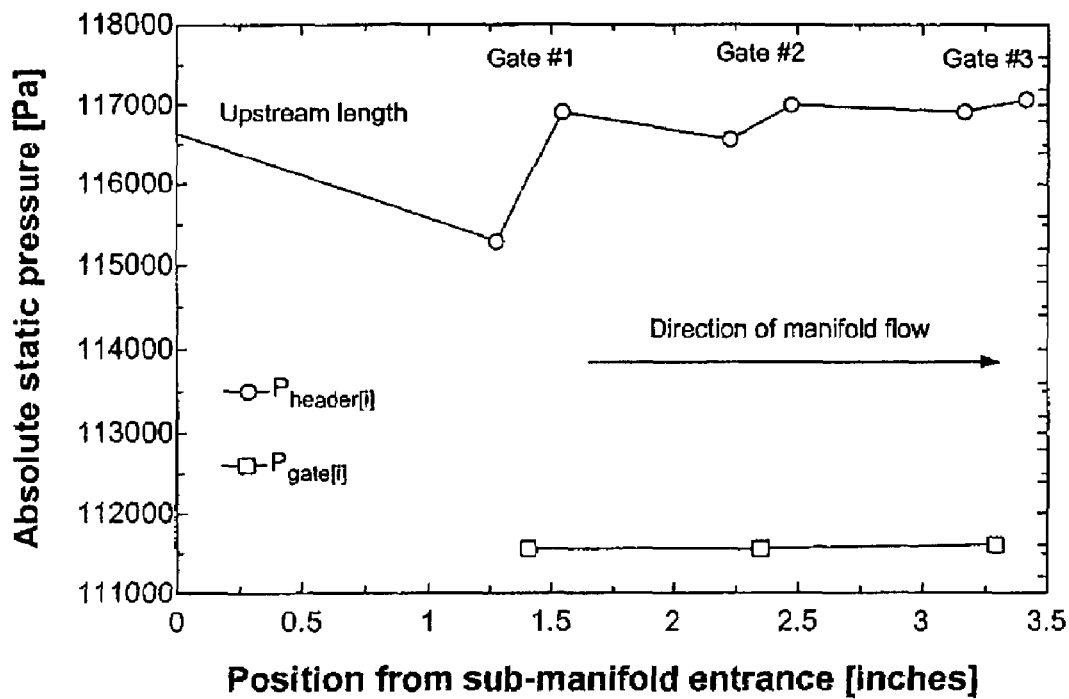
Figure 50L:
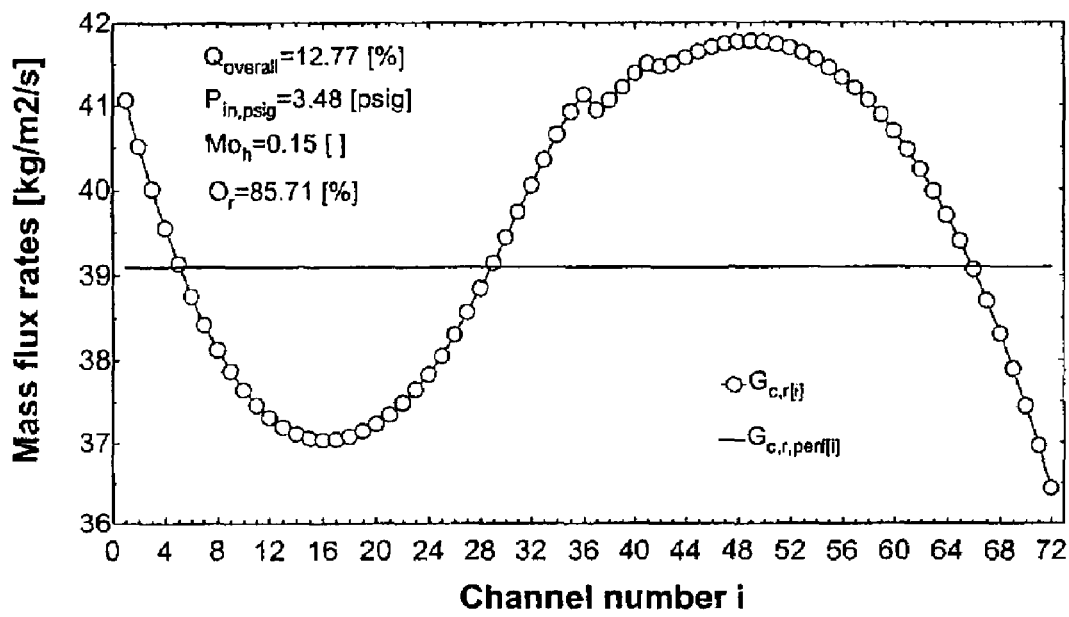
Figure 51I:
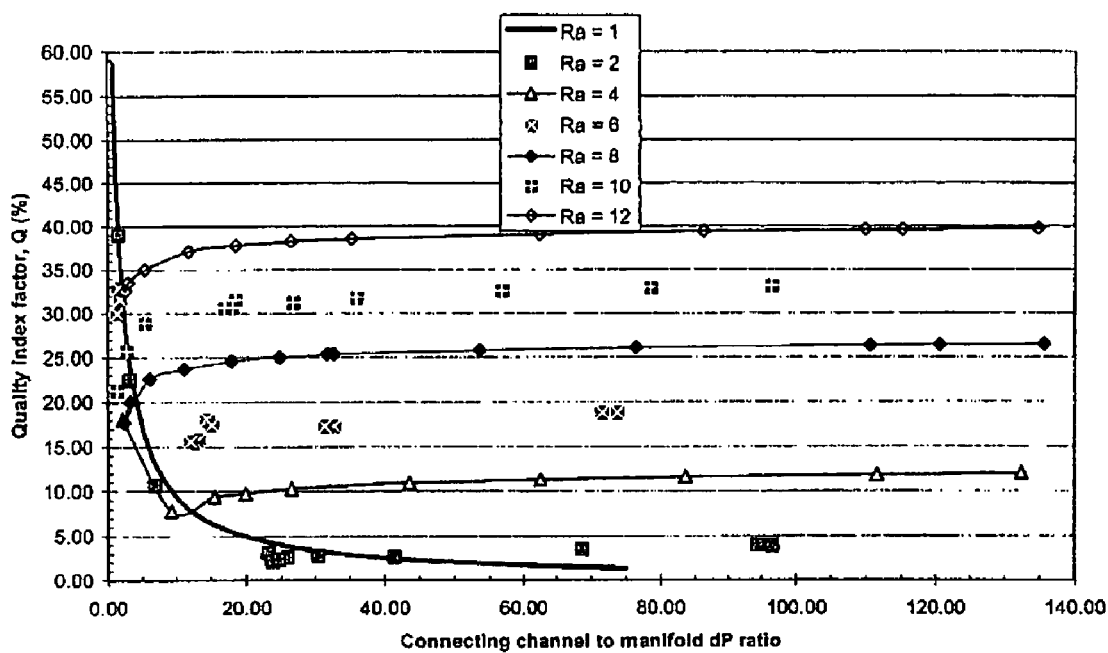
Figure 52I:
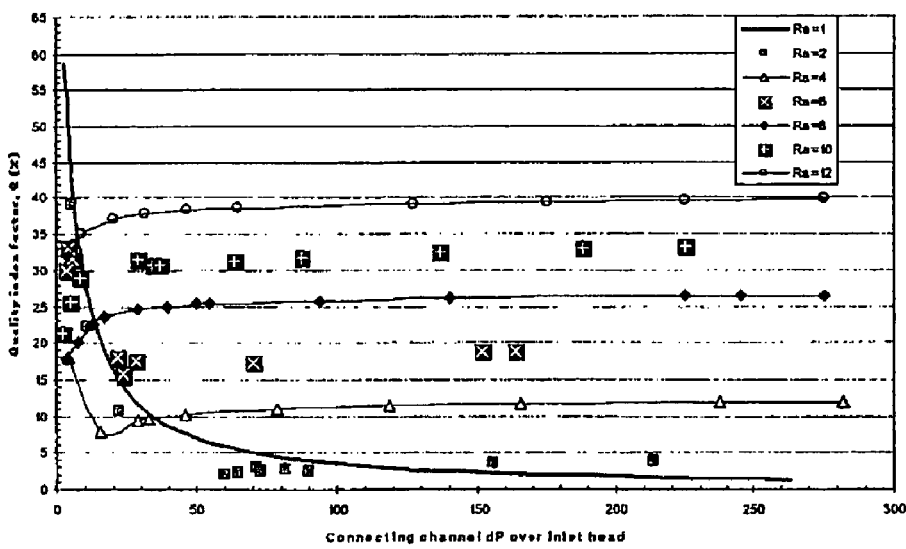

Orifice plates can have equally distributed orifices of similar or identical sizes, monotonically increasing or decreasing open areas, or can be designed with any desired orifice distribution. For example, FIG. 39A shows orifice plates with holes or slots that increase to a maximum area then decrease down their length. In general, a moveable orifice plate between a manifold and connecting channels can be used to vary flow rate into connecting channels. For example, the plates in FIG. 39B have optional screw holes 392 for use as moveable plates. As shown in the A-A view, the orifice plate can be moved up or down to vary flow. The plate can be mounted and sealed between the header of the device and the channel inlet face using screws. When a flow distribution profile change is needed, the relative position between the plate and the channels can be changed by unscrewing the plate and moving the plate to a position corresponding to the designed new distribution profile. Thus, different flow distribution profiles within the same device can be obtained, and flow rates optimized for varying conditions.

Device Fabrication

Sheets and strips for forming laminated devices can be formed by processes including: conventional machining, wire EDM, plunge EDM, laser cutting, molding, coining, water jet, stamping, etching (for example, chemical, photochemical and plasma etch) and combinations thereof. For low cost, stamping to cut apertures through a sheet or strip is especially desirable. Any shaping or forming process can be combined with additional steps. Some of the inventive methods can also be characterized by the absence of certain forming techniques; for example, some preferred methods do not utilize etching, casting, melting a powder, molding, chemical or physical deposition, etc.

To form a laminated device, a sheet or strip is stacked on a substrate. For purposes of the present invention, a substrate is broadly defined to include another sheet or strip or a thicker component that could be, for example, a previously bonded sheet stack. Preferably, multiple sheets and/or strips are aligned in a stack before bonding. In some embodiments, a brazing compound is placed on one or more surfaces of a sheet or strip (or plural sheets and/or strips) to assist bonding. Sheets and strips should be aligned in a stack. Alignment can be achieved by making sheets and/or strips with alignment apertures and then using alignment pins to align the sheets and/or strips in a stack. A stack (including a subassembly that does not include all the components of a final device) can be lifted from pins, or the pins can be removed (such as by burning or by pulling out pins), or the pins can become bonded in the stack. Another alignment technique utilizes molds for aligning sheets and/or strips; this technique can be especially useful for positioning flow modifiers such as ribs. In some embodiments, molds remain in place while the stack components are attached in place such as by welding, heating an adhesive, or diffusion bonding; subsequently, the molds are removed. In other embodiments, the mold can be removed before the components are bonded. Molds can be reusable or can be single use components that could be removed, for example, by burning out.

The sheets, strips and subassemblies may be joined together by diffusion bonding methods such as ram pressing or hot isostatic pressing (HIPing). They may also be joined together by reactive metal bonding, brazing, or other methods that create a face seal. Welding techniques, such as TIG welding, laser welding, or resistance welding, may also be used. Devices can alternatively be joined by the use of adhesives.

In cases where a full length seal is desired to provide fluid containment, seam welding can be employed to form a complete seal between a substrate, strip and/or flow modifier. Tack or spot welding can be used to hold strips, flow modifiers or subassemblies in place, without creating a complete seal along an entire edge. Usually, the tack welded assemblies will be subjected to a subsequent bonding step.

Brazing techniques and compositions are known and can be employed in forming devices of the present invention. Braze cycles longer than about 10 hours can result in better devices that show less distortion and have better bonding.

Techniques for assembly and/or bonding of devices can use the same techniques or a mixture of techniques. For example, a subassembly could be welded together and then welded to a second subassembly that itself was formed by welding. Alternatively, for example, a subassembly could be spot welded together, brazed to a second subassembly, and the combined assembly diffusion bonded.

Numerous microchannel, laminated devices can be made with the components described herein and/or structures described herein and/or made using the methods described herein. Such laminated devices can be, for example, heat exchangers, reactors (integrated combustion reactors are one preferred type of reactor), separators, mixers, combinations of these, and other microchannel, laminated devices that are capable of performing a unit operation. The term "laminated articles" encompasses laminated devices as well as laminated subassemblies.

While the individual laminae are quite thin, the device dimensions are not particularly limited because numerous laminae (of a desired length and width) may be stacked to any desired height. In some preferred embodiments, the inventive articles contain at least 5 laminae, more preferably at least 10, and in some embodiments, more than 50. In some preferred embodiments, the articles contain at least 2, in some embodiments at least 5 repeating units (with each repeating unit containing at least 3 different laminae).

In some embodiments, at least one fluid is flowing through the manifold, and in some embodiments, this fluid is a gas. The header or footer can be shaped to fit an end of a subassembly, for example a square end on a header/footer to match one side of a cubic subassembly.

The articles may be made of materials such as plastic, metal, ceramic, glass and composites, or combinations, depending on the desired characteristics. In some preferred embodiments, the articles described herein are constructed from hard materials such as a ceramic, an iron based alloy such as steel, or monel, or high temperature nickel based superalloys such as Inconel 625, Inconel 617 or Haynes alloy 230. In some preferred embodiments, the apparatuses are comprised of a material that is durable and has good thermal conductivity. In some embodiments, the apparatuses can be constructed from other materials such as plastic, glass and composites. Materials such as brazes, adhesives and catalysts are utilized in some embodiments of the invention.

The present invention may include chemical reactions that are conducted in any of the apparatus or methods of conducting reactions that are described herein. As is known, the small dimensions can result in superior efficiencies due to short heat and mass transfer distances. Reactions can be uncatalyzed or catalyzed with a homogenous or heterogeneous catalyst. Heterogeneous catalysts can be powders, coatings on chamber walls, or inserts (solid inserts like foils, fins, or porous inserts). Catalysts suitable for catalyzing a selected reaction are known in the art and catalysts specifically designed for microchannel reactors have been recently developed. In some preferred embodiments of the present invention, catalysts can be a porous catalyst. The "porous catalyst" described herein refers to a porous material having a pore volume of 5 to 98%, more preferably 30 to 95% of the total porous material's volume. The porous material can itself be a catalyst, but more preferably the porous material comprises a metal, ceramic or composite support having a layer or layers of a catalyst material or materials deposited thereon. The porosity can be geometrically regular as in a honeycomb or parallel pore structure, or porosity may be geometrically tortuous or random. In some preferred embodiments, the support of the porous material is a foam metal, foam ceramic, metal felt (i.e., matted, nonwoven fibers), or metal screen. The porous structures could be oriented in either a flow-by or flow-through orientation. The catalyst could also take the form of a metal gauze that is parallel to the direction of flow in a flow-by catalyst configuration.

Alternatively, a catalyst support could be formed from a dense metal shim, fin or foil. A porous layer can be coated or grown on the dense metal to provide sufficient active surface sites for reaction. An active catalyst metal or metal oxide could then be washcoated either sequentially or concurrently to form the active catalyst structure. The dense metal foil, fin, or shim would form an insert structure that would be placed inside the reactor either before or after bonding or forming the microchannel structure. A catalyst can be deposited on the insert after the catalyst has been inserted. In some embodiments, a catalyst contacts a wall or walls that are adjacent to both endothermic and exothermic reaction chambers.

The invention also includes processes of conducting one or more unit operations in any of the designs or methods of the invention. Suitable operating conditions for conducting a unit operation can be identified through routine experimentation. Reactions of the present invention include: acetylation, addition reactions, alkylation, dealkylation, hydrodealkylation, reductive alkylation, amination, ammoxidation aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dehydrogenation, oxydehydrogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (including hydrodesulferization HDS/HDN), isomerization, methylation, demethylation, metathesis, nitration, oxidation, partial oxidation, polymerization, reduction, reformation, reverse water gas shift, Sabatier, sulfonation, telomerization, transesterification, trimerization, and water gas shift. For each of the reactions listed above, there are catalysts and conditions known to those skilled in the art; and the present invention includes apparatus and methods utilizing these catalysts. For example, the invention includes methods of amination through an amination catalyst and apparatus containing an amination catalyst. The invention can be thusly described for each of the reactions listed above, either individually (e.g., hydrogenolysis), or in groups (e.g., hydrohalogenation, hydrometallation and hydrosilation with hydrohalogenation, hydrometallation and hydrosilation catalyst, respectively). Suitable process conditions for each reaction, utilizing apparatus of the present invention and catalysts that can be identified through knowledge of the prior art and/or routine experimentation. To cite one example, the invention provides a Fischer-Tropsch reaction using a device (specifically, a reactor) having one or more of the design features described herein.

EXAMPLE 1

Comparative Calculated Example

Calculations have been conducted based on a design shown in FIGS. 51 to 64 of Golbig published patent application US 2002/0106311A1. In this design, a fluid flows into two separate headers of the same dimensions. The header intersects at a right angle with the ends of connecting channels of varying widths; the widths varying from widest at the start of the header to the narrowest channel at the end. The object of this design was to enable "viscous fluids to be processed in parallel fluid channels with substantially equivalent residence time distributions." The varying channel width tailors the connecting channel flow resistance to compensate for the differences between the header and footer pressure for a given fluid viscosity and flow rate, adding resistance to channels with larger pressure difference driving forces and less resistance to those with lower pressure difference driving force.

While the publication does not specifically describe all the dimensions of the design, approximate dimensions can be surmised from the text. From paragraph 292, the shims have a thickness of 0.3 mm, and paragraph 295 shows the relative channel widths in units which appear to be a multiplicative factor of channel height. Measuring channel widths from the figure, and comparing to the unit dimensions in paragraph 295, we calculate that 0.1 cm of measured distance is equal to 0.393 mm in the design. Similarly, the connecting channel lengths are measured to be 13.8 cm, correlating to an actual design length of 54.3 mm, with ribs between channels of 0.59 mm, header width of 0.39 mm, and footer width of 2.55 mm. In paragraph 138 it is stated that limiting openings to a maximum of 2 mm enhances the bonding process—this limit is consistent with our calculated range of channel openings. The preferred embodiment of this invention is desired to have substantially equivalent residence times.

Golbig et al. use an analogy to circuit theory, and use the laminar flow regime to describe flow. Thus, we calculate pressure drop as $$\Delta P = \frac{4fL}{D}\frac{G^2}{2\rho} \quad (1)$$

$$= \frac{4L}{D}\left(\frac{C}{Re}\right)\frac{G^2}{2\rho}$$

$$= \frac{4L}{D}\left(\frac{\mu C}{GD}\right)\frac{G^2}{2\rho}$$

$$= \left(\frac{2\mu CL}{D^2}\right)\frac{G}{\rho} = \left(\frac{2\mu CL}{D^2}\right)U$$

where
C [dimensionless]=Coefficient, a function of channel dimensions and perimeter
f [dimensionless]=C/Re=Fanning friction factor
D [m]=Hydraulic diameter=4(cross-sectional area)/(channel perimeter)
L [m]=length of channel
G [kg/m$^2$/s]=Mass flux rate
ρ [kg/m$^3$]=Density
Re [dimensionless]=Reynolds number=GD/□
U [m/s]=Mean channel velocity
μ [kg/m/s]=Dynamic viscosity of the fluid The resistance for any section becomes $$R = \frac{2\mu CL}{D^2} \quad (2)$$

The equation (1.3) assumes fully developed laminar flow, meaning the boundary layer in the channel has fully developed over the channel length L. Using the definition of dimensionless hydrodynamic length x$^+$, $$x^+ = \frac{L}{DRe} \quad (3)$$

the flow is approaching fully developed flow around a x$^+$ value of 0.05, and is much closer to developed flow at a x$^+$ value of 1[1]. If resistance path lengths L are small, either the hydraulic diameter D or Re must become small to get reasonable x$^+$ values. To meet the limitation of x$^+$>0.05 to 1 for given channel hydraulic diameters, we will look at low Reynolds number values.

[1] R. K. Shah and London, A. L. "Advances in Heat Transfer. Supplement 1. Laminar flow forced convection in ducts—A source book for compact heat exchanger analytical data." Academic Press, New York, 1978, p.212.

The system we used for analysis has the same dimensions as described above, with the following assumptions and factors:

Two header inlet mass flow rates of equal flow rate, and the distributions of the two headers are assumed to be the same.

The reactant streams have the mass flux rates from the header, while the product stream mass flux rate have the combined flow of the two header inputs for channel i $$2G_{react}[i]=G_{prod}[i] \quad (4)$$

Ignore the pressure drop losses in the transitions for the streams between shims and on mixing, as the first will be a small addition and the latter because the stream momentums are so low.

Use air at room temperature (20° C.) and have the footer outlet at 101325 Pascals [Pa] or 1.01325 bar. Golbig's preferred process doesn't specify a specific temperature rise or species change, so we are arbitrarily setting the conditions.

Quality index factor will be based upon mass flux rates with the Q$_2$ equation $$Q_2 = \frac{G_{max} - G_{min}}{G_{max}} \times 100\%$$

The system had two options for the header laminar Fanning friction factors f,

Fully developed flow

Developing flow, with the L in the $x^+$ equation (0.17) based on the distance away from the entrance in the header and the distance from the beginning of the manifold in the footer.

The first case that was investigated was for a flow rate of $10^{-06}$ kg/s flow to each header, with fully developed flow in the manifolds, and all turning losses and momentum compensation effects removed. The channel mass flux rates for the case are plotted in FIG. 401. The $Q_2$ factor is almost 71%. The mass flux rate varies from 0.2 to 0.6 kg/m²/s in the channels, with flow favoring the first (i.e. widest) channels. The header and footer Mo values are on the order of 0.04 and 0.03, respectively. The pressure drop for the system was on the order of 350 Pa ($3.5\times10^{-3}$ bar) and the header inlet and footer outlet Reynolds numbers were 159 and 78, respectively.

When the momentum compensation, turning losses and laminar developing flows are added, we get worse results, as seen in FIG. 411.

As mentioned in the published application, the system dimensions are a function of the viscosities of the reactants and the products of the reaction system. The case with water at the same mass flow rate was run and the results in FIG. 421 show the results are just as poor.

Doing some optimization of header and footer widths, the Q factor comes down to 7% by setting the header and footer manifold widths to 0.004 mm and 0.003 mm, respectively. The results are shown in FIG. 431. The Mo values for the header and footer are low, on the order of 0.01. When the flow rates for this case are increased 10 fold to $10^{-05}$ kg/sec per header manifold, the performance drops precipitously in Q factor, as seen in FIG. 441. The Q factor increases to 33%, and the results show typical Z-manifold behavior for high momentum flows: higher flux rate at the last connecting channel in the header compared to the first channel. Note that the header and footer Mo values are higher than 0.05, despite low Reynolds numbers. Thus, turbulent Reynolds numbers are not required to have a high Mo value—high Mo can occur in low laminar flow.

The methodology in Golbig's patent application doesn't show equal flow distribution (low Q) for fully developed laminar flow at low head values, much less so at higher heads that lead to substantial manifold turning loss and momentum compensation terms. The reason may be the relationship between channel flow resistance and the degree to which the connecting channel's aspect ratio leads to that resistance. This is shown in Examples 4 and 5.

EXAMPLE 2

This example describes the predicted performance of the SMR module flow distribution discussed earlier in the application.

In this design, the gate widths grow wider as the length of a sub-manifold's upstream length increases, and the width of a sub-manifold increases as the sub-manifold's upstream length increases. By using the widths of both sub-manifolds and gates within sub-manifolds, the overall pressure drop seen in each sub-manifold was equalized in both air and fuel header M2M manifolds. The sub-manifold with the shortest path length (#1) across the shim has the thinnest sub-manifold width and the thinnest gates, while the sub-manifold with the longest path across the shim (#6) has the widest sub-manifold width and widest gates. The relative dimensions for the manifolds are given below in Table 1.

TABLE 1

| Sub-manifold number | M2M channel width (in) | Width of air Gates (inches) | | | Width of Fuel Gates (inches) | | |
|---|---|---|---|---|---|---|---|
| | | #1 | #2 | #3 | #1 | #2 | #3 |
| 1 | 0.400 | 0.188 | 0.175 | 0.172 | 0.105 | 0.102 | 0.094 |
| 2 | 0.500 | 0.165 | 0.167 | 0.167 | 0.122 | 0.119 | 0.103 |
| 3 | 0.500 | 0.240 | 0.235 | 0.232 | 0.143 | 0.142 | 0.127 |
| 4 | 0.550 | 0.260 | 0.260 | 0.260 | 0.160 | 0.161 | 0.145 |
| 5 | 0.600 | 0.277 | 0.277 | 0.277 | 0.299 | 0.230 | 0.152 |
| 6 | 0.600 | 0.590 | 0.580 | 0.588 | 0.560 | 0.555 | 0.550 |

Dimensions for the combustion M2M air and fuel sub-manifolds listed per sub-manifold number.
Gate number is given in the order that the manifold stream sees the gate, i.e. #1 for the first gate seen in the sub-manifold and #3 for the last gate seen.

As fluid leaves the sub-manifold's distribution zone into the gates, the constant width of the section leads to a static pressure increase to compensate the loss of dynamic pressure, minus whatever frictional losses occur in that zone. With each gate, the static pressure has the potential to increase or stay steady in this high momentum (dynamic pressure) flow, but the turning losses aren't constant over the manifold. The use of gate widths, such as in Table 1, allow us to tailor the local pressures in the device for better flow distribution. In general, decreasing the gate width with increasing gate number in a sub-manifold overcomes the momentum compensation factors in the header. FIGS. 451 and 461 show the model results for the header and gate static pressures plotted versus the gate number (18 total per manifold) for air and fuel respectively. The lower number gates add additional back pressure to compensate for shorter upstream manifold lengths. The use of the gates achieves an even pressure at the gates across the module, equalizing the pressure drop driving force to the exhaust outlet at 0.25 psig. The DPR3 ratios for both fuel and air manifolds are high for gates one through three in the first sub-manifold, but the average value is about 0.5 because the turning losses decrease as the sub-manifold number increases.

Results of the coupled combustion manifold are seen in FIG. 471, showing the model predictions of the 72 channel flow rates for air and fuel plotted versus the fuel channel number. The overall results are listed below.

Total air M2M mass flow rate: 14.96 kilograms per hour
Total fuel M2M mass flow rate: 4.84 kilograms per hour (Natural gas and air)
Total air M2M quality index factor: 3.9%
Total fuel M2M quality index factor: 6.1%
Air M2M sub-manifold to sub-manifold quality index factor: 0.2%
Fuel M2M sub-manifold to sub-manifold quality index factor: 0.5%
Inlet air M2M pressure (including turning loss from macro manifold): 8.16 psig
Inlet fuel M2M pressure (including turning loss from macro manifold): 6.61 psig

EXAMPLE 3

This example is a calculated example based on a sub-manifold that has the following features: L-manifold header, like that described; constant width, height of M2M manifold; 3 "gates", each serving four connecting channels downstream of the distribution section; and high momentum flow (Entrance Mo=0.7>>0.05). The conditions are: an outlet pressure of 1 atm (101325 Pa); air flow of 38.22 SLPM; and 20° C.

The header M2M manifold dimensions are:
  0.041" height, made from a 0.017" and a 0.023" shims and a
  0.001" tall gasket
  0.400" wide for the entire manifold ($W_m$)
  $A_M=1.04\times10^{-5}$ m$^2$
Lengths:
  From macro manifold connection to first gate: 1.250" (=$L_{u,1}$)
  From macro manifold connection to end of the manifold 3.700"
  Lengths for friction losses:
    $L_{c,1}$=0.270"
    $L_{c,2}$=0.250"
    $L_{c,3}$=0.245"
    $L_{u,1}$=1.250"
    $L_{u,2}$=0.680"
    $L_{u,3}$=0.692"

Gate and distribution section dimensions:
  Center position of gates from macro manifold:
    1$^{st}$: 1.410"
    2$^{nd}$: 2.350"
    3$^{rd}$: 3.290"
  Gate channel height: 0.024"
  Length of gate opening in flow direction: 0.060"
  Gate widths:
    1$^{st}$: 0.270" ($A_{c,1}$=0.0000041 m$^2$)
    2$^{nd}$: 0.250" ($A_{c,2}$=0.0000039 m$^2$)
    3$^{rd}$: 0.245" ($A_{c,3}$=0.0000038 m$^2$)
  Dimensions of each gate downstream distribution section:
    Length: 0.500"
    Height: 0.040" total–0.017" is in the open "picture frame" shim
    Width: 0.820"
  Connection to downstream connecting channels
    Through the 0.024" wide channel
    0.060" total length to connecting channel Connecting Channel Dimensions
  Twelve channels, 0.160" wide
  Four channels per gate, each separated by 0.060" wide ribs (3 per gate)
  Two 0.120" wide ribs separating the channels (2 total)
  2.700" wide connecting channel matrix
  Heights and widths
    For 1.000" downstream of the gate distribution section
      0.041" channel height
      $A_{cc}$=0.0000042 m$^2$
    For the last 11.500" of the channel
      0.018" channel height
      $A_{cc}$=0.0000018 m$^2$
  The channel flows end abruptly, exiting out to ambient pressure.

Equations:
Same as described in the Discussion section, but with the following additions to the downstream resistance. The gate distribution section has a resistance term for each of the four downstream channels, dependent upon gate Reynolds number. The gate has a mass flow rate continuity equation to distribute the flows. The connecting channel pressure drop has two major resistances: friction losses for the 1.000" long section downstream of the gate; friction losses for the last 11.500" of the channel; and the sudden contraction losses and the exit losses are ignored.

Results:
FIG. 481 shows the mass flow rates in each connecting channel. The predicted quality index factor $Q_1$ is 2.2%. FIG. 491 shows the predicted pressures in the header and the gates across the manifold. The header pressure profile shows the effect of frictional losses over the first 1.25" inches prior to the first gate, with the Reynolds number in the 8000 range (turbulent). The static pressures climb from the beginning of each gate (lower position value) to the end of the gate, despite friction losses. There are friction losses in the header between gates. The use of decreasing gates cross-sectional area in the direction of flow in the header to compensate for the changes in the header static pressure leads to the good distribution from gate to gate. FIG. 491 shows the pressure profile from Example 3 in the header (round dots) and in the gates (squares) plotted versus position from the inlet of the channel.

The gate turning losses are needed to compensate for the pressure profile created by the changes in flow regime. At the first gate the upstream and downstream Reynolds numbers are 8054 and 5386, respectively, well into turbulent flow regimes. The static pressure increase for the first gate in that section is dramatic, 1600 Pa, making up for the friction losses of the channel up to that point. The second gate has upstream and downstream Reynolds numbers of 5386 and 2699, which start in the turbulent range and drop into the transition range. The pressure gain at the second gate is 400 Pa, a substantial drop from the turbulent case. The third gate has upstream and downstream Reynolds numbers of 2699 and 0, which implies the flow starts in the transition flow range and end in laminar range. The pressure gain at the third gate is on the order of 160 Pa, a substantial drop from the second and first gate's static pressure gains of 400 Pa and 1600 Pa, respectively. This example shows that the effect of momentum compensation on the static pressure profile, and in turn illustrates the need to use turning losses to equalize the pressures across the gates. It also illustrates the high flow rates needed to supply millisecond contact time microchannel reactors can lead to very large Reynolds numbers in the M2M manifold when multiple channels must have high overall flow rates that are in the transition and turbulent ranges. These flow regimes have large head values that give rise to substantial momentum compensation and turning loss terms, as this example shows.

EXAMPLE 4

M2M Patent—Manifold Performance Comparison

In the following discussion, inventive manifolds are compared with designs of the type disclosed by Golbig et al. in WO 03/043730 A1. The manifold options for a L-manifold with a 72 connecting channel matrix were evaluated using a manifold design tool. The three options were as follows: a manifold split into sub-manifolds with gate connecting channel interfaces, a grate design with one large manifold width and constant channel opening and channel matrix dimensions, and a grate design with one large manifold width and channel widths varying from channel to channel (like those discussed in Golbig et al). All the designs had the same inlet mass flow rate and target mass flux rate distribution (akin to contact time). Some results follow:

The sub-manifold design using variable width gates for sub-manifold flow distribution had the lowest quality index factor ($Q_1$=6.03%), but had a relatively high manifold pressure drop over inlet head ratio (8.8) due to the gate M2M turning losses. The pressure drop was estimated at 3.25 psid from the macro manifold to the outlet. The final width of the manifold was 3.45", with 3.15" actual open space. It is possible to further improve this design for lower quality index factors.

The option of a grate design with a single M2M manifold and constant connecting channel width dimensions had poor quality index factors for most gate widths, obtaining values of $Q_1$=41.08% to 29.03% for M2M widths of 2.5 inches to 3.5 inches.

The third option was a grate design with a single M2M manifold with the option of varying the connecting channel width as that used by Golbig et al. This design was not able to match the low quality index factor of the sub-manifold and gate design. It reached a low of $Q_2$=12.8% with a 2.00" wide manifold, which greatly lowered the manifold pressure drop to head ratio down to 3.9. Large changes in channel width are needed to obtain reasonable control, i.e. large values of Ra were needed to obtain good flow distribution.

Common Manifold Features

There are 72 channels, whose total width must add up to 11.52"(=72×0.160") The walls (i.e ribs) in between the channels make the total manifold length add up to 16.800". The matrix channels are 0.017" in height, while the manifold-to-connecting channel opening is 0.023" tall. In between these two zones there is a short length 0.040" tall. There is a 1" long zone upstream of the manifold and all systems have a common macro-to-M2M turning loss. All manifold sections have a total height of 0.040"(1.016 mm). The grate systems assume a 0.023" zone (shim) lies beneath the 0.040" tall manifold section, with the grate extending across the entire M2M manifold width. A total of 0.00494 kg/second of air was sent through all three systems at 20° C., with an outlet pressure of 101.325 kPa.

Sub-Manifolds with Gate System

The sub-manifold system dimensions, both M2M channel widths and gate widths, are given in Table 1.

TABLE 1

The sub-manifold and gate design dimensions.

| Sub-manifold number | M2M channel width (in) | Width of Gates (inches) | | |
|---|---|---|---|---|
| | | #1 | #2 | #3 |
| 1 | 0.400 | 0.270 | 0.250 | 0.245 |
| 2 | 0.500 | 0.272 | 0.255 | 0.251 |
| 3 | 0.500 | 0.352 | 0.330 | 0.325 |
| 4 | 0.550 | 0.390 | 0.363 | 0.358 |
| 5 | 0.600 | 0.368 | 0.349 | 0.342 |
| 6 | 0.600 | 0.580 | 0.440 | 0.430 |

The resulting manifold parameters for this case are: The height of the M2M channel ($h_{M2M}$) is 1.016 mm. The total length of the manifold is 16.800" in total, and each $L_{M2M}$ value is 2.700" for each sub-manifold. The ratio of the length of the channels between the end of the gate and the 11.5 inch long section to $L_{M2M}$ is 0.23-1.66, based upon sub-manifold lengths. The sub-manifold Mo values ranged from 0.70 to 0.77. The $Q_1$ values for the connecting channel and sub-manifolds are 6.0% and 0.3%, respectively. The Ra value for the system's gates are 2.36 and the manifold's pressure drop is 8.83 times its inlet head.

The Grate with Constant Channel Widths

Performance was calculated with all channel widths set to 0.160 inch. The results are shown in Table 2. The table shows improvement in the quality index factor with increasing channel width, but the overall Q factors are very large. The major driving force for the poor distribution is the turning losses from the M2M manifold to the channels. These turning loss values are large at the entrance of the manifold due to the large flow rates seen there, adding substantial flow resistance to these channels. This in turn causes flow to skew to the channels at the end of the manifold.

TABLE 2

Constant channel width results for various manifold widths

| Manifold Width (inches) | Quality index factor Q (%) | Manifold pressure drop Over inlet head ratio | Mo value |
|---|---|---|---|
| 2.50 | 41.08 | 5.886 | 0.141 |
| 2.75 | 37.95 | 5.983 | 0.137 |
| 3.00 | 34.82 | 6.064 | 0.134 |
| 3.15 | 33.12 | 6.102 | 0.132 |
| 3.25 | 31.85 | 6.131 | 0.131 |
| 3.50 | 29.03 | 6.191 | 0.128 |

Grate design with channel widths varying from channel to channel
Channel widths distribution added up to a total of 11.52 inches of total channel width. Basing the channel width on channel number i $$Width[i] = M + L\left[\frac{|i - 36.5|}{36.5 - 1}\right]^B \quad (1)$$

where M is the median channel width value, L [inches] is the offset from the medium width, i is the channel number, and B is the power factor for changing the channel distribution. L is positive for i≦36 and negative for i>36. This equation (11) allows the distribution to be varied from linear to various curves from the median value of 0.160".

The results are shown in Table 3 for various M2M channel widths. An interesting trend appears—as the M2M channel width decreases, better control of the streams is obtained, up to a minimum value of about 2.00". This is due to the larger connection to manifold cross-sectional area ratios (connection openings to manifold) seen at thinner M2M manifold widths. As the connection to manifold cross-sectional area ratio increases, the turning losses decrease in pressure drop. That coupled with the relative decrease in connecting channel matrix flow resistance as the channels approach parallel plates for a set channel height, the net effect is less resistance to flow for the first channels in the system. FIG. 501 shows the mass flux rate distribution versus channel position in the manifold for the best case at 2.0" wide. For smaller M2M widths the momentum compensation static pressure increases eroded the control that the changing width provided.

TABLE 3

Varying channel width results

| M2M Manifold Width (inches) | M (inches) | L (inches) | B | Quality Index Factor $Q_2$ (%) | Mo | Manifold Pressure Drop Over Inlet head ratio | Ratio of widest to thinnest channels, Ra |
|---|---|---|---|---|---|---|---|
| 1.75 | 0.160 | 0.100 | 0.50 | 16.83 | 0.156 | 3.7 | 4.3 |
| 2.00 | 0.160 | 0.120 | 0.50 | 12.77 | 0.150 | 3.9 | 7.0 |
| 2.25 | 0.160 | 0.120 | 0.50 | 14.81 | 0.145 | 4.2 | 7.0 |
| 2.50 | 0.160 | 0.120 | 0.75 | 17.35 | 0.141 | 4.5 | 7.0 |
| 2.75 | 0.160 | 0.120 | 0.75 | 18.79 | 0.137 | 4.7 | 7.0 |
| 3.00 | 0.160 | 0.120 | 0.75 | 19.15 | 0.134 | 4.9 | 7.0 |
| 3.15 | 0.160 | 0.120 | 0.75 | 18.73 | 0.132 | 5.0 | 7.0 |

Table 3. Varying Channel Width Results

The channel width distribution shown in the Ra ratio was high for all of the cases. To get a good distribution with changing channels widths, you would need a large change in channel width. This may not be feasible for all processing cases or for fabrication of large numbers of these manifolds.

In summary, the quality index factors, Ra and Mo ratios for the three cases discussed above are listed in Table 4.

TABLE 4

Summary of case comparison for the 72 channel L-manifold

| Case | Connecting channel quality index factor (%) | Ra ratio | Mo ratio |
|---|---|---|---|
| Sub-manifolds with varying gates widths and constant connecting channel widths | $Q_1 = 6.0\%$ | 2.4 | 0.74 |
| Single grate manifold with constant connecting channel widths | $Q_1 = 29.0\%$ | 1.0 | 0.13 |
| Single grate manifold with varying connecting channel widths | $Q_2 = 12.8\%$ | 7.0 | 0.15 |

EXAMPLE 5

For a variable width connecting channel M2M manifold, what is the relationship between the connecting channel quality index factor $Q_2$ and the Ra and pressure drop ratio? Based on the variable channel width design shown in Golbig, WO 03/043730, Quality index factor was calculated as a function of the ratio of the area of the largest to the smallest channel (Ra) and two values of manifold pressure drop ratio discussed in the glossary section. While Example 4 was based upon a fixed connecting channel length, the results shown below reflect changing length which in turn changes the connecting channel back pressure. The results show the effect of channel width change upon flow distribution as a function of channel back pressure.

FIG. 511 shows the minimum quality index factors, based upon the dimensions discussed in Example 4, plotted versus connecting channel pressure drop over manifold pressure drop.

The Ra=1 curve shows constant channel width Q2 values, and predictably you can achieve small $Q_2$ factors for this system as the pressure drop in the channel increases. If the connecting channel pressure drop is large enough, special manifold designs may not be necessary.

As the Ra value increases from unity the Q factors for the pressure drop ratio increasing from zero fall to a minimum below the Ra=1 value. Thus, for a given back pressure, there may be a non unity Ra value that gives a better Q factor than the Ra=1 value However, as values of the pressure drop ratio increase, the $Q_2$ curves of constant Ra cross over the Ra=1 curve and to asymptote to values higher than the Ra=1 values. However, if the lengths of the channels of varying width get long enough, a maldistribution will occur due to differing resistance in the channel flow resistance.

FIG. 521 shows the same quality index factor data plotted versus the ratio of connecting channel pressure drop over the manifold inlet head, and while the curves change slightly, the general trends stay the same. The $Q_2$ surface in FIGS. 2A1-2D1 based upon Ra and $DPR_1$ is made by the constant Ra values correlations based on the curves in FIG. 521 and Lagrangian interpolation between these values to get a representative curve of best cases $Q_c$:

$$Q_c(Ra, DPR_1) = E1 + E2 + E4 + E6 + E8 + E10 + E12,$$

where $$E1 = \frac{112.9 + 1.261 DPR_1}{1 + 0.3078 DPR_1 + 0.003535 DPR_1^2}$$

$$\left[\frac{(Ra-2)(Ra-4)(Ra-6)(Ra-8)(Ra-10)(Ra-12)}{(1-2)(1-4)(1-6)(1-8)(1-10)(1-12)}\right]$$

$$E2 = \frac{91.73 - 1.571 DPR_1 + 0.01701 DPR_1^2}{1 + 0.2038 DPR_1 + 0.00193 DPR_1^2}$$

$$\left[\frac{(Ra-1)(Ra-4)(Ra-6)(Ra-8)(Ra-10)(Ra-12)}{(2-1)(2-4)(2-6)(2-8)(2-10)(2-12)}\right]$$

$$E4 = \frac{24.27 - 4.943 DPR_1 + 0.3982 DPR_1^2}{1 - 0.2395 DPR_1 + 0.03442 DPR_1^2 - 0.000006657 DPR_1^3}$$

$$\left[\frac{(Ra-1)(Ra-2)(Ra-6)(Ra-8)(Ra-10)(Ra-12)}{(4-1)(4-2)(4-6)(4-8)(4-10)(4-12)}\right]$$

$$E6 = \frac{29.23 - 2.731 DPR_1 + 0.09734 DPR_1^2}{1 - 0.1124 DPR_1 + 0.005045 DPR_1^2}$$

$$\left[\frac{(Ra-1)(Ra-2)(Ra-4)(Ra-8)(Ra-10)(Ra-12)}{(6-1)(6-2)(6-4)(6-8)(6-10)(6-12)}\right]$$

$$E8 = \frac{25.98 + 11.26 DPR_1 + 0.02201 DPR_1^2 + 0.5231 DPR_1^3}{1 - 0.8557 DPR_1 + 0.00887 DPR_1^2 + 0.02049 DPR_1^3 - 0.000002866 DPR_1^4} \times$$

$$\left[\frac{(Ra-1)(Ra-2)(Ra-4)(Ra-6)(Ra-10)(Ra-12)}{(8-1)(8-2)(8-4)(8-6)(8-10)(8-12)}\right]$$

$$E10 = \frac{20.75 - 3.371 DPR_1 + 0.9026 DPR_1^2 + 0.01277 DPR_1^3}{1 - 0.1514 DPR_1 + 0.03173 DPR_1^2 + 0.0003673 DPR_1^3}$$

$$\left[\frac{((Ra-1)(Ra-2)(Ra-4)(Ra-6)(Ra-8)(Ra-12))}{((10-1)(10-2)(10-4)(10-6)(10-8)(10-12))}\right]$$

$$E12 = \frac{51.67 + 18.94 DPR_1 + 21.57 DPR_1^2 + 21.57 DPR_1^3}{1 + 1.183 DPR_1 + 0.5513 DPR_1^2 - 0.00004359 DPR_1^3}$$

$$\left[\frac{(Ra-1)(Ra-2)(Ra-4)(Ra-6)(Ra-8)(Ra-10)}{(12-1)(12-2)(12-4)(12-6)(12-8)(12-10)}\right]$$

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A method of carrying out a reaction for the formation of hydrogen peroxide comprising:

flowing a carrier fluid through a microchannel of a microchannel reactor, the microchannel at least partially containing a catalyst;

directing an oxidant into communication with the carrier fluid; and reacting within the microchannel the oxidant with a chemical providing a source of hydrogen in the carrier fluid in the presence of the catalyst to produce hydrogen peroxide;

wherein at least one of the oxidant and the chemical is conveyed to the microchannel via staged manifolds.

2. The method of claim 1, further comprising the act of directing the chemical providing the source of hydrogen into communication with the carrier fluid prior to directing the oxidant into communication with the carrier fluid.

3. The method of claim 2, wherein:

the source of hydrogen comprises at least one of water and hydrogen gas; and the carrier fluid is substantially polar.

4. The method of claim 2, wherein the act of directing the source of hydrogen into communication with the carrier fluid includes providing a microchannel mixing zone upstream from the microchannel reactor operative to mix the source of hydrogen with the carrier fluid.

5. The method of claim 1, wherein:

the source of hydrogen, the carrier fluid, and the oxidant comprise a reactant stream flowing in direct communication with the catalyst;

the source of hydrogen comprises between about 1 and about 95 weight percent of the reactant stream; and the oxidant comprises between about 95 and about 1 weight percent of the reactant stream.

6. The method of claim 1, further comprising the act of directing the oxidant into communication with the carrier fluid prior to directing the source of oxygen into communication with the carrier fluid.

7. The method of claim 1, further comprising the act of directing the source of hydrogen into communication with the carrier fluid concurrent with directing the oxidant into communication with the carrier fluid.

8. The method of claim 1, wherein:
the source of hydrogen is at least partially soluble in the carrier fluid;
the oxidant is at least partially soluble in the carrier fluid; and
the hydrogen peroxide produced is soluble in the carrier fluid.

9. The method of claim 8, wherein:
an operating pressure exerted upon the source of hydrogen and oxidant while in communication with the catalyst is between about 1 and about 50 atms;
the oxidant directed into communication with the carrier fluid coexists in a liquid phase and a gaseous phase;
the concentration of the oxidant in the liquid/gaseous phase is between about 95 to about 1 percent;
the source of hydrogen coexists in a liquid phase and a gaseous phase; and
the concentration of the source of hydrogen in the liquid/gaseous phase is between about 1 to about 95 percent.

10. The method of claim 1, further comprising the act of providing a heat transfer fluid in thermal communication with the hydrogen peroxide product, wherein:
the microchannel of the microchannel reactor comprises a microchannel reactor repeating unit;
the microchannel reactor comprises a plurality of microchannel reactor repeating units;
the heat transfer fluid flows through a microchannel comprising a microchannel heat transfer repeating unit; and
a unit operation for hydrogen peroxide production includes a plurality of microchannel reactor repeating units and a plurality of microchannel heat transfer repeating units.

11. The method of claim 10, wherein the unit operation is fabricated to alternate the microchannel reactor repeating units with the microchannel heat transfer repeating units.

12. The method of claim 1, wherein the microchannel of the microchannel reactor includes a coating to inhibit corrosion.

13. The method of claim 1, wherein the coating includes at least one alumina, silica, titania, chromia, zirconia, aluminum, nickel, titanium, and a polymer.

14. The method of claim 12, wherein the coating is applied to the microchannel of the microchannel reactor at least one of prior to fabrication, concurrent with fabrication, and subsequent to fabrication.

15. The method of claim 1, wherein the act of directing the oxidant into communication with the carrier fluid occurs at a plurality of locations at least one of along the length of the microchannel of the microchannel reactor and upstream from the microchannel of the microchannel reactor.

16. The method of claim 1, further comprising the act of directing the source of hydrogen into communication with the carrier fluid prior to directing the oxidant into communication with the carrier fluid, wherein the step of directing the oxidant into communication with the carrier fluid occurs at a plurality of locations upstream from the microchannel of the microchannel reactor.

17. The method of claim 1, wherein the carrier fluid is flowing through the microchannel of the microchannel reactor in laminar flow.

18. The method of claim 1, wherein the oxidant is directed into communication with the carrier fluid is in laminar flow.

19. The method of claim 1, wherein the carrier fluid is polar.

20. The method of claim 1, further comprising the act of providing a heat transfer fluid in thermal communication with the microchannel of the microchannel reactor.

21. The method of claim 20, wherein the flow of the heat transfer fluid is at least one of co-current, counter current, or cross current.

22. The method of claim 20, wherein the heat transfer fluid in thermal communication with the microchannel of the microchannel reactor is in laminar flow.

23. The method of claim 20, wherein the heat transfer fluid flows through a heat transfer microchannel in thermal communication with the microchannel of the microchannel reactor.

24. The method of claim 23, wherein the heat transfer fluid includes a vapor component and a liquid component.

25. The method of claim 24, where in the heat transfer fluid includes steam and liquid water.

26. The method of claim 20, where in the heat transfer fluid includes a liquid.

27. The method of claim 20, wherein the heat transfer fluid flows through a plurality of heat transfer microchannels in thermal communication with the microchannel of the microchannel reactor.

28. The method of claim 27, wherein at least one of the microchannel of the microchannel reactor and a microchannel downstream from the microchannel reactor interposes at least two microchannels of the plurality of heat transfer microchannels.

29. The method of claim 20, wherein:
at least one component of the heat transfer fluid is involved in an endothermic reaction; and
the endothermic reaction is carried out within a heat transfer microchannel.

30. The method of claim 1, further comprising the act of separating the hydrogen peroxide product from at least one of the source of hydrogen and the oxidant downstream from the microchannel reactor.

31. The method of claim 30, wherein the act of separating the hydrogen peroxide product includes utilization of a wetted wick.

32. The method of claim 1, further comprising the act of containing the microchannel of the microchannel reactor within a pressurized vessel.

33. The method of claim 20, further comprising the act of containing the microchannel of the microchannel reactor within a pressurized vessel.

34. The method of claim 33, wherein the heat transfer fluid is pressurized within the pressurized vessel and exerts a positive gauge pressure upon the microchannel of the microchannel reactor.

35. The method of claim 33, wherein the pressurized vessel is operative to separate liquid components of the heat transfer fluid from vapor components of the heat transfer fluid.

36. The method of claim 32, wherein the microchannel of the microchannel reactor is removable from the pressurized vessel.

37. The method of claim 1, wherein the microchannel of the microchannel reactor includes at least one of a channel gap not exceeding predetermined detonation cell size, a channel length not exceeding a predetermined detonation run-up length, and dimensions ensuring that a combustion flame speed is in a laminar flow regime.

38. The method of claim 1, further comprising the act of mounting obstacles in series with the direction of carrier fluid flow to suppress turbulence.

39. The method of claim 1, further comprising the act of pre-heating at least one of the source of hydrogen and the oxidant prior to communication with the catalyst.

40. The method of claim 1, further comprising the act of adding an inert to at least one of the source of hydrogen and the oxidant prior to communication with the catalyst.

41. The method of claim 1, wherein manipulating at least one of the flow rate and concentration of at least one of the source of hydrogen and oxidant is operative to manipulate the temperature within the microchannel reactor.

42. The method of claim 1, wherein:
the source of hydrogen and the oxidant comprise a reactant stream flowing in direct communication with the catalyst;
the source of hydrogen comprises between about 95 and about 1 weight percent of the reactant stream; and
the oxidant comprises between about 1 and about 95 weight percent of the reactant stream.

43. A method of starting up a microchannel reactor to produce hydrogen peroxide comprising:
flowing a first inert stream through a first reactant microchannel of a microchannel reactor assembly, wherein the first inert stream flowing through the first reactant microchannel has a first predetermined volumetric flow rate, and wherein the first reactant microchannel is adapted to carry a chemical providing a hydrogen source;
heating the first reactant microchannel of the microchannel reactor assembly using the first inert stream;
flowing a second inert stream through a second reactant microchannel of the microchannel reactor assembly, wherein the second inert stream flowing through the second reactant microchannel has a second predetermined volumetric flow rate, and wherein the second reactant microchannel is adapted to carry an oxidant;
heating the second reactant microchannel of the microchannel reactor assembly using the second inert stream;
flowing the oxidant and chemical providing a hydrogen source into the microchannel reactor assembly, already preheated, to react and produce hydrogen peroxide.

44. The method claim 43, wherein the acts of hearing the first and second reactant microchannels of the microchannel reactor includes heating the first and second reactant microchannels at a rate of 1 C per minute.

45. The method of claim 43, further comprising the step of heating a reaction microchannel of the microchannel reactor assembly using at least one of the first inert stream and the second inert stream.

46. The method claim 45, wherein the acts of heating the first and second reactant microchannels of the microchannel reactor assembly includes heating the first and second reactant microchannels at a rate of 1 C per minute.

47. The method claim 45, wherein the acts of heating the reaction microchannel of the microchannel reactor assembly includes heating the first and second reactant microchannels at a rate of 1 C per minute.

48. The method claim 43, wherein the acts of heating the first and second reactant microchannels of the microchannel reactor includes heating the first and second reactant microchannels at a rate of 1 C per minute.

49. A method of starting up a microchannel reactor to produce hydrogen peroxide comprising:
flowing a first inert stream through a first reactant microchannel of a microchannel reactor, wherein the first inert stream flowing through the first reactant microchannel has a first predetermined volumetric flow rate;
flowing a second inert stream through a second reactant microchannel of the microchannel reactor, wherein the second inert stream flowing through the second reactant microchannel has a second predetermined volumetric flow rate;
flowing a hydrogen source stream through the first reactant microchannel of the microchannel reactor, wherein the hydrogen source stream and the first inert stream flow through the microchannel reactor at approximately the first predetermined volumetric flow rate, and wherein a volumetric flow rate of the first inert is decreased over time;
flowing an oxidant stream through the second reactant microchannel of the microchannel reactor, wherein the oxidant stream and the second inert stream flow through the microchannel reactor at approximately the second predetermined volumetric flow rate, and wherein a volumetric flow rate of the second inert is decreased over time;
commingling the flows of the first reactant stream and the second reactant stream; and
reacting at least a portion of the oxidant stream with at least a portion of the hydrogen source stream to produce hydrogen peroxide.

50. A method of shutting down a microchannel reactor producing hydrogen peroxide comprising:
reacting at least a portion of an oxidant stream with at least a portion of an hydrogen source stream to produce hydrogen peroxide;
substituting a first inert stream for a fraction of the oxidant stream;
increasing the fraction of the oxidant stream substituted by the first inert stream until the fraction approximates one;
substituting a second inert stream for a fraction of the hydrogen source stream; and
increasing the fraction of the hydrogen source stream substituted by the second inert stream until the fraction approximates one.

* * * * *